(12) United States Patent
Elmore et al.

(10) Patent No.: US 7,657,436 B2
(45) Date of Patent: Feb. 2, 2010

(54) SYSTEM AND METHOD FOR ESTABLISHING ELECTRONIC BUSINESS SYSTEMS FOR SUPPORTING COMMUNICATIONS SERVICES COMMERCE

(75) Inventors: Kevin Elmore, Danville, CA (US); Vince Hoeser, Lafayette, CA (US); David Horn, San Francisco, CA (US); Linda Horne, Oakland, CA (US); Charles Kaake, San Francisco, CA (US); Kevin Kelly, Denver, CO (US); Mark Mabel, Missoula, MT (US); Hal Rodriguez, San Francisco, CA (US); Paul Stephens, San Francisco, CA (US); Vadim Pokotylo, Castro Valley, CA (US); Girish Bakhru, San Francisco, CA (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1037 days.

(21) Appl. No.: 10/240,614

(22) PCT Filed: Mar. 30, 2001
(Under 37 CFR 1.47)

(86) PCT No.: PCT/US01/10473
§ 371 (c)(1),
(2), (4) Date: Feb. 22, 2005

(87) PCT Pub. No.: WO01/75549
PCT Pub. Date: Oct. 11, 2001

(65) Prior Publication Data
US 2006/0059107 A1 Mar. 16, 2006

(51) Int. Cl.
*G06F 17/60* (2006.01)

(52) U.S. Cl. .............................................. 705/1; 705/26
(58) Field of Classification Search ................... 705/1, 705/26
See application file for complete search history.

(56) References Cited

U.S. PATENT DOCUMENTS 5,761,499 A 6/1998 Sonderegger ............... 395/610

(Continued)

FOREIGN PATENT DOCUMENTS

EP 889 421 1/1999

(Continued)

OTHER PUBLICATIONS

Heineman, George; A Model for Designing Adaptable Software Components; 1998; IEEE.

(Continued)

*Primary Examiner*—Pierre E Elisca
(74) *Attorney, Agent, or Firm*—William S. Morriss; Frost Brown Todd LLC

(57) ABSTRACT

A comprehensive electronic business support system comprises three layers: (1) the business layer, including various smart components which unify data and business processes across all customer interactions; (2) the integration layer, including various communications messaging interfaces and enterprise application integration adapters, which provide a flexible, automated, and process driven solution for integrating across business applications and operations support systems; and (3) the presentation layer, including various customer views, which are presented via particular business portals. A smart component server provides the core services and comprehensive business process logic required to successfully conduct business online. The communications messaging interfaces integrate with back-office systems for functions such as billing, provisioning, and interconnection.

64 Claims, 21 Drawing Sheets

U.S. PATENT DOCUMENTS

| | | | | |
|---|---|---|---|---|
| 5,826,085 | A | 10/1998 | Bennett et al. | 395/683 |
| 5,970,475 | A | 10/1999 | Barnes et al. | |
| 6,470,386 | B1 * | 10/2002 | Combar et al. | 709/224 |
| 6,763,336 | B1 * | 7/2004 | Kolls | 705/44 |
| 7,225,249 | B1 * | 5/2007 | Barry et al. | 709/227 |

FOREIGN PATENT DOCUMENTS

| | | | |
|---|---|---|---|
| JP | 2001/195272 A | * | 7/2001 |

OTHER PUBLICATIONS

Huber, Franz, A. Rausch, and B. Rumpe; Modeling Dynamic Component Interfaces.

Shimura, Takeyuki, M. Yoshikawa, and S. Uemura; Storage and Retrieval of XML Documents Using Object-Relational Databases.

TOPLink; 1997; The Object People.

Office Action Final Response for U.S. Appl. No. 09/796,058, (Dec. 22, 2005).

Office Action Non-Final Response for U.S. Appl. No. 09/796,058, (Jun. 6, 2005).

Office Action Non-Final Response for U.S. Appl. No. 09/796,058, (Apr. 21, 2005).

Office Action Final Response for U.S. Appl. No. 09/796,058, (Sep. 13, 2004).

Office Action Non-Final Response for U.S. Appl. No. 09/796,058, (Mar. 26, 2004).

Information Disclosure State for U.S. Appl. No. 09/796,058, (Feb. 28, 2001).

Information Disclosure Statement for U.S. Appl. No. 09/796,058, (Apr. 2, 2001).

Office Action dated May 13, 2009 for U.S. Appl. No. 11/552,117.

* cited by examiner

190

210

Future.com

Open Trouble Ticket

Instructions

To notify of problems, enter the following information. When you finished, click □submit□.

□□□□□□□□□□□□□□□□□□□□□□□□□□□□□□□□□□□□□□□

Business Access Line 1234567894

Trouble Ticket created by:   user-0001

Trouble Ticket created on:   03/30/2001

□□□□□□□□□□□□□□□□□□□□□□□□□□□□□□□□□□□□□□□

Notify (optional)

To notify an individual, please provide the person□s name as well as phone number or email address.

Name:

Phone Number:

Email Address:

Preferred Contact Method:   _ Phone    _ Email

□□□□□□□□□□□□□□□□□..□□□□□□□□□□□□□□□□□□□

Category: ▼

Description of Problem:

□□□□□□□□□□□□□□□□□□□□□□□□□□□□□□□□□□□□□□

[ Cancel ]                                               [ Submit ] ← 211

| *Future.com* | HOME  MY HOME  BROWSE CATALOG  SEARCH  HELP |
|---|---|

| menu | cart | accounts | products |
|---|---|---|---|

Trouble Ticket Detail

Your trouble ticket has been received. When you are finished reviewing, click ☐go back☐ button.

☐☐☐☐☐☐☐☐☐☐☐☐☐☐☐☐☐☐☐☐☐☐☐☐☐☐☐☐☐☐☐☐☐☐☐☐

Trouble TicketNumber:    1000000

Status:            <u>Pending</u>        (click here to see the detailed status)

Created By:        user-0001

Created Date:      Fri Mar 30 19:12:55 PDT 2001

Contact to Notify: user 0001

Phone Number:      (415)555-5555

Email Address:     user0001@company.com

☐☐☐☐☐☐☐☐☐☐☐☐☐☐☐☐☐☐☐☐☐☐☐☐☐☐☐☐☐☐☐☐☐☐☐☐

Reported for:      Business Access Line1234567894

Category:          Intermittent dial tone

Problem Description: Dial tone is not always present

Resolution:

☐☐☐☐☐☐☐☐☐☐☐☐☐☐☐..☐☐☐☐☐☐☐☐☐☐☐☐☐☐☐☐☐☐

[ < go back ]

<u>HOME</u>  <u>MY HOME</u>  <u>BROWSE CATALOG</u>  <u>SEARCH</u>  <u>HELP</u>

*Agent chooses to ☐Supplement This Order☐ (481)*

| ORIGINAL ORDER | DISP |
|---|---|
| Access Line | COMPL |
| Voicemail | DISP |
| Call Forward | DISP |
| Call Waiting | DISP |

| QUOTE FOR SUPP ORDER | PEN_CONF |
|---|---|
| Access Line | SUPP_COMPL |
| Voicemail | PEN_CONF |
| Call Forward | PEN_CONF |
| Call Waiting | PEN_CONF |

*Agent cancels Call Waiting in Quote for Supp Order.(482)*

| ORIGINAL ORDER | DISP |
|---|---|
| Access Line | COMPL |
| Voicemail | DISP |
| Call Forward | DISP |
| Call Waiting | DISP |

| QUOTE FOR SUPP ORDER | CONFIGD |
|---|---|
| Access Line | SUPP_COMPL |
| Voicemail | PEN_CONF |
| Call Forward | PEN_CONF |
| Call Waiting | SUPP_CANCL |

*Agent replace Voicemail with Super-V Mail in Quote for Supp Order. (483)*

| ORIGINAL ORDER | DISP |
|---|---|
| Access Line | COMPL |
| Voicemail | DISP |
| Call Forward | DISP |
| Call Waiting | DISP |

| QUOTE FOR SUPP ORDER | CONFGD |
|---|---|
| Access Line | SUPP_COMPL |
| Voicemail | REPLACED |
| Call Forward | PEN_CONF |
| Call Waiting | SUPP_CANCL |
| Super V-Mail | PEN_CONF |

*Agent reconfigures Call Forwarding and Super V-Mail. (484)*

| ORIGINAL ORDER | DISP |
|---|---|
| Access Line | COMPL |
| Voicemail | DISP |
| Call Forward | DISP |
| Call Waiting | DISP |

| QUOTE FOR SUPP ORDER | CONFGD |
|---|---|
| Access Line | SUPP_COMPL |
| Voicemail | REPLACED |
| Call Forward | PEN_CONF |
| Call Waiting | SUPP_CANCL |
| Super V-Mail | CONFIGD |

Agent submits Quote to create Supplemental Order (485)

| QUOTE FOR SUPP ORDER | CONFGD |
|---|---|
| Access Line | COMPLETE |
| Voicemail | COMPLETE |
| Call Forward | COMPLETE |
| Call Waiting | COMPLETE |
| Super V-Mail | COMPLETE |

| SUPPLEMENTAL ORDER | |
|---|---|
| Access Line | COMPL |
| Super V-Mail | DISP |
| Call Forward | DISP |
| Call Waiting | DISP |

FIG. 20

SYSTEM AND METHOD FOR ESTABLISHING ELECTRONIC BUSINESS SYSTEMS FOR SUPPORTING COMMUNICATIONS SERVICES COMMERCE

TECHNICAL FIELD

The invention relates to electronic commerce technology. More particularly, the invention relates to a comprehensive electronic business support system for communications service providers.

BACKGROUND OF THE INVENTION

Bringing businesses online is challenging in any industry. In the communications industry, complex operational infrastructures and intricate partner relationships pose an even bigger challenge in extending businesses to the Internet. In addition, today's climate of active consolidation means all providers will eventually face the challenge of integrating existing operational systems with those of a newly-formed subsidiary, parent, or partner. To remain competitive, providers must evolve into new organizations based on scalable infrastructures that incorporate dynamic and automated business processes to support customer-centric activities. New systems must also be designed for flexibility and efficiency to ensure continuous and responsive customer support. Retooling an existing infrastructure, however, is a costly and time-consuming option, even for new entrants burdened by few legacy systems.

What is desired is to develop a comprehensive, communications-specific electronic business (eBusiness) solution that communications service providers can easily deploy.

SUMMARY OF THE INVENTION

This invention provides a comprehensive, modular solution that brings eBusiness to communications service providers. The solution according to the invention is based on a deep understanding of communications business processes, operations support systems (OSS) complexity, and Internet technology. It integrates marketing, sales, ordering, billing and service into a single, personalized Internet portal and brings communications service providers directly to their customers. The Internet portal fulfills the promise of "one-stop shopping", delivering targeted, convergent product bundles and round-the-clock service to valued customers. The completely open, modular architecture unites functionally segmented processes and systems across all customer touch-points. Together, these elements form a comprehensive solution that delivers speedy implementation, low maintenance cost, and rapid return on investment.

The solution is unique in that it allows customers to view their communications profile and requirements on their terms—in a format and flow consistently presented through a trusted and familiar Web browser interface. The information hub translates customer management processes into myriad discrete service order transactions, each one tracked, coordinated and reported on via the browser interface. This solution empowers customers and business partners with self-service capabilities, creating a revolutionary end-to-end customer experience that increases revenue and customer loyalty while dramatically reducing costs. It allows customers to interact with communications service providers in a whole new way with simplicity, intimacy, transparency and immediacy. Simplicity is possible because interfaces are clear, convenient and easy-to-use. Intimacy is created through expressed preferences and personalized profiles that are remembered, and service presentations tailored to customer preferences. Transparency is achieved through the presentation of meaningful status—customers understand exactly where their orders stand, reducing human intervention. Immediacy is attainable because customer requests are handled in real time.

The system according to the invention is built on a Java platform using open Internet standards, proven enterprise technology and leading workflow and middleware applications. It enables communications service providers to rapidly deploy a complete eBusiness solution all at once or in stages that fit their strategic and technical needs. The eBusiness portals are the Internet interfaces designed for a particular sales channel and audience. They provide a complete customer experience—one-stop-shopping and round-the-clock service. The invention's eBusiness platform provides the foundation for a communications-specific business model that enables a single view of the customer across functional silos. Its integration components automate business processes and leverage complex and heterogeneous OSS.

The eBusiness platform according to the invention provides a consolidated customer view and experience through a communications-specific business model spanning all customer touch-points. This end-to-end experience allows more than self-service purchasing of product bundles, by allowing customers to administer accounts, view bills, open trouble tickets, and more.

The eBusiness platform contains Smart Components and an Administrator. The Smart Components represent communications-specific data and business logic that is customer-focused, convergent, and cross-functional. They provide a single unified customer view across functional silos from marketing, sales, ordering, billing, to service and are built to Sun's Enterprise JavaBeans specifications. The Smart Components are grouped by logical functionality, providing a flexible design that makes it easy to add capabilities as the communications service provider's business evolves. Each Smart Component is designed to manage the unique application logic, data, and business rules for the communications industry and can be easily extended to implement the specific business policies and processes of a communications provider. The Administrator is a graphical user interface tool used by the communications service provider's internal staff to define and maintain the eBusiness site data.

The solution according to this invention allows for integration with operations support systems (OSS). Specifically, the Interconnect Framework provides predefined interfaces and connectivity to infrastructures. Through these components, the solution ensures that the customer experience remains simple, intimate, transparent and immediate.

The Interconnect Framework provides a flexible solution for integrating across business applications and OSSs. The solution utilizes CMIs to communicate with a communications provider's OSS. The communications messaging interfaces (CMIs) are predefined interfaces to any system, such as a communications provider's existing marketing, sales, ordering, billing, and service systems.

The eBusiness Portals, as embodiments of the solution, are the Internet interfaces that allow communications service providers to redefine the complete customer experience—integrating touch points across marketing, sales, ordering, billing and service into a personalized Web-based interface.

Each eBusiness portal provides the capabilities for a particular customer segment or sales channel. They are designed to quickly deploy a branded Internet presence. The eBusiness Portals present a communications provider communications-specific functionality and data dynamically and are easily configurable to evolve as its business changes and grows. Each of the eBusiness Portals utilizes a set of unique interfaces to meet the specific needs of the channel and audience. So whether the target customer is an IT administrator who is managing a communications service for 3,000 employees, a small business owner with 50 employees who needs Internet, phone, voice mail and other new products, or a residential customer who wants to add a new phone line or install DSL, the eBusiness Portals can be customized to support these specific customer needs. Each of the eBusiness Portals consists of a set of JavaServer Pages (JSPs) that allow for quick and easy changes to the presentation of the communications provider's portal by using standard Web development tools.

BRIEF DESCRIPTION OF THE DRAWINGS

FIG. 10 is a pictorial diagram showing a sample page wherein a user enters information to open a trouble ticket against a product in the hierarchy;

FIG. 11 is a pictorial diagram showing a sample page returned to the client via HTTP;

FIG. 20 is block diagram that illustrates a process for creating a supplemental order in the eBusiness support system.

DETAILED DESCRIPTION OF THE INVENTION

Section 1

Architecture

This section describes the architecture of the eBusiness support system according to the invention.

1.1. Overview

Figure 1:
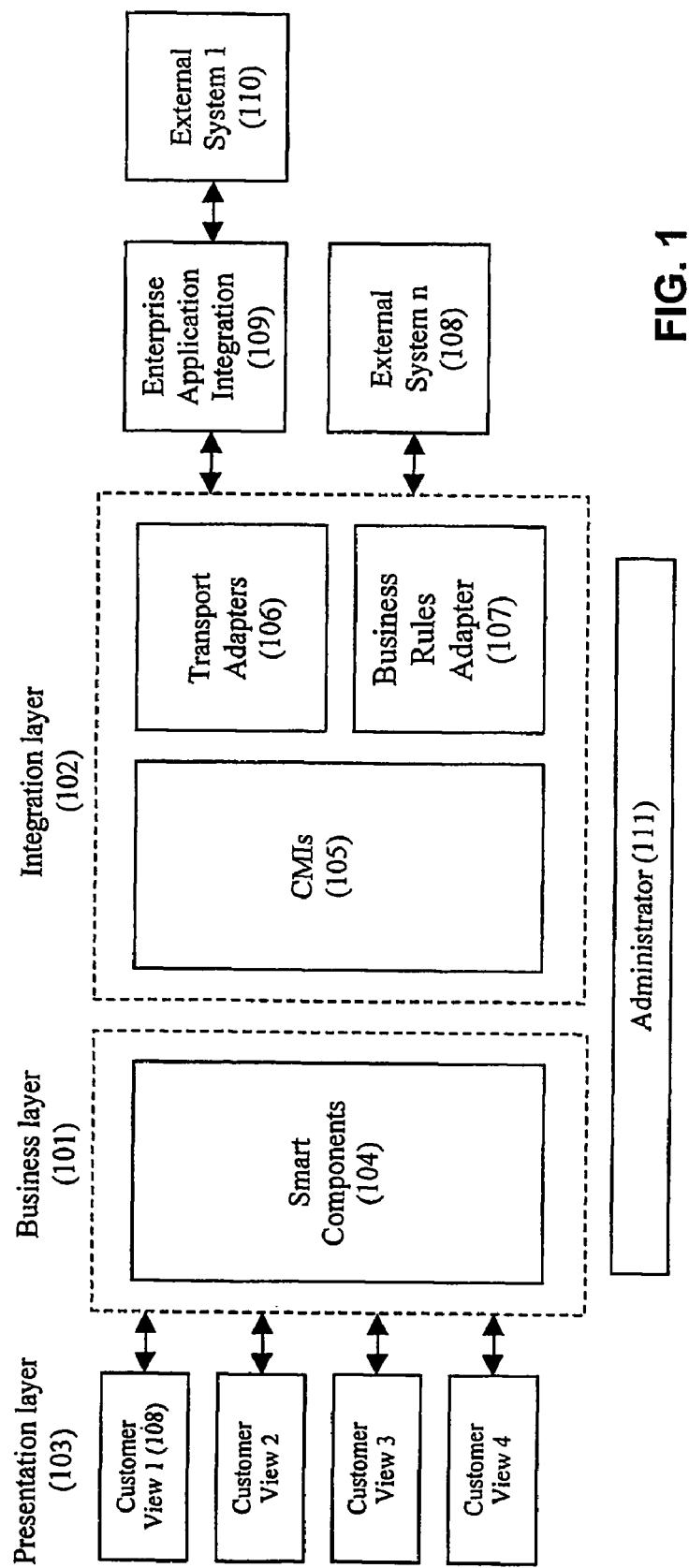
FIG. 1 is a block diagram showing the architecture of the eBusiness support system.

Referring to FIG. 1, the architecture of the eBusiness support system 100 according to this invention includes three distinct layers:

(1) Business Layer 101, which is the core of the system 100. Smart Components 104 employ Enterprise JavaBeans (EJB) technology, which allows them to encapsulate all the core functionality needed to complete communications specific business transactions. By encapsulating this functionality, Smart Components 104 provide a unified view that seamlessly presents information obtained from disparate systems.

(2) Integration Layer 102, through which Smart Components 104 access external systems 110. The interconnect service within this layer uses communications messaging interfaces (CMIs) 105 and adapters 106/107 to transport messages. The CMIs are pre-defined interfaces to common services (e.g. rating, address validation, service reservation, etc.) needed to complete client requests for customer, pre-order, order, and post order transactions. The EAI Adapters 106 provide the flexibility to integrate with an EAI package 109. These adapters are configurable software interfaces for different EAI packages, such as Vitria BusinessWare or BEA eLink. Other adapters are also available.

(3) Presentation Layer 103, in which eBusiness portals provide communications specific functionality tailored to particular types of users, such as small businesses or resellers. These portals are eBusiness sites with interfaces and process flows dedicated to particular customer group. They use JavaServer Pages (JSP) technology—standard HTML files that contain blocks of simple Java code—to dynamically generate customer views 108. The JSP-based portal architecture enables the separation of the user interface from application logic, enabling the design of the page to change without altering the underlying content. Additional components of the portal architecture include a Web session controller, which maintains user session state, and page transition policies—Java classes that enforce page transition rules by accessing business functionality contained in the Smart Components 104.

Administrator 111 is a Java-based tool that uses XML files to map object attributes to the database. It enables users in product marketing to create and configure new products and services, without the need for software code changes. It provides access to system maintenance functions for setting up secure user access.

The layered and component-based architecture provides a carrier-class performance, transactional integrity, and communications expertise. For example, the Smart Component Server has the ability to cluster Smart Components for increased performance; and maintains transactional integrity and security; provides powerful, communications-specific capabilities.

The architecture provides fast and easy integration capabilities. For example, the interconnect service facilitates interoperability with external systems; can be middleware-based of communicate directly with an external system; and provides the ability to add new message types and adapters to external systems.

The architecture also provides a flexible front-end user experience. For example, the eBusiness portals are completely independent from the core Smart Components 104. Each portal can be redesigned without rebuilding or altering core functionality; can be one of many portals simultaneously accessing the same Smart Component Server; and is adaptable to new presentation vehicles.

The communications industry demands a carrier-class eBusiness solution that provides high performance, scalability and resiliency. The Smart Components 104 in this invention are implemented as stateless session beans in order to meet these requirements.

The Smart Components 104 are clustered to increase performance. Their stateless nature obviates the need to maintain instance-specific information over invocations. This means that even though bean instances are pooled, no complex state activation logic is required. Furthermore, in case of failure, instance data need not be replicated across nodes in a cluster.

New Smart Component instances can be dynamically generated as needed to meet increasing user demand. The request load is then distributed among the Smart Components 104 to fully utilize all resources.

Because the Smart Components 104 do not maintain any state information, a client need not maintain contact with the same bean instance throughout the life of a session. The Smart Components 104 can be replicated across servers. In the event of an outage, clients are switched to another bean instance on a working server.

1.2. Smart Component Server

Figure 2:
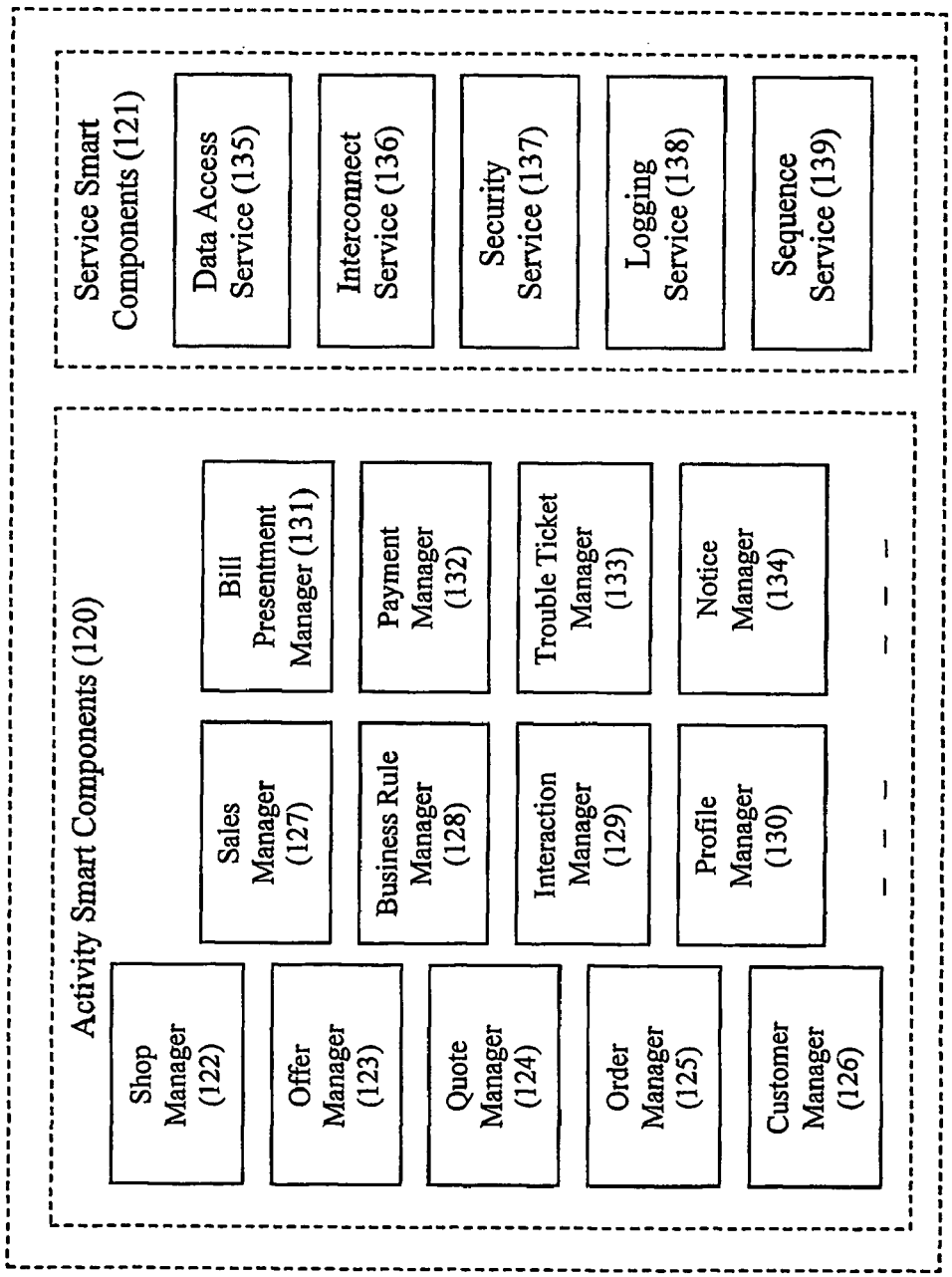
FIG. 2 is a block diagram showing the structure of the Smart Components.

Referring to FIG. 2, the business layer 101 contains two types of Smart Components: activity Smart Components 120 and service Smart Components 121. Activity Smart Components 120 encapsulate communications-specific functionality and business logic. Service Smart Components 121 provide common infrastructure capabilities. Both types of the Smart Components constitute the system's API.

1.2.1. Activity Smart Components

The activity Smart Components 104 includes a plurality of managers. For examples: (1) Shop Manager 122, which provides the ability to navigate through a catalog and place offers in a shopping cart; (2) Quote Manager 124, which provides the ability to dynamically quote product charges to the customer. Possibly in conjunction with an integrated billing system, the Quoting Manager calculates a product charge based on an action (e.g. add, remove, upgrade, recurring, etc.), time period, customer pricing group and rate method. It also manages the configuration of products and creates the quote; (3) Order Manager 125, which governs the creation of an order and sending it to an external provisioning system; (4) Customer Manager 126, which delivers a consolidated view of an enterprise vision representing the customer, accounts, users and services. Customers manage their accounts, products, services, and users from their own perspective, which could be from an organizational, location or financial reporting structure; (5) Business Rule Manager 128, which defines valid business relationships between customers, accounts, products, and processes. Works with business rules to define allowable configurations during the ordering process (e.g. a customer must have an access line to order voice-mail). Customers are now able to self-manage the complex communications-specific configurations during the ordering process and account management; (6) Interaction Manager 129, which allows customers to track an order or service request from start to finish. Customers can immediately view provisioning steps that have been completed during the flow-through provisioning process. A high-level status is provided to the customer while a detailed status is used by the provider to track potential performance enhancements; (7) Bill Presentation Manager, which presents consolidated billing views online using information from customer invoices. The bill presentation manager interfaces with external billing systems to obtain billing information for display, dispute and adjustment; (8) Trouble Ticket Manager 133, which provides a self-service mechanism for the customer to request service assistance such as reporting trouble for a product. When used with Interaction Manager 129, real-time trouble ticket status can be viewed. The trouble ticket manager interfaces with an external trouble ticket application to handle the dispatch and resolution; (9) Sales Manager 127, which provides basic functionality to support a sales force in relation to a customer hierarchy; (10) Profile Manager 130, which provides a mechanism to collect and organize information about a customer; (11) Payment manager 132, which manages payments towards non-recurring charges either by adding the charges to the customer's next invoice or by collecting a payment method at the time of ordering; (12) Notice Manager 134, which provides a mechanism to store messages for display to targeted customers.

For situations where the processing logic is likely to change for each licensee, the addition of plug-ins is supported. The plug-ins are small, dynamically deployed algorithms that a communications service provider (CSP) can implement to perform specific tasks.

For example, the CSP could create an algorithm that determines which news and information item to select based on where a customer lives. To do this, the CSP would create a plug-in that selects the news and information item based on the customer's address. The CSP could later override this behavior by creating and registering a new plug-in that selects the news and information item based on different criteria-for example, the customer's area code.

1.2.2. Service Smart Components

Referring to FIG. 2 again, Service Smart Components 121 provide common infrastructure capabilities required by activity Smart Components 120, including: a data access service (DAS) 135, which includes a plurality of value objects and a data cursor service; an interconnect service 136, which uses the communications messaging interfaces and the adapters to connect the activity smart components to external systems; a security service 137, which uses standard Internet security protocols such as SSL to ensure browser-to-server security (via HTTPs) and server-to-server security; a logging service 138, which creates files that report on specific actions within the system; and a sequence service 139, which establishes default sequence for page flows.

(1) Data Access

Figure 3:
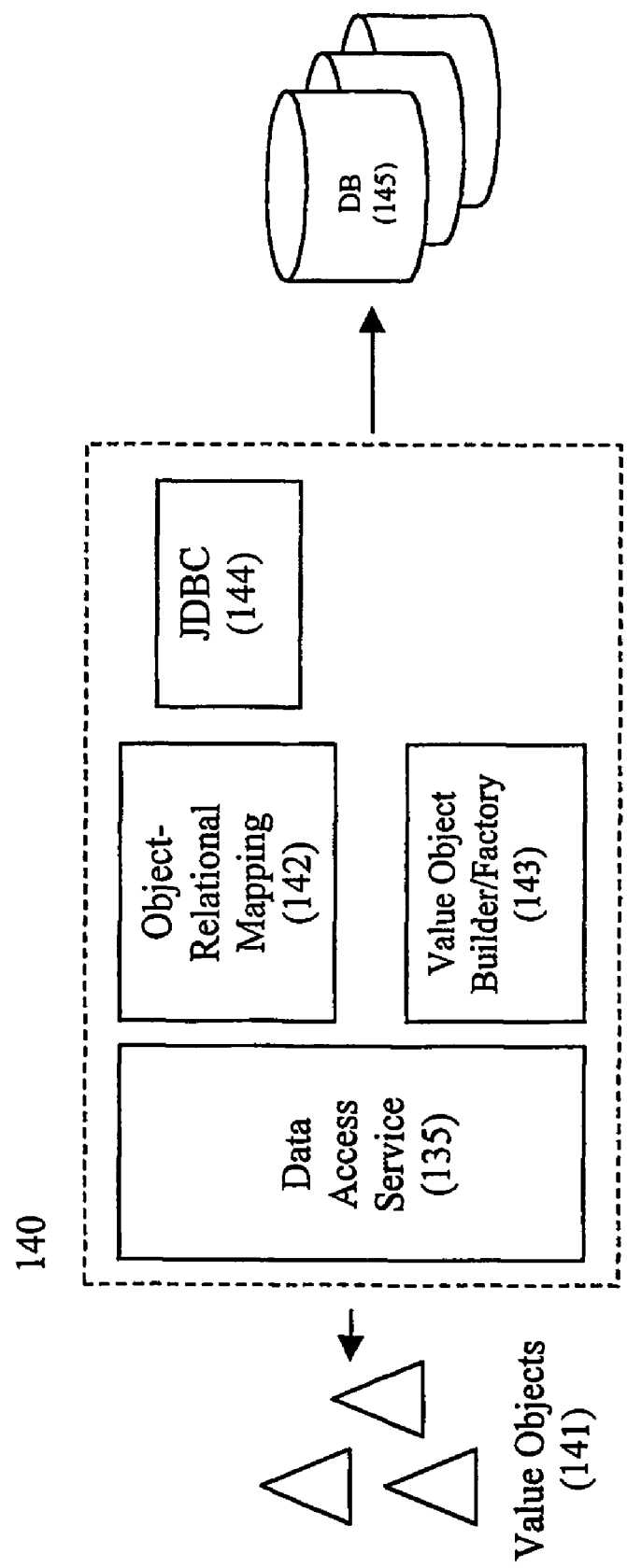
FIG. 3 is a block diagram showing a data access structure used in the system.

FIG. 3 illustrates a data access structure 140. DAS 135 provides an API that performs all create, read, update, and delete (CRUD) operations on the value objects 141 which represent data in the system. There are two types of value objects: domain objects, which represent a specific row in a database table; and display objects, which are containers that deliver attribute values to the JSP pages in the presentation layer 103. DAS 135 also includes a value object builder 143. This factory instantiates value objects 141 and sets initial attribute values.

(2) Domain Objects

The domain objects are created by DAS 135 by invoking a create method, which looks in the BUILDER table to determine the builder class to use to create the new object. DAS 135 then passes the logical class name to the buildObject method in the builder class, which creates, initializes, and returns the new object. The system employs TopLink for Java, an object relational mapping tool, to map attributes from a domain object or display object to the database. TopLink accesses the database 145 via Java Database Connectivity (JDBC) 144.

(3) Data Cursor

The data cursor service is implemented as a stateful enterprise bean. It creates a scrollable, read-only cursor used when a large result set from a query is expected. However, because the resulting list is read-only, the data cursor service cannot be used to retrieve attribute values that need to be updated.

(4) Logging Service

The logging service 138 creates files that report on specific actions within the system. A CSP can configure the logging service to meet individual business needs. Log messages contain identifiers that report on the severity of an event (e.g. fatal, critical, warning, etc.), the architectural component where the event occurred (e.g. DAS, interconnect service, activity object, etc.), and the functionality that the application was attempting (e.g. shopping cart, customer, menu, etc.). Two types of loggers are used: a file logger that sends information to a text file, and a console logger that sends information to the screen.

(5) Authentication and Authorization

An authentication service is used to verify that a user name and password is valid for the system. An authorization service determines what a given user is allowed to do within a portal.

The authentication service is used by the Customer Manager 126 to register new user IDs and passwords, as well as authenticate users logging in to the system. It provides an abstraction to a security provider that contains principal information used for authentication. Principals are specific users of the system, and can be either individual users or defined groups. In implementation, an RDBMS-based authentication security provider is used to assigns new users to specific groups. This assignment happens when a user is created in either a Universal Agent Portal or a Small Business Portal. The CSP can also use the LDAPRcalm class, which authenticates principals using a directory service such as the Netscape Directory Server. New users and groups are also entered in this directory server.

Note that LDAP can only be used for authentication (verifying a user and password are valid for the system). All authorization within the application must be done using the RDBMSRealm service. The framework accesses the CYG-ACL table before rendering a page or executing a transition policy. This table associates permissions (either allowing or restricting execution) for a JSP or transition policy with specific groups.

The groups include: (1) UA_LICENSEE_USER, which can use the Universal Agent Portal to shop for and purchase products, manage hierarchies on behalf of customers and partners, and create price overrides; (2) UA_LICENSEEAD-MINISTRATOR, which can use the Universal Agent Portal to create other users of that portal, create price overrides, and also use the Administrator Console and the licensee-level features in the Small Business Portal; (3) CP_ADMIN, which can shop for and purchase products and manage hierarchies in the Channel Partner Portal and create other users of the Channel Partner Portal; (4) CP_USR, which is a read-only user of the Channel Partner Portal; (5) SB_ADMIN, which can shop for and purchase products and manage hierarchies in the Small Business Portal and create other users of the Small Business Portal; and (6) SB_USR, which is a read-only user of the Small Business Portal.

For example, the users of a Small Business portal are assigned to one of two groups: (1) sb_customer_user, which has read-only access to the portal; and (2) sb_customer_admin, which can shop for products and manage products.

If a user assigned to one of these groups attempts to log into a Universal Agent Portal, an error message displays, and they are prevented from logging into that portal. Similarly, within a portal, access to specific pages can be restricted, and through the use of the tags in a JSP, links and content can be displayed to and executed by certain user groups.

1.2.3. Constant Classes

Constant classes are used throughout the application to store static data such as state names, street type codes, types of contacts, and so on.

When a CSP needs to add new codes and the corresponding values to the application, the CSP can either create its own constant class or subclass an existing constant class.

For example, the constant class StreetTypeCode defines codes that can be used by the application:

```
public class StreetTypeCode
{
        // FIELDS -----------------------------------------
        /** Avenue */
        public static final int            AVENUE   1;
        /** Drive */
        public static final int            DRIVE    2;
        /** Place */
        public static final int            PLACE    3;
        /** Street */
        public static final int            STREET   4;
        /** Way */
        public static final int            WAY = 5;
} // end StreetTypeCode class
```

1.3. Integration with External Systems

The interconnect service EJB provides an interface that the activity smart components use to access external systems 110. Messages that contain information for external systems 110 are sent from the eBusiness support system through a particular type of communications messaging interface (CMI) 105. Examples of these CMI types include credit card validation, address validation, and service reservation, etc.

The CMIs are designed to work via EAI facilities. They provide APIs built on best practices established by industry groups such as the TeleManagement Forum (TMF) and the Ordering and Billing Forum (OBF), and through participation with emerging standards bodies such as IPDR Working Group, and vendor programs such as SunConnect Framework for Communications. Open architecture and a standards-based technology platform ensures that messages exchanged between the eBusiness platform and existing systems leverage standard interconnect technicologies such as XML CORBA Java Messaging Service, and TUXEDO.

Figure 4:
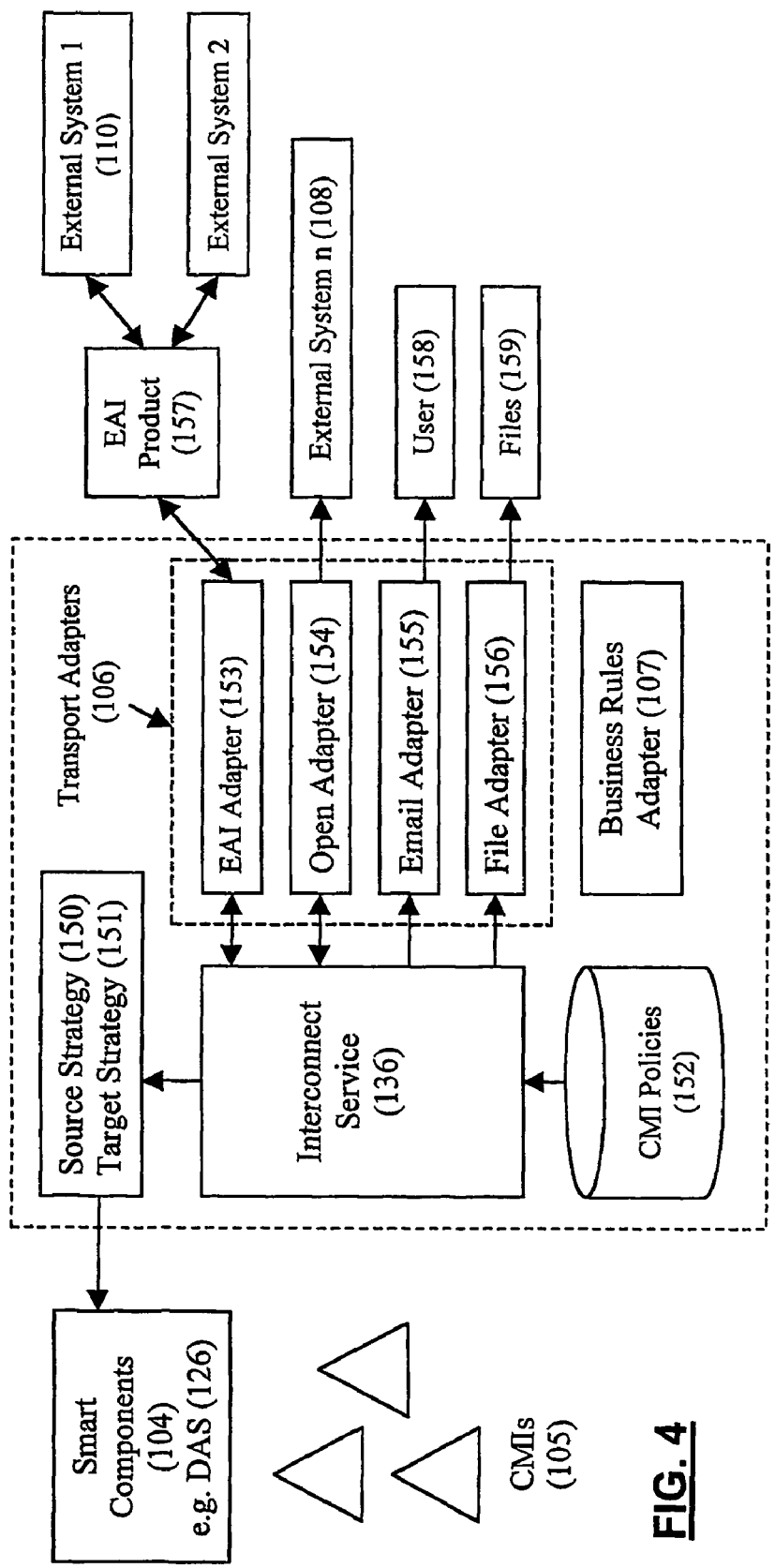
FIG. 4 is a block diagram showing a structure of connectivity between the eBusiness support system and external systems.

Referring to FIG. 4, the activity Smart Components 104 or transition policies call the interconnect service 136 to create CMIs 105 whenever the eBusiness support system needs to communicate with an external system 110. Each CMI type is associated with a CMI routing policy 152 which determines the transport adapter 153 that handles that message (CMIs can be associated with multiple adapters in the case where they may send different messages via different transport methods). Transport adapters 153 facilitate connectivity with the external system; they use strategies to retrieve data and update the system and use handlers to translate the data into a format that the external system expects.

Various transport adapters are available with the Smart Component Server. For example: (1) Default adapter—this is a file adapter 156 that prints out all CMI information sent to it. By default, all CMIs 105 deal with provisioning or trouble ticketing writing to the default adapter. A CSP can change the routing data associated with the CMI so that these use a different adapter; (2) Open adapter 154—by default, this adapter's handlers are stubs used by CMIs 105 such as address validation or credit card authorization.

A CSP can configure these handlers to send the type of message appropriate to the transport. The CSP can also create additional handlers for new CMIs, or configure existing CMIs to use different (or new) adapters or handlers. However, if the CSP needs to send many messages via a particular transport type (for example IIOP or DCOM), and if that transport type requires specific adapter properties (configured in the adapter's XML file), the CSP should create a new transport-specific adapter; (3) SMTP email adapter 155—this adapter sends email messages based on CMIs. Handlers for the email adapter 155 determine who receives the email and the template used to create the message; (4) EAI Adapter 106—this adapter is integrated with Vitria's BusinessWare, an enterprise application integration system that allows disparate systems to communicate via messages.

Each CMI 105 is also mapped to source and target strategy classes 151/152. The interconnect service 136 uses the source strategy to build up the payload message associated with the CMI before being dispatched to the transport adapter 153. Payloads are of a specific message type, such as name/value pairs or an XML, message. Target strategies are used to update the system with data from inbound messages.

Various strategies are available. For examples: (1) OidSourceStrategy, which builds a payload of OIDs. This is the default strategy used by all CMIs 105. It is the only one that can be used by the EAI Adapter 106; (2) DummySourceStrategy, which used when no source strategy is needed; (3) DummyTargetStrategy, which used when no target strategy is needed.

A CSP needs to create source strategies for each CMI that the CSP wants to actually be sent to external systems. When creating CMIs, the CSP can set the CMI_LOG flag so data about the dispatching of CMIs is persisted to the CMI_LOG table.

To receive inbound messages, inbound transport adapters 153 need to be created. The inbound transport adapter 153 creates a CMI, invokes the remote method receiveCMI(cmi) on the interconnect EJB. The interconnect service receives the inbound CMT and uses the target strategy to update the data model or to call the API.

1.3.1. How the Interconnect Service Sends CMIs

Figure 5:
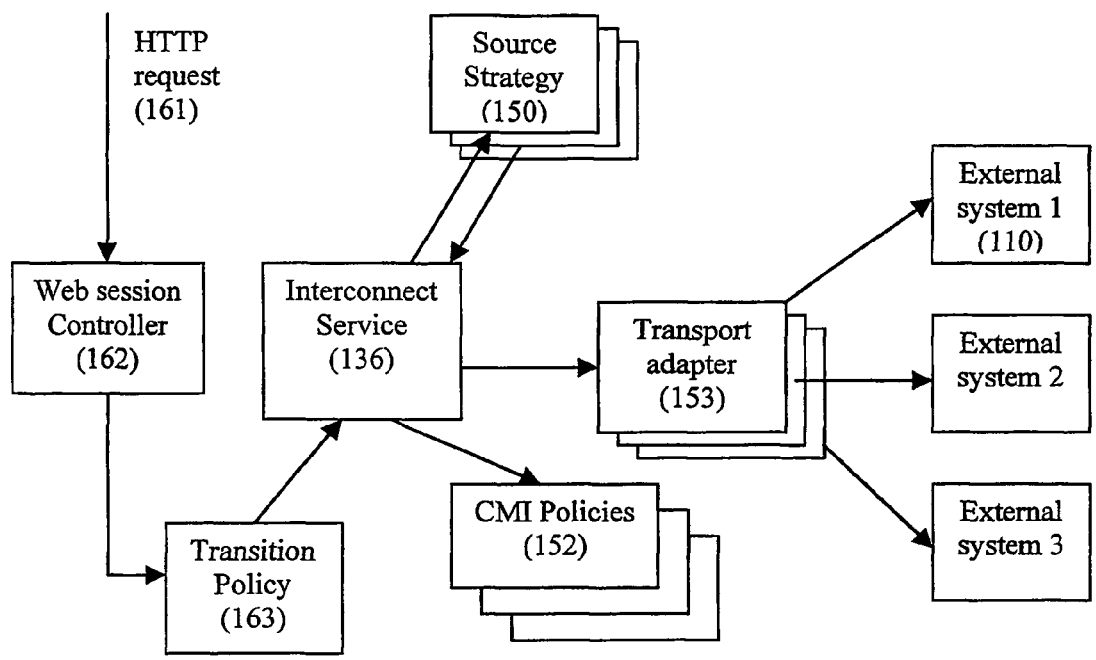
FIG. 5 is a block diagram illustrating a process for sending a message to an external system.

FIG. 5 illustrates a process 160 that a transition policy 163 or an activity uses the interconnect service 136 to send a message to an external system. The process includes the steps of:

(1) The createCmi method on the interconnect service 136 is called, passing in the code value of the CMI.

(2) The createCmi method returns an empty CMI object.

(3) The putCmiDataItem method on the CMI object is called, passing in the Object Identifier (OID) and the fully qualified class name of the domain object that contains the event information the CSP wants to send. The source strategy 150 uses this information to retrieve data for the message.

(4) The sendCmi method on the interconnect service 136 is called, passing in a reference to the CMI object created in step (2). The sendCmi method returns information about the CMI response.

(5) The interconnect service 136 performs a database lookup in the CMI_CMI_POLICY table to determine which routing policy to use for the CMI.

This table maps each CMI code to the fully-qualified Java class of its routing policy. The routing policy determines the adapter to invoke and if the CMI is to be logged.

The eBusiness support system provides three routing policy classes: (a) a default policy that sends CMIs to the default file adapter 156; (b) a generic policy that uses the GENERIC_CMI_POLICY table to determine the adapter to which the CMI is delivered; and (c) a vendor product policy that uses the VENDOR_PROD_CMI_POLICY table to determine the adapter to which the CMI is delivered based on a product's action. For more advanced policies, a CSP needs to write its own policy class.

(6) If the default routing policy is used (or if no policy is specified) the routing policy sends the CMI to the file adapter 156 with a default payload (OIDs).

(7) If a generic routing policy is used, the routing policy class performs a database lookup in the GENERIC_CMI_POLICY table to determine which adapter to use. This table associates the CMI with: (a) Adapter home, which is the JNDI-bound name of the adapter; (b) Context, which is used to determine how to translate the data into a format the external system expects. Examples of context include the handler class name, an email address, a fax number, or any information the adapter needs to pass on the message; (c) Payload, which determines the type of message being sent, such as a class name and OID, a name/value pair, or an XMI, document. There is a payload constant for each payload type.

(8) If a vendor product policy is used, the routing policy class performs a database lookup in the VENDOR_PROD_CMI_POLICY table to determine which adapter to use. This table associates the CMI with: (a) an action, (b) vendor product OID, (c) adapter home, (d) context, and (e) payload. Vendor product routing policies are useful when the adapter to use varies depending on the action performed on a product. For example, to "Add" an access fine, the eBusiness support system might send a CMI to an external provisioning system. However, to "Remove" the same access line, the system might send an email. In this case, the VENDOR_PROD_CMI_POLICY table would contain one row for the "Add" action that sends the CMI to an adapter which uses handlers to deliver to the external system 110. The table would contain another row for the "Remove" action that calls an email adapter 155 to send an email to the CSP.

(9) The interconnect service 136 performs a database lookup in the SOURCE_TARGET_STRATEGY_POLICY table to determine the source strategy 150 to use for the CMI and the given payload. The strategy is invoked and it calls the Smart Component Server (either through DAS or a direct API call) to collect the data needed to build up the payload. If the default file adapter 156 was associated with the CMI, then the default source strategy 150 (OidSourceStrategy) is used.

(10) The adapter sends the message out to the external system 110.

(11) If in the CMI_CMI_POLICY table, the CMI_LOG_FLAG is set to 1, the interconnect service 136 populates the CMI_LOG table with dispatch information. The interconnect service also updates the CMI_DOMAINOBJECT_LOG.

If a CMI has multiple entries in the CMI_CMI_POLICY table, then the steps (5) through (11) are repeated again for the CMI. The order in which the process is repeated depends on the order in the database.

1.3.2. How the Interconnect Service Receives Messages

Figure 6:
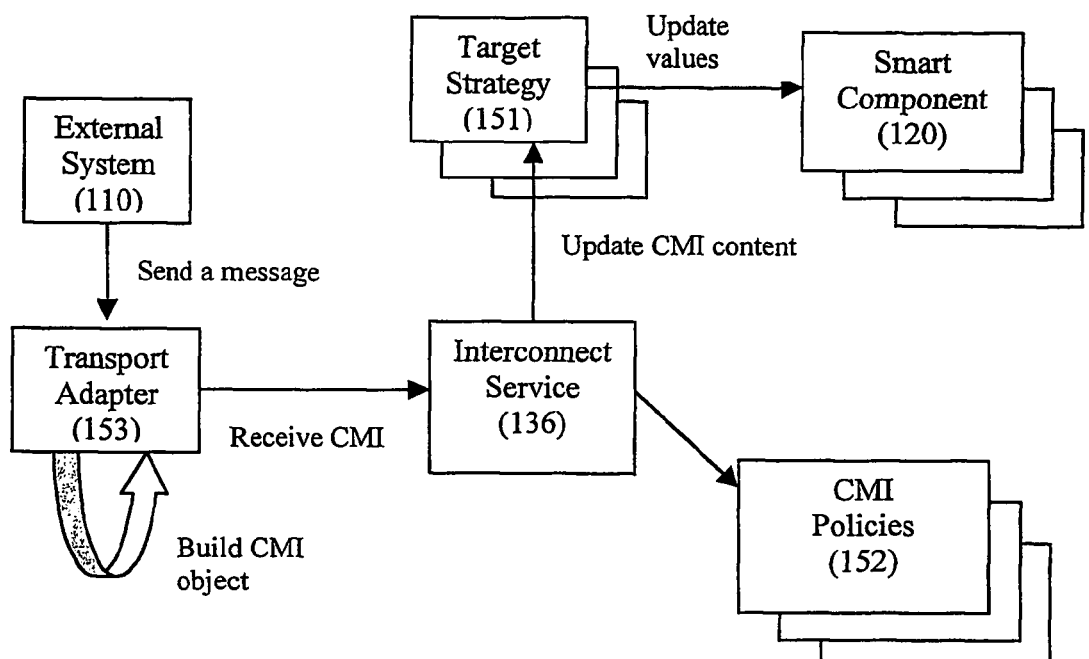
FIG. 6 is a block diagram illustrating a process for receiving a-message from an external system.

FIG. 6 illustrate a process 170 that an external system 110 calls a transport adapter 153 to receive a message. Note that a CSP must build inbound transport adapters specific to the messages the CSP expects to receive. The process includes the steps of:

(1) The external system 110 sends a message to a transport adapter 153. This adapter acts similar to a daemon process in that it listens to a specific port number or socket, or in the case of RMI, an RMI call. This message must include a CMI code value, CMI ID, and a payload type code.

(2) The transport adapter 153 calls createCmi (cmi) on the interconnect service 136 to build the CMI based on the code value.

(3) The createCmi method returns an empty CMI object. The adapter must be written such that it populates the CMI with the needed data before proceeding to the next step.

(4) The transport adapter 153 calls receiveCmi (cmi) on the interconnect service 136.

(5) The interconnect service 136 performs a database lookup in the SOURCE_TARGET_STRATEGY_POLICY table to determine the target strategy 151 to use for the CMI and the given payload.

(6) The target strategy 151 is invoked and it calls a smart component 120 (either through DAS 135 or a direct APT call) to update the system accordingly.

1.3.3. How the Interconnect Service Recovers from Errors

It is possible that a CMI 105 may fail correctly to reach its intended destination, or that it may fail processing at that system. In this event, the external system 110 should provide information describing the error in the response message.

The eBusiness support system provides an Error Correction Facility (ECF) to review, correct, and re-send CMIs which may have failed in this way. The ECF can also be used to re-send successful CMIs, should this be desired.

The ECF relies on information written to CMI_LOG and CMI_DOMAIN_OBJECT_LOG when reviewing and correcting CMIs. For this reason, if the CSP wants to recover and correct an erred CMI, the CSP must populate the CMI_LOG_FLG flag in the CMI_CMI_POLICY table with '1' to insure that CMIs of that type are logged.

Only CMIs whose payload is composed of the OIDs can be reviewed, corrected and re-sent by the ECF. The payload of a CMI 105 is determined by the source strategy 150.

When reviewing a CMI 105, the ECF relies on data in the CMI_DOMAIN_OBJECT_LOG table to re-construct the CMI and allow users to change and correct domain object data which may have caused the CMI to fail. Once corrected, the CMI and its payload can be re-sent to the external system 110.

Any error information provided by the external system 110 is captured in three fields in the CMI_LOG table: (a) ERROR-CDE, which is a numeric code for the error encountered; (b) ERROR-CNTXT, which is the context in which the error occurred; and (c) ERROR-MSG, which is a text string describing the nature of the error encountered.

It is the job of the target policy 151 for the CMI 105 to receive this error information from the remote system's response and populate the eBusiness support system's database 145. Then, when the CMI 105 is reviewed in the Error Correction Facility, this error information is displayed.

1.4. eBusiness Portals

The eBusiness support system provides portals that are specific to a market segment of the communications industry. The Universal Agent Portal, Channel Partner Portal, and Small Business Portals all use: (1) JavaServer Pages (JSP) technology—these HTML pages with embedded Java source code allow for dynamic Web content; (2) Display policies—embedded within the JSP pages, these policies access and manipulate data for display; (3) A Web session controller 162—this servlet mediates the creation and display of JSP pages; (4) Transition policies 163—these Java files determine navigation logic through the site; and (5) Resource Bundles—the classes store display values or messages corresponding to codes in constant classes.

1.4.1. JavaServer Pages

JSP pages are standard HTML files containing blocks of simple Java code that display dynamic content. A CSP can use a standard HTML editor to create and edit these pages.

The eBusiness support system leverages JSP auto-compilation capabilities but defers all navigation and application logic to other components within the portal. This approach clearly separates presentation responsibilities from application logic so a licensee can change events that occur during a page transition without having to alter the JSP page. A JSP page uses display policies that handle any process logic needed to display a page.

To create or edit JSP pages for the portal, a CSP needs to understand various aspects of JAVA or HTML such as Page directives, Transition directives, Scriptlets, Expressions, Tags, and JavaScript libraries.

(1) JSP Page Directives. The directives are used to set JSP page directives. For example:

```
<jsp:directive.page language="java" />
<jsp:directive.page buffer="[ n] K" />
<jsp:directive.page autoFlush="faise" />
<jsp:directive.page errorPage="/DefaultError.jsp" />
<jsp:directive.page
extends="cygent.portal.frame.jsp.DisplayJsp" />
```

The directives are also used to import needed classes. For example:

```
<jsp:directive.page
import="cygent.portal.frame.jsp.TypeConversion"/>
<jsp:directive.page
import="cygent.portal.frame.jsp.CygentContext"/>
<jsp:directive.page
import="cygent.portal.sb.display.logon.MyHomeUser
"/>
```

(2) Transition Directives. The transition directives are special HTML hidden form fields that appear on a JSP page. They determine what navigation logic, if any, the server should execute. Transition directives also determine the destination JSP page. The CSP is required to set the following three transition directives on the JSP page:

to—the intended destination page.

from—the originating page (the page the link is on).

Task—the task to accomplish during the transition from the originating page to the destination page.

The names that the CSP sets for "to" and "from" directives are logical names that uniquely represent pages on the server. The framework uses the URL_MAP table to obtain a fully-qualified path for the page corresponding to the logical page name.

The following code might appear on a JSP page:

```
<FORM NAME=IlmainForinIl METHOD="POST" ACTION="/go"
target=11_top11
onSubmit=11return (false);">
<INPUT TYPE=hidden NAME=from
VALUE="ApproveAccountRequest">
<INPUT TYPE=hidden NAME=to VALUE='->
<INPUT TYPE=hidden NAME=task VALUE='->
```

At submit time, the values for the "to" and "task" directives are populated by the subFormjavaScript function, which is defined in js_common.js, a library provided for input and form submit manipulation. The script notifies the browser to submit all form data, including transition directives, to the server. The server then parses through the data and looks in the TRANS_MAP table to determine if there is a transition policy associated with the "from" and "task" directives. If a transition policy does not exist, the user is directed to the page set in the "to" directive. If a transition policy exists, the policy is invoked and the server executes the navigation logic defined in the policy.

(3) Scriptlets. Java code within the page is placed inside a scriptlet tag. For example:

```
<jsp:scriptlet>
    .java code
</jsp:scriptlet>
```

(4) Expressions. Java code that evaluates a string is placed inside an expression tag. For example:

'<%=bundleItem.getCode( ) %>'

(5) Tags. The Web framework provides a library of the tags that allow JSP page writers to retrieve value objects and display dynamic content using a simple tag syntax. These tags are action tags used to instantiate object(s) and make them available through scripting variables. They are specifically designed to simplify the process of retrieving or displaying information from the database.

The tags used in the eBusiness support system allow a CSP to introduce dynamic content into a page from a variety of sources, including databases, resource bundles, CMIS, and file systems. Table 1.1 illustrates various tags, including source tags for retrieving and displaying dynamic content, and presentation tags for display purposes.

TABLE 1.1

| Tag Name | Tag Type | Description |
| --- | --- | --- |
| queryObject | source | Retrieves a display object. |
| queryList | source | Retrieves a list of display objects. |
| Bundle | source | Creates a list of BundleItem objects. |
| GenericObject | source | Creates any value object. |
| GenericList | source | Creates any list of value objects. |
| Loop | presentation | Iterates through a list of objects and makes each object available through a scripting variable; also provides a counter variable. |
| Authorize | presentation | Checks a user's permissions. Used in conjunction with either the pass or fail tag. |

TABLE 1.1-continued

| Tag Name | Tag Type | Description |
| --- | --- | --- |
| Pass | presentation | Displays JSP content when the authorize tag determines a user has permission. Used in conjunction with the authorize tag. |
| Fail | presentation | Displays JSP content when the authorize tag determines a user does not have permission. Used in conjunction with the authorize tag. |
| validation | presentation | Provides access to validation information created by a transition policy. |

For each of the source tags, the CSP can implement a corresponding display policy. Display policies can be used to modify the behavior of a custom tag. To perform a simple data retrieval, such as retrieving an object by its primary key, a display policy is not necessary. However, if the CSP had compound criteria for its data retrieval, or if the CSP wanted to do some post-query data manipulation (e.g. calculate someone's age from their birth date), then the CSP would do those activities from a display policy. At request time, the tag invokes methods defined in the display policy implementation.

In the following example, the queryObject tag invokes a display policy that constructs a query used to retrieve the display object for the CustomerDetail screen:

```
<cygent:queryObject
    id="customerDetail"
    obiectRef="customerDetail"
    policy="cygent.portal.sb.display.customerEdit.CustomerDetailPolicy"
```

To access the tag library, add the following line of code below the page directives in the source file:

<% @ taglib uri="/cygent.tld" prefix="cygent" %>

(6) JavaScript Libraries. The JavaScript libraries are used for client-side validation. js_validation.js provides JavaScript methods for validating data to submit to the server. For example, it is used to verify that the required fields are filled in by the user.

Client-side validation should be used in conjunction with server-side validation. The former is not a replacement for the later. Although client-side validation may enable a better user experience by performing validation on the fly, it exposes the application to security risks from users who could bypass the JavaScript and submit erroneous data to the database.

The JavaScript libraries are also used for input and form submit manipulation. js_common.js provides javaScript methods for setting request parameters and passing variables and values to the server.

All pages that submit form data should access the librares.

To access the libraries, the JavaScript codes must be included in the HEAD tag of the HTML page. For example:

```
<HTML>
<HEAD>
<TITLE>Order History</TITLE>
<SCRIPT SRC="/common/script/js_common.js" language =
"javascript">
```

-continued

```
</SCRIPT>
<SCRIPT SRC="/common/script/js_validation.js" language =
javascript">
</SCRIPT>
</HEAD>
```

(7) Implementing a Back Button. Within JSP navigation there are two different types of contracts between JSPs. One is explicit and the other is dynamic.

In an explicit contract, a button or link on JSPA always takes the user to JSPB. The button or link on JSP_A has JSP_B coded into the navigation logic. In the same fashion, the "back" or "cancel" button on JSP_B will always return the user to JSPA.

In a dynamic contract, one screen can be accessed from multiple JSPs. For example, JSP_C can be accessed from either JSP_A or JSP_B. In this case, the "back" or "cancel" button on JSP_C cannot be tied to a physical JSP. The back functionality must rely on the history or stack that the browser stores to know where the user came from and what the previous JSP is.

Two methods that access the browser stack are history.go( ) and history.back( ).

history.back( ) always returns the user to the previous page. If a user navigates from JSP_A to JSP_B, and then executes the "back" button on JSP_B, the application returns the user to JSP_A. When JSP_B will return to JSP_A, implement history.back( ).

For more complex situations, history.go( ) can be implemented. history.go( ) is similar to history.back( ), but it accepts a parameter (Integer) that communicates how many pages the CSP wants the navigation to take the user forward (positive Integer value) or backwards (negative integer value). A counter is maintained on the JSP that is then used as the input parameter to history.go( ).

There are various cases that warrant the use of history.go( ). For examples:

(a) When a JSP includes both validation and a "back" button. If a user navigates to JSP_B, from JSP_A, and then experiences a validation error, JSP_B will be re-rendered with a validation message. Because technically the previous page from JSP_B with validation errors is JSP_B, history.go( ) needs to be implemented. The following code sample shows how the counter can be implemented:

```
[ in the hidden fields of the JSP]
<INPUT TYPE=hidden
    NAME="timesValidationFailed"
    VALUE="<jsp:expression>((val.getFieldValue("timesValidation-
Failed") == null)
        ? 1
        : 1 + Integer.parseInt(val.getFieldValue("times-
ValidationFailed") ))
    </jsp:expression>II>
[ in the back, or 'cancel' link]
<A HREF= "javascript: history. go (-(document. forms[ 0 ]
times-
ValidationFailed.value))"> </A>
```

(b) When a JSP includes cursoring and a "back" button. If a user navigates to JSP_B, from JSP_A, then clicks "next" to see more items on a list, JSP_B is re-rendered with the next set of list items. Because the last JSP from the second set of list items on JSP_B, if there is a "back" button, history.go must be implemented to return to JSP_A instead. The following code sample shows how the counter can be implemented:

```
[ in the hidden fields of the JSP]
<INPUT TYPE=hidden NAME="timesPageCursored"
    VALUE ="<%=((request.getParameter("timesPageCursored")==
null)
        ? 1
        : 1 +
Integer.parseInt(request.getParameter("timesPageCursored"
)))%> ">
[ in the back' or 'cancel' link)
<A
HREF="javascript:history.go(-(document.forms[ O] .
timesPageCursored.value))"> </A>
```

In the case where a JSP has cursoring logic, as well as validation, the above counters would have to be added together.

(c) When there is a sequence of screens that all have "back" buttons. (Note that the JSPs in this sequence may also have validation and cursoring, so the above rules may also apply.) An example might be JSP_A, JSP_B, JSP_C, and JSP_D, all of which have back functionality on them. A user can navigate to JSP_A, then execute a link off JSP_A that begins the screen flow JSP_B, JSP_C, JSP_D, then back to JSP_A.

A concrete example is an AccountDetail JSP that allows a user to navigate to OpenTroubleTicket then TroubleTicket-Detail, which then returns the user to AccountDetail.

In this scenario, a similar counter must be maintained by all JSPs in this sequence, in order that all "back" buttons work correctly. In the trouble ticket example, the following counter would be implemented on all screens in the flow:

```
[ in the hidden fields of the JSP]
<INPUT TYPE=hidden NAME="timesTroubleTicketPageAccessed"
    VALUE="<jsp:expression>((request.getParameter("timesTrouble
Ticket-PageAccessed") == null)
        ? 1
        : 1 + Integer.parseInt(request.getParameter-
("timesTroubleTicketPageAccessed") ))
    </jsp:expression>"
>
[ in the 'back' or 'cancel' link]
<A HREF="javascript:history.go(-(document.forms[ O].times-
TroubleTicketPage-Accessed.value))"> </A>
```

(d) When a JSP requires multiple counters. For example, a JSP may have validation and be part of a JSP sequence. In this case, two counters are needed. The counter for validation is added to the common counter, kept by all JSPs in a sequence. For example:

```
[ in the hidden fields of the JSP]
    <INPUT TYPE=hidden
        NAME="timesScreenScreenRendered"
        VALUE="<jsp:expression>((request.
getParameter("timesScreenScreenRendered") == null)
        ? 1 +
Integer.parseInt(val.getFieldValue("timesValidation-Failed"))
        : 1 +
Integer.parseInt(request.getParameter("timesScreen-
ScreenRendered") ))
    </jsp:expression>"
>
<INPUT TYPE=hidden
    NAME="timesValidationFailed"
```

-continued

```
        VALUE="<jsp:expression>((val.getFieldvalue("timesValidation
Failed") == null)
            ?1
            : 1 + Integer.parseInt(val.getField-
Value("timesValidation-Failed")) ))
        </jsp:expression>"
>
[ in the 'back' or 'cancel, link]
<A
HREF="javascript:history.go(-(document.forms[ O].timesValidationFai-
led.value)) "></A>
```

When adding screens into existing jSP sequences, the CSP must evaluate whether a counter needs to be added to the JSP. This can be done by analyzing any counters that are on the screen before the new JSP and after the new JSP to see if a counter is being maintained.

(8) Display Objects. Display objects are value objects in the eBusiness support system that hold attributes displayed on a page. They are used as an alternative to domain objects when (a) the attributes to display span more than one domain object and (b) the domain object contains more attributes than what is needed to display.

For example, if a domain object called Foo contains four attributes, the CSP may want to display only one attribute. The CSP could choose to carry the extra three attributes or create a display object that contains only the attribute that the CSP wants to display

1.4.2. Display Policies

If the destination page in a transition requires more information than the parameters passed via the HTTP request from the Web session controller, or if a tag alone is not sufficient to retrieve and manipulate needed data, then a display policy is used. Query and generic tags on the resulting page access these policies, which are then used to retrieve and optionally manipulate data.

Display policies are interfaces that a CSP can implement to extend the functionality of the tags. Each tag of the tags has a corresponding display policy interface that the tag can invoke.

Table 1.2 illustrates various display policies and methods to implement.

TABLE 1.2

| Display Policy | Description | Methods to Implement |
|---|---|---|
| BundlePolicy | Invoked by the bundle tag. | Must implement the following method: DoAfterLoadBundle Modifies the list of BundleItem Objects. |
| QueryObject Policy | Invoked by the queryObject tag. | Must implement the following method: createExpression Creates the CygentExpression object; DoAfterQuery Modifies the object. |
| QueryListPolicy | Invoked by the queryList tag. | Must implement the following methods: createExpression Creates the CygentExpression object; doAfterQuery Modifies the created list. |
| Genericobject Policy | Invoked by the genericObject tag. | Must implement the following method: loadObject Creates any object to be available in the JSP page. |
| GenericList Policy | Invoked by the genericList tag. | Must implement the following methods: loadList Creates a list of any object to be available in the JSP page. |
| LoopPolicy | Invoked by the loop tag. | Must implement the following methods: doInitLoop Modifies values in CygentContext; doBeforeLoopBody Modifies the item in the list before it is displayed; DoAfterLoopBody Modifies the item in the list after it is displayed; doEndLoop Modifies values in CygentContext. |

The CSP can also use JSPs to upload files to a server. The properties file determines the directory to which any uploaded file will be saved, and the maximum allowable file size.

To allow an upload, the <FORM> tag must include the following attribute setting:

ENCTYPE="mulitpart/form-data"

This upload request is handled slightly differently than any other page request from a JSP. Normally, all data submitted from a JSP is available to a portal as parameters. However, parameters are only allowed to be of type String. In this case, since a file is created on the server, an attribute in Request scope is created. It is accessible using the same form input name as indicated in the <INPUT TYPE="FILE">field on the JSP. The getAttribute method in this case, returns an object of type File. All other input fields are available, as usual, as parameters.

Additionally, to prevent overwriting of files on the server, the name of the file is prepended with the session ID, which is unique. The original file name (without the session id) is available as a Parameter using the name as indicated in the <INPUT TYPE="FILE">field on a JSP.

Since the Web framework is unable to determine when the portal is done using the file, the framework is unable to know when the file should be deleted from the server. It is left to the portal developers to delete this uploaded file, when no longer needed. This can be done using the method delete on the Java File object.

1.4.3. Web Session Controller

The Web session controller is a Java servlet that provides load balancing through a session-level, round-robin algorithm that weighs server load information and routes requests accordingly. This servlet also provides failover by replicating HTTP session information across nodes in a cluster, and maintains session state via a cookie-based session ID.

Every link or form submission on a JSP page points to this controller, called Go. When a transition starts, the following information is passed:

to directive—the intended destination page.

from directive—the originating page (the page that link is on).

task directive—the task to accomplish during the transition from the originating page to the destination page.

any parameters required by the transition policy or destination page

The Web session controller also resolves the page ID submitted with the request to an actual URL, in order to display the page.

The Web session controller uses scope as a way of describing the lifecycle of data as it travels from a client, through the framework, and back to the client. There are four types of scope and they range from a very short lifecycle to a long running lifecycle. These scopes are:

(1) Page. Page scope begins when a JSP starts rendering, and is available only to that page. Page scope is primarily used to pass data back and forth between a page and a display policy. Page scope expires when a JSP is finished rendering. Sub JSPs each have their own scope, therefore the Request scope must be used to pass something from a parent to sub JSP.

(2) Request. Request scope is analogous to parameter and attribute data in an HTTP request. It begins with a browser request that passes in HTML form data, which is stored in the scope of parameters. Request scope lives throughout the life of the request from a client, until the destination JSP is rendered and sent back to the browser. Request scope is most often used to pass data from transition policies to JSPs and display policies. It is also used to pass data between parent and sub JSPs.

(3) Session. Session scope is analogous to attribute data in an HTTP session. It is created when a user first makes a request to the Web session controller and is destroyed when the session times out. Session scope is generally used to store data between requests. Keep in mind that information placed in session scope lives until it is explicitly removed or the session is terminated. Therefore, putting many objects into session scope can have performance impacts.

(4) Application. Application scope spans all sessions on the server. It begins with server startup and ends when the server is shut down. It is not clustered; each node has its own application scope.

1.4.4. Transition Policies

When a transition off a page requires data to be submitted or requires complex business processes, then a transition policy is invoked. When a user clicks a button or link, the Web session controller accesses the TRANS_MAP database table to determine if a transition policy is needed, using the from and task directives. It then routes the request either to that policy or if no policy exists, directly to the subsequent page.

Transition policies are Java files that contain navigation and validation logic. They access the Smart Components' API to perform specific business logic through the process and parse methods. These methods may also provide server-side validation against any submitted data. Once this method is executed, control returns to Go, which then determines the URL of the destination page using the URL_MAP table in the database.

Transition policies may also use the parseAddOn method, which enables the CSP to handle any new form fields that are added to a JSP in addition to the fields handled by the parse method. The parse method in the transition policy takes user input (HTML form data) and returns ParameterData, which contains at least one hash map of attributes and values, or at least one new (or updated) domain objects.

To add a new form field, the CSP must first subclass the existing transition policy for the task that needs to pass in the new field value. In the subclass, the CSP implements the parseAddOn method, which receives as a parameter the ParameterData returned by parse. To accommodate the new form field, the CSP should alter the hash map or object to include data that corresponds to the new fields. The updated ParameterData is then used by the process method when executing the necessary navigation logic and calls to activity Smart Components.

For example:

```
public void parseAddOn(CygentContext context,
            ParameterData paramData)
        throws CygentException
{
    ParameterDataEntry contactEntry;
        MyContact contact;
    // get entry from data structure
    contactEntry = paramData.getEntry(1);
    // get domain object from entry
    contact = (MyContact)contactEntry.getDomainobject( );
    // update attributes
    contact.setSecondPhoneNumber
            (context.getParameter("Contact.SecondTN"));
    ...
}
```

To add validation for a new form field, it is necessary to call the add method on the validation context object from within the parseAddon method. The process method then executes validation and handles validation errors for the new field.

(1) Nested Flows

Figure 7:
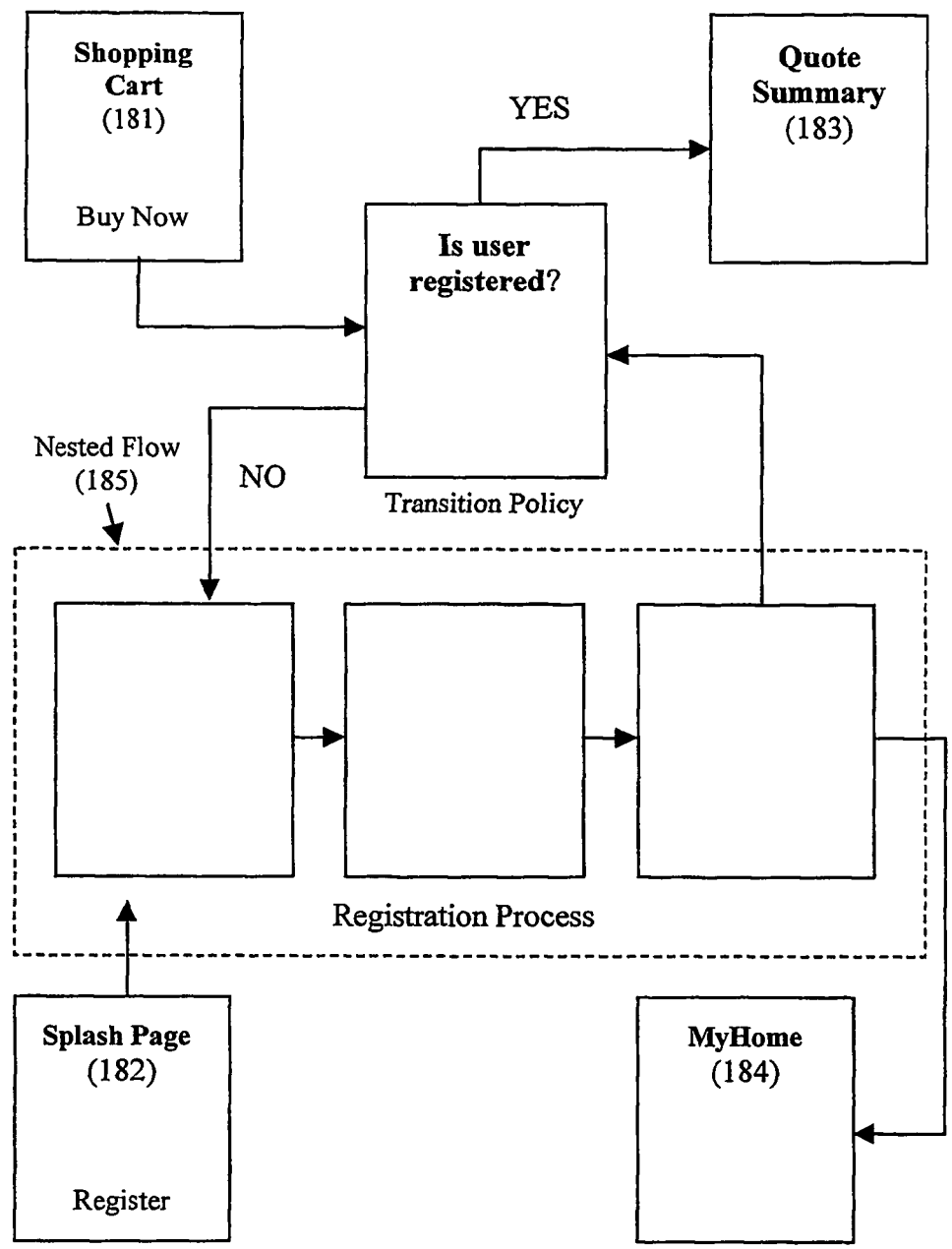
FIG. 7 is a page flow diagram illustrating a section of page flow used in the Small Business Portal that includes a registration process as a nested flow.

FIG. 7 illustrates a section of page flow 180 used in the Small Business Portal that includes a registration process 185 as a nested flow. There are two places in the flow where a user can access the registration process: the Shopping Cart page 181 and the Splash page 182. Since there is more than one page that can access that page flow, there is more than one page that the user can end up on at the end of the registration process. In the case of registration, there are two different pages: (a) Quote Summary 183, if the user enters the flow from a shopping cart; or (b) MyHome 184, if the user enters the flow from the Splash page 182.

Whenever a page flow has an undetermined exit, that process is considered a nested flow 185. In these cases the transition policy for the transition into the nested flow invokes a method that passes in (a) the ID for the first page in the nested flow; (b) the origin page ID; and (c) the destination page ID.

The Web session controller then stores that information and directs the user into the nested flow 185. A transition directive on the last page in the nested flow informs the controller to re-execute the transition policy for the originating page. However if needed, the last page in the flow may use a transition policy to first perform some business process, such as persisting data, before re-executing the originating page's transition policy.

If the DEST keyword is present, the server detects the keyword and re-executes the initial transition policy. In some cases, the CSP may also want to execute a transition policy that performs some business process, such as persisting data, before re-executing the transition policy that initiated entry into the nested flow. To do this, create an entry in the TRANS_MAP table that maps the logical page and task to the transition policy class. Then, the new task can be passed to the subForm method to execute the transition policy. After the original transition policy executes, the user exits the nested flow and forwards to the initial destination.

If the ORIG keyword is present, the server redirects the user to the page specified by the origPageId parameter without re-executing the transition that initiated entry into the nested flow.

In the previous registration example, when the transition policy for checkout on shopping cart 181 is re-executed, the user is now registered; therefore the destination page (either Quote Summary 183 or MyHome 184) is displayed.

If there is a need to reroute to another page, for example, to send the user to an error page, the nested flow 185 needs to be cleared. To do this, the clearNestedState method on the CygentContext object in the transition policy should be called.

(2) Non-Repeatable Transitions

The portal architecture also allows for the restriction of transition policies to be repeated. For example, when an end user has placed an order, the user should not be allowed to use his browser back button and resubmit the same order. To prevent this, transition policies can be flagged so that they cannot be repeated in the scope of a page flow. When this flag is set, instead of re-executing the transition policy, the server redirects to the destination page determined during the first execution of the transition policy.

In some cases, the CSP may not want a user to execute the same transition twice during a critical flow. For example, a user ordering an access line should not be able to submit the same order twice by using the back button to return to the order page after the order has already been submitted. To avoid this, the CSP can create a clearly defined set of related logical pages that constitute a flow, and specify pages within the flow that have non-repeatable transition policies. These transitions are non-repeatable within the scope of the flow.

Figure 8:
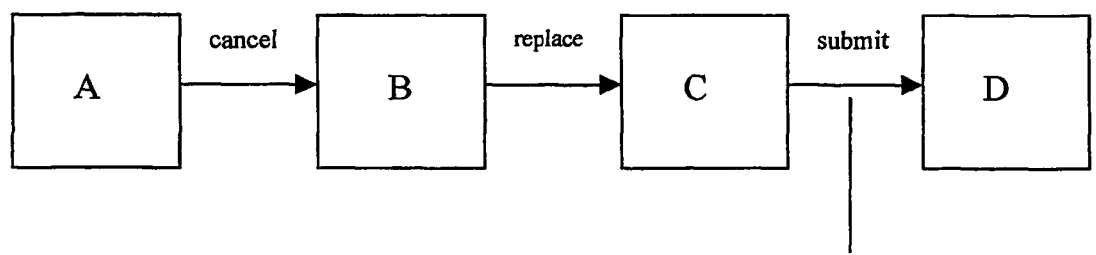
FIG. 8 is block diagram illustrating an example of a non-repeatable transition.

Now referring to FIG. 8, an example of a non-repeatable transition 190 is illustrated. Page C is associated with a transition policy (Policy3) that the user should not be allowed to execute more than once.

Also referring to Table 1.3, for the first execution of the submit link on page C, the server looks in the TRANS_MAP table and executes the transition policy-associated with the originating page ID (C) and task (submit).

TABLE 1.3

| ORIG-PAGE-ID | TASK | CLASS_NAME | NO_REPEAT_FLG |
|---|---|---|---|
| A | cancel | Policy1 | 0 |
| B | replace | Policy2 | 0 |
| C | submit | Policy3 | 1 |

After clicking the "submit" button and transitioning to page D, the user may use the "back" button to return to page C. However, if the user (now on page C) tries to click the "submit" button again, the server does not re-execute the transition policy because the NO_RFPEAT_FLG is set to 1. Instead, it bypasses the transition policy and directs the user to the destination page determined during the first execution of the policy (when the FLOW table was accessed). In this example, the next page would be page D. See Table 1.4.

TABLE 1.4

| Flow_ID | Page_ID | Page_Order |
|---|---|---|
| Flow1 | A | 1 |
| Flow1 | B | 2 |
| Flow1 | C | 3 |

The user can now only execute Policy3 again by navigating through the application to page A (without using the browser button to go back).

For all pages with the same FLOW_ID, the data in the PAGE_ORDER column must consist of consecutive numbers that start with 1.

(3) Server-Side Validation

Whenever the CSP collects HTML form data that will be persisted to the database, the server-side validation within the transition policies should be used. Data that does not meet the validation criteria is placed in a validation exception (along with an error message retrieved from a resource bundle) and thrown. The Web framework redirects the user to the previous screen and makes information about the exception, including the input data, available to the screen.

Table 1.5 illustrates the server-side validation types supported by the current system.

TABLE 1.5

| TYPES | DESCRIPTION |
|---|---|
| credit card | Returns true if the credit card number is valid based on the LUHN validation. Otherwise, returns false. The credit card number must have 13 to 17 digits in one of the following formats:<br>5555555555555555<br>5555 5555 5555 5555 |

TABLE 1.5-continued

| TYPES | DESCRIPTION |
|---|---|
| | 5555 555555 55555<br>5555555555 |
| date | Validates a date string in the format MM/dd/yyyy. (for example, Jan. 1, 2000) but will not except a shortened year format of M/d/yy (for example, Jan. 1, 2000). |
| code value in a resource bundle | Validates that a code value is valid. |
| code value not zero | Validates that the user made a selection from a drop-down menu populated using code values from a resource bundle. |
| email | Validates that the email address includes an period, and ends in a three letter domain or two letter country.<br>Valid formats include:<br>extension-greg@host.com<br>quoted User-"Greg Jones"@host.com<br>ipDomain-greg@[123.123.123.1]<br>forCountry-Greg@host.co.uk |
| maximum length | Validates that a "form value" is less than or trim the value prior to validating. |
| non-numeric | Returns true if the entire "input string" contains non-digits. Returns false if the "input string" contains any digits. |
| non-zero numeric | Returns true if the "input string" contains one or more numeric characters with at least one non-zero character. Returns false if the "input string" contains non-numeric characters or only 'O' characters. |
| not blank | Returns false if the given "text field" is empty. Returns true if the given "text field" contains a value. |
| numeric | Returns true if the "input string" contains a numeric string. Returns false if the "input string" contains any non-numeric characters. |
| positive non-zero numeric | Returns true if the "input string" contains a numeric string which is greater than zero. Returns false if the "input string" contains a negative numeric string or any non-numeric characters. |
| positive numeric | Returns true if the "input string" contains a numeric string which is greater than or equal to zero. Returns false if the "input string" contains a negative numeric string or any non-numeric characters. |
| telephone number | Verifies that the phone number is numeric with any combination of dashes, parenthesis, spaces, and periods. |
| zip code | Verifies that the zip code is numeric, dash allowed, and exactly 5 or 9 digits.<br>Valid formats include:<br>55555<br>55555-5555<br>555555555 |

The CSP can change the error messages that these validation types return by editting the resource bundle cygent.common.resource.ValidationMessageResourceBundle, or creating a new resource bundle and change the cygent.httpd.validation bundle property in the cygent.properties file to use a different resource bundle class name.

1.4.5. Resource Bundles

The eBusiness support system stores all static data displayed at the front end (except data coded directly into JSP pages) in Java classes called resource bundles. Resource bundles associate text strings that appear in the portal with unique codes used internally by the application.

For example, static data for street types is stored in a bundle class called StreetTypeCodeResourceBundle:

```
public class StreetTypeResourceBundle
            extends CygentResourceBundle
{
static final Object[ ][ ] contents = {
//LOCALIZE THIS
    { "1", "AVENUE"},
    { "2", "DRIVE"},
    { "3", "PLACE"},
    { "4", "STREET"},
    { "5", "WAY"),
```

-continued

```
//END OF MATERIAL TO LOCALIZE
};
```

Each resource bundle must have a corresponding constant class that identifies the unique codes used by the application. For this example, the constant class StreetTypeCode defines the codes that are used in the bundle class StreetTypeResourceBundle.

```
public class StreetTypeCode
{
    //FIELDS --------------------------------
    /** Avenue */
    public static final int        AVENUE = 1;
    /** Drive */
    public static final int        DRIVE= 2;
    /** Place */
    public static final int        PLACE = 3;
    /** Street */
    public static final int        STREET = 4;
    /** Way */
    public static final int        WAY = 5;
} // end StreetTypeCode class
```

1.5. Client Request Process

Figure 9:
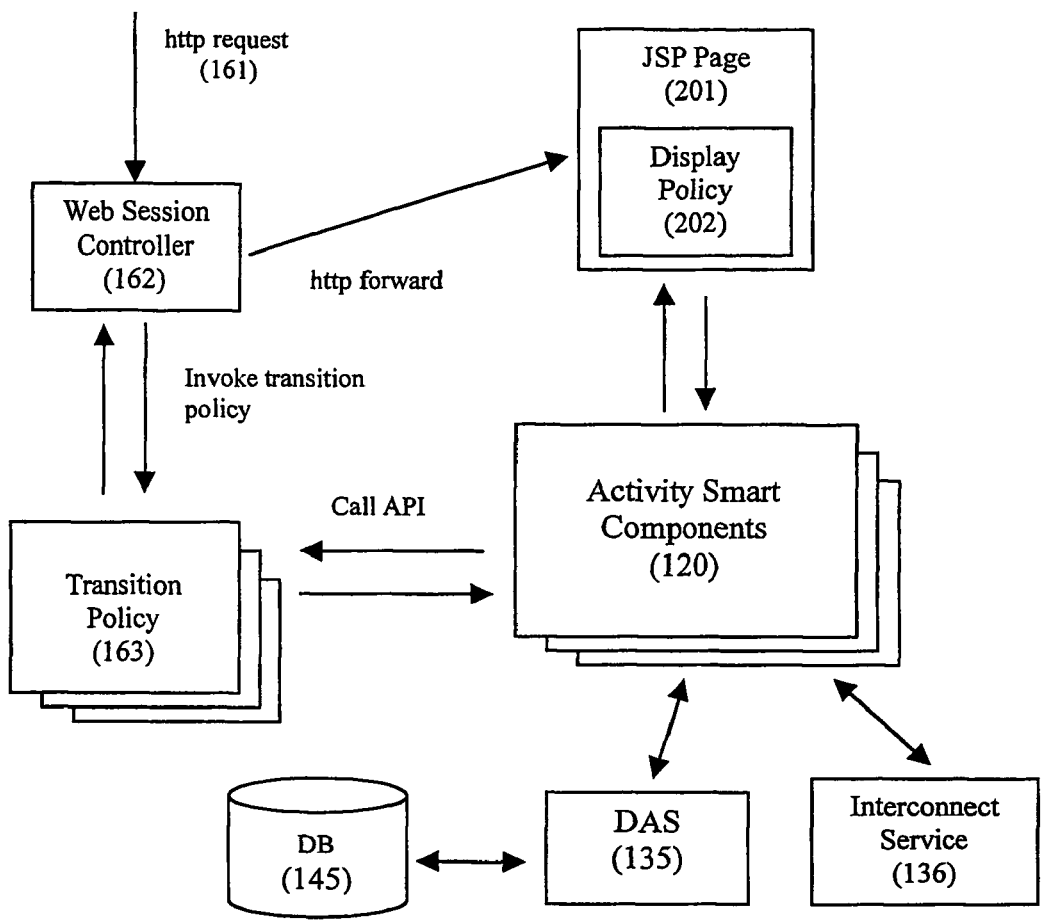
FIG. 9 is block diagram illustrating a process for submitting a request.

FIG. 9-11 illustrate a process for submitting a request. The process includes the steps of:

(1) A user clicks a link on a page. Referring to FIG. 10 which illustrates a sample page 210, a user enters information to open a trouble ticket against a product in the hierarchy, and clicks submit button 211. Referring to FIG. 9, the entered data, along with the originating page, destination page, and task (CreateTrouble-Ticket, Trouble-TicketRecap, and submit) are sent via an HTTP request 161 to the Web session controller 162.

(2) The Web session controller 162 accesses the TRANS_MAP table in the database 145 to determine whether to invoke a transition policy 163. For example, the database row that contains CreateTroubleTicket as the origin page and submit as the task also contains the required transition policy, TroubleTicket-SubmitPolicy. This class is invoked.

(3) The transition policy 163 calls an activity Smart Component 120. For example, the TroubleTicket transition policy calls the factory 143 to obtain the TroubleTicketManager Smart Component 133.

(4) The activity Smart Component 120 calls DAS 135 to create and persist value objects 141. The transition policy 163 passes in values for the object. For example, the TroubleTicketManager Smart Component 133 calls DAS 135 to create new trouble ticket and trouble ticket contact domain objects. It then updates the objects with form data and persists the updated objects.

(5) Control is passed back to the transition policy 163. For example: the transition policy populates the CMI 105 with needed form data, and passes the CMI 105 to the interconnect service 136.

(6) The transition policy 163 returns control to the Web session controller 162.

(7) The Web session controller 162 resolves the page ID passed in the HTTP request 161 to a URL, and invokes the corresponding JSP page 201. For example, the TroubleTicketRecapJSP page is invoked. This file contains query tags to access the TroubleTicketRecapPolicy display policy.

(8) Corresponding display policies 202 are invoked and, if needed, a display object is created. For example, the TroubleTicketRecapPolicy gets all the information needed to display the new trouble ticket.

(9) The dynamic HTML page is returned to the client via HTTP. Referring to FIG. 11 for example, the user sees a recap 220 of the opened dispute.

Section 2

Data Structure

This section describes the data structure for the eBusiness support system which includes various database tables.

2.1. Area Table Descriptions

All tables of the database are grouped according to their area. Each table lists the name of each field attribute, whether or not the field is required, the type and length, and a description for each field.

(1) Populating Tables Manually

Every row in most database tables uses an Object Identifier (OID) as the primary key. To manually populate a row in a database, the entry for the row's OID must be determined for that area, using the SEQ table. The SEQ table contains an entry for each area of the application (the SEQ_NAME attribute) and a VALUE. The value is the next number to be used as an OID for that area, and is the number to be used as the OID for the new row. However, once this number is used, it must also be manually incremented, so that the next entry made will use a unique number.

(2) Type

Some tables have a TYPE field, a class indicator field used by the persistence layer to determine the subclass for a particular object. If the database is manually populated for an object that has subclasses, the correct type value must be entered. If the database is populated using the Administrator console, these values are automatically entered. To determine the correct value, the TopLink Builder console is used to view the inheritance properties for the superclass object.

(3) Write Lock

Most tables have a WRITE_LOCK field. This field works with the persistence layer to provide an optimistic lock that prevents access to a field if It is in the process of updating.

(4) Primary Keys

The field name OID denotes the primary key for a table. Any other field that uses "_OID" in its name is a foreign key.

(5) Dates:

All unset dates are treated as Y.

2.2. Agent

An agent is a user of the Universal Agent Portal.

TABLE 2.1

| | | AGENT | |
|---|---|---|---|
| Attribute Name | Allows Nulls? | Type | Description |
| OID | N | NUMBER (18) | Object identifier for the agent |
| OVRRDE_THRSHD_VALUE | N | NUMBER (9) | Threshold value for this agent |
| OVRRDE_THRSHD_CD | N | NUMBER (9) | Code indicating the override threshold type |
| AGENT_TYPE_CD | N | NUMBER (9) | Code indicating the agent type |
| STATUS_CD | N | NUMBER (9) | Code indicating the status for an agent type |
| EMP_ID | Y | VARCHAR2 (50) | Employee ID for this agent |
| SINCE_DT | N | DATE | The date this agent was created |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |

TABLE 2.1-continued

AGENT

| Attribute Name | Allows Nulls? | Type | Description |
|---|---|---|---|
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.2 maps an agent to an agent group.

TABLE 2.2

AGENT_GROUP_MEMBER_MAP

| Attribute Name | Allows Nulls? | Type | Description |
|---|---|---|---|
| AGENT_OID | N | NUMBER (18) | Object identifier for the agent |
| AGENT_GROUP_OID | N | NUMBER (18) | Object identifier for the agent group |

Table 2.3 maps an agent to an agent group to which they have visibility.

TABLE 2.3

AGENT_GROUP_VISBLTY_MAP

| Attribute Name | Allows Nulls? | Type | Description |
|---|---|---|---|
| AGENT_OID | N | NUMBER (18) | Object identifier for the agent |
| AGENT_GROUP_OID | N | NUMBER (18) | Object identifier for the agent group |

Table 2.4 maps an agent to a root (either a customer or a partner).

TABLE 2.4

AGENT_ROOT_MAP

| Attribute Name | Allows Nulls? | Type | Description |
|---|---|---|---|
| AGENT_OID | N | NUMBER (18) | Object identifier for the agent |
| ROOT_OID | N | NUMBER (18) | Object identifier for the root |

Table 2.5 creates a parent/child association between agent groups.

TABLE 2.5

AGENT_GROUP_GROUP_MAP

| Attribute Name | Allows Nulls? | Type | Description |
|---|---|---|---|
| PARENT_OID | N | NUMBER (18) | Object identifier for the parent |
| CHILD_OID | N | NUMBER (18) | Object identifier for the child |

TABLE 2.6

AGENT_GROUP

| Attribute Name | Allows Nulls? | Type | Description |
|---|---|---|---|
| OID | N | NUMBER (18) | Object identifier for the agent group |
| NAME | N | VARCHAR2 (50) | Name of agent group |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.7 maps the agent to the root request with the root associated.

TABLE 2.7

AGENT_ROOT_RQST_MAP

| Attribute Name | Allows Nulls? | Type | Description |
|---|---|---|---|
| AGENT_OID | N | NUMBER (18) | Object identifier for the agent |
| ROOT_RQST_OID | N | NUMBER (18) | Object identifier for the root request |

2.3. Bill Presentment

Table 2.8 is a container used to pass billing point information to the portal.

TABLE 2.8

ACCT_RECVBL

| Attribute Names | Allows Nulls? | Type | Description |
|---|---|---|---|
| OID | N | NUMBER (18) | Object identifier for accounts receivable |
| BLNG_POINT_OID | N | NUMBER (18) | Object identifier for the billing point |
| ENTERED_DT | N | DATE | The date time for the date entered |
| CREATE_USR | Y | VARCHAR2 (40) | User who created the entry |
| CREATE_DT | Y | DATE | Date the entry was created |

TABLE 2.8-continued

ACCT_RECVBL

| Attribute Names | Allows Nulls? | Type | Description |
|---|---|---|---|
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.9 represents an entry to an account.

TABLE 2.9

ACCT_RECVBL_ENTRY

| Attribute Names | Allows Null? | Type | Descriptions |
|---|---|---|---|
| OID | N | NUMBER (18) | Object identifier for accounts receivable entry |
| ACCT_RECVBL_OID | N | NUMBER (18) | Object identifier for accounts receivable |
| ACCT_RECVBL_TYPE_CD | N | NUMBER (9) | Code indicating the accounts receivable type |
| AMT | N | NUMBER ( ) | Amount of the accounts receivable entry |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.10 displays header information regarding charge amounts for a specific account imported from an external billing system.

TABLE 2.10

INVOICE

| Attribute Name | Allows Nulls? | Type | Description |
|---|---|---|---|
| OID | N | NUMBER (18) | Object identifier for the invoice |
| INVOICE_ID | Y | VARCHAR2 (50) | Invoice identifier used by an external system. The default is the OID. |
| ACCT_OID | N | NUMBER (18) | Object identifier for the associated account |
| INVOICE_START_DT | N | DATE | Start date of the billing cycle |
| INVOICE_END_DT | N | DATE | End date of the billing cycle |
| TOTAL_AMT_DUE | N | NUMBER ( ) | Total net price of all transactions for the given account during the billing cycle |
| STATE_CD | N | NUMBER (9) | Code indicating the state of the invoice after confirmation |
| STATUS_CD | N | NUMBER (9) | Code indicating the status for an invoice |
| DSPLBL_INVOICE_PARTS_CD | N | NUMBER (9) | Determines what to display for the invoice (i.e., use an external URL, |

TABLE 2.10-continued

INVOICE

| Attribute Name | Allows Nulls? | Type | Description |
|---|---|---|---|
| | | | use an internal invoice summary, or both) |
| EXT_URL | Y | VARCHAR2 (240) | External URL to link to an invoice |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.11 represents a dollar amount by which a charge is adjusted.

TABLE 2.11

INVOICE_ADJMNT_ITEM

| Attribute Name | Allows Nulls? | Type | Description |
|---|---|---|---|
| OID | N | NUMBER (18) | Object identifier for the adjustment |
| ADJMNT_TYPE_CD | N | NUMBER (9) | Code indicating the type of adjustment |
| ADJMNT_DT | Y | DATE | Date the adjustment was created |

Table 2.12 represents the amount charged for a transaction against an object. These values are imported from an external billing system.

TABLE 2.12

INVOICE_CHARGE_ITEM

| Attribute Name | Allows Nulls? | Type | Description |
|---|---|---|---|
| OID | N | NUMBER (18) | Object identifier for the invoice charge |
| ACTION_CD | N | NUMBER (9) | Code indicating the type of action that created this charge |
| UOM_CD | N | NUMBER (9) | Code indicating the unit of measure |
| QTY | Y | NUMBER (18) | Quantity |
| SVC_ID | Y | VARCHAR2 (240) | Identifier for the service domain (i.e., a phone number or email address) |
| SVC_DOMAIN_CD | N | NUMBER (9) | Code indicating how the associated product will be tracked for usage or billing (e.g., a phone number or email address) |
| OFFER_INSTNC_OID | N | NUMBER (18) | Object identifier for the associated offer |

Table 2.13 represents an invoice charge item that represents a discount imported from an external billing system.

TABLE 2.13

INVOICE_DISC_ITEM

| Attribute Name | Allows Nulls? | Type | Description |
|---|---|---|---|
| OID | N | NUMBER (18) | Object identifier for the discount |
| START_DT | Y | DATE | Date the discount starts |
| END_DT | Y | DATE | Date the discount ends |
| QTY | Y | NUMBER ( ) | Number of units |
| PRORTN | Y | NUMBER ( ) | Amount that the discount is prorated |
| UOM_CD | N | NUMBER (9) | Code indicating the unit of measure |

Table 2.14 Represents information regarding a single line item imported from an external billing system.

TABLE 2.14

INVOICE_LINE_ITEM

| Attribute Name | Allows Nulls? | Type | Description |
| --- | --- | --- | --- |
| OID | N | NUMBER (18) | Object identifier for the invoice line item |
| INVOICE_OID | N | NUMBER (18) | Object identifier for the associated invoice |
| DSPL_ORDER | N | NUMBER (18) | Order in which the line item is displayed |
| EXT_SYS_REF | Y | VARCHAR2 (240) | Reference to the external billing system |
| DSCR | Y | VARCHAR2 (50) | Description of the invoice line item |
| AMT | Y | NUMBER ( ) | Amount of the invoice line item |
| CREATE_USR | Y | VARCHAR2 (40) | Internal identifier of the user who created the entry |
| CREATE_DT | Y | DATE | Date the entry was created |
| MOD_USR | Y | VARCHAR2 (40) | Internal identifier of the user who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.15 represents an invoice charge that represents a non-recurring charge. This is imported from an external billing system.

TABLE 2.15

INVOICE_NON_RCURRNG_CHARGE_ITEM

| Attribute Name | Allows Nulls? | Type | Description |
| --- | --- | --- | --- |
| OID | N | NUMBER (18) | Object identifier for the non-recurring charge |
| CHARGE_DT | N | DATE | Date of the charge |

Table 2.16 allows addition of external data in the form of new attributes to any classes within the bill presentment domain.

TABLE 2.16

INVOICE_LINE_ITEM_EXT_DATA

| Attribute Name | Allows Nulls? | Type | Description |
| --- | --- | --- | --- |
| OID | N | NUMBER (18) | Object identifier for the invoice line item external data |
| PARENT_OID | N | NUMBER (18) | Object identifier for the parent object |
| ATTRIB_NAME | N | VARCHAR2 (40) | Name of the attribute |
| ATTRIB_VALUE | N | VARCHAR2 (40) | Value of the attribute |
| WRITE_LOCK | N | NUMBER (18) | Optimistic lock |

Table 2.17 represents an invoice charge that represents a recurring charge. This is imported from an external billing system.

TABLE 2.17

INVOICE_RCURRNG_CHARGE_ITEM

| Attribute Name | Allows Nulls? | Type | Description |
| --- | --- | --- | --- |
| OID | N | NUMBER (18) | Internal identifier for the recurring charge |
| PRDCTY_CD | N | NUMBER (9) | Code indicating the billing periodicity (i.e., weekly, monthly) |
| START_DT | N | DATE | Billing start date (exclusive) |
| END_DT | Y | DATE | Billing end date (inclusive) |

Table 2.18 represents invoice summary information, which is imported from an external billing system.

TABLE 2.18

INVOICE_SUMM

| Attribute Name | Allows Nulls? | Type | Description |
| --- | --- | --- | --- |
| OID | N | NUMBER (18) | Object identifier for the invoice summary |
| INVOICE_OID | N | NUMBER (18) | Object identifier for the associated invoice |
| TOTAL_EXTENDED_PRICE_AMT | N | NUMBER ( ) | Total extended price |

TABLE 2.18-continued

INVOICE_SUMM

| Attribute Name | Allows Nulls? | Type | Description |
|---|---|---|---|
| TAX_AMT | N | NUMBER ( ) | Total tax amount |
| ADJMNT_AMT | Y | NUMBER ( ) | Total adjustment amount |
| PREV_BAL_AMT | Y | NUMBER ( ) | Previous balance |
| DISC_AMT | Y | NUMBER ( ) | Total amount of all discounts |
| ONE_TIME_CHARGES_AMT | Y | NUMBER ( ) | Total amount of any non-recurring charges |
| MONTHLY_CHARGES_AMT | Y | NUMBER ( ) | Total amount of recurring charges |
| USAGE_CHARGES_AMT | Y | NUMBER ( ) | Total amount of usage charges |
| CREATE_USR | Y | VARCHAR2 (40) | Internal identifier of the user who created the entry |
| CREATE_DT | Y | DATE | Date the entry was created |
| MOD_USR | Y | VARCHAR2 (40) | Internal identifier of the user who last modified the entry |
| MOD_DT | Y | DATE | Date the entry was last modified |
| WRITE_LOCK | N | NUMBER (18) | Optimistic lock |

Table 2.19 represents an invoice charge item that represents a tax charge imported from an external billing system.

TABLE 2.19

INVOICE_TAX_ITEM

| Attribute Name | Allows Nulls? | Type | Description |
|---|---|---|---|
| OID | N | NUMBER (18) | Internal identifier for the invoice tax item |

Table 2.20 represents an invoice charge item that represents usage charges imported from an external billing system.

TABLE 2.20

INVOICE_USAGE_CHARGE_ITEM

| Attribute Name | Allows Nulls? | Type | Description |
|---|---|---|---|
| OID | N | NUMBER (18) | Object identifier for the invoice usage charge |
| START_DT | N | DATE | Date the usage charge began |
| END_DT | Y | DATE | Date the usage charge ended |
| TO_SVC_ID | Y | VARCHAR2 (240) | The "to" service identifier |
| FROM_SVC_ID | Y | VARCHAR2 (240) | The "from" service identifier |
| TO_SVC_DOMAIN_CD | N | NUMBER (9) | Code indicating the service domain type for the "to" service identifier |
| FROM_SVC_DOMAIN_CD | N | NUMBER (9) | Code indicating the service domain type for the "from" service identifier |

Table 2.21. is a collection of attributes representing Adjustment Request to a Customer Bill.

TABLE 2.21

BILL_ADJMNT_RQST

| Attribute Name | Allows Nulls? | Type | Description |
| --- | --- | --- | --- |
| OID | N | NUMBER (18) | Object identifier for the bill adjustment request |
| BLNG_POINT_OID | N | NUMBER (18) | Object identifier for the billing point |
| TARGET_OID | N | NUMBER (18) | Object identifier for the target |
| TARGET_CLASS | N | VARCHAR2 (80) | The class of the target object (Invoice for e.g.) associated with this bill adjustment request |
| TYPE_CD | N | NUMBER (9) | Code indicating the type of the bill adjustment request |
| STATE_CD | N | NUMBER (9) | Code indicating the state of the bill adjustment request |
| STATUS_CD | N | NUMBER (9) | Code indicating the status of the bill adjustment request |
| REASON_CD | N | NUMBER (9) | Code indicating the reason |
| DSCR | Y | VARCHAR2 (240) | Description of the bill adjustment request |
| AMT | N | NUMBER ( ) | Amount of the bill adjustment request |
| CREATED_USR | N | VARCHAR2 (40) | User name that created this bill adjustment request |
| CREATED_DT | N | DATE | The date this bill adjustment request is requested (created in system). |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.4. Business Rules

Table 2.22 contains information regarding rules used to maintain valid relationships between objects. These rules are based on a finite set of atomic rules both simple (e.g., mutual exclusion) and complex (e.g., mutual exclusion plus a numerical limit).

TABLE 2.22

BUS_RULE

| Attribute Name | Allows Nulls? | Type | Description |
| --- | --- | --- | --- |
| OID | N | NUMBER (18) | Object identifier for the business rule |
| TEMPLT_CODE | N | NUMBER (9) | Template code |
| NAME | Y | VARCHAR2 (50) | Name for the business rule |
| VIOLTN_MSG | Y | VARCHAR2 (240) | Violation message to be displayed in the portal |
| DSCR | Y | VARCHAR2 (240) | Description of the business rule |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER2 | Used by TopLink to identify subclass tables related to a superclass |
| WRITE_LOCK | N | NUMBER (18) | Optimistic lock |

Table 2.23 contains parameter information which is used to describe a business rule.

TABLE 2.23

BUS_RULE_PARM

| Attribute Name | Allows Nulls? | Type | Description |
| --- | --- | --- | --- |
| OID | N | NUMBER (18) | Object identifier for the business rule parameter |
| BUS_RULE_OID | N | NUMBER (18) | Object identifier for the associated business rule |
| NAME | N | VARCHAR2 (50) | Name of the parameter |
| VALUE | Y | VARCHAR2 (50) | Value of the parameter |
| START_DT | Y | DATE | Date the parameter becomes effective |
| END_DT | Y | DATE | Date the parameter is no longer effective |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.24 contains information regarding descriptor groups. Descriptors are used to create groupings of objects or groupings of other descriptors that are used by business rules.

TABLE 2.24

DATA_OBJ_DSCPTR

| Attribute Name | Allows Nulls? | Type | Description |
| --- | --- | --- | --- |
| OID | N | NUMBER (18) | Object identifier for the data object descriptor |
| DSCR | Y | VARCHAR2 (240) | Description of the data object descriptor |
| CREATE_USR | Y | VARCHAR2 (40) | User who created the entry |
| TYPE | Y | NUMBER (2) | Used by TopLink to identify subclass tables related to a superclass |
| CREATE_DT | Y | DATE | Date the entry was created |
| MOD_USR | Y | VARCHAR2 (40) | User who last modified the entry |
| MOD_DT | Y | DATE | Date the entry was last modified |
| WRITE_LOCK | N | NUMBER (18) | Optimistic lock |

Table 2.25 Contains information regarding individual items within descriptor groups. Descriptors are used to create groupings of objects or groupings of other descriptors that are used by business rules.

TABLE 2.25

SIMPLE_DATA_OBJ_DSCPTR

| Attribute Name | Allows Nulls? | Type | Description |
| --- | --- | --- | --- |
| OID | N | NUMBER (18) | Object identifier for the simple data object descriptor |
| KEY_NAME | Y | VARCHAR2 (100) | Name for the simple object descriptor |
| VALUE | Y | VARCHAR2 (50) | Value for the simple object descriptor |

Table 2.26 combines two simple object descriptors with a boolean operator to create grouping of objects used by business rules.

TABLE 2.26

CMPND_DATA_OBJ_DSCPTR

| Attribute Name | Allows Nulls? | Type | Description |
|---|---|---|---|
| OID | N | NUMBER (18) | Object identifier for the compound descriptor |
| OPERTN | Y | VARCHAR2 (10) | Boolean operator (e.g., and/or) |
| DATA_OBJ_DSCPTR1_OID | N | NUMBER (18) | Object identifier for the first data object descriptor |
| DATA_OBJ_DSCPTR2_OID | N | NUMBER (18) | Object identifier for the second data object descriptor |

2.5. Common

Table 2.27 represents a group of principals that share a role for authorization purposes.

TABLE 2.27

CYG_GROUP

| Attribute Name | Allows Nulls? | Type | Description |
|---|---|---|---|
| OID | N | NUMBER (18) | Object identifier for the Cygent group |
| NAME | Y | VARCHAR2 (240) | Name for the Cygent group value must match constant value in the CygGroupTypeCode.java constant class |
| CREATE_USR | Y | VARCHAR2 (40) | Date the entry was created |
| CREATE_DT | Y | DATE | User who created the entry |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.28 maps individual Cygent users to Cygent groups

TABLE 2.28

CYG_GROUP_CYG_USR_MAP

| Attribute Name | Allows Nulls? | Type | Description |
|---|---|---|---|
| CYG_GROUP_OID | N | NUMBER (18) | Object identifier for the Cygent group |
| CYG_USR_OID | N | NUMBER (18) | Object identifier for the Cygent user |
| CREATE_USR | Y | VARCHAR2 (40) | Date the entry was created |
| CREATE_DT | Y | DATE | User who created the entry |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.29 contains an encrypted password for a user of the Cygent system.

TABLE 2.29

CYG_USR

| Attribute Name | Allows Nulls? | Type | Description |
| --- | --- | --- | --- |
| PSWD | N | VARCHAR2 (240) | Encrypted password |
| OID | N | NUMBER (18) | Object identifier for the Cygent user |
| NAME | N | VARCHAR2 (40) | Login name for the Cygent user |
| ACTIVE_FLG | N | NUMBER (1) | Indicates whether the Cygent user is active |
| CREATE_USR | Y | VARCHAR2 (40) | Date the entry was created |
| CREATE_DT | Y | DATE | User who created the entry |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.30 maps a CMI to a CMI policy.

TABLE 2.30

CMI_CMI_POLICY

| Attribute Name | Allows Nulls? | Type | Description |
| --- | --- | --- | --- |
| OID | N | NUMBER (18) | Object identifier for the map |
| CD_VALUE | Y | NUMBER (18) | Code for the CMI |
| POLICY_CLASS | Y | VARCHAR2 (240) | Fully qualified path for the CMI policy |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.31 contains information used to grant a permission on a resource or class of resources to a list of Users and Groups.

Table 2.32 is used to group JSP pages into logical "flows" or sequences of pages which together perform a certain function.

TABLE 2.31

CYG_ACL

| Attribute Name | Allows Nulls? | Type | Description |
| --- | --- | --- | --- |
| OID | N | NUMBER (18) | Object identifier for the Cygent ACL |
| ACL_NAME | N | VARCHAR2 (240) | Name for the ACL |
| ACL_PRNCPL_NAME | N | VARCHAR2 (240) | Name of the user/group that has a specific permission for the ACL |
| ACL_PRMSSN | N | VARCHAR2 (40) | Permission assigned to the principal on this ACL |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| WRITE_LOCK | N | NUMBER (18) | Optimistic lock |

TABLE 2.32

FLOW

| Attribute Name | Allows Nulls? | Type | Description |
|---|---|---|---|
| OID | N | NUMBER (18) | Object identifier for the flow |
| FLOW_ID | N | VARCHAR2 (40) | Identifier for the flow |
| PAGE_ID | N | VARCHAR2 (40) | Identifier for the JSP page |
| PAGE_ORDER | N | NUMBER (18) | Order in which the page should appear |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.33 determines which adapter to use if the CMI is associated with the generic routing policy.

TABLE 2.33

GENERIC_CMI_POLICY

| Attribute Name | Allows Nulls? | Type | Description |
|---|---|---|---|
| OID | N | NUMBER (18) | Object identifier for the generic CMI policy |
| CD_VALUE | N | NUMBER (18) | Code indicating the CMI policy to be called |
| ADAPTER_HOME | N | VARCHAR2 (240) | Home name for the CMI adapter |
| CNTXT | N | VARCHAR2 (240) | Implementation method for the adapter |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

TABLE 2.34

SOURCE_TARGET_STRATEGY_POLICY

| Attribute Name | Allows Nulls? | Type | Description |
|---|---|---|---|
| OID | N | NUMBER (18) | Object identifier for the source target strategy policy |
| CD_VALUE | N | NUMBER (9) | Code indicating the value |
| PAYLOAD_CD | N | NUMBER (9) | Code indicating he payload |
| SOURCE_STRATEGY_CLASS | N | VARCHAR2 (240) | The fully qualified source strategy class name |
| TARGET_STRATEGY_CLASS | N | VARCHAR2 (240) | The fully qualified target strategy class name |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

TABLE 2.35

CMI_LOG

| Attribute Name | Allows Nulls? | Type | Description |
|---|---|---|---|
| OID | N | NUMBER (18) | Object identifier for the CMI log |
| ACTION_CD | Y | NUMBER (9) | Code indicating the action for this CMI |
| VENDOR_PROD_OID | Y | NUMBER (18) | Object identifier for the vendor product associated with this CMI, if any. |
| CMI_ID | N | NUMBER (18) | Object identifier for the CMI |
| CD_VALUE | N | NUMBER (18) | Code indicating the value |
| CMI_DSCR | Y | VARCHAR2 (240) | The CMI description |
| STATUS_MSG | Y | VARCHAR2 (240) | The CMI status, dispatched, completed or failed |
| ADAPTER_HOME | Y | VARCHAR2 (240) | The adapter home name that the CMI was delivered to |
| ERROR_CD | Y | NUMBER (9) | Code indicating the error |
| ERROR_MSG | Y | VARCHAR2 (240) | The CMI error message |
| ERROR_CNTXT | Y | VARCHAR2 (500) | The CMI error context |
| DISPATCHED_CNT | Y | NUMBER (18) | The number of times the CMI has been dispatched |
| PAYLOAD_CD | Y | NUMBER (9) | Code indicating the payload |
| CORRECTED_CMI_ID | Y | NUMBER (18) | The identifier of the corrected CMI |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.36 maps a domain class with a domain OID for a CMI.

TABLE 2.36

CMI_DOMAIN_OBJECT_LOG

| Attribute Name | Allows Nulls? | Type | Description |
|---|---|---|---|
| OID | N | NUMBER (18) | Object identifier for the CMI domain object log |
| CD_LOG_OID | N | NUMBER (18) | Object identifier for the CD log |
| DOMAIN_OID | N | NUMBER (18) | Object identifier for the domain |
| DOMAIN_CLASS | N | VARCHAR2 (240) | The domain class name |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.37 maps a plug-in constant to the appropriate plug-in class.

TABLE 2.37

PLUGIN_MAP

| Attribute Name | Allows Nulls? | Type | Description |
|---|---|---|---|
| OID | N | NUMBER (18) | Object identifier for the plug-in map |
| PLUGIN_CD | N | NUMBER (9) | Code indicating the plug-in |
| PLUGIN_CLASS | Y | VARCHAR2 (240) | Fully qualified path for the plug-in class |
| CREATE_USR | Y | VARCHAR2 (40) | User who created the entry |

TABLE 2.37-continued

PLUGIN_MAP

| Attribute Name | Allows Nulls? | Type | Description |
| --- | --- | --- | --- |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.38 determines whether a transition policy is associated with the "from" and "Task" directives during a page transition at the front end.

TABLE 2.38

TRANS_MAP

| Attribute Name | Allows Nulls? | Type | Description |
| --- | --- | --- | --- |
| OID | N | NUMBER (18) | Object identifier for the transition map |
| ORIG_PAGE_ID | N | VARCHAR2 (80) | Identifier of the origin page |
| TASK | N | VARCHAR2 (40) | Task to be executed |
| CLASS_NAME | N | VARCHAR2 (240) | Fully qualified class name for the association transition policy |
| NO_REPEAT_FLG | N | NUMBER(1) | Flag indicating whether the transaction can be repeated |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.39 maps a page identifier to an external URL.

TABLE 2.39

URL_MAP

| Attribute Name | Allows Nulls? | Type | Description |
| --- | --- | --- | --- |
| OID | N | NUMBER (18) | Object identifier for the URL map |
| PAGE_ID | N | VARCHAR2 (80) | Identifier for the page |
| URL | N | VARCHAR2 (240) | Relative path for the external URL |
| SECURE_FLG | N | NUMBER (1) | Indicates whether the external URL uses a secure protocol |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.40 maps a validation constant to the appropriate validation policy class.

TABLE 2.40

VALDTN_MAP

| Attribute Name | Allows Nulls? | Type | Description |
|---|---|---|---|
| OID | N | NUMBER (18) | Object identifier for the validation map |
| CD_VALUE | Y | NUMBER (18) | Code for the associated constant |
| POLICY_CLASS | Y | VARCHAR2 (240) | Associated policy class |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | MOD_DT DATE | Date the entry was last modified |
| TYPE | Y | NUMBER (2) | Used by TopLink to identify subclass tables related to a superclass |
| WRITE_LOCK | N | NUMBER (18) | Optimistic lock |

2.6. Customer

Table 2.41 is default implementation of a billing point.

TABLE 2.41

ACCT

| Attribute Name | Allows Nulls? | Type | Description |
|---|---|---|---|
| OID | N | NUMBER (18) | Object identifier for the account |
| ACCT_ID | N | NUMBER | Identifier for the account used by external systems |

TABLE 2.42

ACCT_RQST

| Attribute Name | Allows Nulls? | Type | Description |
|---|---|---|---|
| OID | N | NUMBER (18) | Object identifier for the account request object |
| ACCT_OID | N | NUMBER (18) | Object identifier for the account |
| STATE_CD | N | NUMBER (9) | Code indicating the state |
| ACTION_CD | N | NUMBER (9) | Code indicating the action |
| TOTAL_PRICE_AMT | N | NUMBER | The amount of the total price of the account request |
| TOTAL_TAX_AMT | N | NUMBER | The amount of the total tax of the account request |
| TOTAL_DISC_AMT | N | NUMBER | The amount of the total discount of the account request |
| SUBMTD_DT | Y | DATE | The date the account request was submitted |
| LABEL | Y | VARCHAR2 (50) | Label |
| BILLED_THRU_DT | Y | DATE | The date the account request is billed through |
| CREDIT_RATING_CD | N | NUMBER (9) | Code indicating the credit rating |
| BLNG_PRDCTY_CD | N | NUMBER (9) | Code indicating the billing |
| BILL_ROUND | Y | NUMBER | |
| TAX_GROUP_CD | N | NUMBER (9) | Code indicating the tax group |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE LOCK | N | NUMBER (18) | Optimistic lock |

Table 2.43 is a collection of attributes representing an address.

TABLE 2.43

ADDR

| Attribute Name | Allows Nulls? | Type | Description |
| --- | --- | --- | --- |
| OID | N | NUMBER (18) | Internal identifier for an address object |
| STREET_NBR | Y | VARCHAR2 (50) | Street number |
| STREET_NAME | Y | VARCHAR2 (50) | Street name |
| ADDL_NAME_LINE | Y | VARCHAR2 (240) | Additional name line |
| STREET_TYPE_CD | N | NUMBER (9) | Code indicating the street type |
| ADDL_ADDR_LINE | Y | VARCHAR2 (240) | Second street address line |
| DDL_ADDR_LINE2 | Y | VARCHAR2 (240) | Third street address line |
| STREET_DIRCTN_PRE_CD | N | NUMBER (9) | Code indicating the street direction prefix |
| STREET_DIRCTN_POST_CD | N | NUMBER (9) | Code indicating the street direction postfix |
| UNIT_NBR | Y | VARCHAR2 (50) | Unit number |
| UNIT_TYPE_CD | N | NUMBER (9) | Code indicating the unit type |
| ZIP_CD | N | VARCHAR2 (50) | Zip code |
| CITY | N | VARCHAR2 (50) | City |
| STATE_CD | N | NUMBER (9) | Code indicating the state |
| COUNTRY_CD | N | NUMBER (9) | Code indicating the country |
| HOUSE_NBR_SUFFIX | Y | VARCHAR2 (10) | The house number suffix |
| FLOOR | Y | VARCHAR2 (9) | The floor for this address |
| ROOM | Y | VARCHAR2 (10) | The room number for this address |
| COMMUNITY | Y | VARCHAR2 (32) | The community name for this address |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

40

Table 2.44 represents an offer instance that is either a provisioned product or a composite product, and has been assigned to a customer hierarchy.

TABLE 2.44

ASSGND_PROD

| Attribute Name | Allows Nulls? | Type | Description |
| --- | --- | --- | --- |
| OID | N | NUMBER (18) | Object identifier for the assigned product |
| OFFER_INSTNC_OID | N | NUMBER (18) | Object identifier for the associated offer instance |
| BLNG_PRDCTY_CD | N | NUMBER (9) | Code indicating the billing periodicity (e.g., monthly, weekly) |
| BLNG_METHOD_CD | N | NUMBER (9) | Code indicating the billing method (e.g., mail or electronic) |
| PARTNER_CUST_OID | Y | NUMBER (18) | Object identifier for the partner customer |
| ORDRD_FOR_PROVSNG_DT | Y | DATE | Date the product was ordered for provisioning |
| ORDRD_FOR_UNPROVSNG_DT | Y | DATE | Date the product was ordered to be unprovisioned |
| SCHED_PROVSND_DT | Y | DATE | Date the assigned product is scheduled to be provisioned |

TABLE 2.44-continued

ASSGND_PROD

| Attribute Name | Allows Nulls? | Type | Description |
| --- | --- | --- | --- |
| SCHED_UNPROVSND_DT | Y | DATE | Date the assigned product is scheduled to be unprovisioned |
| PROVSND_DT | Y | DATE | Date the assigned product was provisioned |
| UNPROVSND_DT | Y | DATE | Date the assigned product was unprovisioned |
| RQSTD_PROVSND_DT | Y | DATE | Date the assigned product was requested to be provisioned |
| RQSTD_UNPROVSND_DT | Y | DATE | Date the assigned product was requested to be unprovisioned |
| TYPE | Y | NUMBER (2) | Used by TopLink to identify subclass tables related to a superclass |

Table 2.45 contains the information required for billing purposes. To order billable products, a customer or partner must have at least one billing point. A customer or partner can have multiple billing points.

TABLE 2.45

BLNG_POINT

| Attribute Name | Allows Nulls? | Type | Description |
| --- | --- | --- | --- |
| OID | N | NUMBER (18) | Object identifier for the billing point |
| PRICE_GROUP_OID | Y | NUMBER (18) | Object identifier for the associated price group |
| ACTIVE_DT | Y | DATE | Date the billing point became active |
| INACTIVE_DT | Y | DATE | Date the billing point became inactive |
| BILLED_THRU_DT | Y | DATE | Last bill round date the account was billed |
| BLNG_PRDCTY_CD | N | NUMBER (9) | Code indicating the billing periodicity (e.g., weekly, monthly, etc.) |
| BLNG_METHOD_CD | N | NUMBER (9) | Code indicating the billing method (i.e., mail, electronic, etc.) |
| TAX_GROUP_CD | N | NUMBER (9) | Code indicating the tax group |
| BILL_ROUND | Y | NUMBER ( ) | Bill round |
| CREDIT_RATING_CD | N | NUMBER (9) | Code indicating the credit rating |
| RUNNING_BAL | N | NUMBER ( ) | Up-to-date balance of a customer's account |
| TYPE | Y | NUMBER (2) | Used by TopLink to identify subclass tables related to a superclass |

Table 2.46 represents the group of products ordered using an offer collection.

TABLE 2.46

COMPOSITE_PROD

| Attribute Name | Allows Nulls? | Type | Description |
| --- | --- | --- | --- |
| OID | N | NUMBER (18) | Object identifier for the composite product |
| TYPE | Y | NUMBER (2) | Used by TopLink to identify subclass tables related to a superclass |

Table 2.47 is a collection of attributes representing a person responsible for an entity in the Cygent system. An entity can have one to many contacts.

TABLE 2.47

CNTCT

| Attribute Name | Allows Nulls? | Type | Description |
| --- | --- | --- | --- |
| OID | N | NUMBER (18) | Object identifier for the contact |
| NAME_OID | N | NUMBER (18) | Object identifier for the name of the contact |
| PHONE_NBR | Y | VARCHAR2 (50) | Contact phone number |
| CELL_NBR | Y | VARCHAR2 (50) | Contact cell number |
| PGR_NBR | Y | VARCHAR2 (80) | Contact pager number |
| DSCR | Y | VARCHAR2 (240) | Description |
| TITLE | Y | VARCHAR2 (40) | Title |
| CNTCT_TYPE_CD | N | NUMBER (9) | Code indicating the contact type (e.g., technical, business) |
| EMAIL_ADDR | Y | VARCHAR2 (240) | Email address of the contact |
| TARGET_OID | N | NUMBER (18) | Object identifier for the entity instance that the contact is responsible for |
| TARGET_CLASS | N | VARCHAR2 (80) | Fully-qualified path for the target class |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.48 represents credit information for a hierarchy object

TABLE 2.48

CREDIT_REF

| Attribute Name | Allows Nulls? | Type | Description |
| --- | --- | --- | --- |
| OID | N | NUMBER (18) | Object identifier for the credit reference |
| CREDIT_TYPE_CD | N | NUMBER (9) | Code indicating the type of credit reference (e.g., FID, SSN, VISA) |
| CREDIT_ID | N | VARCHAR2 (50) | Credit identifier associated with this credit reference for use by an external system. The default is the OID. |
| TARGET_OID | N | NUMBER (18) | Object identifier for the object with which the credit reference is associated |
| TARGET_CLASS | N | VARCHAR2 (80) | Fully-qualified path for the target class |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.49 is an implementation of the root hierarchy object.

TABLE 2.49

CUST

| Attribute Name | Allows Nulls? | Type | Description |
|---|---|---|---|
| OID | N | NUMBER (18) | Object identifier for the customer |
| TYPE | Y | NUMBER (2) | Used by TopLink to identify subclass tables related to a superclass |
| CUST_ID | N | NUMBER | The ID of this customer |

TABLE 2.50

CUST_RQST

| Attribute Name | Allows Nulls? | Type | Description |
|---|---|---|---|
| OID | N | NUMBER (18) | Object identifier for the customer request |
| CUST_OID | N | NUMBER (18) | Object identifier for the customer |
| STATE_CD | N | NUMBER (9) | Code indicating the state |
| SUBMTD_DT | Y | DATE | Date the customer request was submitted |
| ACTION_CD | N | NUMBER (9) | Code indicating the action |
| TOTAL_PRICE_AMT | Y | NUMBER | Amount of the total price of the customer request |
| TOTAL_TAX_AMT | Y | NUMBER | Amount of the total tax of the customer request |
| TOTAL_DISC_AMT | Y | NUMBER | Amount of the total discount of the customer request |
| LABEL | Y | VARCHAR2 (50) | Label |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.51 represents a partner as an implementation of a root.

TABLE 2.51

PARTNER

| Attribute Name | Allows Nulls? | Type | Description |
|---|---|---|---|
| OID | N | NUMBER (18) | Object identifier for the partner |
| TYPE | Y | NUMBER (2) | Used by TopLink to identify subclass tables related to a superclass |

Table 2.52 captures changes made to a Partner.

TABLE 2.52

PARTNER_RQST

| Attribute Name | Allows Nulls? | Type | Description |
|---|---|---|---|
| OID | N | NUMBER (18) | Object identifier for the partner request |
| TYPE | Y | NUMBER (2) | Used by TopLink to identify subclass tables related to a superclass |

Table 2.53 represents Partner-defined ID for a partner's customer.

TABLE 2.53

PARTNER_CUST

| Attribute Name | Allows Nulls? | Type | Description |
| --- | --- | --- | --- |
| OID | N | NUMBER (18) | Object identifier for the partner customer |
| PARTNER_CUST_ID | Y | VARCHAR2 (50) | Partner-defined ID for a partner's customer |
| LABEL | Y | VARCHAR2 (50) | Partner/customer label |
| PARTNER_OID | N | NUMBER (18) | Object identifier for the partner |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (18) | Used by TopLink to identify subclass tables related to a superclass |
| WRITE_LOCK | N | NUMBER (18) | Optimistic lock |

Table 2.54 contains information about geographical area where Partner is authorized to resale.

TABLE 2.54

RESALE_REGION

| Attribute Name | Allows Nulls? | Type | Description |
| --- | --- | --- | --- |
| OID | N | NUMBER (18) | Object identifier for the resale region |
| REGION_CD | N | NUMBER (9) | Code indicating the region |
| PARTNER_OID | N | NUMBER (18) | Object identifier for the partner |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.55 represents delivered products which are owned by an account and require no subscriber-type relationship.

TABLE 2.55

DELVRD_PROD

| Attribute Name | Allows Nulls? | Type | Description |
| --- | --- | --- | --- |
| OID | N | NUMBER (18) | Object identifier for the delivered product |
| ORDRD_DT | Y | DATE | Date the product was ordered |
| PARTNER_CUST_OID | Y | NUMBER (18) | Object identifier for the partner and customer |
| RQSTD_DELVRD_DT | Y | DATE | Date the product was requested to be delivered |
| SCHED_DELVRD_DT | Y | DATE | Date the product is scheduled to be delivered |
| SHIPPED_DT | Y | DATE | Date product was shipped |
| RETURNED_DT | Y | DATE | Date the product was returned |
| DSPL_EXPRTN_DT | Y | DATE | Last date the delivered product is displayed |
| OFFER_INSTNC_OID | N | NUMBER (18) | Object identifier for the associated offer instance |
| INVENTORY_HIER_OBJ_OID | Y | NUMBER (18) | Object identifier for the billing point or account the delivered product is associated with |
| LABEL | Y | VARCHAR2 (50) | Label for the delivered product |

TABLE 2.55-continued

DELVRD_PROD

| Attribute Name | Allows Nulls? | Type | Description |
|---|---|---|---|
| DSCR | Y | VARCHAR2 (240) | Description of the delivered product |
| STATE_CD | N | NUMBER (9) | Code that indicating state of the delivered product (e.g., pending, cancelled) |
| STATUS_CD | N | NUMBER (9) | Code indicating the status of the delivered product (e.g., shipped) |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.56 represents a point on the hierarchy. A hierarchy objects can be a root, a billing point, or an assigned product.

TABLE 2.56

HIER_OBJECT

| Attribute Name | Allows Nulls? | Type | Description |
|---|---|---|---|
| OID | N | NUMBER (18) | Object identifier for the hierarchy object |
| LABEL | Y | VARCHAR2 (50) | Label for the hierarchy object |
| STATUS_CD | N | NUMBER (9) | Code indicating the hierarchy object status |
| STATE_CD | N | NUMBER (9) | Code indicating the hierarchy object state |
| PARENT_OID | Y | NUMBER (18) | Object identifier for the parent hierarchy object |
| HIER_OBJECT_TYPE_CD | N | NUMBER (9) | Code indicating the object type (i.e., root, billing point, assigned product) |
| ROOT_OID | Y | NUMBER (18) | Object identifier for the hierarchy object that is the root of this hierarchy |
| DSPL_EXPRTN_DT | Y | DATE | Last date that the hierarchy object can be displayed |
| DSCR | Y | VARCHAR2 (240) | Description of the hierarchy object |
| CREATE_USR | Y | VARCHAR2 (40) | Internal identifier of the user who created the entry |
| CREATE_DT | Y | DATE | Date the entry was last modified |
| MOD_USR | Y | VARCHAR2 (40) | Internal identifier of the user who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.57 allows external information to be added to hierarchy classes in the form of attributes.

TABLE 2.57

HIER_OBJECT_EXT_DATA

| Attribute Name | Allows Nulls? | Type | Description |
|---|---|---|---|
| OID | N | NUMBER (18) | Object identifier for the hierarchy object external data |
| PARENT_OID | N | NUMBER (18) | Object identifier for the parent object |
| ATTRIB_NAME | N | VARCHAR2 (40) | Name for the attribute |
| ATTRIB_VALUE | N | VARCHAR2 (40) | Value for the attribute |
| WRITE_LOCK | N | NUMBER (18) | Optimistic lock |

Table 2.58 maps a summary point to a hierarchy object.

TABLE 2.58

HIER_OBJECT_SUMM_POINT_MAP

| Attribute Name | Allows Nulls? | Type | Description |
|---|---|---|---|
| HIER_OBJECT_OID | N | NUMBER (18) | Object identifier for the hierarchy object |
| OID | N | NUMBER (18) | Object identifier for the map |
| SUMM_POINT_OID | N | NUMBER (18) | Object identifier for the summary point object |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.59 maps a delivered product to an associated hierarchy object.

TABLE 2.59

HIER_OBJ_DELVRD_PROD_MAP

| Attribute Name | Allows Nulls? | Type | Description |
|---|---|---|---|
| HIER_OBJECT_OID | N | NUMBER (18) | Object identifier for the hierarchy object |
| DELVRD_PROD_OID | N | NUMBER (18) | Object identifier for the delivered product |

Table 2.60 contains information regarding the customer's name.

TABLE 2.60

NAME

| Attribute Name | Allows Nulls? | Type | Description |
|---|---|---|---|
| OID | N | NUMBER (18) | Object identifier for the name |
| SURNAME | N | VARCHAR2 (50) | Last name |
| GIVEN_NAME1 | Y | VARCHAR2 (50) | First name |
| GIVEN_NAME2 | Y | VARCHAR2 (50) | Middle or second name |
| GIVEN_NAME3 | Y | VARCHAR2 (50) | Third or middle name |
| PREFIX_CD | N | NUMBER (9) | Code indicating the name prefix |
| SUFFIX_CD | N | NUMBER (9) | Code indicating a suffix to the name |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.61 maps an object to a specific address and address type. This table is populated when an object can be associated with multiple addresses (each of a different type). If an object is associated with only one address, the ADDR_OID is stored on the object itself and the OBJ_ADDR_MAP table is not used.

TABLE 2.61

OBJ_ADDR_MAP

| Attribute Name | Allows Nulls? | Type | Description |
|---|---|---|---|
| OID | N | NUMBER (18) | Object identifier for the object address map |
| TARGET_OID | N | NUMBER (18) | Object identifier for the associated target object |
| TARGET_CLASS | N | VARCHAR2 (80) | Fully-qualified path to the associated target class. Target classes include classes in the customer domain, such as customer, account, contact, account request, and customer request. |
| ADDR_OID | N | NUMBER (18) | Object identifier for the address |
| ADDR_TYPE_CD | N | NUMBER (9) | Code indicating the type of address |
| ROOT_OID | Y | NUMBER (18) | Object identifier for the root object |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER ( ) | Used by TopLink to identify subclass tables related to a superclass |
| WRITE_LOCK | N | NUMBER (18) | Optimistic lock |

Table 2.62 is used to apply rates specific to a group of customers or partners, such as residential or business price group. Every root must be assigned to a price group.

TABLE 2.62

PRICE_GROUP

| Attribute Name | Allows Nulls? | Type | Description |
|---|---|---|---|
| OID | N | NUMBER (18) | Object identifier for the price group |
| NAME | N | VARCHAR2 (50) | Name of the price group |
| DSCR | N | VARCHAR2 (50) | Description of the price group |
| ROOT_MENU_OID | N | NUMBER (18) | Object identifier for the associated root menu |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.63 represents products that have been provisioned.

TABLE 2.63

PROVSND_PROD

| Attribute Name | Allows Nulls? | Type | Description |
|---|---|---|---|
| OID | N | NUMBER (18) | Object identifier for the provisioned product |
| TYPE | Y | NUMBER (2) | Used by TopLink to identify subclass tables related to a superclass |

Table 2.64 represents the highest point in a hierarchy. A root has no parent.

TABLE 2.64

ROOT

| Attribute Name | Allows Nulls? | Type | Description |
|---|---|---|---|
| OID | N | NUMBER (18) | Object identifier for the root |
| ROOT_ID | Y | VARCHAR2 (50) | The root ID |
| PRICE_GROUP_OID | Y | NUMBER (18) | Object identifier for the associated price group |
| ATHZTN_INFO | Y | VARCHAR2 (40) | The authorization info for root |
| LOGO_URL | Y | VARCHAR2 (240) | The URL to this root's logo |
| DOC_URL | Y | VARCHAR2 (240) | The URL to a file |
| SINCE_DT | Y | DATE | Date the root was created |
| TYPE | Y | NUMBER (2) | Used by TopLink to identify subclass tables related to a superclass |

Table 2.65 encapsulates a change instance of the Customer hierarphy object

TABLE 2.65

ROOT_RQST

| Attribute Name | Allows Nulls? | Type | Description |
|---|---|---|---|
| OID | N | NUMBER (18) | Object identifier for the root request |
| ROOT_OID | N | NUMBER (18) | Object identifier for the root |
| STATE_CD | N | NUMBER (9) | Code indicating the state of the root request |
| SUBMTD_DT | N | DATE | The date when root request was submitted |
| ACTION_CD | N | NUMBER (9) | Code indicating the action type |
| ROOT_ID | Y | VARCHAR2 (50) | The root ID |
| TOTAL_PRICE_AMT | N | NUMBER ( ) | The total price for this root request |
| TOTAL_TAX_AMT | N | NUMBER ( ) | The total tax for this root request |
| TOTAL_DISC_AMT | N | NUMBER ( ) | The total discounts for this root request |
| LABEL | Y | VARCHAR2 (50) | The HierObjectImpl label |
| PRICE_GROUP_OID | Y | NUMBER (18) | The price group OID for this root request |
| DOC_URL | Y | VARCHAR2 (240) | The URL link to any documents/contracts associated with root |
| ATHZTN_INFO | Y | VARCHAR2 (40) | Authorization information |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.66 represents that a billing point request captures changes made to a billing point.

TABLE 2.66

BLNG_POINT_RQST

| Attribute Name | Allows Nulls? | Type | Description |
|---|---|---|---|
| OID | N | NUMBER (18) | Object identifier for the billing point request |
| BLNG_POINT_OID | N | NUMBER (18) | Object identifier for the billing point |
| STATE_CD | N | NUMBER (9) | Code indicating the state type |
| ACTION_CD | N | NUMBER (9) | Code indicating the action type |
| TOTAL_PRICE_AMT | N | NUMBER ( ) | The total price for this billing point request |
| TOTAL_TAX_AMT | N | NUMBER ( ) | The total tax for this billing point request |
| TOTAL_DISC_AMT | N | NUMBER ( ) | The total discounts for this billing point request |
| SUBMTD_DT | N | DATE | The date when the billing point request was submitted |
| LABEL | Y | VARCHAR2 (50) | The billing point label |
| BILLED_THRU_DT | Y | DATE | The billed through date of this billing point |
| CREDIT_RATING_CD | N | NUMBER (9) | Code indicating the credit rating |
| BLNG_PRDCTY_CD | N | NUMBER (9) | The billing periodicity of this billing point |
| BLNG_METHOD_CD | N | NUMBER (9) | Code indicating the billing method |
| BILL_ROUND | Y | NUMBER ( ) | The bill round associated with this Billing Point |
| TAX_GROUP_CD | N | NUMBER (9) | Code indicating the tax group |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic Lock |

Table 2.67 represents a specific category associated with a hierarchy point for creating different views of the hierarchy.

TABLE 2.67

SUMM_POINT

| Attribute Name | Allows Nulls? | Type | Description |
|---|---|---|---|
| OID | N | NUMBER (18) | Object identifier for the summary point |
| SUMM_POINT_TYPE_OID | N | NUMBER (18) | Summary point type |
| DSCR | N | VARCHAR2 (240) | Description of the summary point |
| NAME | N | VARCHAR2 (50) | Summary point name |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.68 represents a general category from which specific summary points are created.

TABLE 2.68

SUMM_POINT_TYPE

| Attribute Name | Allows Nulls? | Type | Description |
|---|---|---|---|
| OID | N | NUMBER (18) | Object identifier for the summary point type |
| NAME | N | VARCHAR2 (50) | Name of the summary point type |
| ICON | Y | VARCHAR2 (240) | Path to the icon that represents the summary point type |
| DSCR | N | VARCHAR2 (240) | Description of the summary point type |
| ROOT_OID | N | NUMBER (18) | Object identifier for the associated root hierarchy object |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.69 represents that a person at the provider site is responsible for a particular aspect of a customer or partners business.

TABLE 2.69

SPPRT

| Attribute Name | Allows Nulls? | Type | Description |
|---|---|---|---|
| OID | N | NUMBER (18) | Object identifier for the support |
| NAME_OID | N | NUMBER (18) | Object identifier for the name |
| PHONE_NBR | Y | VARCHAR2 (50) | Phone number |
| CELL_NBR | Y | VARCHAR2 (50) | Cell number |
| PGR_NBR | Y | VARCHAR2 (80) | Pager number |
| TITLE | Y | VARCHAR2 (40) | Title |
| EMAIL_ADDR | Y | VARCHAR2 (240) | Email address for support |
| DSCR | Y | VARCHAR2 (240) | Description of support |
| SPPRT_TYPE_CD | Y | NUMBER (9) | Code indicating the support type |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.70 maps a support to a root.

TABLE 2.70

SPPRT_ROOT_MAP

| Attribute Name | Allows Nulls? | Type | Description |
|---|---|---|---|
| ROOT_OID | N | NUMBER (18) | Object identifier for the root |
| SPPRT_OID | N | NUMBER (18) | Object identifier for the support |

Table 2.71 contains temporary information necessary to hold descriptions of products that are being considered for removal.

TABLE 2.71

TEMP_REMOVE_ITEM

| Attribute Name | Allows Nulls? | Type | Description |
|---|---|---|---|
| OID | N | NUMBER (18) | Object identifier for the temp remove item |
| USR_OID | N | NUMBER (18) | Object identifier for the associated user |
| HIER_OBJECT_OID | N | NUMBER (18) | Object identifier for the associated hierarchy object |
| TO_OFFER_OID | Y | NUMBER (18) | Object identifier for the "to" offer |
| ACTION_CD | N | NUMBER (9) | Action code |
| CREATE_USR | Y | VARCHAR2 (40) | User who created the entry |
| CREATE_DT | Y | DATE | Date the entry was created |
| MOD_USR | Y | VARCHAR2 (40) | User who last modified entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.72 represnets the user object that contains information pertaining to a registered users login name and password.

TABLE 2.72

USR

| Attribute Name | Allows Nulls? | Type | Description |
|---|---|---|---|
| OID | N | NUMBER (18) | Object identifier for the user object |
| ATHRTY | Y | NUMBER (18) | Associated authority role |
| PSWD_RMNDR | Y | VARCHAR2 (50) | Password reminder |
| CYG_USR_OID | N | NUMBER (18) | Object identifier for the associated Cygent user object |
| USR_TYPE_CD | N | NUMBER (9) | User type which determines where to take the user upon login. |
| TARGET_CLASS | Y | VARCHAR2 (80) | Class path for the associated target. |
| TARGET_OID | Y | NUMBER (18) | Object with which the user is be associated (usually customer) |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.73 holds information pertaining to a user interaction with the system. For all portals it is used to log that a user has registered or signed in. For the Universal Agent Portal, a log is also created when an agent puts a user or customer into session.

TABLE 2.73

USR_INTRCTN_LOG

| Attribute Name | Allow Nulls? | Type | Descriptions |
|---|---|---|---|
| OID | N | NUMBER (18) | Object identifier for the user interaction log |
| USR_OID | N | NUMBER (18) | Object identifier for the user |
| ROOT_OID | Y | NUMBER (18) | Object identifier for the root |
| INTRCTN_TYPE_CD | N | NUMBER (9) | Code indicating the interaction type |
| PORTAL_TYPE_CD | N | NUMBER (9) | Code indicating the portal type |
| CREATED_DT | N | DATE | Date the user interaction log was generated |

TABLE 2.73-continued

USR_INTRCTN_LOG

| Attribute Name | Allow Nulls? | Type | Descriptions |
|---|---|---|---|
| CREATE_USER | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by Toplink to identity subclass tables related to a superclass |
| WRITE_LOCK | N | NUMBER (18) | Optimistic lock |

2.7. Frame

Table 2.74 is used with TopLink to create an aggregation of object attributes for OID, amount, and date.

TABLE 2.74

AGG_OBJ_MAP

| Attribute Name | Allows Nulls? | Type | Description |
|---|---|---|---|
| AMOUNT | Y | NUMBER ( ) | Holds an aggregation of attributes for a currency amount |
| DT | Y | DATE | Holds an aggregation of attributes for a date |

Table 2.75 is used to instantiate domain objects

TABLE 2.75

BUILDER

| Attribute Name | Allows Nulls? | Type | Description |
|---|---|---|---|
| OID | N | NUMBER (18) | Object identifier for the builder class |
| DOM_NAME | N | VARCHAR2 (80) | Domain name |
| BLDR_CLASS | N | VARCHAR2 (80) | Builder class |
| BLK_SIZE | N | NUMBER (18) | Block size used to indicate the number of OIDs |

TABLE 2.75-continued

BUILDER

| Attribute Name | Allows Nulls? | Type | Description |
|---|---|---|---|
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.76 is for a sequence of numbers used to determine OIDs.

Every row in a database table uses the Object Identifier (OID) as the primary key. To manually populate a row in a database, the entry for the row's OID for that area must be determined. The SEQ table is used to determine this number.

Each area of the application should have its own entry in this table. The value is the next number to be used as an OID for that area, and is the number to be used as the OID for the new row. However, this number is used, it must also be manually incremented, so that the next entry made (either by an administrator or by the application) will use a unique number.

TABLE 2.76

SEQ

| Attribute Name | Allows Nulls? | Type | Description |
|---|---|---|---|
| SEQ_NAME | N | VARCHAR2 (255) | Name of the area of the application for which you are creating a new OID. |
| VALUE | Y | NUMBER (18) | Next number to be used as an OID for the area. This is the number you should use as the OID for the new row. |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.8. Interaction

Table 2.77 provides a portal view of an instance of an interaction model. This object contains information that allows customers to view the past, current, and future states of an instance of a business process model managed by an external workflow tool. Different portals may display different end-user views.

TABLE 2.77

END_USR_VIEW

| Attribute Name | Allows Nulls? | Type | Description |
| --- | --- | --- | --- |
| OID | N | NUMBER (18) | Object identifier for the end-user view |
| NAME | N | VARCHAR2 (50) | Name of the end-user view |
| DSCR | Y | VARCHAR2 (240) | Description of the end-user view |
| INTRCTN_MODEL_OID | N | NUMBER (18) | Object identifier for the associated interaction model |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.78 displays the end-user view of an instance state. The past, current, and future states of an instance are displayed as part of the end-user view of that business process model.

TABLE 2.78

END_USR_VIEW_STATE

| Attribute Name | Allows Nulls? | Type | Description |
| --- | --- | --- | --- |
| OID | N | NUMBER (18) | Object identifier for the end-user view state |
| END_USR_VIEW_OID | N | NUMBER (18) | Object identifier for the associated end-user view state |
| NAME | N | VARCHAR2 (50) | Name of the end-user view state |
| DSCR | Y | VARCHAR2 (240) | Description of the end-user view state |
| ESTMTD_DURTN | Y | NUMBER (18) | Expected duration of this end-user view state |
| DSPL_ORDER | N | NUMBER (18) | Order in which the state is displayed |
| INTRCTN_MODEL_STATE_OID | N | NUMBER (18) | Object identifier for the associated interaction model state |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.79 maintains state values of objects based on information from an external workflow tool.

TABLE 2.79

INTRCTN_MODEL

| Attribute Name | Allows Nulls? | Type | Description |
| --- | --- | --- | --- |
| OID | N | NUMBER (18) | Object identifier for the interaction model |
| NAME | N | VARCHAR2 (50) | Name of the interaction model |
| DSCR | Y | VARCHAR2 (240) | Description of interaction model |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |

TABLE 2.79-continued

INTRCTN_MODEL

| Attribute Name | Allows Nulls? | Type | Description |
| --- | --- | --- | --- |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.80 maps interaction model objects to end-user view objects, enabling the end user to view the interaction model information in the portal.

TABLE 2.80

INTRCTN_MODEL_END_USR_VIEW_MAP

| Attribute Name | Allows Nulls? | Type | Description |
| --- | --- | --- | --- |
| OID | N | NUMBER (18) | Object identifier for the interaction model |
| PORTAL_TYPE_CD | Y | NUMBER (9) | Code indicating the type of business portal to use |
| END_USR_VIEW_OID | N | NUMBER (18) | Object identifier for the end-user view |
| START_DT | Y | DATE | First date the end-user view object can be displayed |
| END_DT | Y | DATE | Last date the end-user view can be displayed |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.81 references an interaction model associated with states for a particular object instance.

TABLE 2.81

INTRCTN_MODEL_INSTNC

| Attribute Name | Allows Nulls? | Type | Description |
| --- | --- | --- | --- |
| OID | N | NUMBER (18) | Object identifier for the interaction model instance |
| INTRCTN_MODEL_OID | N | NUMBER (18) | Object identifier for the associated interaction model |
| PENDING_TIME | Y | NUMBER ( ) | Period of time before the object begins the first step of the model instance |
| STATUS_CD | N | NUMBER (9) | Code indicating the status of the interaction model instance |
| INSTNC_START_DT | Y | DATE | Starting date and time of the interaction model instance |
| TARGET_CLASS | N | VARCHAR2 (80) | Fully-qualified path of the target class for the interaction model instance |
| TARGET_BUS_OBJ_OID | N | NUMBER (18) | Object identifier for the associated target object |
| CREATE_USR | Y | VARCHAR2 (40) | Internal identifier of the user who created the entry |
| CREATE_DT | Y | DATE | Date the entry was created |

TABLE 2.81-continued

INTRCTN_MODEL_INSTNC

| Attribute Name | Allows Nulls? | Type | Description |
|---|---|---|---|
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.82 references the state of a step within an interaction model instance.

TABLE 2.82

INTRCTN_MODEL_INSTNC_STATE

| Attribute Name | Allows Nulls? | Type | Description |
|---|---|---|---|
| OID | N | NUMBER (18) | Object identifier for the instance state |
| INTRCTN_MODEL_INSTNC_OID | N | NUMBER (18) | Object identifier for the associated interaction model instance |
| CMPLTD_DT | Y | DATE | Date and time when the interaction model state was completed |
| INTRCTN_MODEL_STATE_OID | N | NUMBER (18) | Object identifier for the associated interaction model state |
| EXTERNAL_STEP_MSG | Y | VARCHAR2 (240) | The external step message associated with this interaction model instance state. |
| IS_DSPLD_FLG | N | NUMBER (1) | Flag indicating whether the state is displayed |
| STATUS_CD | N | NUMBER (9) | Code indicating the status of the state |
| INTRCTN_STATE_TYPE_CD | N | NUMBER (9) | Code indicating the state type |
| DSPL_ORDER | N | NUMBER (18) | Order in which the state should be displayed |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.83 contains information regarding the state of a step within the interaction model.

TABLE 2.83

INTRCTN_MODEL_STATE

| Attribute Name | Allows Nulls? | Type | Description |
|---|---|---|---|
| OID | N | NUMBER (18) | Object identifier for the interaction model state |
| INTRCTN_MODEL_OID | N | NUMBER (18) | Object identifier for the associated interaction model |
| NAME | N | VARCHAR2 (50) | Name of the interaction model state |
| DSCR | Y | VARCHAR2 (240) | Description of the interaction model state |
| ESTMTD_DURTN | Y | NUMBER (18) | Expected duration of the interaction model state |
| INTRCTN_STATE_TYPE_CD | N | NUMBER (9) | Code indicating type of interaction model state |
| DSPL_ORDER | N | NUMBER (18) | Order in which the model states should be displayed |
| CREATE_USR | Y | VARCHAR2 (40) | Internal identifier for the user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic Lock |

Table 2.84 contains information used to select an order item for an interaction model.

TABLE 2.84

ORDR_ITEM_INTRCTN_MODEL_SELCTN

| Attribute Name | Allows Nulls? | Type | Description |
|---|---|---|---|
| OID | N | NUMBER (18) | Object identifier for this selection object |
| INTRCTN_MODEL_OID | N | NUMBER (18) | Object identifier for the interaction model |
| ACTION_CD | N | NUMBER (9) | Code indicating the action to be used |
| VENDOR_PROD_OID | Y | NUMBER (18) | Obejct identifier for the associated vendor product |
| CREATE_USR | Y | VARCHAR2 (40) | Internal identifier for the user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic Lock |

2.9. Note

Table 2.85 represents notes that can be associated with a Customer, Quote or Order.

TABLE 2.85

NOTE

| Attribute Name | Allows Nulls? | Type | Description |
|---|---|---|---|
| OID | N | NUMBER (18) | Object identifier for the note |
| TARGET_OID | N | NUMBER (18) | Object identifier for the target |
| TARGET_CLASS | N | VARCHAR2 (80) | The target class for this Note |
| ROOT_OID | N | NUMBER (18) | Object identifier for the root |

TABLE 2.85-continued

NOTE

| Attribute Name | Allows Nulls? | Type | Description |
|---|---|---|---|
| NOTE_TYPE_CD | N | NUMBER (9) | Code indicating the note type |
| SUBJECT | N | VARCHAR2 (50) | A text description of the subject this Note |
| USR_OID | N | NUMBER (18) | Object identifier for the user |
| CREATED_DT | N | DATE | Date the note was generated |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.86 represents a note comment associated with a given note.

TABLE 2.86

NOTE_CMT

| Attribute Name | Allows Nulls? | Type | Description |
|---|---|---|---|
| OID | N | NUMBER (18) | Object identifier for the note comment |
| NOTE_OID | N | NUMBER (18) | Object identifier for the note |
| DSCR | N | VARCHAR2 (2000) | Description |
| USR_OID | N | NUMBER (18) | Object identifier for the user |
| CREATED_DT | N | DATE | Date the note comment was generated |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.10. Notice

Table 2.87 displays news and information to a user at the front end.

TABLE 2.87

CONTENT_ITEM

| Attribute Name | Allows Nulls? | Type | Description |
|---|---|---|---|
| OID | N | NUMBER (18) | Object identifier for the content item |
| OFFER_OID | Y | NUMBER (18) | Object identifier for the associated offer |
| NAME | N | VARCHAR2 (50) | Name of the content item |
| SHORT_DSCR | Y | VARCHAR2 (240) | Short description of the content item |
| LONG_DSCR | Y | VARCHAR2 (2000) | Long description of the content item |
| SMALL_ICON | Y | VARCHAR2 (240) | Small icon displayed with the content item |
| LARGE_ICON | Y | VARCHAR2 (240) | Large icon displayed with the content item |
| START_DT | Y | DATE | Earliest date the content item can be displayed |
| END_DT | Y | DATE | Last date that the content item can be displayed |
| DSPL_MAX_COUNT | Y | NUMBER ( ) | Maximum number of times the content item can be displayed |
| PLUGIN_CD | N | NUMBER (9) | Code indicating the plug-in used to determine the content items to display |
| CATGRY_CD | N | NUMBER (9) | Code indicating the content item category |
| TARGET_CLASS | Y | VARCHAR2 (80) | Fully-qualified path of the target class such as a display attribute object used to display the content item |
| TARGET_OID | Y | NUMBER (18) | Object identifier for the target class |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.88 associates a content item with the specific object to which it is displayed.

TABLE 2.88

TARGET_CONTENT

| Attribute Name | Allows Nulls? | Type | Description |
|---|---|---|---|
| OID | N | NUMBER (18) | Object identifier for the target content |
| CLASS_NAME | N | VARCHAR2 (80) | Fully-qualified path to which a content item will be displayed |
| CLASS_OID | N | NUMBER (18) | OID for the specific class instance for which a content item will be displayed |
| CONTENT_ITEM_OID | N | NUMBER (18) | Object identifier for the associated content item |
| DSPL_COUNT | Y | NUMBER ( ) | Number of times item is displayed to the target class |
| CLICK_COUNT | Y | NUMBER ( ) | Number of times item is clicked on by the target class |
| PRIORITY_CD | N | NUMBER (9) | Code indicating the priority of the associated content item |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.11. Offer

Table 2.89 maps the disclosure that the user selected with the offer instance.

TABLE 2.89

ACCPTD_DISCL

| Attribute Name | Allows Nulls? | Type | Description |
|---|---|---|---|
| OID | N | NUMBER (18) | Object identifier for the accepted disclosure |
| DISCL_OID | N | NUMBER (18) | Object identifier for the associated disclosure |
| OFFER_INSTNC_OID | N | NUMBER (18) | Object identifier for the associated offer instance |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.90 determines what happens to offers within an offer collection when the collection is broken, usually by the removal of an offer within the collection.

TABLE 2.90

BREAK_OFFER_COLLCTN_RULE

| Attribute Name | Allows Nulls? | Type | Description |
|---|---|---|---|
| OID | N | NUMBER (18) | Object identifier for the rule |
| OFFER_COLLCTN_OID | N | NUMBER (18) | Object identifier for the associated offer collection |

TABLE 2.90-continued

BREAK_OFFER_COLLCTN_RULE

| Attribute Name | Allows Nulls? | Type | Description |
| --- | --- | --- | --- |
| FROM_OFFER_OID | N | NUMBER (18) | Object identifier for the "from" offer |
| TO_OFFER_OID | Y | NUMBER (18) | Object identifier for the "to" offer |
| TRANSTN_ACTION_CD | N | NUMBER (9) | Code indicating the action used |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

TABLE 2.91

COMPARISON_DEFN
Represents the attributes by which products can be compared.

| Attribute Name | Allows Nulls? | Type | Description |
| --- | --- | --- | --- |
| OID | N | NUMBER (18) | Object identifier for the comparison definition |
| DSCR | N | VARCHAR2 (240) | Text description of the definition for comparison |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

Table 2.92 represents a group that contains offers to be compared against each other.

TABLE 2.92

COMPARISON_GROUP

| Attribute Name | Allows Nulls? | Type | Description |
| --- | --- | --- | --- |
| OID | N | NUMBER (18) | Object identifier for the comparison group |
| GROUP_NAME | N | VARCHAR2 (50) | Name of the comparison group |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

Table 2.93 maps a comparison group to a comparison definition.

TABLE 2.93

COMPARISON_GROUP_DEFN_MAP

| Attribute Name | Allows Nulls? | Type | Description |
| --- | --- | --- | --- |
| OID | | N  NUMBER (18) | Object identifier for the map |

TABLE 2.93-continued

COMPARISON_GROUP_DEFN_MAP

| Attribute Name | Allows Nulls? | Type | Description |
| --- | --- | --- | --- |
| L-Linkparatext_OID | N | NUMBER (18) | Object identifier for the comparison group |
| L-Linkparatext_OID | N | NUMBER (18) | Object identifier for the comparison definition |
| DSPL_ORDER | N | NUMBER (18) | Determines the order in which the definition appears in a comparison group. |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

Table 2.94 maps a comparison group to a specific determinant.

TABLE 2.94

COMPARISON_GROUP_DTRMNT_MAP

| Attribute Name | Allows Nulls? | Type | Description |
| --- | --- | --- | --- |
| OID | N | NUMBER (18) | Object identifier for the map |
| L-Linkparatext_OID | N | NUMBER (18) | Object identifier for the comparison group |
| L-Linkparatext_OID | N | NUMBER (18) | Object identifier for the determinant |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

Table 2.95 stores values for comparison definitions for specific offers.

TABLE 2.95

COMPARISON_VALUE

| Attribute Name | Allows Nulls? | Type | Description |
| --- | --- | --- | --- |
| OID | N | NUMBER (18) | Object identifier for the comparison definition value |
| L-Linkparatext_OID | N | NUMBER (18) | Object identifier for the associated comparison definition |
| L-Linkparatext_OID | N | NUMBER (18) | Object identifier for the associated offer |
| COMPARISON_VALUE | N | VARCHAR2 (240) | Value for the definition in string format. For multiple values (i.e. if the definition is "color" and there are multiple available colors), the VALUE must be a concatenated string. |
| CREATE_USR | Y | VARCHAR2 (40) | User who created the rule |
| CREATE_DT | Y | DATE | Date the entry was created |
| MOD_USR | Y | VARCHAR2 (40) | User who modified the entry |
| MOD_DT | Y | DATE | Date the entry was last modifier |
| TYPE | Y | NUMBER (2) | Used by TopLink to identify subclass tables related to a superclass |
| WRITE_LOCK | N | NUMBER (18) | Optimistic lock |

Table 2.96 represents the individual screens within an offer collection.

TABLE 2.96

DTRMNT

| Attribute Name | Allows Nulls? | Type | Description |
| --- | --- | --- | --- |
| OID | N | NUMBER (18) | Object identifier for the offer collection determinant |
| DTRMNT_TYPE_CD | N | NUMBER (9) | Code indicating the type of determinant |
| VALDTN_PLUG_CD | N | NUMBER (9) | Code for the plug-in used to validate the determinant |
| DSPL_ATTRIBS_OID | N | NUMBER (18) | Object identifier for the associated display attributes |
| MIN_RANGE | N | NUMBER (9) | Specifies the minimum range of the determinant. Used only when the determinant is of type choose multiple. |
| MAX_RANGE | N | NUMBER (9) | Specifies the maximum range of the determinant. Used only when the determinant is of type choose multiple |
| DFLT_SELCTN | N | NUMBER (9) | Specifies the selection that appears as the default. Used only when the determinant is of type choose multiple. |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | N | NUMBER (2) | Used by TopLink to identify subclass tables related to a superclass |
| WRITE_LOCK | N | NUMBER (18) | Optimistic lock |

Table 2.97 represents the offers in an offer collection from which the user can make a selection.

TABLE 2.97

DTRMNT_ITEM

| Attribute Name | Allows Nulls? | Type | Description |
| --- | --- | --- | --- |
| OID | N | NUMBER (18) | Object identifier for the determinant item |
| OVRRIDE_DTRMNT_SEQ_OID | Y | NUMBER (18) | Object identifier for the determinant sequence table designating the next offer collection determinant. Overrides the next determinant OID on the determinant item's offer determinant |
| DTRMNT_OID | N | NUMBER (18) | Object identifier for the associated offer collection determinant |
| OFFER_OID | N | NUMBER (18) | Object identifier for the associated offer |
| DSPL_ORDER | N | NUMBER (18) | Indicates the order in which to display the determinant item in the offer collection determinant |
| INSTNC_DSPL_ORDER | N | NUMBER (18) | Indicates the order in which to display the offer instances in collection groups in the subsequent containers, such as a cart or an offer |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |

TABLE 2.97-continued

DTRMNT_ITEM

| Attribute Name | Allows Nulls? | Type | Description |
| --- | --- | --- | --- |
| TYPE | Y | NUMBER (2) | Used by TopLink to identify subclass tables related to a superclass |
| WRITE_LOCK | N | NUMBER (18) | Optimistic lock |

Table 2.98 maps one offer collection determinant to another.

TABLE 2.98

DTRMNT_SEQ

| Attribute Name | Allows Nulls? | Type | Description |
| --- | --- | --- | --- |
| OID | N | NUMBER (18) | Object identifier for the offer collection determinant map |
| OFFER_COLLCTN_OID | N | NUMBER (18) | Object identifier for the associated offer collection |
| TO_DTRMNT_OID | Y | NUMBER (18) | Object identifier for the determinant that is being mapped to |
| FROM_DTRMNT_OID | Y | NUMBER (18) | Object identifier for the determinant being mapped from |
| OVRRDE_FLG | N | NUMBER (1) | Flag indicating whether the determinant sequence overrides the order created in the determinant item |
| DESTINATION_DTRMNT_TYPE_CD | N | NUMBER (9) | Code indicating the type of the destination |
| LOGICAL_DSPL_ORDER | N | NUMBER (18) | Order in which the determinants appear at the front end |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | Y | NUMBER (18) | Optimistic lock |

Table 2.99 represents legal information that a user must agree to before ordering a quote.

TABLE 2.99

DISCL

| Attribute Name | Allows Nulls? | Type | Description |
| --- | --- | --- | --- |
| OID | N | NUMBER (18) | Object identifier for the disclosure |
| SHORT_DSCR | Y | VARCHAR2 (240) | Short description for the disclosure |
| LONG_DSCR | Y | VARCHAR2 (2000) | Long description for the disclosure |

TABLE 2.99-continued

DISCL

| Attribute Name | Allows Nulls? | Type | Description |
|---|---|---|---|
| ACTION_CD | N | NUMBER (9) | Code indicating the action the disclosure is associated with |
| CREATE_USR | Y | VARCHAR2 (40) | User who created the entry |
| CREATE_DT | T | DATE | Date the entry was created |
| MOD_USR | Y | VARCHAR2 (40) | Internal identifier of the user who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.100 represents a single marketable entity offered by a licensee to its customers. An offer contains all the data necessary for displaying the offer to a customer, which is then related to one or more vendor products.

TABLE 2.100

OFFER

| Attribute Name | Allows Nulls? | Type | Description |
|---|---|---|---|
| OID | N | NUMBER (18) | Object identifier for the offer |
| ORDERABLE_DT | Y | DATE | Date that the offer can be ordered |
| EXPRTN_DT | Y | DATE | Date that the offer expires and can no longer be ordered |
| EXPRTN_OID | Y | NUMBER (18) | Object identifier for the offer that can replace this offer when it expires |
| DSPL_ATTRIBS_OID | N | NUMBER (18) | Object identifier for the corresponding display attributes |
| OFFER_TYPE_CD | N | NUMBER (9) | Code indicating the offer type |
| PLUGIN_CD | N | NUMBER (9) | OID for the plug-in used to select the vendor product |
| TRANSTN_DTRMNT_OID | Y | NUMBER (18) | Object identifier for the determinant used to transition the offer if it is part of an offer collection |
| TRANSTN_DTRMNT_TYPE_CD | N | NUMBER (9) | Code indicating the determinant type used to transition the offer if it is part of an offer collection |
| RPLCMNT_DTRMNT_OID | Y | NUMBER (18) | Object identifier for the replacement determinant |
| RPLCMNT_DTRMNT_TYPE_CD | N | NUMBER (9) | Code indicating the replacement determinant type |
| UPDATABLE_QTY_FLG | N | NUMBER (1) | Flag indicating whether the offer quantity is updatable |
| ADDR_MAINTENANCE_CD | N | NUMBER (9) | Code to indicating whether address maintenance is required |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |

TABLE 2.100-continued

OFFER

| Attribute Name | Allows Nulls? | Type | Description |
|---|---|---|---|
| TYPE | Y | NUMBER (2) | Used by TopLink to identify subclass tables related to a superclass |
| WRITE_LOCK | N | NUMBER (18) | Optimistic lock |

Table 2.101 represents a set of screens used to display and select offers purchased as a group.

TABLE 2.101

OFFER_COLLCTN

| Attribute Name | Allows Nulls? | Type | Description |
|---|---|---|---|
| OID | N | NUMBER (18) | Object identifier for the offer collection |
| OFFER_COLLCTN_TYPE_CD | N | NUMBER (9) | Code indicating the offer collection type |
| COMPOSITE_OFFER_OID | Y | NUMBER (18) | Object identifier for the composite offer associated with the offer collection |
| TRANSTN_DTRMNT_OID | Y | NUMBER (18) | Object identifier for the determinant to use when transitioning this collection |
| TRANSTN_DTRMNT_TYPE_CD | N | NUMBER (9) | Code indicating the type of determinant to use for a transition of this collection |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.102 contains information used for mapping source offer collection objects with target offer collection objects during a transition.

TABLE 2.102

OFFER_COLLCTN_OFFER_TRANSTN

| Attribute Name | Allows Nulls? | Type | Description |
|---|---|---|---|
| OID | N | NUMBER (18) | Object identifier for this object |
| OFFER_COLLCTN_OID | N | NUMBER (18) | Object identifier for the associated offer collection object |
| FROM_OFFER_OID | N | NUMBER (18) | Object identifier for the offer the transition is being mapped from |
| TO_OFFER_OID | N | NUMBER (18) | Object identifier for the offer the transition is mapping to |
| FIXED_COMPOSITE_OID | Y | NUMBER (18) | Object identifier for the associated fixed composite offer |
| SHORT_DSCR | Y | VARCHAR2 (240) | Short description of the transition |
| LONG_DSCR | Y | VARCHAR2 (2000) | Long description of the transition |

TABLE 2.102-continued

OFFER_COLLCTN_OFFER_TRANSTN

| Attribute Name | Allows Nulls? | Type | Description |
|---|---|---|---|
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.103 represents licensee-entered price that overrides an associated price

TABLE 2.103

OVRRDE

| Attribute Name | Allows Nulls? | Type | Description |
|---|---|---|---|
| OID | N | NUMBER (18) | Object identifier for the override |
| TARGET_CLASS | N | VARCHAR2 (80) | Fully-qualified path of the target class for the override |
| TARGET_OID | N | NUMBER (18) | Object identifier for the override |
| UNIT_PRICE_OID | Y | NUMBER (18) | Object identifier for the unit price |
| OVRRDE_TYPE_CD | N | NUMBER (9) | Object identifier for the override type |
| AMT | N | NUMBER ( ) | Amount of the override |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.104 represents associated reason for an override.

TABLE 2.104

OVRRDE_REASON

| Attribute Name | Allows Nulls? | Type | Description |
|---|---|---|---|
| OID | N | NUMBER (18) | Object identifier for the override reason |
| REASON_CD | N | NUMBER (9) | Code indicating the override reason |
| REASON_DSCR | Y | VARCHAR2 (240) | Reason description |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic Lock |

Table 2.105 represents a specific instance of an offer as it moves through cart, quote, and order, and is assigned to the customer hierarchy. Each offer instance object contains a reference to the offer being ordered, the vendor product that needs to be provisioned, the non-recurring prices associated with the item, and the configured parameters.

TABLE 2.105

OFFER_INSTNC

| Attribute Name | Allows Nulls? | Type | Description |
|---|---|---|---|
| OID | N | NUMBER (18) | Object identifier for the offer instance |
| OFFER_OID | N | NUMBER (18) | Object identifier for the associated offer |
| DTRMNT_ITEM_OID | Y | NUMBER (18) | Object identifier for the associated determinant item |
| VENDOR_PROD_OID | Y | NUMBER (18) | Object identifier for the associated vendor product |
| SVC_DOMAIN_CD | N | NUMBER (9) | Code indicating how the associated product will be tracked for usage for billing (e.g., a phone number or IP address) |
| OVRRDE_REASON_OID | Y | NUMBER (18) | Object identifier for the override reason |
| TOTAL_PRICE_AMT | N | NUMBER ( ) | Total non-recurring charges |
| TOTAL_TAX_AMT | N | NUMBER ( ) | Total taxes |
| TOTAL_DISC_AMT | N | NUMBER ( ) | Total discount |
| EXTENDED_PRICE_AMT | N | NUMBER ( ) | Extended price (price × quantity) |
| MONTHLY_RCURRNG_DSPL_AMT | Y | NUMBER ( ) | Monthly rate displayed in the portal |
| CREATED_DT | N | DATE | Date the offer instance was generated |
| OFFER_COLLCTN_INSTNC_ID | Y | NUMBER (18) | Identifier of the associated offer collection instance |
| OFEER_COLLCTN_DSPL_ORDER | Y | NUMBER (18) | Order in which to display the offer instance within the offer collection |
| OFFER_COLLCTN_COMPOSITE_FLG | N | NUMBER (1) | Flag indicating whether this offer instance is a composite product |
| OFFER_COLLECTION_OID | Y | NUMBER (18) | Object identifier for the offer collection determinant from which the offer instance was collected |
| PRE_CONFIGD_CD | N | NUMBER (9) | Code indicating whether the offer instance has already been configured |
| REPRICE_RATES_FLG | N | NUMBER (1) | Flag indicating whether the rates can be repriced |
| ADDR_OID | Y | NUMBER (18) | Object identifier for the associated service address. |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.106 contains the discount line items that are attributed to a particular offer instance.

TABLE 2.106

OFFER_INSTNC_DISC

| Attribute Name | Allows Nulls? | Type | Description |
|---|---|---|---|
| OID | N | NUMBER (18) | Object identifier for the discount |
| DSCR | Y | VARCHAR2 (240) | Description of the discount line item |
| QTY | Y | NUMBER ( ) | Quantity |
| AMT | N | NUMBER ( ) | Discount amount |
| OFFER_INSTNC_OID | N | NUMBER (18) | Object identifier for the associated offer instance |
| FORMAT_CD | Y | NUMBER (9) | Code indicating how the discount is formatted in an external system |
| EXT_SYS_REF | Y | VARCHAR2 (240) | Reference to external system |
| CREATE_USR | Y | VARCHAR2 (40) | Internal identifier of the user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.107 contains information regarding a non-recurring charge for an offer instance.

TABLE 2.107

OFFER_INSTNC_NON_RCURRNG_CHARG

| Attribute Name | Allows Nulls? | Type | Description |
|---|---|---|---|
| OID | N | NUMBER (18) | Object identifier for this object |
| OFFER_INSTNC_OID | N | NUMBER (18) | Object identifier for the associated offer instance |
| PRICE_ARRGMNT_OID | N | NUMBER (18) | Object identifier for the associated price arrangement |
| AMT | N | NUMBER ( ) | Amount of the charge |
| DSCR | Y | VARCHAR2 (240) | Description of the charge |
| QTY | Y | NUMBER ( ) | Number of items |
| FORMAT_CD | N | NUMBER (9) | Code indicating how the discount is formatted in an external system |
| UOM_CD | N | NUMBER (9) | Code indicating the unit of measure |
| CHARGE_DT | N | DATE | Date the charge transaction is calculated |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18 | Optimistic lock |

Table 2.108 contains information regarding a non-recurring charge for an offer instance

TABLE 2.108

OFFER_INSTNC_RCURRNG_RATE

| Attribute Name | Allows Nulls? | Type | Description |
|---|---|---|---|
| OID | N | NUMBER (18) | Object identifier for the offer instance recurring rate |

TABLE 2.108-continued

OFFER_INSTNC_RCURRNG_RATE

| Attribute Name | Allows Nulls? | Type | Description |
|---|---|---|---|
| OFFER_INSTNC_OID | N | NUMBER (18) | Object identifier for the associated offer instance |
| PRICE_ARRGMNT_OID | N | NUMBER (18) | Object identifier for the associated price arrangement |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.109 represents information regarding any tax rate associated with an offer instance.

TABLE 2.109

OFFER_INSTNC_TAX

| Attribute Name | Allows Nulls? | Type | Description |
|---|---|---|---|
| OID | N | NUMBER (18) | Object identifier for the tax |
| DSCR | N | VARCHAR2 (240) | Description of the tax |
| AMT | N | NUMBER ( ) | Amount of the tax |
| OFFER_INSTNC_OID | N | NUMBER (18) | Object identifier for the associated offer instance |
| EXT_SYS_REF | Y | VARCHAR2 (240) | Reference to the external billing system |
| FORMAT_CD | Y | NUMBER (9) | Code indicating how the discount is formatted in an external system |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.110 references information regarding a usage rate for an offer instance.

TABLE 2.110

OFFER_INSTNC_USAGE_RATE

| Attribute Name | Allows Nulls? | Type | Description |
|---|---|---|---|
| OID | N | NUMBER (18) | Object identifier for the usage object |
| OFFER_INSTNC_OID | N | NUMBER (18) | Object identifier for the offer instance |
| PRICE_ARRGMNT_OID | N | NUMBER (18) | Object identifier for the price arrangement |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.111 maps source offer objects to target offer objects.

TABLE 2.111

OFFER_TRANSTN

| Attribute Name | Allows Nulls? | Type | Description |
|---|---|---|---|
| OID | N | NUMBER (18) | Object identifier for the offer transition |
| FROM_OFFER_OID | N | NUMBER (18) | Object identifier for the from offer |
| TO_OFFER_OID | N | NUMBER (18) | Object identifier for the "to" offer |
| SHORT_DSCR | Y | VARCHAR2 (240) | Short description of the offer transition |
| LONG_DSCR | Y | VARCHAR2 (2000) | Long description of the offer transition |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.112 maps offers to vendor products.

TABLE 2.112

OFFER_VENDOR_PROD_MAP

| Attribute Name | Allows Nulls? | Type | Description |
|---|---|---|---|
| VENDOR_PROD_OID | N | NUMBER (18) | Object identifier for the vendor product |
| OFFER_OID | N | NUMBER (18) | Object identifier for the offer |

Table 2.113 maps source Offer's with target Offers during a Replacement

TABLE 2.113

OFFER_RPLCMNT

| Attribute Name | Allows Nulls? | Type | Description |
|---|---|---|---|
| OID | N | NUMBER (18) | Object identifier for the offer replacement |
| FROM_OFFER_OID | N | NUMBER (18) | Object identifier for the from offer |
| TO_OFFER_OID | N | NUMBER (18) | Object identifier for the to offer |
| SHORT_DSCR | Y | VARCHAR2 (240) | Short description of the offer replacement |
| LONG_DSCR | Y | VARCHAR2 (2000) | Long description of the offer replacement |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.114 maps source Offer Collection's with target Offer Collections during a transition

TABLE 2.114

OFFER_COLLCTN_OFFER_RPLCMNT

| Attribute Name | Allows Nulls? | Type | Description |
| --- | --- | --- | --- |
| OID | N | NUMBER (18) | Object identifier for the offer collection offer replacement |
| OFFER_COLLCTN_OID | N | NUMBER (18) | Object identifier for the offer collection |
| FROM_OFFER_OID | N | NUMBER (18) | Object identifier for the from offer |
| TO_OFFER_OID | N | NUMBER (18) | Object identifier for the to offer |
| FIXED_COMPOSITE_OID | Y | NUMBER (18) | Object identifier for the fixed composite |
| SHORT_DSCR | Y | VARCHAR2 (240) | Short description for the offer collection offer replacement |
| LONG_DSCR | Y | VARCHAR2 (2000) | Long description for the offer collection offer replacement |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | VARCHAR2 (40) | Date the entry was last modified |
| TYPE | Y | NUMBER (2) | Used by TopLink to identify subclass tables related to a superclass |
| WRITE_LOCK | N | NUMBER (18) | Optimistic lock |

Table 2.115 determines an offer that is an upsell of another offer.

TABLE 2.115

UPSELL_OFFER

| Attribute Name | Allows Nulls? | Type | Description |
| --- | --- | --- | --- |
| OID | N | NUMBER (18) | Object identifier for the upsell offer |
| OFFER_OID | N | NUMBER (18) | Object identifier for the offer |
| TARGET_OID | N | NUMBER (18) | Object identifier for the target upsell offer |
| TARGET_CLASS | N | VARCHAR2 (80) | The class of the upsell object (either Offer or Offer Collection) |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.116 is used by determinant items to create parent/child relationships.

TABLE 2.116

PARENT_ASSIGNMENT

| Attribute Name | Allows Nulls? | Type | Description |
| --- | --- | --- | --- |
| OID | N | NUMBER (18) | Object identifier for the parent assignment |
| OFFER_COLLCTN_OID | N | NUMBER (18) | Object identifier for the offer collection |
| CHILD_DTRMNT_ITEM_OID | N | NUMBER (18) | Object identifier for the determinant that is the child |
| PARENT_DTRMNT_ITEM_OID | N | NUMBER (18) | Object identifier for the offer collection determinant that is the parent |
| CARDINALITY_CD | N | NUMBER (9) | Code indicating whether the relationship is one-to-one or one-to-many |

TABLE 2.116-continued

PARENT_ASSIGNMENT

| Attribute Name | Allows Nulls? | Type | Description |
| --- | --- | --- | --- |
| CREATE_USR | Y | VARCHAR2 (40) | Date the entry was created |
| CREATE_DT | Y | DATE | User who created the entry |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.117 represents information necessary to display, validate, and collect parameters for products.

TABLE 2.117

PARM_DEFN

| Attribute Name | Allows Nulls? | Type | Description |
| --- | --- | --- | --- |
| OID | N | NUMBER (18) | Object identifier for the parameter definition |
| DSPL_LABEL | Y | VARCHAR2 (50) | Label displayed at the front end |
| CONFIGD_LABEL | Y | VARCHAR2 (50) | Label displayed at the front end once the parameter is configured |
| READ_ONLY_FLG | N | NUMBER (1) | Flag indicating whether the parameter value can be modified |
| USR_VSBL_FLG | N | NUMBER (1) | Flag indicating whether the parameter is visible at the front end for configuration |
| VALDTN_CD | N | NUMBER (9) | Validation code for the parameter |
| PLUGIN_CD | N | NUMBER (9) | Plug-in used to validate the parameter |
| GUI_WIDGT_CD | N | NUMBER (9) | Code indicating the type of GUI widget to display at the front-end when collecting the parameter information |
| LOW_VALUE | Y | VARCHAR2 (50) | Minimum value for the parameter |
| HIGH_VALUE | Y | VARCHAR2 (50) | Maximum value for the parameter |
| DFLT_VALUE | Y | VARCHAR2 (50) | Default value that is displayed for the parameter |
| PARM_DEFN_TYPE_CD | N | NUMBER (9) | Code indicating the parameter type |
| PARM_SIZE | N | NUMBER (18) | Size of the parameter |
| REQUIRED_FLG | N | NUMBER (1) | Flag indicating whether or not the parameter is required |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.118 represents default parameter value for a specific vendor product.

TABLE 2.118

PARM_DEFN_DFLT_VALUE_OVRRDE

| Attribute Name | Allows Nulls? | Type | Description |
| --- | --- | --- | --- |
| OID | N | NUMBER (18) | Object identifier for the map |
| PARM_DEFN_OID | N | NUMBER (18) | Object identifier for the parameter definition |
| VENDOR_PROD_OID | N | NUMBER (18) | Object identifier for the vendor product |
| DFLT_VALUE | N | VARCHAR2 (50) | Value of the default |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.119 maps enumerations to parameter definitions

TABLE 2.119

PARM_DEFN_PARM_ENUM_MAP

| Attribute Name | Allows Nulls? | Type | Description |
| --- | --- | --- | --- |
| OID | N | NUMBER (18) | Object identifier for the map |
| PARM_DEFN_OID | N | NUMBER (18) | Object identifier for the parameter definition |
| PARM_ENUM_OID | N | NUMBER (18) | Object identifier for the parameter enumeration definition object |
| DSPL_ORDER | N | NUMBER (18) | Display order of the enumerations within the definition |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.120 contains the list of values for an associated parameter.

TABLE 2.120

PARM_ENUM_DEFN

| Attribute Name | Allows Nulls? | Type | Description |
| --- | --- | --- | --- |
| OID | N | NUMBER (18) | Ojbect identifier for the parameter enumeration definition |
| EXTERNAL_NAME | Y | VARCHAR2 (50) | Name displayed to the user (e.g., "Three") |
| INTERNAL_VALUE | Y | VARCHAR2 (50) | Internal value used by the system (e.g., "3") |
| PARM_ENUM_TYPE_CD | N | NUMBER (9) | Code indicating the parameter enumeration type |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.121 allows the user to validate against a group of parameters as if they were one entity (e.g., address validation). Parameters must belong to a parameter group

TABLE 2.121

PARM_GROUP

| Attribute Name | Allows Nulls? | Type | Description |
|---|---|---|---|
| OID | N | NUMBER (18) | Object identifier for the parameter group |
| GROUP_NAME | N | VARCHAR2 (50) | Name of the parameter group |
| PLUGIN_CD | N | NUMBER (9) | Plug-in to call to validate the group |
| VALDTN_CD | N | NUMBER (9) | Code used to validate the group |
| USR_VSBL_FLG | N | NUMBER (1) | Determines whether the group is visible to the end user |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.122 maps the parameter group object to the parameter definition object.

TABLE 2.122

PARM_GROUP_PARM_DEFN_MAP

| Attribute Name | Allows Nulls? | Type | Description |
|---|---|---|---|
| OID | N | NUMBER (18) | Object identifier for the map |
| PARM_GROUP_OID | N | NUMBER (18) | Object identifier for the parameter group |
| PARM_DEFN_OID | N | NUMBER (18) | Object identifier for the parameter definition |
| DSPL_ORDER | N | NUMBER (18) | Order in which the parameter definition appears in the group |
| DSPL_NEXT | N | NUMBER (1) | Indicates the next parameter displayed in the group |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.123 contains the configured parameter value selected by the user for a given offer instance.

TABLE 2.123

PARM_VALUE

| Attribute Name | Allows Nulls? | Type | Description |
|---|---|---|---|
| OID | N | NUMBER (18) | Object identifier for the parameter value |
| PARM_DEFN_OID | N | NUMBER (18) | Object identifier for the associated parameter definition |
| PARM_GROUP_OID | N | NUMBER (18) | Object identifier for the associated parameter group |
| VALUE | Y | VARCHAR2 (50) | Value of the parameter |
| OFFER_INSTNC_OID | N | NUMBER (18) | Object identifier for the associated offer instance |

TABLE 2.123-continued

PARM_VALUE

| Attribute Name | Allows Nulls? | Type | Description |
|---|---|---|---|
| PARM_GROUP_DSPL_ORDER | Y | NUMBER (18) | Order in which the value is displayed in the group |
| STATUS_CD | N | NUMBER (9) | Code indicating the parameter status |
| EXTERNAL_NAME | Y | VARCHAR2 (50) | Name for the parameter value used by external systems |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.124 maps a Cygent offer to an external provider's offer.

TABLE 2.124

PRVDR_SVC_OFFER_MAP

| Attribute Name | Allows Nulls? | Type | Description |
|---|---|---|---|
| OID | N | NUMBER (18) | Object identifier for the map |
| L-Linkparatext_OID | N | NUMBER (18) | Object identifier for the associated determinant item |
| L-Linkparatext_OID | N | NUMBER (18) | Object identifier for the associated determinant |
| PRVDR_SVC_ID | Y | NUMBER (18) | External provider's ID for the returned service |
| PRVDR_SVC_NAME | Y | VARCHAR2 (50) | External provider's name for the returned service |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.125 represents displayed link from one offer to another related offer.

TABLE 2.125

RLTD_OFFER

| Attribute Name | Allows Nulls? | Type | Description |
|---|---|---|---|
| OID | N | NUMBER (18) | Object identifier for the related offer link |
| OFFER_OID | N | NUMBER (18) | Object identifier for the associated offer |
| RLTD_OFFER_OID | N | NUMBER (18) | Object identifier for the related offer |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.126 represents a single line item indicating what the offer instance was created from. An offer instance can be created in many different ways. (e.g., from the menu, an existing service, etc.) The offer instance can handle zero to many instances of source line items.

TABLE 2.126

SOURCE

| Attribute Name | Allows Nulls? | Type | Description |
| --- | --- | --- | --- |
| OID | N | NUMBER (18) | Object identifier for the source line item |
| DSCR | N | VARCHAR2 (240) | Description of the source line item |
| OFFER_INSTNC_OID | N | NUMBER (18) | Object identifier for the associated offer instance |
| SOURCE_FROM_CD | Y | NUMBER (9) | Code indicating the type of source |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.127 represnets the lead time required to complete an action on an offer.

TABLE 2.127

SVC_LEVEL_AGRMNT

| Attribute Name | Allows Nulls? | Type | Description |
| --- | --- | --- | --- |
| OID | N | NUMBER (18) | Object identifier for the service level agreement |
| TARGET_CLASS | N | VARCHAR2 (80) | Fully-qualified path of the class to which you are mapping the service level agreement, usually vendor product |
| TARGET_OID | N | NUMBER (18) | Object identifier for the object specified by the target class |
| ACTION_CD | N | NUMBER (9) | Code indicating the action |
| VALUE | N | NUMBER (18) | Time needed to perform the action |
| UOM_CD | N | NUMBER (9) | Code indicating the unit of measure |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.128 temporarily stores offer instances during the selection of an offer collection.

TABLE 2.128

TEMP_OFFER_COLLCTN_ITEM

| Attribute Name | Allows Nulls? | Type | Description |
| --- | --- | --- | --- |
| OID | N | NUMBER (18) | Object identifier for the temporary offer collection item |
| TEMP_OFFER_COLLCTN_ID | N | NUMBER (18) | Identifier of the temp offer collection instance |
| OFFER_COLLCTN_OID | N | NUMBER (18) | Object identifier for the associated offer collection |

TABLE 2.128-continued

TEMP_OFFER_COLLCTN_ITEM

| Attribute Name | Allows Nulls? | Type | Description |
|---|---|---|---|
| USR_OID | Y | NUMBER (18) | Object identifier for the current user |
| SESSION_ID | Y | VARCHAR (240) | Identifier for the session in which the cart item was created |
| TARGET_OID | N | NUMBER (18) | Object identifier for the object to which the offer instance will be associated |
| TARGET_CLASS | N | VARCHAR2 (80) | Fully-qualified class path for the target object |
| DTRMNT_OID | Y | NUMBER (18) | Object identifier for the associated offer collection determinant |
| OFFER_INSTNC_OID | N | NUMBER (18) | Object identifier for the associated offer instance |
| LOGICAL_DSPL_ORDER | Y | NUMBER (18) | Location of this item within the logical sequence of this item |
| DTRMNT_ITEM_OID | Y | NUMBER (18) | Object identifier for the associated determinant item |
| DSPL_ORDER | N | NUMBER (18) | Location of this item within the display |
| QTY | Y | NUMBER (25) | Quantity of the offer instance |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.129 represnets a vendor who supplies a product to the licensee.

TABLE 2.129

VENDOR

| Attribute Name | Allows Nulls? | Type | Description |
|---|---|---|---|
| OID | N | NUMBER (18) | Object identifier for the vendor |
| NAME | N | VARCHAR2 (50) | Vendor's name |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.130 represents an actual product that can be shipped or provisioned.

TABLE 2.130

VENDOR_PROD

| Attribute Name | Allows Nulls? | Type | Description |
|---|---|---|---|
| OID | N | NUMBER (18) | Object identifier of the vendor product |
| NAME | N | VARCHAR2 (50) | Name of the vendor product |

TABLE 2.130-continued

VENDOR_PROD

| Attribute Name | Allows Nulls? | Type | Description |
| --- | --- | --- | --- |
| DSCR | N | VARCHAR2 (50) | Description of the vendor product |
| PROVSNG_CD | Y | VARCHAR2 (240) | Code indicating the provisioning type |
| SVC_DOMAIN_CD | N | NUMBER (9) | Code indicating the type of service domain (e.g., phone number, email address) |
| PROVSNG_START_DT | Y | DATE | First date that the vendor product can be provisioned |
| PROVSNG_END_DT | Y | DATE | Last date that the vendor product can be provisioned |
| VENDOR_OID | N | NUMBER (18) | Object identifier for the associated vendor |
| IS_SVC_ID_REQUIRED_CD | N | NUMBER (9) | Indicates whether a service identifier is required |
| CLASS_OF_SVC_CD | N | NUMBER (9) | Code indicating the class of service |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.131 maps a vendor product to a CMI policy.

TABLE 2.131

VENDOR_PROD_CMI_POLICY

| Attribute Name | Allows Nulls? | Type | Description |
| --- | --- | --- | --- |
| OID | N | NUMBER (18) | Object identifier for the vendor product to a CMI policy |
| ACTION_CD | N | NUMBER (9) | Action code |
| VENDOR_PROD_OID | N | NUMBER (18) | Object identifier fort the associated Vendor product |
| ADAPTER_HOME | N | VARCHAR2 (240) | The associated adapter |
| CNTXT | N | VARCHAR2 (240) | Associated contact object |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Optimistic lock |
| WRITE_LOCK | N | NUMBER (18) | User who created the entry |

Table 2.132 maps a disclosure to a vendor product.

TABLE 2.132

VENDOR_PROD_DISCL_MAP

| Attribute Name | Allows Nulls? | Type | Description |
| --- | --- | --- | --- |
| OID | N | NUMBER (18) | Object identifier for the map |
| DISCL_OID | N | NUMBER (18) | Object identifier for the disclosure |
| VENDOR_PROD_OID | N | NUMBER (18) | Object identifier for the vendor product |
| DSCR | Y | VARCHAR2 (240) | Description of the map |
| CREATE_USR | Y | VARCHAR2 (40) | User who created the entry |
| CREATE_DT | Y | DATE | Date the entry was created |

TABLE 2.132-continued

VENDOR_PROD_DISCL_MAP

| Attribute Name | Allows Nulls? | Type | Description |
| --- | --- | --- | --- |
| MOD_USR | Y | VARCHAR2 (40) | User who last modified the entry |
| MOD_DT | Y | DATE | Date the entry was last modified |
| WRITE_LOCK | N | NUMBER (18) | Optimistic lock |

Table 2.133 maps vendor products to parameter groups.

TABLE 2.133

VENDOR_PROD_PARM_GROUP_MAP

| Attribute Name | Allows Nulls? | Type | Description |
| --- | --- | --- | --- |
| OID | N | NUMBER (18) | Object identifier for the map |
| PARM_GROUP_OID | N | NUMBER (18) | Object identifier for the parameter group |
| VENDOR_PROD_OID | N | NUMBER (18) | Object identifier for the vendor product |
| DSPL_ORDER | N | NUMBER (18) | The display order for the parameter group. |
| STATUS_CD | N | NUMBER (9) | Code indicating the status of the map |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.134 represents a charge related to the creation of a supplemental order.

TABLE 2.134

SPLMNTL_CHARGE

| Attribute Name | Allows Nulls? | Type | Description |
| --- | --- | --- | --- |
| OID | N | NUMBER (18) | Object identifier for the supplemental charge |
| TARGET_OID | N | NUMBER (18) | Object identifier for the target |
| TARGET_CLASS | N | VARCHAR2 (80) | Fully qualified class name of the target object |
| OVRRDE_REASON_OID | Y | NUMBER (18) | Object identifier for the override reason |
| AMT | N | NUMBER ( ) | Amount of the supplemental charge |
| DSCR | Y | VARCHAR2 (240) | Description of the supplemental charge |
| QTY | Y | NUMBER ( ) | The quantity of the items that the charge was calculated on |
| FORMAT_CD | N | NUMBER (9) | Code indicating the format |
| UOM_CD | N | NUMBER (9) | Code indicating the UOM |
| CHARGE_DT | N | DATE | Date the charge was generated |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.12. Order

Table 2.135 represents a customer commitment to purchase a set of offers.

TABLE 2.135

ORDR

| Attribute Name | Allows Nulls? | Type | Description |
| --- | --- | --- | --- |
| OID | N | NUMBER (18) | Object identifier for the order |
| ORDR_ID | Y | NUMBER (18) | Identifier for the order used by an external system |
| ID | Y | VARCHAR2 (50) | Identifier for the order used by an external system |
| STATE_CD | N | NUMBER (9) | Code indicating the state of the order. The order state attribute is populated from the interaction log. |
| STATUS_CD | N | NUMBER (9) | Code indicating the status of the order |
| ESCLTN_FLG | N | NUMBER (1) | Escalation flag |
| SPLMNTD_ORDR_OID | Y | NUMBER (18) | Object identifier for the supplemental order |
| ORDER_TYPE_CD | N | NUMBER (9) | Code indicating the order type |
| ROOT_OID | N | NUMBER (18) | Object identifier for the root hierarchy object |
| QUOTE_OID | Y | NUMBER (18) | Object identifier for the associated quote |
| TOTAL_AMT | N | NUMBER ( ) | Total amount of the order |
| DSCR | Y | VARCHAR2 (50) | User-entered description of the order |
| SHPNG_ADDR_OID | Y | NUMBER (18) | Object identifier for the shipping address for delivered products |
| PAYMNT_OID | Y | NUMBER (18) | Object identifier for the associated payment |
| MONTHLY_RCURRNG_DSPL_SUMM_AMT | Y | NUMBER ( ) | Monthly rate for an order displayed to the customer |
| TOTAL_SPLMNTL_AMT | N | NUMBER ( ) | Total supplemental charge amount |
| SUBMTD_DT | Y | DATE | Date order was submitted |
| PURCH_ORDR_NBR | Y | VARCHAR2 (50) | Purchase order number |
| AGENT_OID | Y | NUMBER (18) | Object identifier for the agent |
| LAST_MODIFIED_USR | N | VARCHAR2 (40) | Name of last modified user |
| CREATED_USR | N | VARCHAR2 (40) | Name of created user |
| EMAIL_ADDR | Y | VARCHAR2 (240) | Email address |
| PARTNER_CUST_OID | Y | NUMBER (18) | Object identifier for the partner customer |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify Subclass tables related to a superclass |
| WRITE_LOCK | N | NUMBER (18) | Optimistic lock |

Table 2.136 represents an external request for an offer. The scheduled due date and start work flow date are set when the preceding Quote Item is configured.

TABLE 2.136

ORDR_ITEM

| Attribute Name | Allows Nulls? | Type | Description |
| --- | --- | --- | --- |
| OID | N | NUMBER (18) | Object identifier for the order item |
| ORDR_OID | N | NUMBER (18) | Object identifier for the order |
| OFFER_INSTNC_OID | N | NUMBER (18) | Object identifier for the associated offer instance |
| TARGET_OID | N | NUMBER (18) | Object identifier for the hierarchy object to which the order item is associated |

TABLE 2.136-continued

ORDR_ITEM

| Attribute Name | Allows Nulls? | Type | Description |
|---|---|---|---|
| TARGET_CLASS | N | VARCHAR2 (80) | Fully-qualified path of the associated target object |
| SPLMNTD_ORDR_ITEM_OID | Y | NUMBER (18) | Object identified for the supplemental order item |
| SPLMNTL_TYPE_CD | N | NUMBER (9) | Code indicating the supplemental type |
| ESCLTN_FLG | N | NUMBER (1) | Escalation flag |
| PRVDR_ORDER_ID | Y | VARCHAR (50) | Identifier for the associated order provider |
| CAN_REMOVE_FROM_ORDR_FLG | N | NUMBER (1) | Flag indicating whether the order can be removed from cart |
| PURCH_ORDR_NBR | Y | VARCHAR2 (50) | Purchase order number |
| RQST_DUE_DT | Y | DATE | Date the order item is requested for provisioning |
| SCHED_DUE_DT | Y | DATE | Scheduled due date of service, otherwise known as the Service Level |
| SUBMTD_DT | Y | DATE | Date order was submitted |
| EXECUTED_DT | Y | DATE | Date the action on the order item was resolved |
| LABEL | Y | VARCHAR2 (50) | Label for the order item |
| PAYMNT_OID | Y | NUMBER (18) | Object identifier for the associated payment |
| STATUS_CD | N | NUMBER (9) | Code indicating the status of the order item |
| STATE_CD | N | NUMBER (9) | Code indicating the state of the order item. This is populated from the interaction log |
| DSPL_ORDER | N | NUMBER (18) | Number indicating the order in which the item is displayed in relation to other order items |
| QTY | Y | NUMBER ( ) | Order item quantity |
| ACTION_CD | N | NUMBER (9) | Code indicating the action required to create the order item |
| SHPNG_ADDR_OID | Y | NUMBER (18) | Object identifier for the shipping address object. This column is not updated by the Cygent application, but is included for customization purposes only. Shipping addresses are stored at the order level. |
| DSCR | Y | VARCHAR2 (50) | Description for order item |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.13. Payment

Table 2.137 represents a subclass of payment. The credit card payment contains credit card information regarding a specific payment.

TABLE 2.137

CREDIT_CARD_PAYMNT

| Attribute Name | Allows Nulls? | Type | Description |
| --- | --- | --- | --- |
| OID | N | NUMBER (18) | Object identifier for the credit card payment object |
| CARD_TYPE_CD | N | NUMBER (9) | Code that indicates the credit type (e.g., Visa, American Express) |
| CARD_HOLDER_FIRST_NAME | N | VARCHAR2 (50) | First name of the cardholder |
| CARD_HOLDER_MIDDLE_NAME | Y | VARCHAR2 (50) | Middle name of the cardholder |
| CARD_HOLDER_LAST_NAME | N | VARCHAR2 (50) | Last name of the cardholder |
| BLNG_ADDR_OID | N | NUMBER (18) | Object identifier for the associated billing address |
| ENCRYPTED_CARD_NBR | N | VARCHAR2 (50) | Encrypted credit card number |
| ENCRYPTED_PIN_NBR | Y | VARCHAR2 (50) | Encrypted PIN number |
| EXPRTN_DT | N | DATE | Credit card expiration date |
| ATHZTN_CD | Y | VARCHAR2 (50) | Authorization code for this payment |
| ATHZTN_SUBMIT_DT | Y | DATE | Date the payment was submitted for authorization |
| ATHZTN_EXPRTN_DT | Y | DATE | Date the authorization expires for this payment |
| SETTLMNT_MSG | Y | VARCHAR2 (240) | Message returned from the settlement request |
| SETTLMNT_SUBMIT_DT | Y | DATE | Date this payment was submitted for settlement |
| ATHZTN_SOURCE_CD | Y | VARCHAR2 (50) | Code indicating the source of the authorization code |
| APPROVAL_CD | Y | VARCHAR2 (50) | Code indicating payment approval |
| AVS_CD | Y | VARCHAR2 (50) | Code indicating the address verification system |
| SETTLMNT_CD | Y | VARCHAR2 (50) | Code for the settlement transaction |
| SETTLMNT_BATCH_NBR | Y | VARCHAR2 (50) | Batch number in which the settlement request was made |
| PSP_STATUS | Y | VARCHAR2 (50) | Status of the payment as defined by the payment service provider |
| PSP_TXN_NBR | Y | VARCHAR2 (50) | Transaction number associated with this payment |
| SETTLMNT_AMT | Y | NUMBER ( ) | Dollar amount paid by the issuing credit card company |
| PSP_RETURN_CD | Y | VARCHAR2 (50) | Return code for the payment as defined by the payment service provider |
| PSP_ACTION | Y | VARCHAR2 (50) | Action for this payment as defined by the payment service provider |
| PSP_ERROR_MSG | Y | VARCHAR2 (50) | Error message received from the payment service provider |
| PSP_NAME | Y | VARCHAR2 (50) | Name of the payment service provider |
| TYPE | Y | NUMBER (2) | Used by TopLink to identify subclass tables related to a superclass |

Table 2.138 contains information regarding payment transactions made by users.

TABLE 2.138

PAYMNT

| Attribute Name | Allows Nulls? | Type | Description |
|---|---|---|---|
| OID | N | NUMBER (18) | Object identifier for the payment |
| CREATED_DT | N | DATE | Date this payment was created |
| STATUS_CD | N | NUMBER (9) | Code indicating the payment status |
| AMT | N | NUMBER ( ) | Payment amount |
| TARGET_OID | N | NUMBER (18) | Object identifier for the object to which the payment is associated |
| TARGET_CLASS | N | VARCHAR2 (80) | Fully-qualified path for the target class |
| USR_OID | N | NUMBER (18) | Object identifier for the user |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.139 allows addition of new attributes to any classes within the Payment domain.

TABLE 2.139

PAYMNT_EXT_DATA

| Attribute Name | Allows Nulls? | Type | Description |
|---|---|---|---|
| OID | N | NUMBER (18) | Object identifier for the payment external data |
| PARENT_OID | N | NUMBER (18) | Object identifier for the parent class |
| ATTRIB_NAME | N | VARCHAR2 (40) | Name for the attribute |
| ATTRIB_VALUE | N | VARCHAR2 (40) | Value for the attribute |
| WRITE_LOCK | N | NUMBER (18) | Optimistic lock |

2.14. Pricing

Table 2.140 represents the unique key for an action used for a price

TABLE 2.140

CNTXT

| Attribute Name | Allows Nulls? | Type | Description |
|---|---|---|---|
| OID | N | NUMBER (18) | Object identifier for the context |
| NAME | N | VARCHAR2 (50) | Name of the context |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.141 is used to indicate which unit price is valid for different levels in a multi-level price arrangement

TABLE 2.141

CRTRIA

| Attribute Name | Allows Nulls? | Type | Description |
|---|---|---|---|
| OID | N | NUMBER (18) | Internal identifier of the criteria object |
| LOW_VALUE | N | VARCHAR2 (50) | Low value of this level. This is number is inclusive |
| HIGH_VALUE | Y | VARCHAR2 (50) | High value of this level. This number is exclusive. |
| OPER_CD | N | NUMBER (9) | Code that describes the relationships between the levels (e.g., between, greater than) |
| UOM_CD | N | NUMBER (9) | Unit of measure code |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |

TABLE 2.141-continued

CRTRIA

| Attribute Name | Allows Nulls? | Type | Description |
|---|---|---|---|
| TYPE | Y | NUMBER (2) | Used by TopLink to identify subclass tables related to a superclass |
| WRITE_LOCK | N | NUMBER (18) | Optimistic lock |

Table 2.142 determines the active price arrangement for a given price group supported.

TABLE 2.142

PRICE

| Attribute Name | Allows Nulls? | Type | Description |
|---|---|---|---|
| OID | N | NUMBER (18) | Object identifier for the price |
| CNTXT_OID | Y | NUMBER (18) | Object identifier for the associated context |
| ACTIVE_PRICE_ARRGMNT_OID | Y | NUMBER (18) | Object identifier for the currently active price arrangement |
| DSCR | Y | VARCHAR2 (50) | Description of the price |
| LONG_DSCR | Y | VARCHAR2 (240) | Long description of the price |
| PRICE_GROUP_SPPRTD_OID | N | NUMBER (18) | Object identifier for the price group supported |
| EXT_SYS_REF | Y | VARCHAR2 (240) | Reference to the external billing system |
| DO_NOT_SUMMARY_PRICE_FLG | N | NUMBER (1) | Indicates whether the price should not be included in the monthly recurring summary on the associated offer instance |
| FORMAT_CD | N | NUMBER (9) | Code indicating how the invoice is formatted in an external system |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.143 determines how a price is calculated (e.g., flat, tier).

TABLE 2.143

PRICE_ARRGMNT

| Attribute Name | Allows Nulls? | Type | Description |
|---|---|---|---|
| OID | N | NUMBER (18) | Object identifier for the price arrangement |
| PRICE_OID | N | NUMBER (18) | Object identifier for the associated price |
| PRICE_ARRGMNT_TYPE_CD | N | NUMBER (9) | Code indicating the type of the price arrangement |

TABLE 2.143-continued

PRICE_ARRGMNT

| Attribute Name | Allows Nulls? | Type | Description |
|---|---|---|---|
| DSCR | Y | VARCHAR2 (50) | Description of the price arrangement |
| FORMAT_CD | N | NUMBER (9) | Code indicating how the discount is formatted in an external system |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.144 represents the junction of a price group and an action supported for a given offer.

TABLE 2.144

PRICE_GROUP_SPPRTD

| Attribute Name | Allows Nulls? | Type | Description |
|---|---|---|---|
| OID | N | NUMBER (18) | Object identifier for the price group supported |
| PRICE_GROUP_OID | N | NUMBER (18) | Object identifier for the price group |
| OFFER_OID | N | NUMBER (18) | Object identifier for the offer |
| ACTION_CD | N | NUMBER (9) | Code indicating the action |
| NO_PRICE_FLG | N | NUMBER (1) | Indicates whether the price group does not have a price for this action on this offer |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.145 provides the actual monetary amount to be charged per unit for a given price arrangement.

TABLE 2.145

UNIT_PRICE

| Attribute Name | Allows Nulls? | Type | Description |
|---|---|---|---|
| OID | N | NUMBER (18) | Object identifier for the unit price |
| EXT_SYS_REF | Y | VARCHAR2 (240) | Reference to the external billing system |
| UOM_CD | N | NUMBER (9) | Code indicating the unit of measure for the price |
| UNIT_AMT | Y | NUMBER ( ) | Unit dollar amount |
| PRICE_ARRGMNT_OID | N | NUMBER (18) | Object identifier for the associated price arrangement |
| CRTRIA_OID | Y | NUMBER (18) | Object identifier for the criteria that indicates when this price is used in a multi-level price agreement |
| FORMAT_CD | N | NUMBER (9) | Code indicating how the invoice is formatted in an external system |

TABLE 2.145-continued

UNIT_PRICE

| Attribute Name | Allows Nulls? | Type | Description |
|---|---|---|---|
| SEQ_NBR | N | NUMBER (18) | Number indicating the sequence of this unit price |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.15. Profile

Table 2.146 defines a profile that can be associated with any Cygent class.

TABLE 2.146

PROF_DEFN

| Attribute Name | Allows Nulls? | Type | Description |
|---|---|---|---|
| OID | N | NUMBER (18) | Object identifier for the profile definition |
| DSPL_LABEL | Y | VARCHAR2 (50) | The label displayed before profile is configured |
| CONFIGD_LABEL | Y | VARCHAR2 (50) | The label displayed after profile is configured |
| PROF_DEFN_TYPE_CD | N | NUMBER (9) | Code indicating the profile definition type |
| STATUS_CD | N | NUMBER (9) | Code indicating status |
| GUI_WIDGET_CD | N | NUMBER (9) | Code indicating the GUI widget |
| GUI_WIDGET_SIZE | Y | NUMBER (18) | The size of the widget that is displayed when collecting the profile |
| LOW_VALUE | Y | VARCHAR2 (50) | The min value for the profile |
| HIGH_VALUE | Y | VARCHAR2 (50) | The max value for the profile |
| DFLT_VALUE | Y | VARCHAR2 (50) | The default value for the profile |
| REQUIRED_FLG | N | NUMBER (1) | Flag indicating whether or not the profile is required or optional |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.147 defines an element of a list from which a user can select a value for a profile. A set of ProfileEnumerations are associated with a Profile Definition through Profile Definition. Profile Enumeration Maps.

TABLE 2.147

PROF_ENUM_DEFN

| Attribute Name | Allows Nulls? | Type | Description |
|---|---|---|---|
| OID | N | NUMBER (18) | Object identifier for the profile enumeration |
| PROF_ENUM_TYPE_CD | N | NUMBER (9) | Code indicating the profile enumeration type |
| EXT_NAME | Y | VARCHAR2 (50) | The name that is displayed to the user |

TABLE 2.147-continued

PROF_ENUM_DEFN

| Attribute Name | Allows Nulls? | Type | Description |
|---|---|---|---|
| INTERNAL_VALUE | Y | VARCHAR2 (50) | The internal value used by the system |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.148 is used to group profile definitions. All profile definitions must be assigned to a ProfileGroup.

TABLE 2.148

PROF_GROUP

| Attribute Name | Allows Nulls? | Type | Description |
|---|---|---|---|
| OID | N | NUMBER (18) | Object identifier for the profile group |
| GROUP_NAME | Y | VARCHAR2 (50) | The name of the profile group |
| STATUS_CD | N | NUMBER (9) | Code indicating the status of the profile group |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.149 associates profile definitions with Profile-Groups. Each ProfileDefinition must be assigned with one or more ProfileGroups

TABLE 2.149

PROF_GROUP_PROF_DEFN_MAP

| Attribute Name | Allows Nulls? | Type | Description |
|---|---|---|---|
| OID | N | NUMBER (18) | Object identifier for the profile group profile definition map |
| PROF_GROUP_OID | N | NUMBER (18) | Object identifier for the profile group |
| PROF_DEFN_OID | N | NUMBER (18) | Object identifier for the profile definition |
| DSPL_ORDER | N | NUMBER (18) | The display order for profile defintion within the group |
| DSPL_NEXT_FLG | N | NUMBER (1) | Indicates whether the profile definition is displayed next to the previous definition |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.150 associates individual Profile Enumerations with Profile Definitions.

TABLE 2.150

PROF_DEFN_PROF_ENUM_MAP

| Attribute Name | Allows Nulls? | Type | Description |
|---|---|---|---|
| OID | N | NUMBER (18) | Object identifier for the profile definition profile enumeration map |
| PROF_DEFN_OID | N | NUMBER (18) | Object identifier for the profile definition |
| PROF_ENUM_DEFN_OID | N | NUMBER (18) | Object identifier for the profile enumeration definition |
| DSPL_ORDER | Y | NUMBER (18) | The display order for the enumeration |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.151 associates Profile Groups with Cygent objects.

TABLE 2.151

PROF_KEY_PROF_GROUP_MAP

| Attribute Name | Allows Nulls? | Type | Description |
|---|---|---|---|
| OID | N | NUMBER (18) | Object identifier for the profile key profile group map |
| PROF_KEY | N | VARCHAR2 (80) | The profile key |
| PROF_GROUP_OID | N | NUMBER (18) | Object identifier for the profile group |
| PROF_KEY_STATUS_CD | N | NUMBER (9) | Code indicating the profile key status |
| DSPL_ORDER | N | NUMBER (18) | The display order for the profile group |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.152 contains the value of profile definitions selected by the user.

TABLE 2.152

PROF_VALUE

| Attribute Name | Allows Nulls? | Type | Description |
|---|---|---|---|
| OID | N | NUMBER (18) | Object identifier for the profile value |
| PROF_GROUP_OID | N | NUMBER (18) | Object identifier for the profile group |
| PROF_DEFN_OID | N | NUMBER (18) | Object identifier for the profile definition |
| TARGET_OID | N | NUMBER (18) | Object identifier for the target |
| TARGET_CLASS | N | VARCHAR2 (80) | The object class name this profile value belongs to |
| STATUS_CD | N | NUMBER (9) | Code indicating the status of the profile value |

TABLE 2.152-continued

PROF_VALUE

| Attribute Name | Allows Nulls? | Type | Description |
| --- | --- | --- | --- |
| VALUE | Y | VARCHAR2 (50) | The profile value |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.16. Quote

Table 2.153 represents the point in the ordering process flow where a limited-time price is offered for items a user wants to purchase.

TABLE 2.153

QUOTE

| Attribute Name | Allows Nulls? | Type | Description |
| --- | --- | --- | --- |
| OID | N | NUMBER (18) | Object identifier for the quote |
| STATE_CD | N | NUMBER (9) | Code indicating the state of the quote |
| STATUS_CD | N | NUMBER (9) | Status code |
| QUOTE_TYPE_CD | N | NUMBER (9) | Code indicating the quote type |
| SPLMNTD_ORDR_OID | Y | NUMBER (18) | Object identifier for the supplemented order |
| ROOT_OID | N | NUMBER (18) | Object identifier for the associated hierarchy root |
| PAYMNT_OID | Y | NUMBER (18) | Object identifier for the payment |
| SHPNG_ADDR_OID | Y | NUMBER (18) | Object identifier for the shipping address for delivered products |
| MONTHLY_RCURRNG_DSPL_SUMM_AMT | Y | NUMBER ( ) | Total recurring monthly charge for the displayed quote |
| TOTAL_SPLMNTL_AMT | N | NUMBER ( ) | Total supplemental charge amount |
| QUOTE_ID | Y | VARCHAR2 (50) | Identifier used by an external system |
| AGENT_OID | Y | NUMBER (18) | Object identifier for the agent |
| PARTNER_CUST_OID | Y | NUMBER (18) | Object identifier for the partner customer |
| LAST_MODIFIED_USR | N | VARCHAR2 (40) | The name of the user that last modified this quote<br>* Note that this is different from lastModUser field used for auditing |
| EMAIL_ADDR | Y | VARCHAR2 (240) | Email address associated with this quote |
| CREATED_USR | N | VARCHAR2 (40) | Name of created user |
| CREATED_DT | N | DATE | Date the quote was created |
| SUBMTD_DT | Y | DATE | Date the quote was submitted |
| QUOTED_DT | Y | DATE | Date the quote was locked |
| VALID_UNTIL_DT | Y | DATE | Last date that the quote is valid |
| AMT | Y | NUMBER ( ) | Total amount of the quote |
| DSCR | Y | VARCHAR2 (50) | Description of the quote |
| PURCH_ORDR_NBR | Y | VARCHAR2 (50) | Purchase order number for quote |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.154 represents an offer instance in a quote

TABLE 2.154

QUOTE_ITEM

| Attribute Name | Allows Nulls? | Type | Description |
| --- | --- | --- | --- |
| OID | N | NUMBER (18) | Object identifier for the quote item |
| STATE_CD | N | NUMBER (9) | Code indicating the state of the quote item |
| STATUS_CD | N | NUMBER (9) | Code indicating the status |
| OFFER_INSTNC_OID | N | NUMBER (18) | Object identifier for the associated offer instance |
| QUOTE_OID | N | NUMBER (18) | Object identifier for the associated quote |
| TARGET_OID | N | NUMBER (18) | Obejct identifier for the object to which the offer instance that is associated after provisioning |
| TARGET_CLASS | N | VARCHAR2 (80) | Fully-qualified path to the target class |
| FROM_OFFER_OID | Y | NUMBER (18) | Object identifier for the source offer |
| SPLMNTD_ORDR_ITEM_OID | Y | NUMBER (18) | Object identifier for the supplemental order item |
| SPLMNTL_TYPE_CD | N | NUMBER (9) | Code indicating the supplemental type |
| ESCLTN_FLG | N | NUMBER (1) | Boolean indicating if the quote item is escalated |
| PAYMNT_OID | Y | NUMBER (18) | Object identifier for the associated payment |
| SHPNG_ADDR_OID | Y | NUMBER (18) | Object identifier for the address object. This column is not updated by the Cygent application, but is included for customization purposes only. Shipping addresses are stored at the quote level. |
| CREATED_DT | N | DATE | Date the quote item was created |
| RQSTD_DT | Y | DATE | Date the quote item was requested to be active |
| SCHED_DT | Y | DATE | Date the quote item is scheduled to be active |
| CAN_REMOVE_FROM_QUOTE_FLG | Y | NUMBER (1) | Boolean flag indicating whether the quote item can be removed from the quote |
| LABEL | Y | VARCHAR2 (50) | Label for the quote item |
| ACTION_CD | N | NUMBER (9) | Code indicating the action to use |
| PURCH_ORDR_NBR | Y | VARCHAR2 (50) | Purchase order number for the quote item (stored as string) |
| DSCR | Y | VARCHAR2 (50) | Description of the quote item |
| QTY | Y | NUMBER ( ) | Quote item quantity |
| DSPL_ORDER | Y | NUMBER (18) | Indicates the display order of the quote items |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last mod |
| TYPE | Y | NUMBER (2) | Used by TopLink to identify subclass tables related to a superclass |
| WRITE_LOCK | N | NUMBER (18) | Optimistic lock |

Table 2.155 identifies groups of attributes on a quote item that will be populated either by preconfiguration or propagation. Groups include the product parameters, attachment date, requested date, and others.

TABLE 2.155

QUOTE_ITEM_POPULATN_DSCPTR

| Attribute Name | Allows Nulls? | Type | Description |
|---|---|---|---|
| OID | N | NUMBER (18) | Object identifier for the quote item population descriptor |
| OFFER_OID | N | NUMBER (18) | Object identifier for the offer |
| POPULATN_OPERTN_TYPE_CD | N | NUMBER (9) | Code indicating the population operation type |
| TARGET_ATTRIBUTES_CD | N | NUMBER (9) | Code indicating the target attributes |
| PLUGIN_CD | N | NUMBER (9) | Code indicating the plug-in |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.17. Shop

Table 2.156 contains information regarding offers placed in a customer or partners shopping cart.

TABLE 2.156

CART_ITEM

| Attribute Name | Allows Nulls? | Type | Description |
|---|---|---|---|
| OID | N | NUMBER (18) | Object identifier for the cart item object |
| TARGET_OID | Y | NUMBER (18) | Object identifier for the instance that is in the cart |
| TARGET_CLASS | Y | VARCHAR2 (80) | Fully-qualified class path of the target class |
| CART_ID | Y | NUMBER (18) | Identifier for the cart used by external systems. Default is the OID. |
| CAN_REMOVE_FROM_CART_FLG | N | NUMBER (1) | Flag indicating whether the item can be removed from the cart. |
| QTY | Y | NUMBER ( ) | Number of items in the cart |
| OFFER_INSTNC_OID | N | NUMBER (18) | Object identifier for the associated offer instance |
| USR_OID | Y | NUMBER (18) | Object identifier for the associated user |
| SESSION_ID | Y | VARCHAR (240) | Identifier for the session in which the cart item was created |
| ACTION_CD | N | NUMBER (9) | Code indicating the action being performed on this cart item |
| DSPL_ORDER | Y | NUMBER (18) | Number designating priority with which the cart item is displayed in the cart |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.157 contains the information needed to display a menu, offer, or offer collection at the front end.

TABLE 2.157

DSPL_ATTRIBS

| Attribute Name | Allows Nulls? | Type | Description |
|---|---|---|---|
| OID | N | NUMBER (18) | Object identifier for the display attribute |
| ICON | Y | VARCHAR2 (240) | Illustration or photograph that appears with the object when it displays at the front end. |
| LABEL | Y | VARCHAR2 (240) | Name for the object that appears at the front end |
| LABEL_HEX_COLOR | Y | VARCHAR2 (50) | Color used to display the offer text |
| SHORT_DSCR | Y | VARCHAR2 (240) | Brief description of the associated object |
| LONG_DSCR | Y | VARCHAR2 (2000) | Detailed description of the associated object |
| SIDEBAR_GRAPHIC | Y | VARCHAR2 (240) | Clickable image or symbol link that appears next to the link to the object in the portal |
| HIGHLIGHTED_SIDEBAR_GRAPHIC | Y | VARCHAR2 (240) | Rollover version of the clickable image |
| SALES_MSG | Y | VARCHAR2 (240) | The sales message to be displayed with this shop item |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.158 is a menu of other menus or offers displayed to the user. Users see root menus corresponding to their price groups. Each user has a price group and each price group has a root menu.

TABLE 2.158

MENU

| Attribute Name | Allows Nulls? | Type | Description |
|---|---|---|---|
| OID | N | NUMBER (18) | Object identifier for the menu |
| DSPL_ORDER | N | NUMBER (18) | Indicate the display order of the group |
| TARGET_OID | Y | NUMBER (18) | Object identifier for the associated offer |
| TARGET_CLASS | Y | VARCHAR2 (80) | Fully-qualified path for the target class |
| DSPL_ATTRIBS_OID | N | NUMBER (18) | Object identifier for the associated display attributes |
| PARENT_OID | Y | NUMBER (18) | Object identifier for the parent menu |
| ROOT_MENU_OID | N | NUMBER (18) | Object identifier for the root menu |
| CREATE_USR | Y | VARCHAR2 (40) | User who created the entry |
| CREATE_DT | Y | DATE | Date the entry was created |
| MOD_DT | Y | DATE | Date the entry was last modified |
| MOD_USR | Y | VARCHAR2 (40) | User who last modified the entry |
| TYPE | Y | NUMBER (2) | Used by TopLink to identify subclass tables related to a superclass |
| WRITE_LOCK | N | NUMBER (18) | Optimistic lock |

2.18. Task Manager

These tables are specifically for the task manager, which is an optional product. These tables are populated only if you have purchased the cygent task manager.

Table 2.159 represents an object to which a task can be assigned.

TABLE 2.159

TM_PERFRMR

| Attribute Name | Allows Nulls? | Type | Description |
| --- | --- | --- | --- |
| OID | N | NUMBER (18) | Object identifier for the performer |
| TARGET_OID | N | NUMBER (18) | Object identifier for the target object associated with the performer |
| TARGET_CLASS | N | VARCHAR2 (80) | Fully-qualified class name of the target object associated with the performer |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.160 represents a specific initiated instance of a process flow.

TABLE 2.160

TM_PROCESS_FLOW_INSTNC

| Attribute Name | Allows Nulls? | Type | Description |
| --- | --- | --- | --- |
| OID | N | NUMBER (18) | Object identifier for the process flow instance |
| DEF_ID | N | NUMBER (18) | External identifier for the process flow definition |
| NAME | Y | VARCHAR2 (50) | Name of the process flow instance |
| DSCR | Y | VARCHAR2 (240) | Description of the process flow |
| STATE_CD | N | NUMBER (9) | Code indicating the process instance state |
| STATUS_CD | N | NUMBER (9) | Code indicating the process instance status |
| TARGET_OID | Y | NUMBER (18) | Object identifier for the target object that invoked the process instance |
| TARGET_CLASS | Y | VARCHAR2 (80) | Fully-qualified class name of the target object that invoked the process instance |
| ATTACHMENT | Y | VARCHAR2 (80) | Extra information included with the process flow instance |
| START_DT | N | DATE | Date that the process instance was invoked |
| END_DT | Y | DATE | Date the process instance completed |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.161 represents a group of objects qualified to perform a certain type of task.

TABLE 2.161

TM_ROLE

| Attribute Name | Allows Nulls? | Type | Description |
| --- | --- | --- | --- |
| OID | N | NUMBER (18) | Object identifier for the role |
| NAME | N | VARCHAR2 (50) | Name of the role |
| STATUS_CD | N | NUMBER (9) | Code indicating the role's current status |
| ESCLTN_RECPT_TARGET_OID | Y | NUMBER (18) | Object identifier for the target object notified when an associated role has an escalated task |

TABLE 2.161-continued

TM_ROLE

| Attribute Name | Allows Nulls? | Type | Description |
| --- | --- | --- | --- |
| ESCLTN_RECPT_TARGET_CLASS | Y | VARCHAR2 (80) | Fully-qualified class name of the target object |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.162 maps a role to a specific performer.

TABLE 2.162

TM_ROLE_TM_PERFRMR_MAP

| Attribute Name | Allows Nulls? | Type | Description |
| --- | --- | --- | --- |
| L-Linkparatext_OID | N | NUMBER (18) | Object identifier for the role |
| L-Linkparatext_OID | N | NUMBER (18) | Object identifier for the performer |

Table 2.163 represents a specific instance of an invoked task.

TABLE 2.163

TM_TASK_INSTNC

| Attribute Name | Allows Nulls? | Type | Description |
| --- | --- | --- | --- |
| OID | N | NUMBER (18) | Object identifier for the task instance |
| DEF_ID | N | NUMBER (18) | External identifier for the task instance |
| NAME | Y | VARCHAR2 (50) | Name of the task instance |
| DSCR | Y | VARCHAR2 (240) | Description of the task instance |
| TASK_TYPE_CD | N | NUMBER (9) | Code indicating the task type |
| STATE_CD | N | NUMBER (9) | Code indicating the task instance state |
| STATUS_CD | N | NUMBER (9) | Code indicating the task instance status |
| CMI_CD_VALUE | Y | NUMBER (18) | Code indicating a CMI if used for the task |
| DURTN | Y | VARCHAR2 (10) | Length of the tasks duration |
| ESCALATION_L-Linkparatext_OID | Y | NUMBER (18) | Object identifier for the role notified if the task reaches an escalation point (exceeds the duration without completing) |
| ESCLTN_FLG | N | NUMBER (1) | Boolean indicates if the task is escalated (exceeded the duration with completing) |
| ATTACHMENT | Y | VARCHAR2 (80) | Extra information included with the task instance |
| START_DT | N | DATE | Date that the task instance was invoked |
| END_DT | Y | DATE | Date the task instance completed |
| PAGE_ID | Y | VARCHAR2 (80) | Identifier for the JSP page used to begin any JSP page flow created specifically for this task |
| L-Linkparatext_OID | N | NUMBER (18) | Object identifier for the role associated with the task |
| L-Linkparatext_OID | N | NUMBER (18) | Object identifier for the process flow instance to which this task instance belongs |
| L-Linkparatext_OID | Y | NUMBER (18) | Object identifier for the performer to which this task is assigned |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |

TABLE 2.163-continued

TM_TASK_INSTNC

| Attribute Name | Allows Nulls? | Type | Description |
|---|---|---|---|
| TYPE | Y | NUMBER (2) | Used by TopLink to identify subclass tables related to a superclass |
| WRITE_LOCK | N | NUMBER (18) | Optimistic lock |

Table 2.164 represents the value of a task variable for a specific task.

TABLE 2.164

TM_TASK_VALUE

| Attribute Name | Allows Nulls? | Type | Description |
|---|---|---|---|
| OID | N | NUMBER (18) | Object identifier for the task variable value |
| NAME | N | VARCHAR2 (50) | Name of the task variable |
| TASK_VALUE | N | VARCHAR2 (50) | Value of the task variable |
| TYPE_CD | N | NUMBER (9) | Code indicating the task variable type |
| L-Linkparatext_OID | N | NUMBER (18) | Object identifier for the corresponding task instance |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.19. Trouble Ticket

Table 2.165 represents a trouble ticket which provides a way for users to report issues regarding objects in their hierarchy or for an invoice.

TABLE 2.165

TRBL_TKT

| Attribute Name | Allows Nulls? | Type | Description |
|---|---|---|---|
| OID | N | NUMBER (18) | Object identifier for the trouble ticket |
| CATGRY_CD | N | NUMBER (9) | Code indicating the type of the trouble ticket |
| TRBL_TKT_ID | N | VARCHAR2 (50) | Trouble ticket identifier used by external systems |
| TYPE_CD | N | NUMBER(9) | Code indicating the trouble ticket type |
| NAME | Y | VARCHAR2 (240) | Name for the trouble ticket |
| USR_OID | N | NUMBER (18) | Object identifier for the associated user |
| ROOT_OID | N | NUMBER (18) | Object identifier for the associated root object |
| PARTNER_CUST_OID | Y | NUMBER (18) | Object identifier for the partner customer |
| PRIORITY_LEVEL | Y | NUMBER () | Numerical value indicating the trouble ticket's priority or severity |
| RSOLTN | Y | VARCHAR2 (240) | Indicates the trouble ticket resolution |
| STATE_CD | N | NUMBER (9) | Code indicating the trouble ticket state |
| STATUS_CD | N | NUMBER (9) | Code indicating the trouble ticket status |

TABLE 2.165-continued

TRBL_TKT

| Attribute Name | Allows Nulls? | Type | Description |
| --- | --- | --- | --- |
| CREATED_DT | N | DATE | Date that the trouble ticket was created |
| RSOLTN_DT | Y | DATE | Date the trouble ticket was resolved |
| TARGET_OID | Y | NUMBER (18) | Object identifier for the target object that the trouble ticket was raised against |
| TARGET_CLASS | Y | VARCHAR2 (80) | Fully-qualified class name of the target object |
| CNTCT_NAME | Y | VARCHAR2 (240) | Name of the contact for the trouble ticket |
| CNTCT_EMAIL_ADDR | Y | VARCHAR2 (240) | Contact's email address |
| CNTCT_PHONE_NBR | Y | VARCHAR2 (50) | Contact's phone number |
| PREFERRED_CONTACT_CD | N | NUMBER (9) | Customer-selected code indicating the preferred method of notification |
| NOTIFY_ON_EVENT_CD | N | NUMBER (9) | Customer-selected code indicating the frequency of notification |
| SVC_REP_ID | Y | VARCHAR2 (240) | Licensee defined ID for an associated service representative |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.166 contains comments for a specific trouble ticket object. A trouble ticket can have zero to many associated comments.

TABLE 2.166

TRBL_TKT_CMT

| Attribute Name | Allows Nulls? | Type | Description |
| --- | --- | --- | --- |
| OID | N | NUMBER (18) | Object identifier for the trouble ticket comment |
| DSCR | Y | VARCHAR2 (240) | Comment text |
| DSPL_CD | N | NUMBER (9) | Code indicating how the trouble ticket is displayed |
| TRBL_TKT_OID | N | NUMBER (18) | Object identifier for the associated trouble ticket |
| CREATED_DT | N | DATE | Date the trouble ticket comment was generated |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| USR_OID | N | NUMBER (18) | Object identifier for the user |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

Table 2.167 contains information used to map a trouble ticket to an interaction model selection.

TABLE 2.167

TRBL_TKT_INTRCTN_MODEL_SELCTN

| Attribute Name | Allows Nulls? | Type | Description |
|---|---|---|---|
| OID | N | NUMBER (18) | Object identifier for the trouble ticket interaction model selection |
| INTRCTN_MODEL_OID | N | NUMBER (18) | Object identifier for the associated interaction model |
| CREATE_USR | Y | VARCHAR2 (40) | The user who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.20. Vitria Adapter

Table 2.168 is specifically for the EAI adapter to Vitria BusinessWare, which is an optional product. This table determines the source and target strategies for vendor products that use the Vitria adapter. It is populated only if you have purchased that product.

TABLE 2.168

VITRIA_ADAPTER

| Attribute Name | Allows Nulls? | Type | Description |
|---|---|---|---|
| OID | N | NUMBER (18) | Object identifier for the adapter |
| CD_VALUE | Y | NUMBER (18) | Code indicating the CMI policy to be called |
| PUBLISH_CHANNEL | Y | VARCHAR2 (240) | Fully-qualified class name of the target object |
| SOURCE_STRATEGY_CLASS | Y | VARCHAR2 (240) | Fully-qualified class name of the source strategy class |
| TARGET_STRATEGY_CLASS | Y | VARCHAR2 (240) | Fully-qualified class name of the target strategy class |
| L-Linkparatext_OID | N | NUMBER (18) | Object identifier for the vendor product cmi policy |
| CREATE_USR | Y | VARCHAR2 (40) | User who created the entry |
| CREATE_DT | Y | DATE | Date the entry was created |
| MOD_USR | Y | VARCHAR2 (40) | User who last modified the entry |
| MOD_DT | Y | DATE | Date the entry was last modified |
| TYPE | Y | NUMBER (2) | Used by TopLink to identify subclass tables related to a superclass |
| WRITE_LOCK | N | NUMBER (18) | Optimistic lock |

2.21. View Tables

Views are logical representations of physical tables; they retrieve data based on operations on their underlying base tables.

Table 2.169 retrieves offer instance, address and partner customer information for an assigned product, when applicable. Base tables include: ASSGND_PROD, OFFER_INSTNC, HIER_OBJECT, ADDR, and PARTNER_CUST.

TABLE 2.169

ASSGND_PROD_VIEW

| Attribute Name | Attribute Name | Attribute Name |
|---|---|---|
| L-Linkparatext_LABEL | L-Linkparatext_STATE_CD | L-Linkparatext_ADDR_OID |
| L-Linkparatext_ROOT_OID | L-Linkparatext_COUNTRY_CD | OFFER_INSTNC_OID |

TABLE 2.169-continued

ASSGND_PROD_VIEW

| Attribute Name | Attribute Name | Attribute Name |
|---|---|---|
| L-Linkparatext_STATUS_CD | L-Linkparatext_CREATE_USR | L-Linkparatext_OFFER_COLLCTN_COMPOSITE_FLAG |
| ADDR_OID | L-Linkparatext_HOUSE_NBR_SUFFIX | L-Linkparatext_OFFER_COLLCTN_INSTANCE_ID |
| L-Linkparatext_STREET_NBR | L-Linkparatext_FLOOR | L-Linkparatext_OFFER_OID |
| L-Linkparatext_STREET_NAME | L-Linkparatext_ROOM | L-Linkparatext_SVC_ID |
| L-Linkparatext_ADDL_NAME_LINE | L-Linkparatext_COMMUNITY | PARTNER_CUST_OID |
| L-Linkparatext_STREET_TYPE_CD | L-Linkparatext_ZIP_CD | L-Linkparatext_LABEL |
| L-Linkparatext_ADDL_ADDR_LINE | ASSGND_PROD_OID | L-Linkparatext_CUST_ID |
| L-Linkparatext_STREET_DIRCTN_PRE_CD | L-Linkparatext_OFFER_INSTNC_OID | |
| L-Linkparatext_STREET_DIRCTN_POST_CD | L-Linkparatext_PARTNER_CUST_OID | |
| L-Linkparatext_UNIT_NBR | L-Linkparatext_UNPROVSND_DT | |
| L-Linkparatext_UNIT_TYPE_CD | L-Linkparatext_PROVSND_DT | |
| L-Linkparatext_CITY | L-Linkparatext_RQSTD_PROVSND_DT | |

Table 2.170 retrieves offer instance, address and partner customer information for an assigned product, when applicable. Base tables include: ASSGND_PROD, HIER_OBJECT, and ADDR.

TABLE 2.170

ASSGND_PROD_ADDR_VIEW

| Attribute Name | Attribute Name |
|---|---|
| L-Linkparatext_ADDL_ADDR_LINE | L-Linkparatext_UNIT_NBR |
| L-Linkparatext_ADDL_NAME_LINE | L-Linkparatext_UNIT_TYPE_CD |
| L-Linkparatext_CITY | L-Linkparatext_ZIP_CD |
| L-Linkparatext_COMMUNITY | L-Linkparatext_PARTNER_CUST_OID |
| L-Linkparatext_COUNTRY_CD | L-Linkparatext_ROOT_OID |
| L-Linkparatext_FLOOR | |
| L-Linkparatext_HOUSE_NBR_SUFFIX | |
| L-Linkparatext_ROOM | |
| L-Linkparatext_STATE_CD | |
| L-Linkparatext_STREET_DIRCTN_PRE_CD | |
| L-Linkparatext_STREET_DIRCTN_POST_CD | |
| L-Linkparatext_STREET_NBR | |
| L-Linkparatext_STREET_NAME | |
| L-Linkparatext_STREET_TYPE_CD | |

Table 2.171 retrieves offer instance, address and partner customer information for an assigned product, when applicable. Base tables include: ASSGND_PROD, HIER_OBJECT, and ADDR.

TABLE 2.171

ASSGND_PROD_ADDR_2_VIEW

| Attribute Name | Attribute Name |
|---|---|
| L-Linkparatext_ADDL_ADDR_LINE | L-Linkparatext_UNIT_NBR |
| L-Linkparatext_ADDL_NAME_LINE | L-Linkparatext_UNIT_TYPE_CD |
| L-Linkparatext_CITY | L-Linkparatext_ZIP_CD |
| L-Linkparatext_COMMUNITY | L-Linkparatext_PARTNER_CUST_OID |
| L-Linkparatext_COUNTRY_CD | L-Linkparatext_ROOT_OID |
| L-Linkparatext_FLOOR | |
| L-Linkparatext_HOUSE_NBR_SUFFIX | |
| L-Linkparatext_ROOM | |
| L-Linkparatext_STATE_CD | |
| L-Linkparatext_STREET_DIRCTN_PRE_CD | |
| L-Linkparatext_STREET_DIRCTN_POST_CD | |
| L-Linkparatext_STREET_NBR | |
| L-Linkparatext_STREET_NAME | |
| L-Linkparatext_STREET_TYPE_CD | |

Table 2.172 retrieves data for actions taken when an offer collection is broken, when applicable. Base tables include: DSPL_ATTRIBS, BREAK_OFFER_COLLCTN_RULE, OFFER, and OFFER_COLLCTN.

TABLE 2.172

BREAK_OFFER_COLLCTN_RULE_VIEW
Attribute Name

BREAK_OFFER_COLLCTN_RULE_OID
OFFER_COLLCTN_OID
L-Linkparatext_LABEL
FROM_L-Linkparatext_OID
FROM_L-Linkparatext_LABEL
TO_L-Linkparatext_OID
TO_L-Linkparatext_LABEL
TRANSTN_ACTION_CD Table 2.173 retrieves data object descriptors and compound data object descriptors combined with a boolean operator to create grouping of objects used by business rules, when applicable. Base tables include: CMPND_DATA_OBJ_DSCPTR and DATA_OBJ_DSCPTR.

TABLE 2.173

CMPND_DATA_OBJ_DSCPTR_VIEW
Attribute Name

CMPND_DATA_OBJ_DSCPTR_OID
L-Linkparatext_DSCR
L-Linkparatext_OPERTN
DATA_OBJ_DSCPTR1_OID
L-Linkparatext1_DSCR
DATA_OBJ_DSCPTR2_OID
L-Linkparatext2_DSCR Table 2.174 retrieves content items.

TABLE 2.174

CONTENT_ITEM_VIEW
Attribute Name

L-Linkparatext_SHORT_DSCR
L-Linkparatext_SMALL_ICON
L-Linkparatext_START_DT
L-Linkparatext_TARGET_CLASS
L-Linkparatext_TARGET_OID
L-Linkparatext_CATGRY_CD
L-Linkparatext_DSPL_MAX_COUNT
L-Linkparatext_END_DT
L-Linkparatext_LARGE_ICON
L-Linkparatext_LONG_DSCR
L-Linkparatext_NAME
L-Linkparatext_OFFER_OID
L-Linkparatext_OID
L-Linkparatext_PLUGIN_CD
L-Linkparatext_LABEL Table 2.175 retrieves offer instance, address and partner customer information for a delivered product, when applicable. Base tables include: DELVRD_PROD, PARTNER_CUST, ADDR, OFFER_INSTNC.

TABLE 2.175

DELVRD_PROD_ADDR_VIEW

| Attribute Name | |
|---|---|
| DELVRD_PROD_OID | L-Linkparatext_STREET_DIRCTN_PRE_CD |
| L-Linkparatext_INV_HIER_OBJ_OID | L-Linkparatext_STREET_DIRCTN_POST_CD |

TABLE 2.175-continued

DELVRD_PROD_ADDR_VIEW

Attribute Name

L-Linkparatext_SHIPPED_DT
L-Linkparatext_RQSTD_DELVRD_DT
L-Linkparatext_LABEL
L-Linkparatext_STATUS_CD
PARTNER_CUST_OID
L-Linkparatext_CUST_ID
L-Linkparatext_LABEL
OFFER_INSTNC_OID
L-Linkparatext_OFFER_OID
L-Linkparatext_SVC_ID
L-Linkparatext_OFFER_COLLECTION_INSTNC_ID
L-Linkparatext_OFFER_COLLECTION_COMPOSITE_FLG
ADDR_OID
L-Linkparatext_STREET_NBR
L-Linkparatext_STREET_NAME
L-Linkparatext_ADDL_NAME_LINE
L-Linkparatext_STREET_TYPE_CD
L-Linkparatext_ADDL_ADDR_LINE
L-Linkparatext_UNIT_NBR
L-Linkparatext_UNIT_TYPE_CD
L-Linkparatext_ZIP_CD
L-Linkparatext_CITY
L-Linkparatext_STATE_CD
L-Linkparatext_COUNTRY_CD
L-Linkparatext_ROOT_OID Table 2.176 retrieves partner customer information for a delivered product, when applicable. Base tables include: DELVRD_PROD, PARTNER_CUST.

TABLE 2.176

DELVRD_PROD_VIEW
Attribute Name

DELVRD_PROD_OID
L-Linkparatext_PARTNER_CUST_OID
L-Linkparatext_SHIPPED_DT
L-Linkparatext_STATUS_CD
L-Linkparatext_LABEL
L-Linkparatext_OFFER_INSTNC_OID
PARTNER_CUST_OID
L-Linkparatext_LABEL Table 2.177 retrieves data for determinant items and their associated offers when applicable. Base tables include: DSPL_ATTRIBS, DTRMNT, OFFER, and DTRMNT_ITEM.

TABLE 2.177

DTRMNT_ITEM_VIEW
Attribute Name

DTRMNT_OID
L-Linkparatext_LABEL
DTRMNT_ITEM_OID
L-Linkparatext_DSPL_ORDER
L-Linkparatext_INSTNC_DSPL_ORDER
L-Linkparatext_OVRRDE_DTRMNT_SEQ_OID
OFFER_OID
L-Linkparatext_LABEL Table 2.178 retrieves data for mappings from one offer collection determinant to another, when applicable. Base tables include: DSPL_ATTRIBS, OFFER, OFFER_COLLCTN, DTRMNT_SEQ, and DTRMNT.

TABLE 2.178

DTRMNT_SEQ_VIEW
Attribute Name

DTRMNT_SEQ_OID
L-Linkparatext_FROM_DTRMNT_OID
L-Linkparatext_TO_DTRMNT_OID
L-Linkparatext_LOGICAL_DSPL_ORDER
L-Linkparatext_OVRRDE_FLG
TO_L-Linkparatext_LABEL
FROM_L-Linkparatext_LABEL
DESTINATION_L-Linkparatext_TYPE_CD
OFFER_COLLCTN_OID
L-Linkparatext_LABEL Table 2.179 retrieves data for offer collections and their determinants, when applicable. Base tables include: OFFER_COLLCTN, DSPL_ATTRIBS, DTRMNT, and OFFER.

TABLE 2.179

OFFER_COLLCTN_VIEW
Attribute Name

OFFER_COLLCTN_OID
L-Linkparatext_TYPE_CD
COMPOSITE_L-Linkparatext_OID
COMPOSITE_L-Linkparatext_LABEL
L-Linkparatext_TRANSTN_DTRMNT_OID
L-Linkparatext_TRANSTN_DTRMNT_LABEL
L-Linkparatext_TRANSTN_DTRMNT_TYPE_CD Table 2.180 retrieves data for mappings of source offer collection's with target offer collections during a replacement, when applicable. Base tables include: DSPL_ATTRIBS, OFFER, OFFER_COLLCTN, and OFFER_COLLCTN_OFFER_RPLCMNT.

TABLE 2.180

| OFFER_COLLCTN_OFFER_RPLCT_VIEW |
| --- |
| Attribute Name |
| OID |
| OFFER_COLLCTN_OID |
| OFFER_COLLCTN_LABEL (L-Linkparatext) |
| FROM_OFFER_OID |
| FROM_OFFER_LABEL |
| TO_OFFER_OID |
| TO_OFFER_LABEL |
| FIXED_COMPOSITE_OID |
| FIXED_COMPOSITE_LABEL |
| SHORT_DSCR |
| LONG_DSCR |

Table 2.181 retrieves data for mappings of source offer collection's with target offer collections during a transition, when applicable. Base tables include: DSPL_ATTRIBS, OFFER, OFFER_COLLCTN, and OFFER_COLLCTN_OFFER_RPLCMNT.

TABLE 2.181

| OFFER_COLLCTN_OFFER_TRANS_VIEW |
| --- |
| Attribute Name |
| OID |
| OFFER_COLLCTN_OID |
| OFFER_COLLCTN_LABEL |
| FROM_OFFER_OID |
| FROM_OFFER_LABEL |
| TO_OFFER_OID |
| TO_OFFER_LABEL |
| FIXED_COMPOSITE_OID |
| FIXED_COMPOSITE_LABEL |
| SHORT_DSCR |
| LONG_DSCR |

Table 2.182 retrieves data for offer transitions, when applicable. Base tables include: DSPL_ATTRIBS, OFFER, and OFFER_TRANSTN.

TABLE 2.182

| OFFER_TRANSTN_VIEW |
| --- |
| Attribute Name |
| FROM_OFFER_LABEL |
| OFFER_TRANSTN_FROM_OFFER_OID |
| OFFER_TRANSTN_OID |
| OFFER_TRANSTN_TO_OFFER_OID |
| TO_OFFER_LABEL |
| OFFER_TRANSTN_SHORT_DSCR |
| OFFER_TRANSTN_LONG_DSCR |

Table 2.183 retrieves data for replacement offers, when applicable. Base tables include: DSPL_ATTRIBS, OFFER, and OFFER_RPLCMNT.

TABLE 2.183

| OFFER_RPLCMNT_VIEW |
| --- |
| Attribute Name |
| FROM_OFFER_LABEL |
| OFFER_RPLCMNT_FROM_OFFER_OID |
| OFFER_RPLCMNT_OID |
| OFFER_RPLCMNT_TO_OFFER_OID |
| TO_OFFER_LABEL |
| OFFER_RPLCMNT_SHORT_DSCR |
| OFFER_RPLCMNT_LONG_DSCR |

Table 2.184 retrieves information for an offer, when applicable. Base tables include: DISPL_ATTRIBS, DTRMNT, OFFER.

TABLE 2.184

| OFFER_VIEW |
| --- |
| Attribute Name |
| L-Linkparatext1_LABEL |
| EXPRTN_LABEL |
| L-Linkparatext_ADDR_MAINTENANCE_CD |
| L-Linkparatext_DSPL_ATTRIBS_OID |
| L-Linkparatext_EXPRTN_DT |
| L-Linkparatext_EXPRTN_OID |
| L-Linkparatext_OFFER_TYPE_CD |
| L-Linkparatext_OID |
| L-Linkparatext_ORDERABLE_DT |
| L-Linkparatext_PLUGIN_CD |
| L-Linkparatext_DTRMNT_OID |
| L-Linkparatext_DTRMNT_TYPE_CD |
| L-Linkparatext_DTRMNT_OID |
| L-Linkparatext_DTRMNT_TYPE_CD |
| L-Linkparatext_UPDATABLE_QTY_FLG |
| RPLCMNT_DTRMNT_LABEL |
| TRANSTN_DTRMNT_LABEL |

Table 2.185 retrieves information for an order item interaction model, when applicable. Base tables include: ORDR_ITEM_INTRCTN_MODEL_SELCTN, INTRCTN_MODEL, and VENDOR_PROD.

TABLE 2.185

| ORDR_ITEM_INTRCTN_MODLSEL_VIEW |
| --- |
| Attribute Name |
| OID |
| INTRCTN_MODEL_OID |
| INTRCTN_MODEL_NAME |
| ACTION_CD |
| VENDOR_PROD_OID |
| L-Linkparatext_NAME |
| TYPE |

Table 2.186 retrieves partner customer, agent and supplemented order information for an order, when applicable. Base tables include: ORDR, CNTCT, NAME, ORDR, HIER_OBJECT and PARTNER_CUST.

TABLE 2.186

| ORDR_VIEW |
| --- |
| Attribute Name |
| L-Linkparatext1_OID |
| L-Linkparatext1_ROOT_OID |
| L-Linkparatext1_SUBMTD_DT |
| L-Linkparatext1_PARTNER_CUST_OID |
| L-Linkparatext1_CREATED_USR |
| L-Linkparatext1_LAST-MODIFIED_USER |
| L-Linkparatext1_STATUS_CD |
| L-Linkparatext1_ESCLTN_FLG |
| L-Linkparatext1_EMAIL_ADDR |
| L-Linkparatext1_AGENT_OID |
| L-Linkparatext1_SPLMNTD_ORDR_ID |
| L-Linkparatext1_ORDR_ID |
| L-Linkparatext1_ID |
| L-Linkparatext1_PURCH_ORDR_NBR |
| L-Linkparatext1_DSCR |
| L-Linkparatext1_MONTHLY_RCURRNG_DSPL_SUM |
| L-Linkparatext1_TOTAL_SPLMNTL_AMT |
| L-Linkparatext1_TOTAL_AMT |
| PARTNER_CUST_OID |
| L-Linkparatext_LABEL |
| L-Linkparatext_GIVEN_NAME1 |

TABLE 2.186-continued

ORDR_VIEW
Attribute Name

L-Linkparatext_SURNAME
L-Linkparatext_LABEL

Table 2.187 retrieves data for determinant items to create parent/child relationships, when applicable. Base tables include: OFFER, OFFER_COLLCTN, DSPL_ATTRIBS, DTRMNT_ITEM, and PARENT_ASSIGNMENT.

TABLE 2.187

PARENT_ASSIGNMENT_VIEW
Attribute Name

PARENT_ASSIGNMENT_OID
OFFER_COLLCTN_OID
L-Linkparatext_LABEL
CHILD_DTRMNT_ITEM_OID
CHILD_DTRMNT_ITEM_LABEL
PARENT_DTRMNT_ITEM_OID
PARENT_DTRMNT_ITEM_LABEL
PARENT_ASSIGNMENT_CARDINALITY_

Table 2.188 retrieves information for prices, contexts, and price arrangements, when applicable. Base tables include: PRICE, PRICE_ARRGMNT, and CNTXT

TABLE 2.188

PRICE_VIEW
Attribute Name

PRICE_OID
CNTXT_OID
L-Linkparatext_NAME
L-Linkparatext_ACTIVE_PRICE_ARRGMNT_OID
L-Linkparatext_DSCR
L-Linkparatext_DSCR
L-Linkparatext_LONG_DSCR
L-Linkparatext_PRICE_GROUP_SPPRTD_OID
L-Linkparatext_EXT_SYS_REF
L-Linkparatext_DO_NOT_SUMMARY_PRICE_FLG
L-Linkparatext_FORMAT_CD
L-Linkparatext_TYPE Table 2.189 retrieves information to display returned provider offers for the service availability pre-qualification function. Base tables include: DTRMNT, DTRMNT_ITEM, PRVDR_SVC_OFFER_MAP.

TABLE 2.189

PRVDR_SVC_OFFER_MAP_VIEW
Attribute Name

L-Linkparatext_LABEL
L-Linkparatext_OID
L-Linkparatext_LABEL
L-Linkparatext_OID
L-Linkparatext_PRVDR_SVC_ID
L-Linkparatext_PRVDR_SVC_NAME
L-Linkparatext_OID Table 2.190 retrieves partner customer, agent and supplemented order information for a quote, when applicable. Base tables include: QUOTE, CNTCT, NAME, ORDR and PARTNER_CUST.

TABLE 2.190

QUOTE_VIEW
Attribute Name

QUOTE_OID
L-Linkparatext_ROOT_OID
L-Linkparatext_QUOTE_TYPE_CD
L-Linkparatext_CREATED_DT
L-Linkparatext_PARTNER_CUST_OID
L-Linkparatext_STATUS_CD
L-Linkparatext_LAST_MODIFIED_USR
L-Linkparatext_CREATED_USR
L-Linkparatext_EMAIL_ADDR
L-Linkparatext_AGENT_OID
L-Linkparatext_ID
L-Linkparatext_PURCH_ORDR_NBR
L-Linkparatext_DSCR
L-Linkparatext_VALID_UNTIL_DT
L-Linkparatext_STATE_CD
L-Linkparatext_SPLMNTD_ORDR_OID
L-Linkparatext_MONTHLY RCURRNG_DISPL_SUM
L-Linkparatext_TOTAL_SPLMNTL_AMT
L-Linkparatext_AMT
L-Linkparatext_SUBMTD_DT
L-Linkparatext_QUOTED_DT
L-Linkparatext_QUOTE_ID
L-Linkparatext_ORDR_ID
L-Linkparatext_ID
L-Linkparatext_GIVEN_NAME1
L-Linkparatext_SURNAME
PARTNER_CUST_OID
L-Linkparatext_LABEL Table 2.191 retrieves data for links between related offers, when applicable. Base tables include: DSPL_ATTRIBS, OFFER, and RLTD_OFFER.

TABLE 2.191

RLTD_OFFER_VIEW
Attribute Name

L-Linkparatext_OID
L-Linkparatext_OFFER_OID
L-Linkparatext_RLTD_OFFER_OID
RLTD_OFFER_LABEL (L-Linkparatext)
OFFER_LABEL (L-Linkparatext)

Table 2.192 retrieves agent and contact information for a given root (partner or customer), when applicable. Base tables include: HIER_OBJECT, NAME, ROOT, AGENT_ROOT_MAP, CNTCT.

TABLE 2.192

ROOT_AGENT_VIEW
Attribute Name

ROOT_OID
L-Linkparatext_LABEL
L-Linkparatext_ID
L-Linkparatext_CNTCT_GIVEN_NAME1
L-Linkparatext_CNTCT_SURNAME
L-Linkparatext_CNTCT_PHONE_NBR
L-Linkparatext_OID
AGENT_L-Linkparatext_TARGET_CLASS
L-Linkparatext_GIVEN_NAME1
L-Linkparatext_SURNAME Table 2.193 retrieves data needed to display a root request for a given agent. Base tables include: AGENT and ROOT_RQST.

TABLE 2.193

ROOT_RQST_AGENT_VIEW
Attribute Name

L-Linkparatext_CNTCT_OID
L-Linkparatext_CNTCT_TARGET_CLASS
L-Linkparatext_GIVEN_NAME1
L-Linkparatext_NAME_OID
L-Linkparatext_OID
L-Linkparatext_SURNAME
L-Linkparatext_ACTION_CD
L-Linkparatext_LABEL
L-Linkparatext_OID
L-Linkparatext_ROOT_OID
L-Linkparatext_STATE_CD
L-Linkparatext_SUBMTD_DT Table 2.194 retrieves data needed to display items in the news and information (notice) area. Base tables include: TARGET_CONTENT, CONTENT_ITEM, MENU, DSPL_ATTRIBS.

TABLE 2.194

TARGET_CONTENT_VIEW
Attribute Name

L-Linkparatext_OID
L-Linkparatext_PRIORITY_CD
L-Linkparatext_CLASS_NAME
L-Linkparatext_CLASS_OID
L-Linkparatext_CONTENT_ITEM_OID
L-Linkparatext_DSPL_COUNT
L-Linkparatext_CLICK_COUNT
L-Linkparatext_OID
L-Linkparatext_TARGET_OID
L-Linkparatext_TARGET_CLASS
L-Linkparatext_CATGRY_CD
L-Linkparatext_DSPL_MAX_COUNT
L-Linkparatext_NAME
L-Linkparatext_SHORT_DSCR
L-Linkparatext_SMALL_ICON
L-Linkparatext_START_DT
L-Linkparatext_END_DT
L-Linkparatext_OID
L-Linkparatext_DSPL_ATTRIBS_OID
L-Linkparatext_TARGET_CLASS
L-Linkparatext_TARGET_OID
L-Linkparatext_ROOT_MENU_OID
L-Linkparatext_LABEL
L-Linkparatext_LONG_DSCR Table 2.195 retrieves partner customer information for a given trouble ticket, when applicable. Base tables include: TRBL_TKT, PARTNER_CUST.

TABLE 2.195

TBL_TKT_VIEW
Attribute Name

TRBL_TKT_OID
L-Linkparatext_TARGET_OID
L-Linkparatext_TARGET_CLASS
L-Linkparatext_CATGRY_CD
L-Linkparatext_ROOT_OID
L-Linkparatext_USR_OID
L-Linkparatext_ID
L-Linkparatext_PREFERRED_CONTACT_CD
L-Linkparatext_NAME
L-Linkparatext_STATUS_CD
L-Linkparatext_TRBL_TKT_ID
L-Linkparatext_CNTCT_NAME
L-Linkparatext_CNTCT_EMAIL_ADDR
L-Linkparatext_CONTCT_PHONE_NBR TABLE 2.195-continued TBL_TKT_VIEW
Attribute Name L-Linkparatext_RSOLTN
L-Linkparatext_RSOLTN_DT
L-Linkparatext_CREATED_DT
L-Linkparatext_MODIFIED_DT
L-Linkparatext_MODIFIED_USR
PARTNER_CUST_OID
L-Linkparatext_PARTNER_CUST_ID
L-Linkparatext_LABEL Section 3

Operations

This section describes the basic operations of the Smart Component Server (SCS), including the core services and comprehensive business process logic required to successfully conduct business online.

3.1. Users, Groups, and Agents 3.1.1. Users

Users are those who access the Smart Component Server through an eBusiness portal, or through the Administrator Console. Each user has a unique user name/password combination that provides authentication within the system. The user name and password are stored in an encrypted table (USR). The USR table contains all other user information, such as the hierarchy object or agent that a user is associated with.

3.1.2. Groups

Once a password is established, a user is assigned to one of the groups for the system. These groups are used by the ACL table to determine which JSPs and transition policies can be executed.

Various groups are available. For example:

(1) UA_LICENSEE_USER. This group can use the Universal Agent Portal to shop for and purchase products, manage hierarchies on behalf of customers and partners, and create price overrides.

(2) UA_LICENSEE_ADMINISTRATOR. This group can use the Universal Agent Portal to create other users of that portal, create price overrides, and use the Administrator Console, as well as the licensee-level features in the Small Business Portal. It can also use the Error Correction Facility.

(3) CP_ADMIN. The group can shop for and purchase products and manage hierarchies in the Channel Partner Portal. It can also create other users of the Channel Partner Portal.

(4) CP_USR. This group is a read-only user of the Channel Partner Portal.

(5). SB_ADMIN. This group can shop for and purchase products and manage hierarchies in the Small Business Portal. It can also create other users of the Small Business Portal.

(6) SB_USR. This group is a read-only user of the Small Business Portal.

3.1.3. Agents

Users, who use the Universal Agent Portal and who belong to the UA_LICENSEE_USER and UA_LICENSEE_ADMINISTRATOR groups, are agents with associated agent types. While the existing groups in the system determine application-level security, additional groups are needed to determine the actual data displayed to agents in the Universal Agent Portal. Customers and partners are associated with agents during the registration process. The associated agent will always be able to see that root's associated data.

However, a communications services provider (CSP) may want certain agents to be able to view data associated with other agents. For example, the CSP may want sales agent managers to view data for all customers and partners associated with the sales agents they are responsible for. This ability is handled through the use of agent groups and agent group visibilities.

(1) Agent Groups. A CSP may create agent groups to fit its business needs. For example, the CSP might create agent groups named California, Illinois, and New York, to which certain sales agents are members. The CSP then might create agent groups named West Coast, Midwest, and East Coast to which both sales agents and the state groups belong.

(2) Agent Group Visibility. An agent that is a member of a group does not automatically have access to that group's data. Agents can always view data associated with the customers or partners they are assigned to. However, any other viewable customer or partner data must be explicitly designated when the agent is created. For example, both Bob and John belong to the New Jersey group. They can each view their own customers' data. However, only Bob has visibility into the New Jersey group. This means he can view data associated with any other member of that group, in this case John's customer data, but because John does not have visibility into the group, he cannot view any data associated with Bobs customers.

The CSP can use agent groups and agent group visibility to create complex viewing scenarios. Group assignment and visibility work together to create data-level security. Although the New Jersey and Florida groups both belong to the East Coast group, they cannot see each other's data as they do not have visibility into that group.

Sally belongs to the East Coast group. Because Sally has visibility into the East Coast group, she can see all data associated with any member of the East Coast group, which includes all members of the New Jersey group and all members of the Florida group-whether or not those members have visibility into the groups.

Sally also belongs the Regional Managers group, as does Marla. But because neither of them have visibility into that group, Maria cannot view anything associated with the East Coast group, and Sally cannot view anything associated with the West Coast group.

Christine does have visibility into the Regional Managers group, even though she is not a member. This means she has visibility to everything Sally and Maria also have visibility to.

When any customer or partner data is requested by a portal, the Agent Visibility plug-in first determines whether the user associated with the request is an administrator or a CSR agent. If they are, all customer and partner data matching the request is returned. If not, then only the data for which the agent has visibility rights is returned.

3.2. Offers

Offers can either be single offers or can be associated and sold with other offers, such as bundles. Once offers are created, a CSP can create associations for upsell and related products, as well as upgrade and replacement paths for a particular offer. The CSP uses the Administrator Console to create offers and all associated objects such as vendor products, prices, and transitions.

3.2.1. Vendor Products

Vendor products contain information needed to provision products such as provisioning codes and provisioning start and end dates. Product parameters, disclosures, and service level agreements (the time it takes to complete a specific action such as "add" or "remove") are also associated with vendor products.

Users are never shown vendor products. Instead, they see the offers associated with vendor products. More than one vendor product can be associated with a single offer. For example, an offer item of "Access Line" might be associated with two vendor products: one from Company ABC and one from Company XYZ. The ChooseVendorProduct plug-in in the system simply chooses the first associated vendor product found in the database. The CSP can develop a new plug-in that determines the valid vendor product for a given circumstance using different logic. Or the CSP could elect to determine the vendor product manually after the order is placed. It should be noted that the ChooseVendorProduct plug-in is only called if an offer is associated with more than one vendor product.

(1) Parameters

Product parameters provide information for the installation and operation of products; for example, the number of rings before voice mail activates. During the configuration process, form fields such as dropdown lists, radio buttons, and text entry fields collect the selections the user makes. These values are then persisted in the database.

Every parameter is associated with a parameter group. This allows the CSP to group similar parameters together. Vendor products are associated with parameter groups and not with individual parameters.

To have the user select from a list of valid values for a parameter, the CSP create a parameter enumeration. For example, if the CSP creates a parameter named "Number of rings before voice mail activates," then the CSP might create a list containing the values "2," "4," and "6."

If more than one vendor product is associated with an offer, and a plug-in is not used to determine the correct vendor product for a given customer, the user configures parameters for all associated products.

The CSP may have a situation where vendor products share parameter definitions, but each vendor product should have a different default value. For example, the CSP might have a parameter definition called speed. This definition might be used by both a dial-up access product and a DSL product. The CSP might want the default for the dial-up access to be 58K, and the default for the DSL to be 512K.

The CSP can set a default value override for any vendor product. This ensures that the specified vendor product always has a certain parameter value set by default. Parameters (groups, definitions, and enumerations), as well as value overrides are all created in the Administrator Console.

(2) Disclosures

Disclosures are sets of terms and conditions that the CSP requires a customer or partner to read and agree to before a product can be provisioned. A single disclosure can be associated with many vendor products, and a single vendor product can be associated with many disclosures. Users are shown all disclosures for all vendor products associated with an offer.

3.2.2. Offers

Offers contain all the information needed to make purchasing decisions, such as price and descriptive text. Offers have an availability date and an expiration date. When an offer reaches its expiration date, it can no longer be offered for purchase. However, an offer can be associated with another offer to which the original offer transitions when it expires. This is the expiration offer. If no expiration offer is associated, then the user might see a message stating that they can no longer order the original offer.

All offers to be displayed in an eBusiness portal menu are associated with a DisplayAttributes object. The display attribute contains all formatting information needed to display an object in an eBusiness portal; for example, label, icon, font color, and description. A sales message can also be held in a display attribute. This message can be targeted towards an internal user such as a sales agent, to prompt them with information they should impart to their customer when selling the offer.

3.2.3. Offer Instances

When a user elects to buy an offer, an offer instance is created. An offer instance represents the single, unique instance of an offer purchased by a particular user. For example, when users shop the menu, they are looking at offers-representations of products they might want to buy. When they elect to place the product in their cart, they receive their own offer instance that they can configure as needed.

Offer instances are created whenever a cart item is created in the case of shopping the menu, or are created when a quote item is created, as in the case of reordering an existing product. Additionally, when an offer instance is created because a user is adding a product to the hierarchy, an associated assigned product hierarchy object or an associated delivered product is also created.

An offer instance retains its association with the offer and vendor product through the shopping, quoting, and ordering processes and when it is assigned to the customer hierarchy. An instance also retains an association with the parameter values selected and any active rates. Users can change parameter values and can remove products from their hierarchy. Both these actions can have a related price.

Offers may have different relationships with other offers. For examples:

(1) Related Offers. The CSP can associate offers so that when users view an offer, they also see links to any related offers. For example, voice mail might be a related offer for an access line.

(2) Upsell Offers. The CSP can associate offers so that when users view an offer, they see links to offers that are of higher quality or provide more features. For example, voice mail with three mailboxes might be an upsell from voice mail with a single mailbox.

(3) Transitionable Offers. The CSP can also set up offers so that once provisioned and assigned to a hierarchy, customers and partners can upgrade to another offer.

(4) Replacement Offers. The CSP can set up offers so that after an order is placed, but before the resulting order item is provisioned, that order item can be replaced by a different offer instance.

3.2.4. Pricing

When a user views an offer in a menu or cart, a pricing CMI prices that offer based on the price group for the root associated with the current customer or partner. Once a quote reaches the "quoted" stage, the price for non-recurring charges is calculated and assigned to that offer instance. Additionally, committed prices for recurring and usage charges are also associated with the offer instance.

At this point, any future changes to the active price for recurring or usage rates on the associated offer are not reflected on the offer instance—the rates originally associated with the offer instance remain valid.

(1) Price Groups

Price groups allow the CSP to market and provide specific products and prices to specific sets of customers. For example, an access line could have one set of prices for a residential price group and a different set for a business price group. Price groups are associated with root menus. Additionally, every root of a customer hierarchy (customer) must be assigned to a price group, and every price must be associated with a price group. This way, users only view prices associated with the root of their customer hierarchy.

Because Universal Agent Portal users are not themselves associated with a root object, they are shown the defaultInternalUserRootMenu as defined in the properties file. They are shown prices from the default price group.

To set a price group as the default, the CSP must edit the properties file. A price group adapter is available, which automatically assigns all customers to the default price group specified in the properties file. The CSP can create its adapters to call an external system to determine a price group.

A price is derived from the following objects:

(a) Price group supported. This is the intersection of a specific offer, price group, and action (e.g., add, remove, usage).

(b) Price. This determines the active price arrangement for a given price group supported.

(c) Context. This provides a differentiator for each action. For example, an offer may have two prices that use the "add" action: one for labor and one for a one-time fee. Context is also used for transition pricing. If a CSP wish to incur a charge when a customer upgrades a product, the context for that price must be the offer the customer is transitioning from.

(d) Price arrangement. This determines how the price is calculated; for example, flat, tier, or threshold.

(e) Unit price. This specifies the monetary amount charged per unit for a given price arrangement.

(f) Criteria. For a multi-level price arrangement (i.e., tier or threshold), criteria determine each of the levels within the arrangement.

Figure 12:
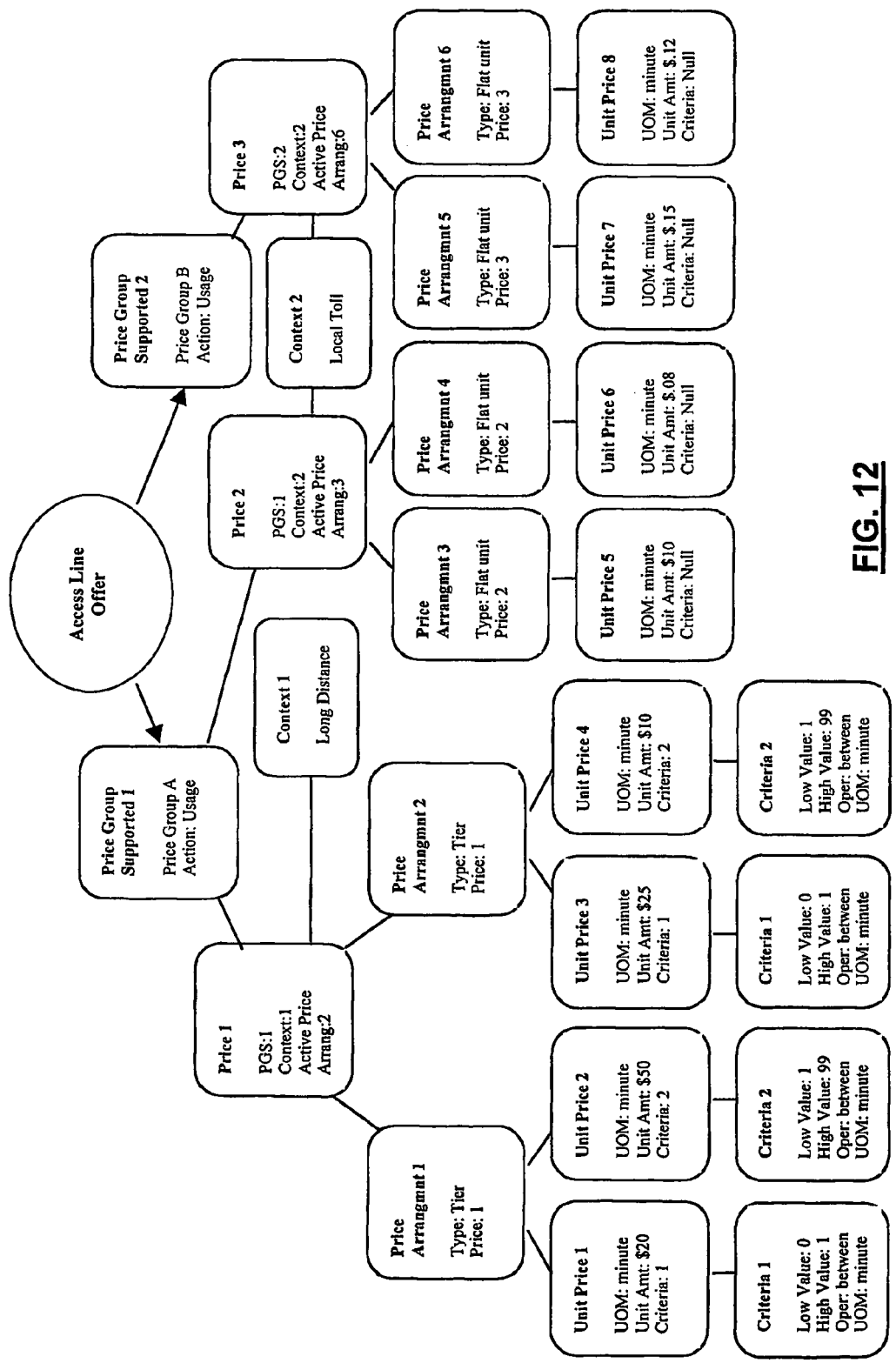
FIG. 12 is a block diagram showing a pricing model for one offer with two price groups.

Referring to FIG. 12, a pricing model is illustrated. This example shows one offer that two price groups can order. For price group A, the product has two prices—one for usage for long distance and one for usage for local toll calls (the context provides the differentiator). For each of these prices, there is both an inactive price arrangement and an active price arrangement. The long distance price uses a tier arrangement whose criteria determine the tier levels. The local toll price uses a flat unit arrangement.

For price group B, there is only a price for usage for local toll. Because there is no price created for long distance, any user associated with price group B will be shown the long distance usage price associated with the default price group.

(2) Price Group Supported

A price group supported (PGS) determines the price based on a given price group and the action performed on a specific offer. The default actions that come with the eBusiness support system include actions that create non-recurring charges and actions that create recurring and usage rates.

(a) Actions that create non-recurring charges include:

Add—The account is charged this price when a product is added to the account's hierarchy.

Change—The account is charged this price when a user changes any configuration parameters for an existing product in the accounts hierarchy.

Remove—The account is charged this price when a user removes the product from an accounts hierarchy.

Transition—The account is charged this price when a user upgrades an existing product, or replaces a pending product using a supplemental order.

Suspend—The account is charged this price when the product is placed under suspension.

Resume—The account is charged this price to resume a previously suspended product.

(b) Actions that create recurring rates include:

Recur—The account is charged this price at an interval determined by the unit of measure attribute in the unit price.

(c) Actions that create usage rates include:

Usage—The account is charged this price based on usage of the product.

It should be noted that by default, the system only calculates charges for non-recurring actions.

Unregistered users, or internal agents who shop for customers or partners before registering them, are shown prices associated with the default price group. Therefore, it is important to post notification that the final price may be different from the price displayed in the menu or cart. Because customers and partners must be registered before a quote can be created, prices shown in a quote reflect the price group assigned during registration.

Additionally, if a PGS does not exist for an action on an offer given a price group, then the user is shown the price associated with the default price group. If instead, CSP do not want members of a price group to be charged for a particular action, CSP must set the NO_PRICE_INDICATOR flag for that price group supported (unless there is also no PGS for the default price group for that action, in which case no price is shown).

For example, the Call Waiting offer has a PGS for the add action for Price Group 1 (the default), but does not have a PGS for Price Group 2. Therefore, any customer or partner associated with Price Group 2 is shown the price for Price Group 1. (If there were also no price for the add action for the default price group, then no price would be shown.)

However, if a PGS is created for Price Group 2 with the NO_PRICE_INDICATOR flag activated, then an customer or partner associated with Price Group 2 is not shown any price for the add action on the Call Waiting offer.

(3) Price

The price is the intersection of a PGS, a context, and the active price arrangement.

Context differentiates actions of the same type. Referring to FIG. 12, the offer has two prices with a PGS action of "usage." However, because each price has a different context (long distance and local toll), two separate prices are created. When users drill down through an invoice, they can view that breakdown.

For prices charged for the action "transition" the context must contain the OID of the offer that the user is transitioning from.

The price can display a short and long description. Additionally, the format code determines where the price appears on the bill. For example, the CSP may want to group all rates of the same action together. The CSP create format codes in constant classes to work in conjunction with external systems.

(4) Price Arrangement

The price arrangement determines how to calculate the price. For example, a price may be multi-level such as tier or threshold, or it may be flat. The price arrangement code specifies the type of price arrangement.

(5) Unit Price

The unit price contains the monetary amount per unit, such as the dollar amount and the unit of measure (e.g., minute, hour). If a unit price is one of many prices in a price arrangement, the CSP need to create criteria to indicate the valid unit price for each level of the arrangement.

(6) Criteria

Criteria determine the valid price for a unit of measure in a multi-level price arrangement. The operand code represents text that describes the levels, such as "equals" or "less than."

3.3. Offer Collections

Figure 13:
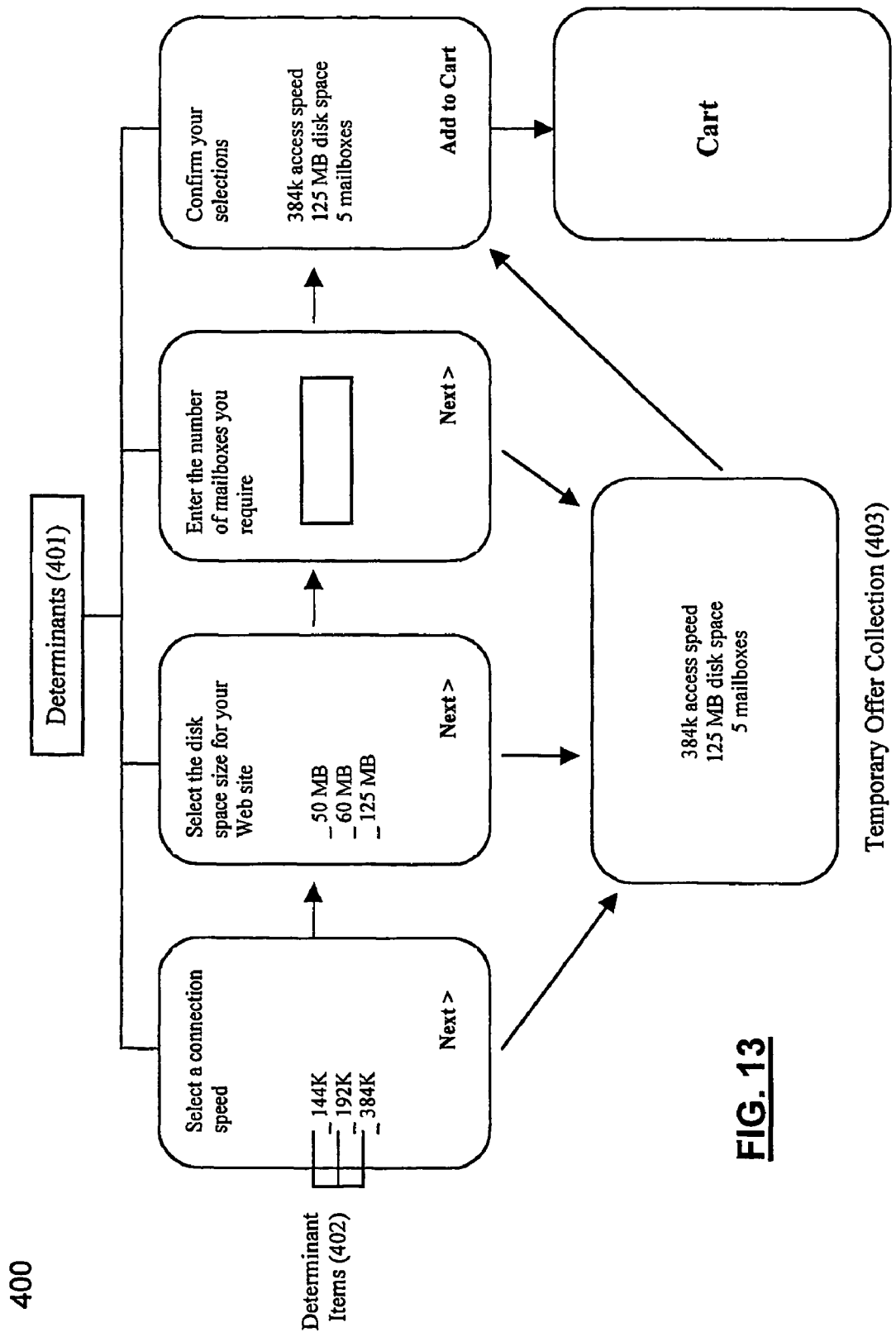
FIG. 13 is a page flow diagram showing a process to make a dynamic offer collection.

The offer collection feature of the eBusiness support system allows the CSP to market and provision complex collections of products. FIG. 13 illustrates a an offer collection process 400. The CSP may create fixed bundles of products or allow a user to create a bundle dynamically by having them select from "menus" of individual offers. For example, the CSP might sell a fixed bundle consisting of a specific access line offer, a specific call forwarding offer, and a specific voice mail offer. Or, if the CSP are selling a Web access bundle that consists of Internet access, Web site hosting, and email boxes, the CSP might create an offer collection that allows users to select from a list of access speeds, disk space sizes, and quantities of mailboxes.

The CSP can also use offer collections to ask questions that help determine the appropriate group of products to present during the shopping process. During the shopping process, an offer collection is presented as a set of screens that gathers the information needed to create a grouping of products. As the user selects an item from a screen, the corresponding offer instance is placed in a temporary collection object 403. Once all selections are determined, the user verifies the grouping, and the individual offer instances are placed in their shopping cart.

3.3.1. Creating an Offer Collection

To allow users to order groups of products, the CSP needs to create: (a) offer collection 403, which is a representation of the groups of screens that displays offers to users; (b) determinant 401, which provides more functionality than that of a simple menu. For example, a determinant allows a user to select from a list of offers to create a bundle; (c) determinant item 402, which is an individual item that represents an offer on a determinant.

(1) Offer Collections

An offer collection represents the set of screens that displays and captures information needed to create a group of offers. There are three types of offer collections:

Fixed Collection. The collection is pre-determined; the user cannot change the offers associated with the collection.

Dynamic Collection. The user can make choices from a pre-determined list for each item in the collection.

Independent Collection. When a collection is of this type, the created offer instances are not associated with each other when ordered.

When offers purchased through a collection need to retain an association with each other, the CSP must also create a composite offer that represents the collection as a whole. In the example shown in FIG. 13 the composite offer may be "Business Dial-Up Service Bundle." All offer instances created using the collection, including the composite offer instance, retain an association with an offer collection ID. Business rules dictate that once provisioned, the composite product is attached to the account, while the associated offer instances can be placed throughout the hierarchy. The composite and assigned products retain an association through a common offer collection ID attribute. Fixed and dynamic collections require composite offers.

Products created from independent collections retain no association with each other. Therefore once provisioned, individual items can be deleted or transitioned without affecting the others.

(2) Determinants

Determinants, rather than menus, are used to display offers within an offer collection. Each determinant type corresponds to a specific JSP page whose transition policies use smart component functionality to create the collection. New determinants may be created by CSP. The solution provides the following determinant types:

Fixed Determinant. The user cannot select the individual offers that make up the collection. This type of determinants is used when the collection is fixed.
   Choose One Determinant. This type of determinant is used when the user must select one item from a list of items.
   Choose Multiple Determinant. This type of determinant is used when the user can select more than one item. If a determinant is of this type, predetermined minimum and maximum values validate the users selections.
   Service Address Request. This type of determinant is used to collect an address.

(3) Determinant Items

Determinant items represent the offers from which the user can make a selection. They are associated with both a determinant and the actual offer they represent. When a user selects a determinant item, an offer instance is created and placed in the temporary collection.

The CSP must be sure that associated offers have not expired. If expired offers are associated with determinant items, the user is still shown the determinant items, and the offer and collection expire when the user elects to purchase the associated quote.

Figure 14:
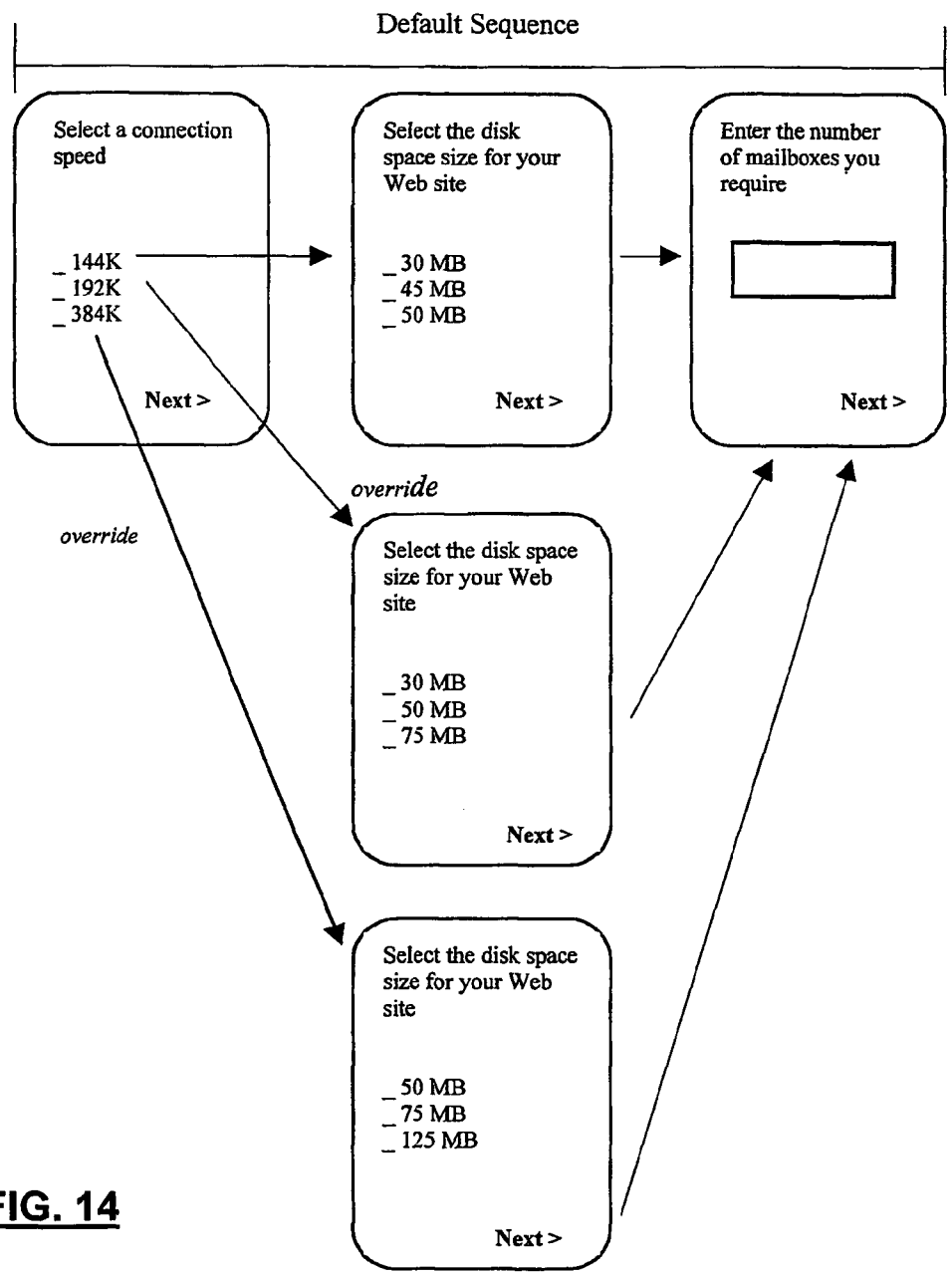
FIG. 14 is a page flow diagram showing an offer determinant branch.

Each offer collection has an associated sequence that establishes the default order in which determinants are displayed within the collection. However, individual determinant items can override that sequence if the next determinant displayed depends on the determinant item selected. For example, in the Web bundle shown in FIG. 13, the CSP might decide that users can select from larger disk spaces when they select higher connection speeds. Referring to FIG. 14, to create a branching navigation, the CSP must override the default determinant sequence by entering an overriding determinant OID for each of the determinant items on the first page. In this example, the CSP would create three different determinants for the second page.

3.3.2. Ordering a Fixed Bundle of Offers

Figure 15:
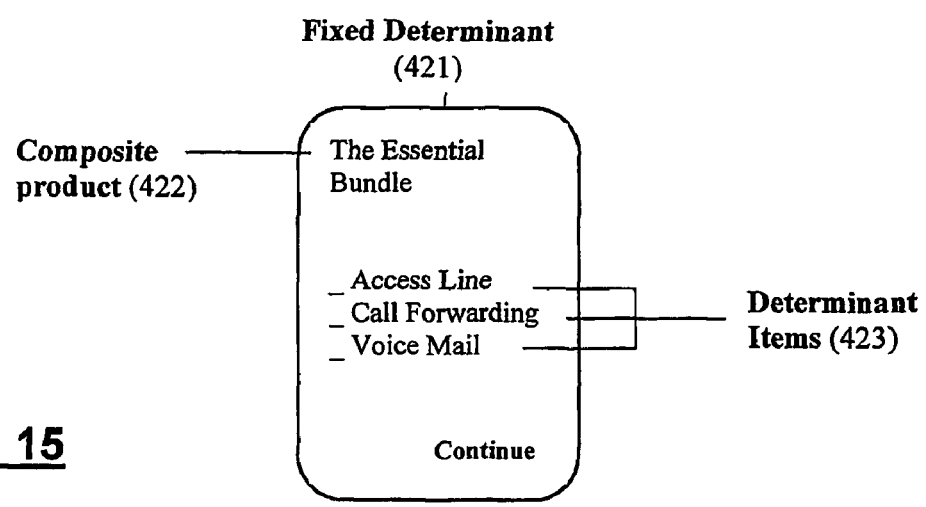
FIG. 15 is a schematic page showing a fixed of bundle of offers.

FIG. 15 illustrate an example of how the CSP might use an offer 420 collection to sell a fixed bundle with three determinant items 423 consisting of an access line, call forwarding, and voice mail. Only one determinant 421 is needed for fixed collections, as the user cannot select the individual offers. When the user adds the collection to a cart, each individual offer instance is added, as well as an offer instance for the "Essential Bundle" composite product 422.

3.3.3. Ordering a Dynamic Bundle of Offers

Figure 16:
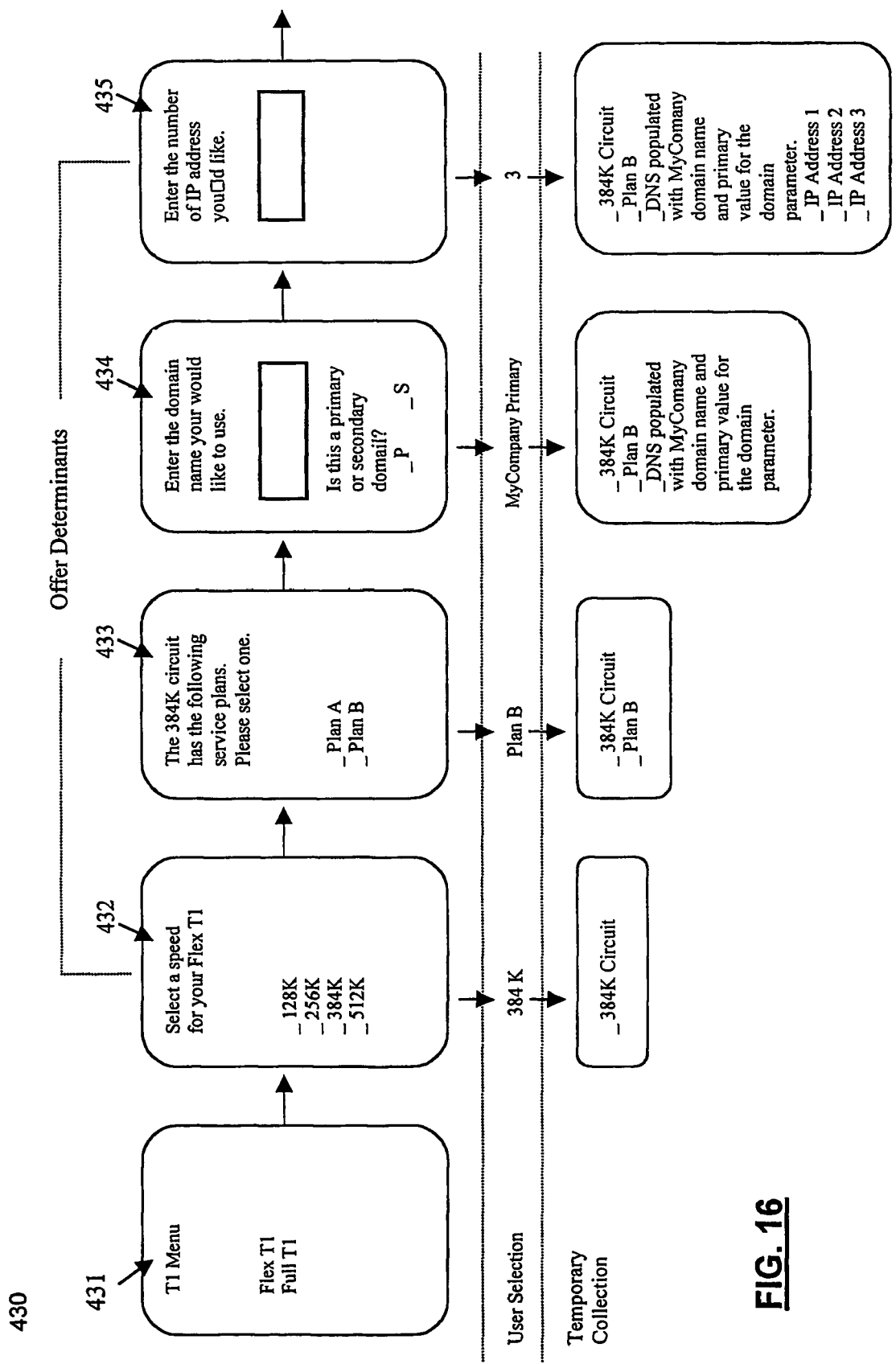
FIG. 16 is a page flow diagram showing a dynamic bundle of offers.

FIG. 16 illustrates an example of how the CSP might use offer collections 430 to present the ordering of T1 access 431. In this example, the CSP would use the determinant type ChooseOne for the first two determinants 432-433. Note that the determinant items displayed on the third page (and therefore the determinant 433) depend on the determinant item 432 the user selected on the second page. For the third determinant 434, the CSP might create a new determinant type that automatically displays parameters and collects values for a specific parameter group. The fourth determinant 435 would use a custom determinant type that creates a quantity of associated offer instances based on the quantity entered.

3.4. Creating Offer Transitions

Transitions allow users to upgrade from an offer instance associated with an assigned product to another pre-determined offer. When a user chooses to upgrade a product, the assigned product becomes associated with the new offer instance and a quote item associated with the new offer is created. The CSP create offer transitions in the Administrator console. For any given offer, the CSP can create one to many transitions. However, the CSP cannot create transitions for delivered products.

3.4.1. Transitioning Offer Collections

The CSP also creates transitions for each offer within an offer collection. Additionally, the CSP can create transitions for when a user breaks an offer collection by attempting to remove an associated product.

For dynamic collections, users can transition the individual offers. Therefore the CSP creates transitions for each offer associated with determinant items in the collection. The composite itself cannot be transitioned—the transitioned products retain an association to the original composite.

For fixed offer collections, the user can only transition the composite product, and at this time, all offer instances associated with that composite are automatically transitioned. Therefore, the CSP must also create transitions for each of those offers, along with a transition for the composite itself.

3.5. Catalogs and Menus

Menus comprise the catalog from which users select product offers. The CSP creates menus using the Administrator Console. A menu can contain a list of links to other menus or it can contain information regarding an offer. When a menu has no associated parent menu, it is a root menu.

The root menu displayed to a user (and therefore all subsequent menus associated with the root menu) depends on the root object currently in session. Users are either associated directly with a root object (as is the case with Small Business Portal and Channel Partner Portal users), or they are agents (as in the Universal Agent Portal).

Figure 17:
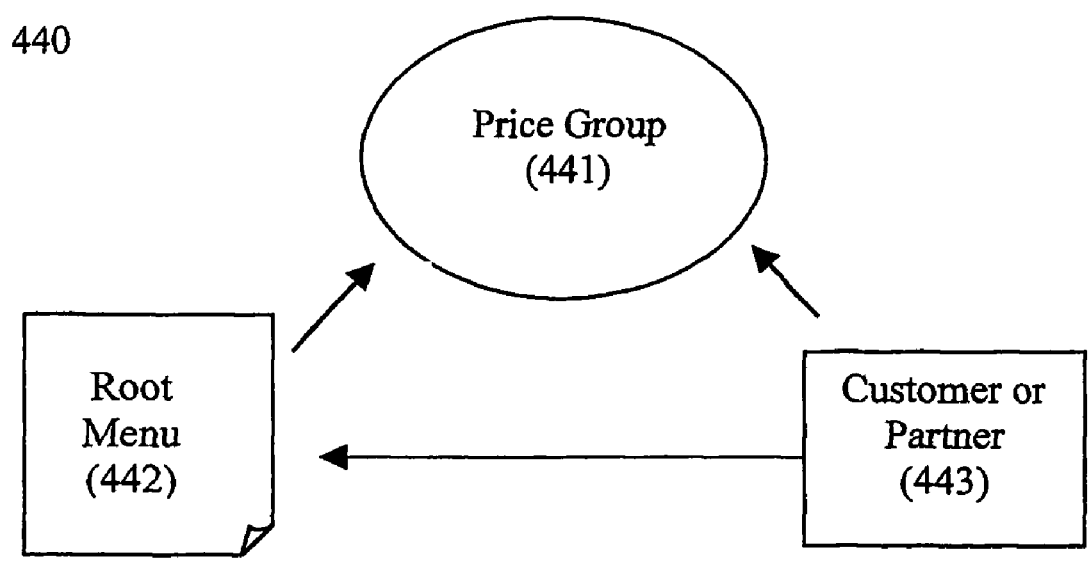
FIG. 17 is a block diagram showing that a customer or partner views a menu associated with the same price group.

Referring to FIG. 17, when customers or partners 443 shop, they are only shown the menu 442 and prices associated with the price group 441 with which their root object is also associated. When agents shop the menu, and they do not have a particular customer in session (that is they have not selected a particular customer to shop for), they are shown the default internal root menu. The prices displayed are prices associated with the default price group. Both the default menu and the default price group are determined in the properties file. However, once agents have a customer 443 in session, they are shown menus and prices associated with that customer or partner's price group 441.

The CSP use the Administrator Console to create menus. Each menu is associated with a DisplayAttributes object that determines display information such as icons, text color, and description. When creating a menu that will be associated with the default menu, be sure to include only offers or offer collections that everyone who will shop on the CSP's Web site can order.

3.6. Hierarchy

Figure 18:
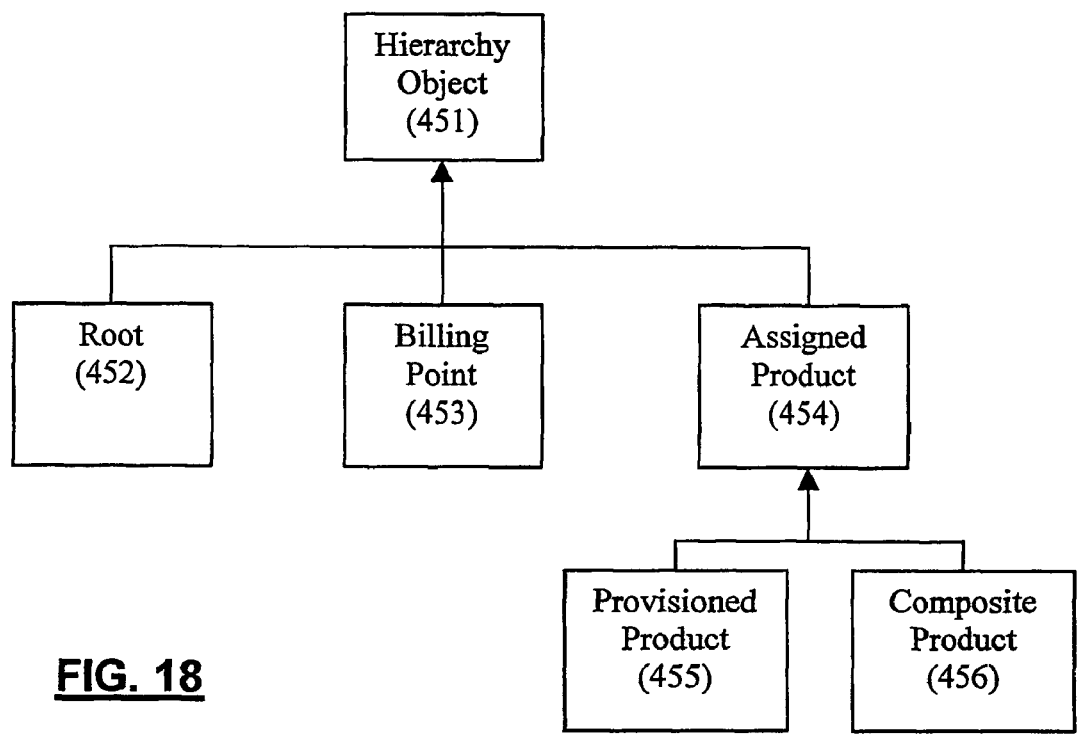
FIG. 18 is a block diagram that illustrates a hierarchy object model of the billing points and products.

In the eBusiness support system, billing points and products that a user procures are organized on a hierarchy. Referring to FIG. 18, there are three types of objects on the hierarchy 450: root 452, billing point 453, and assigned product 454. The root 452 is the top level of the hierarchy. Each root can have one or more billing points 453—the point at which all charges are collected. Assigned products 454 are either provisioned products 455 or composite products 456. Products such as CPEs that are shipped directly to a customer are considered delivered products, and are not hierarchy objects, but instead retain an association with a hierarchy object, such as the billing point to which they are assigned.

To allow for different objects in the eBusiness support system to have the same hierarchy properties, hierarchy objects 451 may be subclassed. For example, in the Channel Partner Portal, the partner object subclasses the root object and is therefore the root in that portal's hierarchy. In the Small Business Portal, the customer object subclasses the root object.

Each hierarchy object has a valid state at any given time. States determine the current stage in the lifecycle and the actions that can be performed on the object.

3.6.1. Creating a Hierarchy

Root and billing point hierarchy objects are created during registration. At this point, other objects can also be associated with these hierarchy objects, such as contacts, names, and addresses. Assigned product hierarchy objects are created during the shop process when the cart items and associated offer instances are created.

(1) Request Objects

Whenever a hierarchy object is created or modified, before the new or changed information is persisted to the actual hierarchy object, a request specific to that object is created (for assigned and delivered products, the request object is a quote item, then an order item). For example, before an actual customer is created, a customer request is created. This request object contains all information that might be needed by any external system that also needs to create a corresponding object.

(2) Root

The root of a hierarchy is at the top level; that is, it has no parent. Products cannot be assigned to a root. The act of registration creates a root hierarchy object to which billing points and products can be associated. The root object holds the following information:

Price group, which determines what products are available to the customer or partner and at what price.

Logo URL, which is a link to where a logo for customers or partners can be stored and then displayed on portal pages.

Doc URL, which is a link to where external documents regarding the customer or partner can be kept.

Authorization, which is unique information regarding a customer or partner, such as a social security number or mother's maiden name.

The root's associated hierarchy object stores state information. A root can have the following states:

Pending, which is a request to add a new root or modify an existing root is in the process of being approved.

Active, which is the root request is approved, and the root is created or updated.

A root can be either a customer or a partner. If the root is a customer, it can have an associated customer ID. If the root is a partner, it has an associated partner ID and can also be associated with a resale region.

(3) Billing Point

A root hierarchy object has one or more billing point objects as a child. This is the point at which billing for all associated products occurs. All information needed for billing purposes is stored on the billing point, such as active/inactive dates, billing periodicity; bill round, and running balance.

The billing point's hierarchy object stores state information. A billing point has the following valid states:

Pending, which indicates that a billing point request (either the addition of a new billing point, or a modification to the existing billing point) is in the process of being approved.

Active, which indicates that the billing point request is approved, and the billing point is created or updated.

(4) Products

A product is a representation of an item that a user has purchased and placed on a hierarchy (this is done during the quote process). Products retain an association with an instance of an offer—the entity that the user shopped and elected to purchase. Products must be attached to either a billing point or another product.

There are two types of products: assigned products and delivered products. An assigned product is a hierarchy object, and can be either a provisioned product or a composite product. A delivered product is not a hierarchy object, but can be associated with a hierarchy object.

(a) Provisioned Product. Provisioned products have a subscriber relationship. That is, the account to which the product is assigned is charged on a periodic basis during the life of the product. These charges can be a one-time fee, a recurring fee, or a fee for usage of the product. An example of a provisioned product is voice mail. Provisioned products can have the following states:

Not ordered, which indicates that a product is in the "shop" process, but has not yet been ordered.

Pending, which indicates that an action on a product (e.g., add/remove/cancel/modify) is not complete.

Rejected, which indicates that the product is not provisioned due to an error or unresolved issue.

Provisioned, which indicates that the process of provisioning the product is complete.

Unprovisioned, which indicates that the process of unprovisioning the product is complete.

Suspended, which indicates that the service is still active and its charges can be invoiced, but no modifications can be made to the product.

Cancelled, which indicates that any pending action on the product is cancelled. This state is only valid while the product is associated with an order item.

(b) Composite product. Composite products represent a group of products ordered as a bundle. An example of a composite product might be "The Essential Bundle," which maintains an association with an access line, voice mail, and call forwarding provisioned products (these associated products can be placed anywhere on the hierarchy). Composite products always have a billing point as a parent, and do not have children. Composite products can have the following states:

Not ordered, which indicates that a product is in the "shop" process, but has not yet been ordered.

Pending, which indicates that an action on a product (e.g., add/remove/cancel/modify) is not complete.

Rejected, which indicates that the product is not provisioned due to an error or unresolved issue.

Provisioned, which indicates that the process of provisioning the product is complete.

Unprovisioned, which indicates that the process of unprovisioning the product is complete.

Suspended, which indicates that the service is still active and its charges can be invoiced, but no modifications can be made to the product.

Cancelled, which indicates that any pending action on the product is cancelled. This state is only valid while the product is associated with an order item.

(c) Delivered Products. Delivered products are normally shipped to and owned outright by the customer and require no subscriber relationship. That is, the billing point is charged for the product only once. They are not hierarchy objects themselves, but instead, may be associated with a hierarchy object. An example of a delivered product is a cell phone associated with a wireless service program.

Delivered products can have the following states:

Not ordered, which indicates that a product is in the "shop" process, but has not yet been ordered.

Pending, which indicates that the product has been ordered, but not shipped.

Rejected, which indicates that the product is not provisioned due to an error or issue.

Delivered, which indicates that the product has been shipped.

Returned, which indicates that the product has been returned.

Canceled, which indicates that any pending action on the product is canceled. This state is only valid while the product is associated with a quote item.

3.6.2. Managing Hierarchies

Once a hierarchy is created, it can be managed. The Small Business Portal and the Channel Partner Portal users can self-manage their hierarchies. The Universal Agent Portal users manage hierarchies on behalf of customers and partners.

The actions that a user can initiate against a hierarchy include: (1) Add an account or modify an existing billing point; (2) Modify customer or partner information, including addresses and contacts; (3) Upgrade assigned products. When a user upgrades an assigned product, the association the assigned product had to an offer instance changes to the offer instance the user upgraded to; (4) Re-order products and attach the new products to other points in the hierarchy; (5) Modify the configuration of an vendor product associated with an assigned product; (6) Suspend and resume an offer instance associated with an assigned product (Universal Agent Portal users only); and (7) Report trouble on any hierarchy object.

3.6.3. Hierarchy Related Objects

The following listed are objects that can also be created and then associated with hierarchy objects.

(1) Name. This object holds all name information (e.g. surname, given name, suffix).

(2) Address. This object holds all address information. The CSP can create an association between an address and any other object in the eBusiness support system using the OBJ_ADDR_MAP table.

(3) Contacts. Users can create contacts, which represent a person responsible for a specific entity in the eBusiness support system. They can be either contacts at the customer/partner site, or at the provider site. Contacts at the customer/partner site can be associated with any point in the hierarchy.

(4) Support Personnel. Contacts at the provider site are called "supports" in the eBusiness support system, and by default are associated with the root hierarchy object. The CSP can create support personnel that represent people internal to the CSP's organization who are responsible for specific areas of customer or partner support. For example, the CSP may create a billing support and a sales support that are then assigned to individual customers or partners upon registration.

(5) Profiles. The CSP may add profile creation to the registration process. Customers and partners can be associated with selected information, such as their industry or their region. By creating profiles, the CSP can gain better insight into customer and partner demographics.

For example, during the registration process, form fields such as dropdown lists, radio buttons, and text entry fields collect the selections the user makes in response to predetermined questions (called profile definitions). These values are then persisted in the database and are associated with a target class and target OID (for example, the customer who answered the questions).

To have the user select from a list of valid values for a profile definition, the CSP create a profile enumeration. For example, if the CSP creates a profile definition "Choose your industry," the CSP might create a list containing the values "Software," "Consulting," and "Hardware."

By mapping profile definitions to profile groups, the CSP can display sets of parameter definitions together. By further associating these groups to profile keys, the CSP can determine which profile groups are displayed under what circumstances. For example, the CSP might create a profile key of customer and a profile key of partner. The CSP would then create its JSPs such that those that display the profiles to customers only display groups associated with the customer key.

(6) Billing and Accounts Receivable. Users can view invoices, open a dispute against an invoice, and create an adjustment against an invoice for a specific billing point.

(7) History. A history of creation of, and changes to, associated objects during the life of the customer hierarchy is maintained. For example, a user can view a history of orders they have placed, or trouble tickets they have raised. The objects for which a user can view history depend on the portal.

3.7. Creating Hierarchy Views

A user can create associations among hierarchy objects to display them by category. To do this, a user creates summary point types and specific summary points. For example, a summary point type might be "Location" and the summary points might be "East," "West," and "Midwest." Once the summary point types and summary points are created, a user can go through the hierarchy and assign summary points to specific billing points or assigned products.

A user can assign many summary points to a hierarchy object. For example, in addition to "Location," a user might also create a summary point type of "State" and individual summary points for specific states, and then assign both summary points to hierarchy objects.

Once summary points are assigned, users can change the hierarchy view by sorting according to summary point type. The user can select up to three different summary point types to determine sorting priorities; for example, first by location, then by state. Items that are not assigned a summary point type used in the sort order are not displayed in the view Views do not retain any hierarchical information. All objects are shown as a list. These views cannot be saved. Users must determine a sorting order each time they wish to view the hierarchy in an order other than the default.

A user can rename and remove summary point types and summary points. If a user removes a summary point type, all summary points associated with it are also removed. When a summary point is removed, any billing point or product that was associated with the summary point loses that association.

3.8. Shopping Cart

When a user elects to purchase an offer from a menu, the following happens:

(1) An offer instance is created. This offer instance retains an association to the offer chosen in the menu.

(2) A cart item is created. The cart item retains an association to the offer instance, user, and a target class (such as an assigned product or delivered product-these objects are also created at this time).

(3) The action "add" is set on the cart item.

The cart acts as a "sandbox," where offers can be added and deleted, and quantities changed, before moving on the quote process where the offer instances are configured.

An user can remove a cart item if it does not belong to a fixed or dynamic offer collection. If the removed item is a composite product, then all other products associated with the same offer collection are also removed.

3.9. Quotes

Users create a quote by selecting to purchase the items in their cart. Each offer instance associated with a cart item becomes associated with a quote item, and the quote becomes associated with the root of the current hierarchy in session. This allows the user to view that hierarchy during the configuration process to determine where to assign or associate the items in the quote.

Quotes display the total monthly recurring charges as well as the total non-recurring (one-time) charges for all items in the quote. Users can enter a description for the quote.

Quotes are associated with the customer or partner's root object. They also maintain an association with an agent if the quote was created using the Universal Agent portal.

Quotes may have various states including: (1) New, which indicates that the quote is created; (2) Pending Configuration, which indicates that not all quote items are completely configured; (3) Configured, which indicates that all quote items are completely configured; (4) Quoted, which indicates that all quote items are configured and contain all the information needed to order the entire quote. The user can no longer alter the quote; (5) Expired, which indicates that the quote has expired and can no longer be ordered; (6) Pending Approval, which indicates that the quote cannot be completed until one or more requirements are met. For example, at this point you might have an external system run a credit check; (7) Canceled, which indicates that the user canceled the quote; (8) Rejected, which indicates that requirements in the approval state were not met; and (9) Completed, which indicates that the quote has been ordered.

3.9.1. Held Quotes

Once a quote reaches the negotiated quote stage, it can be held for a predetermined amount of time before it expires and can no longer be ordered. Once a quote expires, the user must create a new one.

When a quote expires depends on when the user requested provisioning during the configuration process. If the user accepted the earliest possible start date for all items in the quote, then the quote expires 30 days later. If the user selected a later date for provisioning, then the quote expires on the day that is the earliest of all provisioning dates. However, no quote is valid more than 30 days. If the date selected for provisioning is more than 30 days, the quote still expires after 30 days.

The CSP can change the 30-day period for maximum valid days to any length of time by editing the properties file.

If a price for an offer represented by a negotiated quote item changes while a quote is held, the associated offer instance retains the association to the original price and not the new price. And if the offer itself expires, the associated offer instance remains valid for the quote.

3.9.2. Quote Items

Quote items, which are the individual items that make up the quote, are associated with offer instances. During the quoting process, users configure parameters for each quote item. The parameters they configure, and the values they can choose from, are determined by the vendor product associated with the offer instance for the quote item. Once the parameter values are set, those values are directly associated with the offer instance.

It is also during the configuration that a user determines where the quote items should be attached: either to an existing point in their hierarchy or to another item in the current quote. The eBusiness support system uses business rules to determine and display only valid attachment points.

Quote items can have the following states:

Removed, which indicates the quote item has been removed from the quote. However, the quote item is not deleted and still retains an association with the quote.

Pending Configuration, which indicates the quote item is not completely configured.

Configured, which indicates the quote item is completely configured.

Expired, which indicates either the offer associated with the quote item has expired and can no longer be ordered, or the quote that the quote item is associated with has expired.

Canceled, which indicates the user has canceled the quote.

Completed, which indicates the quote item has been ordered.

Replaced, which indicates the quote item has been replaced by another quote item through a supplemental order.

Supplemental Cancel, which indicates the quote item was canceled through a supplemental order.

Supplemental Complete, which indicates the quote item cannot be changed through a supplemental order.

If the quote is created because the user is transitioning from an existing product in their hierarchy, then the quote item retains an association with the original offer for transition pricing purposes.

When a user elects to purchase a quote, all disclosures for the offer items associated with the quote items are displayed. If the disclosure is not accepted, the user can return to the quote and remove the associated quote item. Once all disclosures are accepted, a CMI sends information regarding the relationships of all quote items to the business rule adapter. If any quote item violates a business rule, a warning is displayed.

(1) Pre-populating Default Configuration Values

The eBusiness support system can be configured such that certain values for an offer instance are automatically populated during the transition from the cart to the quote through the use of plug-ins. The plug-ins default the values for the following attributes:

Attachment point. This is the point at which the assigned product will be attached, By default, this plug-in attaches all products to the account.

Parameters. This plug-in sets parameter values. By default, the plug-in accepts the values set as the default for that parameter.

Service identifier. This plug-in sets the service identifier. By default, the plug-in obtains the next available service identifier.

Service address. This plug-in sets the address at which the item will be provisioned. By default, the plug-in uses the address associated with the foot with which the quote is also associated.

When configuration values are pre-populated, the status for each item is set to "configured" during the transition from cart to quote. If needed, the user can then change any of the defaulted values.

(2) Propagating Configuration Values

When a user purchases several of the same item, instead of having to configure each item, the user can elect to propagate values from one quote item to all quote items associated with the same offer item, so that the values are the same for all items. As with setting default configuration values, this is done with one of the plug-ins that can propagate the following configuration values:

Attachment point. This is the point at which the assigned products will be attached.

Parameters. All parameter values are set to match the original quote item parameter values.

Service identifier. Instead of copying the service identifier on the original quote item, the plug in uses the next available service identifier obtained from the ServiceId adapter.

Service address. This plug-in copies the address associated with the original quote item.

Shipping address. For delivered products, the plug-in copies the shipping address of the original quote item.

Requested date. The plug-in copies the original quote items requested provisioning date.

If needed, the user can then change any of the defaulted values.

(3) Price Overrides

The prices displayed for a quote item are those associated with the corresponding offer item. However users of the Universal Agent Portal can override these prices.

A price override can be either a percentage off an existing price, or it can be a new dollar amount that represents the final price. This is determined by the price override type. Overrides reasons are pre-configured using constant class codes. Users pick a reason from this pre-configured list.

Each agent has a threshold that determines the amount they can reduce a charge or rate (overrides can only be used to reduce a rate or charge). This override amount cannot be exceeded when the quote is submitted to be ordered.

If a price is overridden in the Universal Agent portal, this overridden price is the price displayed in the Small Business and Channel Partner portals.

3.9.3. Modifying Quotes

Once quotes reach the negotiated state, they can be modified. However, instead of changing the current quote, all information is copied onto a new quote and the original quote remains the same. This allows the user to compare quotes. When these quotes contain the same offer instance(s), only one of the quotes can actually be ordered.

3.9.4. Suspend/Resume Services

Quotes are also created when a user wishes to suspend or resume an existing assigned product. It may be desirable to suspend rather than remove or unprovision products for a number of reasons. For example, a subscriber may be a large customer who has allowed one or more accounts to fall into arrears. Rather than terminate service (which may damage the customer relationship), services can be suspended while the subscriber is given a chance to bring their account current.

Only assigned products that are in state Provisioned may be suspended. Delivered products may not be suspended or resumed.

(1) Suspension

While an assigned product is suspended, it is put into state Suspended and is no longer a valid attachment point for new products. A quote that contains the products to be suspended is priced as usual, showing charges on the associated offer for the action "Suspend." The assigned product is then moved to a pending state and once the suspend order is submitted and complete, the assigned product moves to state Suspended.

(2) Suspension of Products in Offer Collections

The process described above is true for single, a la carte products. The situation is slightly more complicated in hierarchies with multiple child products or products which were provisioned as part of an Offer Collection.

Figure 19:
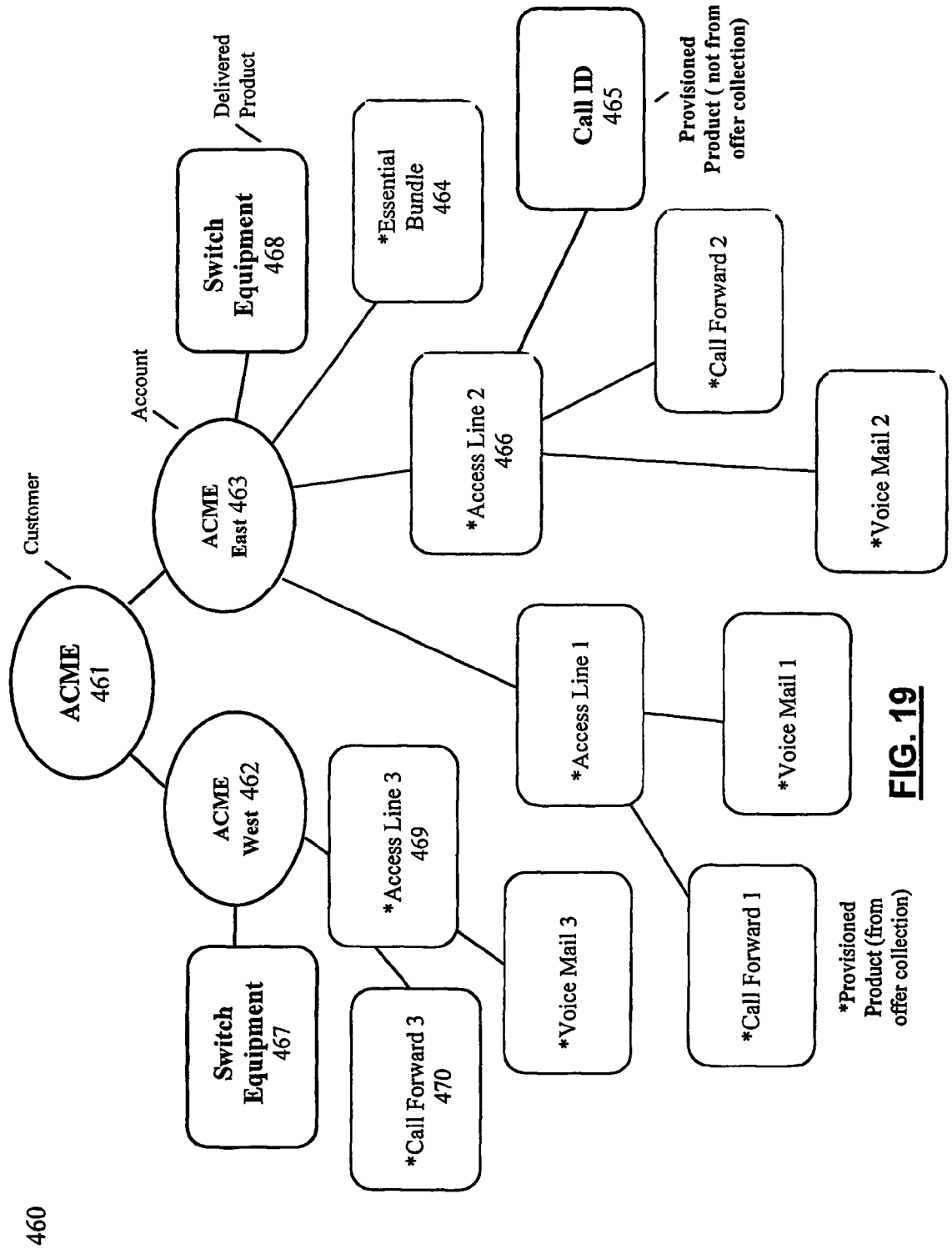
FIG. 19 is a hierarchical graphic that illustrates how a product suspension is handled when the product is associated with other products.

FIG. 19 is a hierarchy 460 illustrating how a product suspension is handled when the product is associated with other products. In this example, there is one customer, ACME 461 which has two accounts, WEST 462 and EAST 463. An offer collection 464, called "Essential Bundle" has been provisioned to ACME-EAST and its constituent products distributed throughout the hierarchy, some to the account ACME-WEST. Those provisioned products which are constituents of the offer collection are marked with "*". One provisioned product, "Caller ID" 465 is an a-la-carte product attached to "Access Line 2" 466. There are also two delivered products, both "Switch Equipment" 467-468.

When an agent attempts to suspend a product, the DetermineSuspendProductList plug-in checks to determine if the product can be suspended. The default plug-in logic is as follows:

If the agent is attempting to suspend an a-la-carte product that has no children, the product is suspended.

If the agent is attempting to suspend an a-la-carte product, the product and all of its child products are suspended.

If the agent is attempting to suspend a product that is part of an offer collection, but is not the offer collection composite, that product and all of its child products are suspended.

If the agent is attempting to suspend the composite of an offer collection, the entire offer collection is suspended. This will suspend all products that are part of the collection, and their children, even if the children were not part of the original collection.

As stated above, only products in state Provisioned may be suspended. If a child product is in a state other than provisioned, the plug-in will throw an exception, an error message will be presented, and the entire transaction will be rolled back.

(3) Resuming

Resuming products functions similarly. Resuming a product will resume all of its child products, and only products that are in a state Suspended can be resumed. However, if there is a need to resume a product that is in a Provisioned state, it will not throw an error. For example, in the hierarchy in FIG. 19, assume that the entire "Essential Bundle" offer collection 464 is suspended, and that an agent resumes "Access Line 3" 469. This also resumes "Call Forward 3" 470 and "Voicemail 3." If, at a later date, the agent then attempts to resume the entire offer collection by resuming the "Essential Bundle" composite product, the system will traverse the collection and recursively resume all products and their children. But, unlike in the case of suspend, when the system encounters "Access Line 3" and sees that it is not in state Suspended, it will silently skip it (and its children) without raising an exception.

3.10. Orders

When the user purchases all items on an existing quote that has not expired, an order is created. All items in a state of Configured on the quote become order items.

Like a quote, an order is associated with the same hierarchy root as the user. In a default implementation, orders can have the following states: (1) New, which indicates that the quote is ordered; (2) Pending Dispatch, which indicates that all order items are created; (3) Dispatched, which indicates that the order is dispatched to the provisioning system; (4) Completed, which indicates that the order is provisioned; (5) Rejected, which indicates that the order is rejected; (6) Pending Cancellation, which indicates that a request is submitted to cancel the order; (7) Canceled, which indicates that the order is canceled; and (8) Supplemented, which indicates that a user changed the order by creating a supplemental order.

An order retains an association with any shipping address associated with the quote, as well as the total of the order, any payment made, and the date the order was submitted.

3.10.1. Order Items

Order items derive much of their information from the associated quote item, except for their order, their requested, scheduled, and submitted dates, and their state. The valid states for an order item include: (1) New, which indicates that the quote item is ordered and is now an order item; (2) Dispatched, which indicates that the order item is dispatched to the provisioning system; (3) Completed, which indicates that the order item is provisioned; (4) Rejected, which indicates that the order item is rejected; (5) Pending Cancellation, which indicates that a request is submitted to cancel the order item; (6) Canceled, which indicates that the order item is canceled; and (7) Supplemented, which indicates that the order has been replaced by an order created through a supplemental quote.

3.10.2. Supplemental Orders

Users can change an order once it has been submitted as long as the item they wish to change has not completed the provisioning process. This is done through the creation of a supplemental order. This process is similar, but not identical to, the standard quote-to-order process.

When a user elects to create a supplemental order, the system creates a new quote which is populated with copies of each of the order items from the original order. During this transition, the SupplementalOrder plug-in determines which items in the original order are eligible for supplement.

By default, this plug-in only allows supplemental orders for items that are in a Dispatched state. Items in any other state still appear in the new supplemental order quote, but have the Supplemental Complete state, indicating that they are complete and no further action need (or may) be taken. The CSP can modify this plug-in to include any other logic, the only requirement is that it return a "True" or "False" value for each order item from the original order indicating if that item is eligible for supplement.

For the quote items that can be changed, users can elect to do one of the following:

Reconfigure. Reconfiguring allows certain values to be changed, similar to the configuration process on a regular quote. The Service ID can be changed during a reconfigure order, as can any product parameters. Certain reconfigurations are not allowed, however. An item cannot be attached to a new hierarchy point. Also, if the item has a service level agreement, the requested date of the item can be moved, as long as it is not prior to the earliest start date for that product's SLA.

Replace. Replacing an order item allows for substitution of an existing order item with a similar item. The CSP determines which replacements are allowed by creating replacement transitions. When a replacement is executed, the supplemental quote item copied from the original order item moves to Replaced state and the new item is added to the supplemental quote in the Pending Configuration state.

Cancel. Canceling an item in a supplemental quote moves the item to Supplemental Cancel state. The original order item is moved to state Pending Cancel.

(1) Submitting a Supplemental Order

The following actions are taken when an agent submits a supplemental quote:

Items that were not eligible for supplement, which were added to the supplemental quote in the state SUPP_COMPLETE are added to the supplemental order. Their state from the original order is copied (Complete to Complete, Rejected to Rejected, etc.).

The system skips any order items that were replaced by new order items (they have a status of Replaced). They are not added to the new supplemental order, no new order item is created.

Any replacement items are added to the new supplemental order in state New.

Items that were supplementable in the original order and were reconfigured in the supplemental quote are added to the supplemental order, but first the plug-in runs again on the order items in the original order. This is to ensure that the original order item is still eligible for supplement. For example, if the supplemental quote was held for a period of time, it is possible that items in the original order to be supplemented are now in the state of Completed, thus making them ineligible for supplementation. If any item fails this check, an exception is thrown, an error displayed and the entire supplemental order is rolled back.

5. The supplemental quote, and all its quote items move to state Complete and the quote ceases to be active.

6. The original order and all its order items move to the state Supplemented and the original order ceases to be active. The new supplemental order becomes the active order.

Once this process is complete, the proper CMI is dispatched to the external system. This CMI is the ServiceRequest CMI in the case of add or change, and the CancelServiceRequest CMI in the case of cancellations.

FIG. 23 illustrates a process 480 about how a supplemental order is created in the system. First, an agent chooses to supplement the original order 481. The Access Line in the order is in a Complete state. It is ineligible for supplement (according to the default plug-in behavior) and arrives in the supplemental quote in state Supplemental Complete. All other items in the original order are eligible, and are placed in the supplemental quote in state Pending Configuration.

Second, the agent cancels the Call Waiting product in the supplemental quote, moving the quote item to Supplemental Cancel 482.

Third, the agent replaces the Voicemail product with the Super V-Mail product 483. The original Voicemail quote item moves to state Replaced, and a new quote item for Super V-mail is added to the supplemental quote in state Pending Configuration.

Forth, the agent must configure those products in state Pending Configuration; Super V-Mail (which was just added via the replacement) and Call Forward 484.

Finally, the agent submits the order 485. The plug-in runs again on the items in the original order and finds that none of them have become ineligible for supplement (which might occur if one of the items in the original order had subsequently completed provisioning and changed state from Dispatched to Complete), and so allows the supplemental order to be created. Access Line, since it was not eligible for supplement, enters the Supplemental Order in the same state (Complete) that it was in the original order. New or reconfigured items (Super V-Mail, Call Forward) are added in state Dispatched. Call Waiting, which was canceled, shows up in the supplemental order in a Pending Cancel state. Finally, Voicemail does not appear in the order since it was replaced by Super V-Mail. After all items have been added, the proper CMIs are sent to the external system. Note that this includes a CMI for Access Line, even though it is expected that the external system will do nothing (since no change was made to the order item), (2) Charges from Supplemental Orders The action of creating a supplemental order can create a charge. However, unlike charges or rates associated with a particular offer, the system uses the CalculateSupplementalCharge plug-in to create the charge. By default, this plug-in creates a supplemental charge object, which is a flat fee, and then associates it to a hierarchy object (by default, the billing point). The logic to create the charge can be modified.

(3) Escalations

Users can escalate an supplemental order. This sets the escalation_flag attribute on the supplemental quote and order.

3.11. Business Rules

The CSP can define rules that maintain valid relationships between objects. These rules are based on a finite set of atomic rules both simple (e.g., mutual exclusion) and complex (e.g., mutual exclusion plus a numerical limit). For example, when defining a voice mail product, a rule might be assigned that does not allow a customer to order voice mail unless they already have phone service.

Rules are invoked during the quote process. When users determine where to attach a quote item (either to an existing point in their customer hierarchy, or to another quote item), the system uses the business rule adapter to determine and display only valid attachment points. Later in the quote process, once all disclosures are accepted, a CMI sends information regarding all quote items to the business rule adapter. At both points, the adapter validates all given items against all existing rules. If any quote item relationship violates a business rule, a warning is displayed.

3.11.1. Rule Templates

The CSP creates rules in the Administrator Console using templates. Within each template are parameters that are defined by specific data-for example, the vendor product the rule is created for.

(1) Template Descriptions

Following are descriptions of each of the business rule templates. Parameters whose values must be determined to create a rule are placed between the brackets [ ].

Template 8

Rule Statement: Any hierarchy item described as an [anchorDescriptor] can have between [min] and [max] relatives of [correspondentRelationship] which are described as a [correspondentDescriptor].

Rule Example #1: A business access line must be attached to an account.

Rule Example #2: Nothing can be attached to a custom calling feature.

Template 9

Rule Statement: At any time when a hierarchy item described as [anchorDescriptor] is in the state [anchorState] it must have at least one relative given by [correspondentRelationship] which is described as [correspondentDescriptor] and is in the state [correspondentState].

Rule Example: Whenever a voice mail product is effective, it must have a sibling call forwarding product that is also effective (i.e., voice mail requires call forwarding).

Template 10

Rule Statement: At any time when a hierarchy item described as [anchorDescriptor] is in the state [anchorState] it cannot have any relative given by [correspondentRelationship] which is described as [correspondentDescriptor] and is in the state [correspondentState].

Rule Example: Two voice mail products cannot be siblings and be effective at the same time.

Template 11

Rule Statement: At any time when a product described by [anchorDescriptor] is in the state [anchorState] it cannot have any relative given by [correspondentRelationship] which is described by [correspondentDescriptor], has the same vendor product OID, has the same [parameterToMatch], and is in the state [correspondentState].

Rule Example #1: Two voice mailboxes with the same mailbox number cannot be assigned to the same parent and be effective at the same time.

Rule Example #2: Only one of each type of custom calling feature can be assigned to an object and be effective at a time.

(2) Descriptors

Often a rule does not apply to one object but to a group of similar objects. For example, in the following rule:

Voice mail must be attached to an access line there may be many vendor products that are defined as voice mail and many other vendor products that are defined as access lines. Descriptors are used to create groupings of objects or groupings of other descriptors.

3.12. Paying Non-recurring Charges

The system allows users to pay for any non-recurring charges (i.e. one-time charges) by credit card. Once all credit card information is entered, a CMI sends that information, along with the total dollar amount to an external system, for authorization. The external system then returns authorization messages that can be displayed to the user. The CSP may need to create new CMIs specific to the CSP's external payment system.

3.13. Notes

Notes are text-based messages that the user creates for future reference. Notes are associated with certain objects such as a quote or order which are created in different portals.

No matter in which portal the note was created, it retains an association with a specific root object. However, users can only view a note from the portal in which that note was created. For example, if a Universal Agent portal user creates a note regarding a partner, a Channel Partner Portal user also associated with that customer cannot view it. However, any other Universal Agent user that can view that customer's information can view that note.

Notes retain an association with the user who created the note, the date and time the note was created, and the comment (this is the actual note text).

Notes cannot be appended; that is, if a user wishes to add a comment to an existing note, they must create a new note comment. However, multiple notes can be associated with the same object.

3.14. Viewing Invoices

To display invoices, the CSP uses the API to import billing information from an external billing system into the invoice tables. Or instead of importing information for all billing points, the CSP can create a link to existing external invoices.

The INVOICE table holds imported header-type information, such as a reference to the account, date information, total amount due, and state information. The INVOICE_SUMMARY table contains the total charges for recurring, usage, and non-recurring charges, as well as tax, adjustment, and discount totals. Individual charge data is stored in the INVOICE_LINE_ITEM table. Invoice line items retain associations with the tables that contain the detailed information for each charge imported from the external billing system.

Once invoice information is imported, a user can view individual invoices (i.e. each month's invoice), past due balances aged at current, 30, 60, 90, and greater than 90 days, and payment history.

3.14.1. Disputes

When a customer or partner questions an invoice line item, an agent can raise a dispute. Disputes are handled in exactly the same way as trouble tickets.

3.14.2. Adjustments

Agent users can create billing adjustments when an error on an existing invoice has been found. Instead of actually creating an adjustment, the user creates a request for adjustment, which an external billing system then accesses, calculates, and returns to the system in the INVOICE_ADJMNT_ITEM table.

Adjustment reasons are pre-defined using constant classes, so that users can select the appropriate reason from a drop-down menu. The CSP can add reasons to this class as needed.

3.15. Reporting Trouble

The system allows users to report trouble for any object in the system by creating a trouble ticket (or in the case of an issue with an invoice, a dispute). Users enter a description of the issue, including a detailed comment. After the information is submitted, the system's server dispatches a CMI to an external trouble ticket system.

As the external trouble ticket system resolves the issue, it notifies the server of each step taken towards resolution. A user can then view those steps. During this time, users can create additional comments associated with the trouble ticket. Agent users can resolve trouble tickets.

Users can also request cancellation of a trouble ticket. When this occurs, a request is sent via a CMI to the trouble ticket system. The external trouble ticket system must be configured to notify the system whether or not the trouble ticket is canceled.

3.16. Viewing Status

The system's server includes interaction models that allow users to view the past, present, and future steps related to business processes managed by external systems. For example, users can view the status of steps for the provisioning of order items and the handling of trouble tickets.

3.16.1. Interaction Models

Interaction models reflect the workflow that external systems use to complete a given task. Interaction model states reflect the individual steps within that workflow. When a user kicks off an event associated with a model, an instance of the model and an instance for each of its states are created, specific to that user's event. As the event travels through the external workflow, the status is passed back to the system. (The configuration of the external workflow determines how the status is passed back.) At this point, the status for the current model instance state is updated. Once a state reaches a status of complete, the completion date is populated for that state, and the next state (specified by the display order), becomes active.

For example, an external provisioning workflow for an access line might have the following steps: (1) Provision access line; (2) Line set up; (3) Establish external service; (4) Establish internal service; (5) Test tine; and (6) Provisioning complete The CSP would create an interaction model named PROVISION_ACCESS_LINE and then create states for each of these steps.

3.16.2. End-User Views

For users to view the status of each state, the CSP creates end-user views that correlate to interaction models, and end-user view states that correlate to interaction model states. Together, these allow users to see pending, in progress, and completed steps for an interaction model instance in language they understand. The CSP can create multiple views for one model to reflect the different portals that can access the data.

Referring to Table 3.1, for example, the interaction model for provisioning an access line might have two views—one for the Small Business Portal viewed by customers, and one for the Universal Agent portal.

TABLE 3.1

| Interaction Model States | CSR End User View State | Customer View State |
| --- | --- | --- |
| Provision access line | Provisioning of the access line has begun | Access line is in the process of being provisioned |
| Line set up | Access line being set up in central office | |
| Establish external service | Running a new line from the central office to the external termination point | |
| Establish internal service | Running a new line from the external termination point to the jack | |
| Test line | Testing line | Testing line |
| Provisioning complete | Provisioning complete | Provisioning complete |

Dates can be associated with end user views to determine when they are valid. This way, if the CSP needs to change an interaction model, any user associated with a model instance that has not completed all steps is shown the view for the model as it was before the CSP changed the model. However, any new instances of the model are shown the new end-user view.

3.17. Viewing Notices

The CSP can create an information queue to display pertinent news and product information to a specific object in the customer hierarchy. For example, the CSP could create a notice about an outage and only show it to affected accounts.

Content items are the actual items that the CSP creates for display. They can contain a reference to a specific offer. The CSP can also set the maximum amount of times the content item is shown. For each content item that CSP creates, the CSP must also create a target. The target determines who sees the notice. The system's server keeps track of each time the content item is shown to a specific target, and also each time that target clicks through to view the associated offer (if applicable).

3.18. Reports

The CSP can generate reports using the system's definition files pulled from the database. The definition files include: (1) Financial Bookings (Universal Agent portal only), which shows monthly recurring and non-recurring charges for a provider's customer and partner base; (2) Financial Bookings for a partner, which shows monthly recurring and non-recurring charges for one Partner; (3) Financial Forecast (Universal Agent Portal only), which shows forecast recurring and non-recurring charges based on orders placed but not yet completed, for a provider's customer and partner base; (4) Financial Forecast for a partner, which shows forecast recurring and non-recurring charges for a partner's products; (5) Orders Past Due, which shows all past due orders for a partner.

From Crystal Reports, the CSP can edit these definition files or create its own to suit its needs. When the CSP generates these reports, it needs to save them using a standardized report name.

Section 4

Small Business Portal

One embodiment of the invention is the Small Business Portal (SBP) that allows customers, either business or residential, to manage their accounts with a provider. SBP users can use the portal to shop for products and services, manage these services, and report and track trouble tickets and disputes.

In this section, "CSP" refers to a communications service provider from whom the customers purchase products and services to resell. CSP deploys the SBP to enable its customers to manage their accounts.

The "customer" refers to other organizations and individuals who purchase products and services from the CSP.

The "user" refers to any user of the SBP. These users will typically be either residential or small business users or personnel at the customer organization. There are two kinds of users: Users and Administrator Users. These two kinds of users have different authority, which is discussed in more detail in the following subsections. For the purposes of this document, the term user will refer to a user with all authority.

3.1. The Small Business Portal

3.1.1. Logging In

The SBP user logs in using a user name and password. By default, two security levels are supported:
  Customer Administrator, which has authority to do everything in the portal except manual approval.
  Customer User, which has authority to browse the catalog and create quotes, but cannot order quotes or create new objects in the system.

The CSP creates the first user (typically an Administrator) for a customer via the Universal Agent portal, or customers can register themselves. Once at least one administrator user is created for a customer, either by the provider or the customer, that user may then in turn create other users.

3.1.2. Self-Registering

A new customer may self-register by clicking the "New User Register Here" link from the splash page. Clicking this link takes the new customer to a page that prompts them to the Create User page, where they enter a user name and password. By default, new users have customer administrator authority. Once they have created this information, they can create customer information by clicking on the "Accounts" link in the My Menu navigation bar. A new customer may shop (they will be shown the menu for the default price group) without creating customer information, but will be prompted to enter the information when they attempt to create an order from their cart.

3.2. Small Business Portal Home

After a SBP user logs in to the portal, he sees the customer homepage, called My Home. This page contains the following areas:

(1) The main navigation bar, which is visible throughout the SBP and allows the user to navigate to the following areas:
  Home: Takes the CSP to the SBP splash page.
  My Home: Brings the user to the customer homepage.
  Search: Currently not implemented, this link can be customized to point to whatever search engine the CSP may design and deploy with the SBP.
  Browse Catalog: Brings the user to the main catalog menu where they can shop for products and services.
  Help: Currently not implemented, this link can be customized to point to whatever online help system the CSP may design and deploy with the SBP.

(2) The My Menu Navigation Bar, which sits below the main navigation bar and contains the following:
  Cart: Takes the customer to the shopping cart to view any products previously placed there.
  Accounts: Takes the customer to the Account Detail page.
  Products: Takes the customer to the My Products page.
  The My Home page also contains the following:
  Company Name and Logo: The name and logo of the provider are displayed at the top of the My Home page, as well as the name of the user currently logged in.
  News and Information: This area displays any news (such as reports of outages, new service offerings, etc.) or other promotional messages targeted at the SBP user. The contents of this area are configurable via the Administrator Console.
  My History: The activity history area allows users to view past activity in the following areas: orders, quotes, payments, disputes, and trouble tickets.
  My Accounts: This area contains links to view and manage customer information, accounts, ordered services, and bills. This section also contains functionality to manage users.

3.3. Shopping

A customer can use the SBP to shop, select, configure and order products. Ordering products in the SBP consists of the three stages: (1) shopping; (2) creating and configuring items in a quote; and (3) Ordering the items in a quote.

The following subsections detail how the SBP implements this life cycle, and the options available to SBP users. The SBP user begins shopping by clicking the "Browse Catalog" link in the main navigation bar on the My Home page.

3.3.1. Menus

Menus are navigable lists of products offered for ordering. In the SBP, the user shops product menus, then chooses and configures offered products.

Menus typically break product offerings down into categories desired to be presented by the licensee such as "Business Services" and "Residential Services."

When the user is browsing the product menu he will see a set of product offerings determined by their assigned price group. The price group determines the root menu and prices for each offer. If a user browses the menu before registering, he is shown the root menu and price associated with the default price group.

The SBP shows a "breadcrumb" displaying the path thus far taken through the hierarchy. The user can click back at any link in the chain to return to the menu at that level.

3.3.2. Offers

The offers in menus are listed with a brief description and an "Add to Cart" button.

(1) Offer Detail. When the user shops and finds an offer they wish to purchase, they can choose to drill in to the offer detail page by clicking on the product name link. The detail page displays the name of the offer, itemized prices for recurring, non-recurring and usage charges, and any related offers. The user can then add that product to the cart then continue shopping.

(2) Related Offers. When viewing an individual offer via the detail page, the user is shown related offers if any exist. Related offers are offers that have some connection or marketing synergy with the offer being viewed. Both related offers are displayed on the detail page as links. These related offers can themselves be drilled into from the first offer's detail page.

3.3.3. Offer Collections

Since-simple, one-product offers may not be sufficient to meet a providers product offering requirements, the system allows for individual offers to be bundled together into offer collections. Offer collections (and also simple offers) are configured in the Administrator Console.

To select an offer collection for purchase the user must click the "Add Bundle" link for that offer and then select which options for that collection they wish to purchase.

If the offer collection is fixed, then all offers in the collection will be automatically selected; no choices can be made.

If the collection is dynamic, the user is guided through the collection's determinants where the user selects the individual offers that will make up the collection. At any point in this process, the user can go back to a previous determinant to select a different offer. The navigation path through the collection, as well as the determinants used and the offers included are all configured through the Administrator Console.

3.3.4. Shopping Cart

As the user selects offers for purchase, they are placed in the shopping cart. At any point in the shopping process, the user can view their shopping cart by selecting the "Cart" link from the My Menu navigation bar in the My Home page. This is a view of all products that have been selected for ordering, their total recurring and total non-recurring charges, the quantity currently selected for quote and a text field to input an updated quantity. The user may also remove items from a quote by checking the remove button and clicking the "Update" button.

3.4. Quotes

3.4.1. Creating Quotes

When the user has shopped and selected all the desired products, clicking "Checkout" takes the customer to the Choose Quote page. The customer can then select an existing quote or click the "Create Quote" button to add the items to the cart to create a quote from the current shopping cart. All of the items that were in the cart now appear as quote items in the Quote Summary page.

3.4.2. Managing Quote Summaries

The Quote Summary page shows all the items in the user's quote. The top of the summary page shows the quote number, creation date, and status. The user can also enter a master purchase order number, a brief description, and an e-mail address.

Items in a quote display the item number (ordinal number of item in quote) product offer name, the action for this item (i.e., add, remove, change, etc.), the purchase order number (if one was provided), the status (configured, pending configuration, etc.), the price for recurring and non-recurring charges, and a checkbox with which the user can remove items from the quote. If the user removes any items from a quote, they must click "Update" to commit those changes. If there are more items than will fit on one page, a pair of previous/next links allows users to navigate between pages.

The user can hold or cancel the quote, shop more, continue the quote—to-order process.

Holding a quote allows a quote to be held in its current state and then re-opened to order at a later time. Once held, it is persisted. Within this time frame, the user can re-open a non-expired held quote at any time and continue working on it by shopping more, configuring items, ordering it or canceling it. After a quote expires, it is no longer available for ordering, but will still appear in and be viewable via the quote history as an "expired quote."

Held quotes are displayed in the current quote history, available from the activity history area on the My Home page.

Canceling a quote causes the quote to become inactive, but it will continue to be viewable as a "Canceled quote" in the quote history. Canceling a quote stops the ordering process and moves the current quote to state "Canceled." Canceled quotes can always be viewed from the quote history available from the My History menu.

3.4.3. Configuring Quote Items

Before quote items can be purchased and moved to order items, they must be configured. Configuration is reached by selecting the "Configure" link which is next to every quote item requiring configuration. If the user attempts to click "Continue" without configuring all quote items, the SBP will prompt for configuration information for each unconfigured item in the quote.

The following attributes are configured in a quote:

(1) Service Start Date. Users can choose to accept the earliest possible start date for a quote item, or select another date (as long as the date they select is not earlier than the earliest possible date). The earliest possible start date is calculated from the Service Level Agreement between the CSP and the User.

A constraint on service start dates arises when a quote item is attached to an existing quote item. Users cannot select a start date for a dependent product that is earlier than the start date selected for its parent product.

(2) Service Address. For some offers, Users must input information for the service address. This associates the product to a physical location, typically a customer address.

(3) Selecting Service Identifier. Users must select a service identifier (a telephone number for access line, for example). The system uses a plug-in which can be interfaced with an external system to retrieve a set of service identifiers from which to choose.

(4) Product Association. The user must also attach each quote item either to a place in the customer's hierarchy or to another item in the quote. The determination of which hierarchy objects or quote items are valid attachment points is handled by the business rules engine.

(5) Product Parameters. Finally, the user must provide values for product parameters (such as number of rings before voicemail picks up, guaranteed level of service, etc.). What parameters are required is an attribute of the offer's associated vendor product. These parameters are defined in the Administrator Console.

3.4.4. Automating Quote Item Configuration

In addition to manually configuring quote items, users can take advantage of features of the Smart Component Server to streamline the quote configuration process, pre-population.

Certain offered products can be set up to have values for their parameters pre-populated when they are added to a quote. By default, when an offer item moves from a cart item to a quote item, a plug-in can then give pre-populated values to certain product parameters. By default, various parameters can be pre-populated: For examples: attachment point, service identifier, and start date.

The parameters to be pre-populated are determined by the PreConfigure*. java plug-ins. By default, the pre-populated values for product parameters are taken from the default values specified when the offer was configured in the Administrator Console.

Other parameters can be pre-populated as follows:
Attachment point. The plug-in picks the first account associated with the customer.
Service identifier. The plug-in picks an identifier at random from the pool.
Start date. The plug-in uses the default earliest-available start date determined by the vendor product associated with this quote item's associated offer.

Once the user accepts the pre-populated configuration information, they can at any time before ordering the quote go back and modify the configuration of individual quote items which were pre-configured.

3.4.5. Disclosures

Offer items in the quote have disclosures associated with them which communicate legal or other information the customer must agree to before purchasing. All associated disclosures for quote items are displayed and the user must accept them before the quote can proceed.

3.4.6 Negotiated Quotes

Once all the configuration described has been completed and disclosures have been accepted, a quote reaches the "quoted" stage, and the display updates to reflect this by bringing the user to the Negotiated Quote page. Once a user elects to order a negotiated quote, all quote items become order items.

(1) Prices of Held Negotiated Quotes. Once a quote reaches the negotiated stage, the price for that quote is fixed. If the user holds the quote, and prices for offers ordered in that quote and for that customer's price group should change, the quote will remain at the price at which it was held. The held negotiated quote information is persisted the same way as a held quote summary, except that a held quote summary will be repriced every time it is accessed.

(2) Modifying a Negotiated Quote. Selecting "Modify Quote" brings the user back to the quote summary page. All of the user's previous configuration information is preserved, and they can make any changes they wish. They then can proceed with ordering the quote.

3.4.7. Orders

Once in the Negotiated Quote page, the user can create an order. Offers which represent equipment (cell phones, pagers) which are physically delivered to a customer are called delivered products in the SBP. When purchasing a quote containing one or more delivered products, users are required to single shipping address into the Shipping Address page to which all delivered products in the quote will be shipped.

If there are no offers corresponding to delivered products in the quote, then no shipping address is required.

Clicking the "Order Now" button in the Negotiated Quote or Shipping Address page takes the user to the Payment Option page. At this point the customer can select to either add the charges for the order to a bill, or to pay immediately via credit card. If the user chooses to pay by credit card, they are taken to the Make Payment page where they provide credit card and billing address information. When they have entered the credit card information and clicked the "Order Now" button a CMI sends all credit infor to an external system for approval and the user is taken to a confirmation page.

3.5. My History

Users can view history information from the links in the activity history section of the My Home page. The user can choose from orders, quotes, or trouble tickets. Choosing one of these categories brings up the history page for that item. Depending on the type of item whose history the user is viewing, they may take different actions.

3.5.1. Order History

SBP users can view a history of service orders from the My Home page. The following information is returned for each item on the order history page: Order number; Date Created; Description; One-time Charges; Recurring Charges; and Status.

(1) Order Detail. By clicking on the order number, the user can then bring up a detail of the order from which they can also request to cancel or reorder the quote. This page lists:
Order number;
Date Ordered;
Status;
Master PO number (if any);
Description; and
each of the constituent order items.
Each order item in the list displays:
Item number;
Action (Add, Remove, etc.);
Description, which is a link which allows the CSP to drill down and view an charges for the item;
Status. The status that is visible from the order item line-item in the order detail page is obtained from an interaction model; it is a view into the external provisioning process. Clicking on this status will bring up the interaction history for that order item;
A link to view the detail for that item.

The detail page for an order item displays: product name, purchase order number, totals for one-time and recurring/monthly charges, and all the configuration information which was determined when that item was configured in a quote.

(2) Request to Cancel an Order. Canceling an order is not guaranteed to completely cancel all products ordered. Since the system relies on external systems to handle provisioning, it is possible that an ordered item can already be provisioned at the time the user is requesting cancellation, but that the new state information has not been communicated to the system. Therefore, canceling an order from the order detail page simply requests a cancellation and sends the appropriate CMI to the external system. If the external system is successful, the order will be canceled and the state reflected in the order history.

(3) Reordering. When the user selects "Reorder" from the Order Detail page, they are brought to the Quote Summary page for a new quote, populated with any items which were in the original order having an action of "Add". This prevents reordering any items which were in the original order as upgrades, or which were removed, changed suspended or resumed. The items in the re-ordered quote are in a pre-configured state, but the user can then change the configuration of the quote items. They then can resubmit them as a new order, leaving the original order unchanged.

3.5.2. Quote History

Users can view quotes from the quote history available from the My Home page in the activity history. For each current quote, the quote history page displays: Quote number; Date Created; Description; Status; and Detail.

A user can also view ordered, expired and canceled quotes. The user can switch between these categories via links on the main quote history page.

(1) Quote Detail. The user can view a detail page for a quote by clicking the "View Detail" link in the history list. The detail page summarizes the data displayed in the history entry, and also shows a list of every item in that quote. As in quote summaries, the user can also request to hold, cancel, modify, or order the quote from this page.

For each item, the quote detail displays:
Item number;
Product Name (Clicking this link shows associated charges for the product);
The action (add, remove, etc.) for that item which caused it to appear in the quote;
The PO number (if any);
Item Status;
One Time Charge; and
Recurring Charge.

3.5.3. Payment History

Users can view payments in the payment history page. This page is accessed via the "Payments" link in the "My History" menu in the My Home page. For each current quote, the payment history page displays: Date; Amount; Status; and Details.

The user can view a detail page for a payment by clicking the "View Detail" link in the history fist. For each payment, the Payment Detail page displays:
Payment Date;
Payment Amount;
Order Number (the Order associated with the payment);
Credit Card Holder Name;
Credit Card Billing Address; and
Credit Card Information.

3.5.4. Dispute History

Past trouble tickets are viewed via the trouble ticket history link in the My Home page.

The following information is returned for each item on the Dispute History page:
Dispute number (Clicking the dispute number in the history list or search result set opens the detail page for that ticket showing a summary of the ticket);
Date Created;
Category and Name of the dispute;
Dispute Status (The user can view a detail for a dispute by clicking on it from the history list.

The dispute detail page lists:
Dispute Number;
Dispute Name;
Status (The dispute status displayed is obtained from an interaction model; it is a view into the external provisioning process. Clicking on this status will bring up the interaction history for that dispute);
Created By;
Created Date;
Last Modified By;
Last Modified Date;
Preferred Contact Method;
Contact to Notify;
Phone Number;
Email Address;
The entity (customer, account, product) for which the ticket was raised;
The category;
The ticket description text; and
The resolution text (if any).

3.5.5. Trouble Ticket History

Past trouble tickets are viewed via the trouble ticket history in the My Home page.

The following information is returned for each item on the trouble ticket history page:
Ticket number (Clicking the trouble ticket number in the history list or search result set opens the detail page for that ticket showing a summary of the ticket);
Date;
Category and Name of trouble ticket;
Ticket Status (The user can view a detail for a trouble ticket by clicking on it from the history list.
The ticket detail page lists:
Trouble Ticket Number;
Trouble Ticket Name;
Status (The ticket status displayed is obtained from an interaction model; it is a view into the external provisioning process. Clicking on this status will bring up the interaction history for that trouble ticket);
Created By;
Created Date;
Last Modified By;
Last Modified Date;
Preferred Contact Method;
Contact to Notify;
Phone Number;
Email Address;
The entity (customer, account, product) for which the ticket was raised);
The category;
The ticket description text; and
The resolution text.

3.6. My Accounts

3.6.1. Managing Accounts

Accounts allow the CSP's customers to segment their business into logical units such as geographic location or department. The My Home page provides the SBP user with a list of all of their accounts in the My Accounts section. The list gives the name of the account, its status, and a link to view products for that account.

Clicking on the account name brings the user to the account detail page, where they can view all information pertaining to the selected account such as billing address, credit information, and the names of any contact personnel assigned to the account.

A drop-down menu at the top allows the user quickly to switch to other accounts, which then displays that account's information. From the account detail page, the user can:
- view the account's history;
- modify any of the account's information;
- report trouble for this account, which will raise a trouble ticket; and
- add, modify and remove contacts by clicking on the appropriate links.

3.6.2. Creating Accounts

Users of the SBP can create accounts from the My Home page by clicking the "Add Account" link. The user must provide an account name, billing address and credit information for every account they create. Once created, the account will be displayed in the list of accounts on the customer accounts page.

3.6.3. Managing Products in an Account

From the account management page the user can view products and services provisioned to a particular account by clicking the "view the products" link next to that account.

This leads to the My Products page, which displays a hierarchical view of all products provisioned to that account. Arrows next to products allows the user to click to expand or collapse that level of the product hierarchy.

Clicking on the name of a product brings the user to the detail page for that product.

(1) Product Detail Page. For assigned products, the detail page shows the name of the product, a brief description, the date the product was provisioned, and a summary of the configuration information. Any contacts assigned to this product are also visible, as is a link to add new contact information.

The user can then perform the following operations to manage the product hierarchy, for assigned products only: (a) upgrade; (b) remove; (c) report trouble; and (d) reorder.

For delivered products, users may only report trouble and add/remove contacts.

(2) Modifying Products. The user modifies an assigned product by clicking "Modify Product" from the assigned product detail page. Since an external provisioning system must be used to make the desired modifications to a provisioned product or service, the SBP implements product modification as an order. Modifying an assigned product takes the user to the Quote Summary page for a new quote, consisting only of the product to be modified.

From this new quote detail, users can then configure any parameters including a "start" date when the modification will take effect as well as any other product parameters, service identifier, etc. The user can then submit the quote.

(3) Removing Products. The user can request to discontinue an assigned product by clicking "Remove Product" from the assigned product detail page. Once again, since an external provisioning system must be used to remove a product, the SBP implements product removal as an order. Removing a product brings up the quote summary page of a new quote, consisting only of the product to be removed.

The only configuration possible for this removal quote is the termination date. Analogous to the service start date selected when ordering the product, the user can choose the earliest possible date or a specific date, as long as the date chosen is not earlier than the earliest possible date.

(4) Upgrading Products. Product upgrades are initiated from the detail page for the provisioned product to be upgraded. Which product offers are on a given product's upgrade path is configurable through the Administrator Console. Once an upgrade product is chosen, that new product is quoted and ordered like a normal product offer. Once the upgrade order is complete, the new offer instance replaces the original.

(5) Reporting Trouble. The user can raise a trouble ticket on a product.

(6) Reordering. When the user selects "Reorder" from the product detail page, they are brought to the Quote Summary page for a new quote, populated with an order item corresponding to the product being reordered. The item in the quote is in a configured state, but the user can then change the configuration. They then can re-submit them as a new order.

3.6.4. Customer Details

The customer detail page presents the SBP user with a summary of their customer information. The page displays customer information, resale authority, address, and contacts. The user can also view their customer history, modify their address information, raise a trouble ticket, or add, modify, and remove contacts. Customer history consists of any changes made to customer information such as mailing address.

(1) Modifying customer Information. The SBP user can click the "Modify Customer Information" link on the customer detail page to provide new or updated address information.

(2) Reporting Trouble. The user can raise a trouble ticket on an account.

(3) Adding and Removing Contacts. The process for adding, modifying, and removing contacts for a customer is identical to the process for adding contacts to an account.

3.6.5. About Contacts

Contacts are individuals in the customer's organization who are assigned responsibility for various aspects of the customer's relationship with the provider. Users of the SBP may assign contacts to customers and accounts.

When adding a contact, the user must provide a name, address and telephone number. Contacts are of a particular type such as "primary" or "technical." Users of the SBP can assign as many contacts as they desire. There can also be multiple contacts of a given type. What contact types are defined is determined by a constant class which may be changed.

Customer contacts are displayed on the customer, account, and product detail pages, where the user can add new contacts, modify an existing contact, or remove an existing contact.

3.6.6. Managing Bills

The Invoice Summary page presents the SBP user with a summary of their billing information. Clicking on the "View Bills" link next to the account name in the My Home page brings the user to the Invoice Summary page, where they can view billing information pertaining to the selected account.

Drop-down menus at the top allow the user quickly to switch to other accounts and other billing cycles, which will then display in this page. From the Invoice Summary page, the user can view detail pages about: One-time Charges; Monthly Charges; Usage Charges; Adjustments; Discounts; and Taxes.

The user can create a billing dispute by clicking on the "Open Dispute" button.

3.6.7. Managing Users

SBP users with administrator authority can create other users for their customer account from the manage users area of the customer My Home page.

The user must provide a user name, password, and password hint. They must also select the authority level. The two authority levels and their default permissions are:

Customer Administrator, which has authority to do everything in the portal except manual approval; and Customer User, which has authority to browse the catalog and create quotes, but cannot order quotes or create new objects in the system.

An SBP user of sufficient authority can also remove existing users by checking the Remove radio button and clicking the "Update" button. The selected user is then made inactive and will be unable to log in to the SBP.

3.7. Creating Trouble Tickets and Disputes

3.7.1. Issuing Trouble Tickets

Users of the SBP can issue trouble tickets against the following items by clicking the "Report Trouble" link on the following detail pages: (a) customer; (b) account; (c) provisioned product; (d) delivered products; (e) composite product.

The trouble ticket is date-stamped and marked with the ID of the SBP user submitting it. The user must supply contact information for the customer making the trouble report and specify a category or reason for the report. The user must also include a detailed text description of the problem, and any recommended action.

Once the user has provided all the information required for the ticket and submitted it, the Trouble Ticket Detail page displays a summary of the ticket.

3.7.2. Creating Billing Disputes

Users of the SBP can create billing disputes against invoices by clicking on the "Open Dispute" button in the Invoice Summary page.

The new dispute is date-stamped and marked with the ID of the SBP user submitting it. The user must supply contact information for the customer making the trouble report and specify a category or reason for the report. The user must also include a detailed text description of the problem, and any recommended action.

Once the user has provided all the information required for the dispute and submitted it, The Dispute Detail page displays a summary of the dispute.

3.8. Manual Approval

The SBP allows administrators at the provider site to manually set the status of order items, account requests, and customer requests. This is useful in testing or in deployments which do not use external systems for provisioning or trouble ticketing. By default, the SBP allows a licensee to set the "pending," "rejected," and "complete" states, plus the "canceled" state for an order item.

The CSP must launch the approval screens from a new browser. The following URL will bring up the approval sign-in page:

```
http://<hostname>:<port_number>/
  go?to=UA_ApprovalSignin&from=nafrom&task=naTask
```

In this URL, replace <localhost> and <port_number> with the appropriate values for the CSP's Smart Component Server deployment.

At the sign-in page, enter the following login information, entering each token exactly as it appears after the colon:

username: userB0022: This is a user that belongs to the UA-Liscensee-Admin Cyg-User groups;

password: "password".

This user has Licensee_Admin level authority. Do not give this user name to anyone who should not have this authority.

The CSP will then see the approval menu which contains the following:

Approve Partner Requests;

Approve Partner Requests;

Approve Account Requests;

Approve Order Item Requests.

Each of these menus presents a list of items (appropriate to the menu chosen), their item number, the date the item was created, the current status, and radio buttons allowing the CSP to alter the state of the item. Once the CSP have made the desired modifications, clicking "Update" will commit those changes and change the state of the items within the system.

Section 5

Universal Agent Portal

One embodiment of the invention is the Universal Agent Portal (UAP), which allows users (customer service representatives, sales agents, or other administrative users) at a communications service provider (CSP) site quick access to customer and partner data, enable them to create and modify customers and partners, shop for products, report trouble, and perform many other functions offered in the eBusiness support system on behalf of customers and partners.

5.1. Navigating the UAP

The functionality available in the UAP can be broken down between the user home page and customer home page. The user home page is displayed after a UAP user have logged in to the portal. Much of the functionality in the UAP is only available once the UAP user has selected a customer or partner with whom to work. This is referred to in this document as making the customer "active." Different navigation controls are available at different points in the portal.

5.1.1. Starting the UAP

First start the Smart Component Server; then open a browser and navigate to the following URL http://<webserver>:<listen_port>/go?to=UA-Signin&from=nafrom&task=naTask When the splash Page appears, enter the user name and password and click "SIGN IN" to log in to the portal.

5.1.2. Main Navigation Bar

The Main navigation bar appears at all times, regardless of whether a customer or partner is active and allows the UAP user to navigate to the following areas:

User Homepage: Takes the UAP user to the Internal User Homepage, which allows the UAP user to search for customers, orders, product instances, and trouble tickets. Clicking the "USER HOME" link also makes the user navigation bar visible if it is not already visible.

Customer/Partner Home: This link takes the UAP user to the customer/partner Summary page and makes the customer/partner navigation bar visible if it is not already visible. If there is no active customer, this link is inactive.

Help: Opens online help in a separate window.

Shop: Takes the UAP user to the first page of the catalog.

Release Customer/Partner Releases the customer/partner currently active.

Logout: Logs the UAP user out of the portal.

5.1.3. Customer/Partner Navigation Bar

The customer/partner navigation bar is active throughout the portal whenever a customer or partner is active. This navigation bar allows the UAP user to navigate the following locations:

orders: Takes the UAP user to the order history page for the active customer/partner.

quotes: Takes the UAP user to the quote history page for the active customer/partner.

payments: Takes the UAP user to the payment history page for the active customer/partner.

adjustments: Takes the UAP user to the adjustment history page for the active customer/partner.

trouble tickets: Takes the UAP user to the trouble ticket history page for the active customer/partner.

disputes: Takes the UAP user to the dispute history page for the active customer/partner.

products: Takes the UAP user to the product history page for the active customer/partner.

notes: Takes the UAP user to the note history page for the active customer/partner.

bills: Takes the UAP user to the billing history page for the active customer/partner.

a/r: Takes the UAP user to the accounts receivable page for the active customer/Partner.

Support: Takes the UAP user to the support page for the active customer/partner.

approval menu: Brings up the manual approval menu. The approval menus may only be viewed by users belonging to the ua-licensee-admin group.

quote preview: Allows the UAP user to view a quote-in-progress (a shopping cart) before the UAP user order a quote. This is the only link on the customer/partner navigation bar which is active when there is no active customer.

5.1.4. User Navigation Bar

This bar is visible throughout the portal and contains the following links:

new customer: Takes the UAP user to the create new customer page.

new partner: Takes the UAP user to the create new partner page.

bulk pre-qualification: Takes the UAP user to the bulk pre-qualification input page.

manage agents: Takes the UAP user to the manage agents page (Administrators only).

manage agent groups: Takes the UAP user to the manage agent groups page (Administrators only).

manage support: takes the UAP user to the manage support page.

change my password: Takes the UAP user to the change user password page.

5.2. Agents, Groups, and Users in the UAP

Universal Agent Portal users are those who access the eBusiness support system through the Universal Agent Portal. Each UAP user has a unique user name/password combination that provides authentication within the system.

5.2.1. Agents

It is necessary not only to restrict the functionality available but also the data visible to the different types of UAP users. The primary-motivation is to protect customer/partner data from inappropriate or inconsistent modification. The system implements this data-level security via agents. Agents are distinct from users, but every UAP user is also of a particular agent type. The following three agent types are defined, by default: (a) CSR; (b) Sales Agent; and (c) Administrator.

Sales Agents are subject to visibility restrictions. CSRs and Administrators are exempt from these restrictions. New agent types can be created by modifying the appropriate constant class. A user's agent type affects what data they can see when executing customer searches. When searching for customers or partners, a plug-in runs and examines the agent type of the user executing the search. The default behavior of the plug-in is as follows:

If the agent executing the search is of agent type CSR, or Administrator no check is made to agent group visibility table.

Otherwise, the table is consulted, and the data returned is restricted according to the visibility rights granted to the agent.

5.2.2. Agent Groups

Agents are further associated into groups. An agent group may be a geographical division (East Coast office, West Coast office, etc.) or by agent's last name, or any other division. Agent groups, and group visibility are what implement the data-level security. UAP administrator users can create new agent groups.

5.2.3. Creating Users and Agents

By default, only administrators can create new UAP agents. The "manage agents" link from the user navigation bar brings the UAP user to the manage agents page. Here, the UAP user is presented with a list of existing agents, which the UAP user can view or modify. The "CREATE" link allows the UAP user to create a new user and the associated agent.

The UAP user must provide a name and password for this user. This name and password is stored with the user. The UAP user must also select an agent type and a security type (one of Administrator or User) and must enter contact information (name, phone, email, pager, etc.) for this agent.

From the Agent Group Assignment page, the UAP user must assign the agent to one or more groups. Finally, the UAP user must make visibility assignments for this agent. Giving an agent visibility into a group allows that agent to see all customer data associated with members of that group.

5.2.4. Managing Agent Groups

The "manage agent groups" link from the user navigation bar brings the UAP user to the manage group page where the UAP user can create, modify or remove groups.

The Manage Groups page shows the UAP user a list of all agent groups, and allows the UAP user to remove, view or modify them, or to create a new group.

Note that the UAP user can assign entire groups as members of a group, so that the UAP user could, for example, create a group called "North America" and assign the groups "East Coast;" "West Coast," and "Midwest" to it.

An agent group may be removed from the system. Agents or agent groups that were members of, or had visibility into the removed group continue to exist. When a group is removed, all agents who had visibility into that group and could see its associated data will no longer have that visibility. This can cause agents to be unable to see the customer data they require.

5.3. The User Homepage

Once logged in, a UAP user are presented with the User Homepage. The UAP user see any news and information targeted to the UAP user, the user navigation bar, and the search pane.

5.3.1. Agent Visibility and Customer Data

What data is visible to the UAP user depends on the following criteria:

(1) Certain agent types are exempt from these visibility rules. The choice of which agents are subject to/exempt from visibility rules is made by a plug-in whose default behavior exempts agents of type CSR or Administrator. All other agent types (that is, Sales Agent) are subject to the visibility restrictions.

(2) The UAP user's agent group and agent group visibility assignments affect what customer data is visible to the UAP user. When executing a search for a customer/partner or a related item, the set of data against which the UAP user search is executed is determined by the UAP user's agent group visibility.

5.3.2. Selecting an Existing Customer

Much of the functionality offered in the UAP is only available when the UAP user has made a customer (or partner) "active." In order to select a customer or partner, the UAP user must perform a search. By selecting a customer or partner from the search result set, the UAP user activates that customer or partner active.

The UAP allows users to search for customers and partners using the attributes of: (a) Customer Name; (b) Customer ID; (c) Customer Contact Phone Number; (d) Customer Contact First Name; (e) Customer Contact Last Name; and (f) Assigned Sales Agent (sort by first and last name individually).

Searches may also be made ascending or descending. Once a customer is selected and made active, the agent is brought to the Customer Homepage.

5.3.3. Searching for Related Items

The UAP user can execute searches for objects other than customers. A dropdown menu on the search pane controls which type of object the UAP user are searching for. Changing this drop-down causes the search pane to redraw with input fields for search criteria appropriate to that object. Once the UAP user specify values for the search criteria, executing the search returns a set of matching items (if any). Selecting an item from the result set causes the associated customer to become the active customer, and replaces the current active customer/partner.

The search then brings the UAP user to the appropriate detail page for that item (product detail page for a provisioned product, trouble ticket detail for a trouble ticket, etc.). With a customer or partner active, the UAP user can also navigate to pages for trouble ticket, product, and service order from the customer/partner navigation bar. These searches will only be against data specific to the active customer or Partner.

The UAP user can execute searches for the following types of items from the user home page:

(1) Product Instance. Search on and Sort on: (a) Product Name; (b) Service Identifier (e.g., telephone number); (c) Customer Name; (d) Customer ID; (e) Partner-Customer ID; and (f) Requested Due Date. Search on only: (a) Service Street Number; (b) Service Street Name; (d) Service City; (e) Service State/Province; and (f) ZIP/Postal Code.

(2) Service Order. Search and Sort on: (a) Order Number; (b) Purchase Order Number; (c) Order Status; (d) Assigned Sales Agent; (e) Customer Name; (f) Customer ID; (h) Partner-Customer ID; (i) Expedite Flag; and (j) Date Created. Sort on only: (a) Agent First Name; (b) Agent Last Name (3) Trouble Ticket. Search on and Sort By: (a) Ticket Number; (b) Ticket Status; (c) Customer Name; (d) Customer ID; (e) Partner-Customer ID; (f) Ticket Contact Name; and (g) Date Created.

When the UAP user finishes working with a customer or partner, the UAP user can choose to release the customer or partner, by selecting the "RELEASE CUSTOMER" link on the main navigation bar. Doing so will remove everything related to that customer/partner from the current session and return the UAP user to the user home page.

The UAP user need not explicitly release a customer or partner from being active. Selecting a new active customer or partner from a customer search result set will automatically make the newly selected customer active in lieu of the original one.

5.3.4. Bulk Pre-Qualification

Some services may require pre-qualification before they can be provisioned. The UAP allows the UAP user to create and submit requests for bulk pre-qualification of customers to an external system.

From the user navigation bar, the UAP user can select "bulk pre-qualification." The bulk pre-qualification page allows the UAP user to browse for and select a file containing information needed to qualify a group of customers for a product. The UAP user must give a name to the request and an email address that will be notified when the request has been processed. The UAP user can then submit the request.

5.4. Registering New Customers/Partners

5.4.1. Creating Customers or Partners

Any UAP user can create customers and partners. The process is slightly different for the two entities.

(1) Creating Customers

When creating a customer, the UAP user enter relevant information such as mailing address and company name. Also, if there are any profiles defined the data required for the profile is captured. The UAP user can also specify: (a) a document URL that points to contracts or other documentation relevant to this customer; (b) a price group for the customer; and (c) an assigned sales agent.

(2) Creating Partners

For partners, additional information is captured during creation. Most notably, partners are often only allowed to resell services in certain geographical areas. Hence, the UAP user must select from a list of (configurable) geographical regions and indicate explicitly in which regions the new partner is authorized to resell services. For partners, the particular partner program in which this new partner is enrolled is called "partner level" This is simply the implementation of price group for partners. In addition to a document URL (which for partners might contain a link to legal or other contractual documents for the partner), the UAP user specifies a URL pointing to the Partner Logo image. This logo is used in the Channel Partner Portal to re-brand the interface for the partner user.

(3) Profiles

Profiles provide a way to capture various demographic or marketing information for a customer or partner at the time that customer is created. What information is gathered is entirely configurable through the Administrator Console.

(4) Assigning Contacts

During the registration process, the UAP user is prompted for information for a contact.

(5) Creating a User

Finally, the UAP user create a user for the customer or partner just created. The UAP user specifies a user name and password, a password hint, and selects a user type. It is this name and password that allows customers to log in to the Small Business Portal and partners to log in to the Channel Partner Portal to manage their partner relationship on their own behalf.

(6) Assigning Support

The UAP user can also assign support resources from the UAP user's organization to a customer.

5.4.2. Creating Accounts

Figure 21:
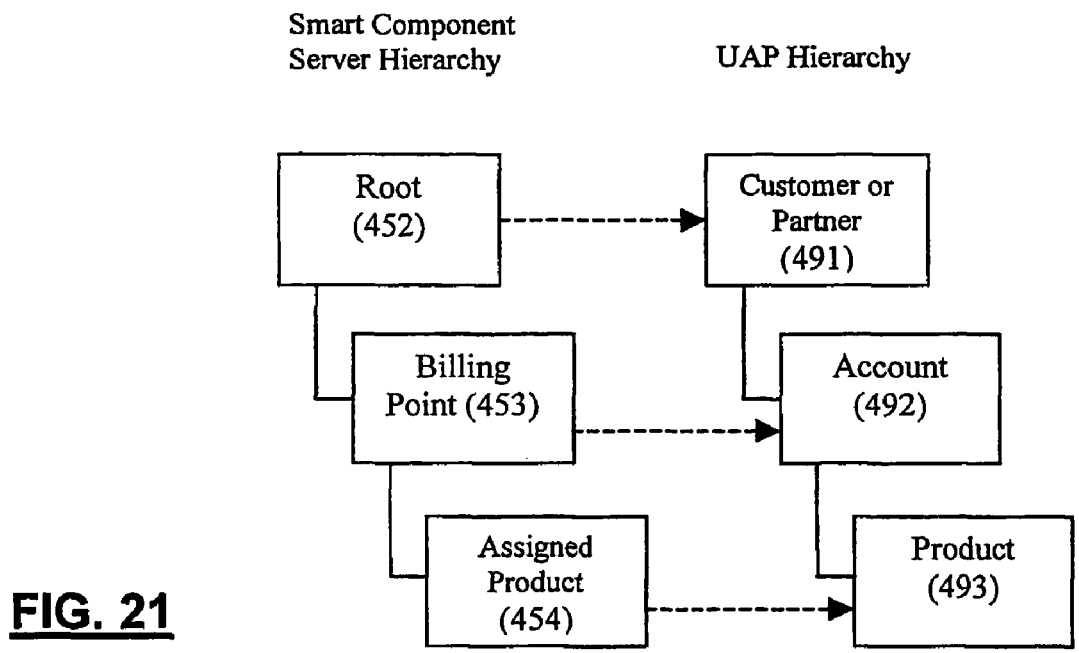
FIG. 21 is a block diagram that illustrates the relationship between the smart component server hierarchy and the universal agent portal hierarchy.

Customers and partners have associated accounts. Once the customer or partner is created, the UAP user can then proceed to create one or more accounts, capturing the required name, address and credit/payment information. Referring to FIG. 21, customer data is organized in a hierarchy 490 which consists of root 452, billing point 453 and assigned product 454. In the UAP, Root 452 is implemented as either a customer or a partner 491; Billing point 453 is implemented as an account 492 (all charges accrue at the account level). The implementation of Assigned products is same as that in the Smart Component Server. When the UAP user makes a customer or partner 491 active, the UAP user can view data belonging to the associated hierarchy 490.

The eBusiness support system relies on external systems to do the actual network provisioning of customers and their accounts and products. If there is no external system, all objects (customers/partners, accounts, orders) will persist in a pending state until manually changed via the approval pages.

5.5. Customer/Partner Homepage

Once a customer/partner has been selected and made active, the UAP user is shown that customer or partner's home page.

This page displays the following:
- a customer summary section, showing each of the customer/partner's accounts and a link to add new accounts;
- a news and information pane showing news and promotional messages appropriate to that customer/partner;
- a history pane of the last five customer activity items (trouble tickets, orders, quotes, disputes, etc.) at the bottom of the page.

5.5.1. Customer/Partner Detail

The name of the customer/partner on the home page is a link to the customer/partner detail page. This page summarizes the information for that customer/partner (including resale authority for partners and customer address for customers) and allows the UAP user to modify the customer/partner information, report trouble, and manage contacts.

5.5.2. Accounts

On the customer summary page, the UAP user is presented with a list of every account associated with that customer. For each account in the list are the following links:

Account Name: Clicking the account name itself brings up the detail page for that account.

View Services: Clicking this link allows the UAP user to view all provisioned services (i.e. products) for that account.

Manage Bills: Bills for this account are available through the Manage Bills link.

A/R: A summary of Accounts Receivable information is available through the A/R link.

Once the UAP user have selected one of these links, each of the subsequent account-related pages has a drop-down menu containing all other accounts associated with this customer, allowing the UAP user to move from viewing information for one account to viewing information for a different account without needing to return to the customer detail page.

(1) Account Detail

Clicking the name of an account in the listing on the customer summary page brings the UAP user to the account detail page for that account. This detail page contains a summary of the account's information such as name, billing information, billing address, and credit information. Also listed are the contacts (if any) for that account.

The account detail page includes links which allow the UAP user to view history items for this account, modify account information, raise a trouble ticket on this account and add, modify or remove contacts for that account.

(2) Bills

Next to each account in the account listing on the customer summary page is the "Manage Bills" link which allows the UAP user to view bills for that account. This page presents a list of bills for the selected account, a drop-down list to select which billing cycle to view, and a drop-down menu from which the UAP user can select a different account whose bills are then displayed in place of the original account selected.

Selecting a bill from the list brings up the bill detail page, which gives a breakdown with subtotals for various types of invoice items, including: (a) Monthly, or Recurring Charges; (b) One-time, or Non-Recurring Charges; (c) Usage charges; (d) Taxes; (e) Adjustments; and (f) Discounts.

The UAP user can then drill in to each type of charge and see a list of charge instances for that type and for that invoice.

(3) Accounts Receivable

In addition to viewing invoices, an "A/R" link next to each account in the customer summary list allows the UAP user to view past balances for a customer account, broken down into intervals of 30 days, 60 days, 90 days, and 90 days and above. The UAP user can then select a different account for the current customer and view that account's A/R balances as well.

(4) Creating an Account

Accounts can be created at any time from the customer summary page by clicking the "ADD NEW ACCOUNT" link. The UAP user must provide an account name, billing address and credit information for every account the UAP user create. Once created, the account will be displayed in the list of accounts on the customer summary page.

5.5.3. History

From the customer/partner home page, the UAP user can view history, showing events in the life-cycle of the customer to date. By default, a list of the last five history items is shown. If the agent wishes to view history information for a particular category, those histories are available from the navigation bar. These history items include the categories of: (a) Orders; (b) Quotes; (c) Payments; (d) Adjustments; (e) Disputes; and (f) Trouble Tickets.

From a history item link, the UAP user can then drill in to the specific item to view its detail page.

5.6. Shopping

The UAP user can use the UAP to shop, select, configure and order products on behalf of customers or partners. Ordering products in the UAP consists of the stages of: (a) Shopping; (b) Creating and configuring items in a quote; and (c) Ordering the items.

5.6.1. Price Group

Price groups are a mechanism by which the UAP user can segment the UAP users customers, perhaps into "VIP," "Executive" and "Standard" groups, for example. Price groups determine what products and what prices for those products are available to a given customer. The prices displayed throughout the shop process are determined by the active price group, but can later be negotiated or overridden. What price groups exist and their associated prices are both configured in the Administrator Console.

What price group is active when using the UAP is dependent on whether or not the UAP user have an active customer. If there is no active customer or partner, the default price group determines the associated product prices. If a customer or partner is active, then the price group for that customer (which was assigned when the customer or partner was created) determines which associated prices are displayed.

5.6.2. Menus

Menus are navigable lists of products offered for ordering. In the UAP, the UAP user shop product catalogs, and choose and configure offered products for the customers or partners on whose behalf they are acting. Menus typically break product offerings down into categories such as "Business Services" and "Residential Services." What categories exist and what offers are available through them is configured through the Administrator Console.

(1) Default Menu

When the UAP user are browsing the product catalogue with no active customer or partner, the UAP user will see a set of product offerings determined by the parameter customer.defaultInternalUserRootMenu0id in the properties file. Once a partner or customer is active, and that partner's price group becomes active and in turn determines the root menu the UAP user see when shopping the catalog. The contents of all menus, including the default menu is configurable through the Administrator Console.

(2) Alphabetical Product Index

In addition to the hierarchical menus, the UAP user can also locate products by name. Selecting a letter from the alphabetical index will bring the UAP user td a menu of products beginning with that letter. The names on which the UAP user search are taken from the menu item label, in the DISPLATTRIBS table entry for that menu item.

(3) Breadcrumbs

While browsing the hierarchical menus (but not while viewing an alphabetical list), the UAP shows a "breadcrumb" displaying the path thus far taken through the catalog. The UAP user can click back at any fink in the chain to return to the menu at that level.

5.6.3. Offers

The offers in menus are listed with a brief description (from the DISPL_ATTRIBS table entry for that menu item), the total price for recurring rates and for non-recurring charges, a field displaying both the current quantity in a quote and a field for entering a different quantity.

When the UAP user shops and finds an offer the customer/partner wishes to purchase for a customer, the UAP user can choose to drill down to the offer detail page. The page displays the name of the offer, a list of which price groups can purchase this offer, itemized prices for recurring, non-recurring and usage charges, and any upsell or related offers. The UAP user can then specify a quantity of the product to be ordered, just as in the order's line-item in the menu page.

Whenever the UAP user changes the quantity of an item to be purchased, either from the menu page or the offer detail page, the UAP user must click "UPDATE" to save the new quantity before moving to a new page, This commits the items the UAP user has selected to the shopping cart, which can be viewed at any time by selecting "quote preview". The UAP user can then continue shopping, perhaps in a different category of product offerings.

When viewing an individual offer via the detail page, the UAP user are shown related offers or upsell offers, if any exist. Related offers are offers which have some connection or marketing synergy with the offer being viewed. Upsell offers are related offers that might be interesting to the user.

Both related and upsell offers are displayed on the detail page in a one-line format similar to the offers on a menu page. These related offers can themselves be drilled into from the first offer's detail page, or the UAP user can specify quantities immediately for purchase.

For example, when the UAP user clicks on the Business Access Line product offer, the UAP user is taken to the offer detail page for Business Access Line. There, in addition to the Business Access Line product, the UAP user see various Upsell Products including: Business Voice Mail w/Pager Notification; Essential Bundle; and Business Messaging Bundle.

The UAP user can enter a quantity for purchase for any of these upsell offers and click "UPDATE" to add those offers to the customer/partner cart. Which offers are related to one another and which are on an upsell path is configurable through the Administrator Console.

5.6.4. Offer Collections

Since simple, one-product offers may not be sufficient to meet a providers product offering requirements, the system allows for individual offers to be bundled together into offer collections. Offer collections (as well as simple offers) are configured in the Administrator Console. Instead of selecting a quantity to purchase, as the UAP user does with simple offers, to select an offer collection for purchase the UAP user must click the "add Bundle" link for that offer and then select which options for the collection the UAP user wish to purchase. If the offer collection is fixed, then the UAP user will automatically select all of the offers in the collection; no choices can be made. If the collection is dynamic, the UAP user are guided through the collection's determinants where the UAP user select the individual offers that will make up the collection. At any point in this process, the UAP user can go back to a previous determinant to select a different offer. The navigation path through the collection, as well as the determinants used and the offers included are all configured through the Administrator Console.

5.6.5. Quote Preview

At any point in the shopping process, the UAP user can view a quote preview by selecting that link from the customer/partner navigation bar. This is a view of all products that have been selected for ordering, their total recurring and total non-recurring charges, the quantity currently selected for quote and a text field to input an updated quantity. As the UAP user select offers for purchase, they are placed in the quote preview. The quote preview is the UAP implementation of the shopping cart. The UAP user can adjust the quantity of remove items from the UAP user's cart.

5.7. Quotes 5.7.1. Creating Quotes

When the UAP user has shopped and selected all the products desired, clicking "CHECKOUT" creates a quote. All of the items that were in the UAP user's quote preview when the UAP user selected checkout now appear as quote items.

5.7.2. Quote Summary

The quote summary page shows all the items in the UAP user's current quote. The top of the summary page shows the quote number, creation date, status, last-modified user, and create user. The UAP user can also enter a master purchase order number, a brief description, e-mail address, select a sales agent, and either select an existing partner-customer ID or enter a new one (only if there is a partner active).

Partner-Customer ID is a field where the UAP user can store a partner's internal ID for their end-customers. When the UAP user is shopping on behalf of a partner, the partner can provide the UAP user with its end-customer's ID which the UAP user can then associate with the quote via this field.

Items in a quote display the item number (ordinal number of item in quote) product offer name, the action for this item, the purchase order number (if one was provided), the status (configured, pending configuration, etc.), the price for recurring usage, and non-recurring charges, and a checkbox with which the UAP user can remove items from the quote. If the UAP user remove any items from a quote, the UAP user must click "UPDATE" to commit those changes. If there are more items than will fit on one page, a pair of previous/next links allow the UAP user to navigate between pages.

The UAP user can hold or cancel the quote, add notes, shop more, or continue. Canceling a quote causes the quote to become inactive, but it will continue to be available as a "Canceled quote" in the customer's quote history. Adding a note to a quote allows the UAP user to attach an annotation to the quote that will then be visible to anyone else working with that quote in the UAP. Any notes created in the UAP can only be viewed in the UAP. Users of other e-Business portals cannot view or modify them.

If the UAP user chooses to "shop more" from the quote summary, the UAP user is returned to the product catalog. Any products the UAP user purchased now are added to the current quote.

5.7.3. Holding a Quote

Holding a negotiated quote causes the quote to persist for a period of time. The UAP user can re-open a held quote at any time and continue working on it by shopping more, configuring items, ordering it or canceling it. After a quote expires, it is no longer available for ordering, but will still appear in and be viewable via the quote history as an "expired quote."

5.7.4. Canceling a Quote

Canceling a quote stops the ordering process and moves the current quote to a "Canceled" state. Canceled quotes can always be viewed from the quote history available from the customer/partner navigation bar.

5.7.5. Configuring Quote Items

Before quote items can be purchased and moved to order items, they must be configured. Configuration is reached by selecting the "Configure" link which is next to every quote item requiring configuration. If the UAP user attempt to click "CONTINUE" without configuring all quote items, the UAP will prompt the UAP user for configuration information for each item in the quote.

(1) Service Start Date

The UAP user can choose to accept the earliest possible start date for a quote item, or select another date (as long as the date the UAP user selects is not earlier than the earliest possible date).

The Service Level Agreement (SLA) is an attribute of the offer's associated vendor product, configured via the Administrator Console when product offerings are created. The SLA is added to the current date resulting in the earliest possible start date. This represents, for example, the amount of time it would take a technician to perform all the necessary network provisioning (perhaps including a customer premises visit) before the offered product is available for use. A constraint on service start dates arises when the UAP user attaches a quote item to an existing quote item. The UAP user may not select a start date earlier than the start date for a dependent product that is earlier than the start date selected for its "parent" product.

(2) Service Address

The UAP user must input information for the service address. This associates the product to a physical location, typically a customer address.

(3) Selecting Service Identifier

The UAP user must select a service identifier (a telephone number for access line, for example). The system uses a plug-in to interface with an external provisioning or telephone-number-inventory system to retrieve a set of service identifiers from which to choose.

(4) Product Association

The UAP user must also attach each quote item either to a place in the customer's hierarchy, or to another item in the quote. The determination of which hierarchy objects or products are valid attachment points is handled by the business rules manager.

(5) Product Parameters

Finally, the UAP user must provide values for product parameters (such as number of rings before voice mail picks up, guaranteed level of service, etc.). What parameters are required is an attribute of the offer's associated vendor product. These parameters are defined in the Administrator Console.

5.7.6. Automating Quote Item Configuration

In addition to manually configuring quote items, the UAP user can take advantage of two features of the UAP to streamline the quote configuration process, pre-population and propagation.

(1) Pre-population of Parameters

Certain offered products can be set up to have values for their parameters pre-populated when they are purchased in a quote. By default, when an offer item moves from a cart item to a quote item, a plug-in can then give pre-populated values to certain product parameters. By default, the following parameters can be pre-populated: (a) attachment point; (b) service address (customers only); (c) service identifier; (d) start date; and (e) other product parameters.

The parameters to be pre-populated are determined by the PreConfigure*, java plug-ins. By default, the pre-populated values for product parameters are taken from the default values specified when the offer was configured in the Administrator Console.

Other parameters are populated as follows:

attachment point—The plug-in picks the first account it finds associated with the partner.

service address—For a customer, defaults to customer's address. For a partner, the plug-in does nothing.

service identifier—The plug-in picks an identifier at from the pool. In the default implementation this is a static list; in an actual deployment this identifier would likely come from some external system.

start date—The plug-in uses the default earliest available start date determined by the vendor product associated with this quote item's associated offer.

Once the UAP user accepts the pre-populated configuration information, the UAP user can at any time before ordering the quote go back and modify the configuration of individual quote items which were pre-configured, until the quote is submitted as an order.

(2) Propagation of Parameters

If there is more than one of the same quote items to be ordered, the UAP allows configuration parameters to propagate to subsequent items in the quote.

Once the UAP user has configured a quote item, the UAP user can check the box marked "Propagate to all items (same product)". Then, when accepting the configuration for that item, the UAP user will see a confirmation page indicating which items in this quote (if any) have been selected by the plug-in to receive the propagated configuration information. The UAP user can then accept or cancel the propagation. If the UAP user accepts the propagation, the indicated quote items receive the configuration information from the "primary" quote item from which the UAP user elected to propagate.

Certain configuration parameters for a quote item can be propagated. By default, they are: (a) attachment point; (b) service address; (c) service identifier: (d) start date; and (e) other product parameters.

The determination of which quote items are to be configured by propagation is also determined by the plug-in. By default, the plug-in propagates configuration to the following class of quote items: (a) quote items that are of the same product type (determined by vendor product type) as the "root" quote item; and (b) of those quote items, only quote items in state "pending configuration" are eligible for propagation.

Once the UAP user propagates configuration information, the UAP user can at any time go back and modify the configuration of individual quote items which were propagated.

5.7.7. Disclosures

Offer items in the quote can have disclosures associated with them which communicate legal or other information the customer must agree to before purchasing. All disclosures for each item in the quote which has them are displayed and the UAP user must accept them before the quote can proceed.

5.7.8. Negotiated Quote

Once all the configuration described has been completed for a quote, it reaches the "quoted" stage, and the display updates to reflect this by bringing the UAP user to the Negotiated Quote page. Once a user elects to order a negotiated quote, A quote items become order items.

(1) Price Overrides

UAP agents can issue price overrides to a quote item once the containing quote has reached the negotiated stage. Every item in a negotiated quote has a link labeled "Modify" which brings up the price override page.

The UAP user must specify a reason for the override, a description of the particular reason (i.e. reason is "promotion" and the description of the particular promotion is "Summer DSL Blowout.")

The UAP user can then specify a percentage discount for each item in the One-time Charges, Monthly Rates or Usage Rates categories. The system calculates and displays the new final charge. The UAP user can either reset or click "APPLY" and commit the override. The total quote price is recalculated based on the overridden items, and the quote summary updates to reflect this new price.

(2) Prices of Held Quotes

Once a quote reaches the negotiated stage, the price for that quote is fixed. If the UAP user holds the quote, and prices for items in that quote and for that customer's price group should change, the quote will remain at the price at which it was held.

5.7.9. Shipping Address for Delivered Products

Offers which represent equipment (cell phones, pagers) which are physically delivered to a customer or partner are called delivered products in the UAP. When purchasing a quote containing one or more delivered products, the UAP user is required to give a single shipping address to which all delivered products in the quote will be shipped. If there are no offers corresponding to delivered products in the quote, then no shipping address is required.

5.8. Orders

Once products have been selected for ordering, configured in a quote and submitted by clicking the "ORDER NOW" link, an order is created.

5.8.1. Order History

The UAP user can search on service orders from the user home page, or orders can be tracked from the Order History off of the customer/partner navigation bar. The order history page displays: (a) Order number; (b) Date Created; (c) Partner-Customer ID; (e) Description; (f) Status; and (g) Last Modified By.

(1) Order Detail

By clicking on the order number, the user can then bring up a detail of the order. This page lists: (a) Order number; (b) Date Created; (c) Status; (d) Master PO number (if any); (e) Description; (f) Partner-Customer ID; and (g) each of the constituent order items Each order item in the list displays:

Item number;

Action (Add, Remove, etc.);

Description. The description is a link which allows the UAP user to drill down and view all charges for the item);

Status. The status that is visible from the order item line-item in the order detail page is obtained from an interaction model; it is a view into the external provisioning process. Clicking on this status will bring up the interaction history for that order item.

a link to view a detail for that item. The detail page for an order item displays the product name, the purchase order number, and all the configuration information which was determined when that item was configured in a quote. From the order detail page, the user can request cancellation of the order, or re-order the entire order. The user can also view any notes attached to this order.

totals for one-time and recurring/monthly charges (2) Item Status and Interaction Models The status that is visible from the order item line-item in the order detail page is obtained from an interaction model; it is a view into the external provisioning process. Clicking on this status will bring up the interaction history for that order item.

5.8.2. Canceling an Order

Canceling an order is not guaranteed to completely cancel all products ordered. Since the system relies on external systems to handle provisioning, it is possible that an ordered item can already be provisioned at the time the UAP user are requesting cancellation, but that the new state information has not been communicated to the system. Therefore, canceling an order from the order detail page simply requests a cancellation and sends the appropriate CMI to the external system.

If the external system is successful, the order will be canceled and the state reflected in the order history.

5.8.3. Reordering

When the UAP user select "REORDER" from the order detail page, the UAP user are brought to the quote summary page for a new quote, populated with any items which were in the original order with an action of "Add". This excludes from reordering any items which were in the original order as upgrades, or which were removed, changed suspended or resumed. The items in the re-ordered quote are in a configured state, but the UAP user can then change the configuration of the quote items. The UAP user then can re-submit them as a new order, leaving the original order unchanged.

5.8.4. Supplemental Orders

From the Order Detail page, the UAP user can elect to supplement the order. Supplemental orders are a way for UAP agents to add or change aspects of an order before it has been fully provisioned. What items in an order are eligible for supplement is controlled by a plug-in, but by default only products who have not reached state "complete" can be supplemented.

The supplemental quote contains those order items which the plug-in determined were eligible for supplement. All other items which were ineligible also appear in the supplemental order quote, but are un-modifiable and retain their state from the original order. The UAP user can make whatever supplemental changes are required, such as replace items in the quote for supplemental order, reconfigure them or cancel them outright. Once the UAP user make these supplemental changes, the UAP user submit the supplemental quote and creates a supplemental order.

(1) Charges for Supplemental Orders

A plug-in calculates charges for a supplemental order. By default, this charge is a flat-fee which is then assessed to the account and associated with the quote. This behavior can be customized. The supplemental charge is displayed on the Negotiated Quote page in the totals area.

The UAP user can also elect to waive this supplemental charge from the Negotiate Quote page by clicking the "Waive Charge" link next to the supplemental charge amount. The charge is then removed and no longer displays.

(2) Escalations

While submitting a supplemental order, the UAP user can flag individual items as "escalation" items, indicating that the item is in response to an issue raised by a customer.

5.9. Service Management

5.9.1. Products in the UAP

Products such as access lines, voice mail, and call forwarding for which there is an ongoing subscriber relationship are referred to as assigned products in the system. Assigned products can be modified, suspended, resumed, or removed.

Delivered products represent actual end-user equipment such as a cell phone or other customer premise equipment. These delivered products maintain an association to an account within the system, but are not eligible for the same actions as provisioned products; they cannot be modified, upgraded, suspended or resumed, or removed.

5.9.2. Viewing Services

From the Customer Summary page, the UAP user can view products and services provisioned to particular account by clicking the "view services" link next to that account. The UAP user is then shown a hierarchical view of all products provisioned to that account. Arrows next to products indicate that the UAP user can click to expand or collapse that level of the product hierarchy. Clicking on the name of a product brings the UAP user to the detail page for that product. The UAP user can also bring up the products page by clicking the "products" link from the customer/partner navigation bar.

(1) Product Detail Page

For assigned products, the detail page shows the name of the product, a brief description, the date the product was provisioned, and a summary of the configuration information. Any contacts assigned to this product are also visible, as is a link to add new contact information.

To manage the product hierarchy, the UAP user can modify, remove, suspend/resume, upgrade, report trouble, and contacts for the assigned products. For delivered products, the UAP user may only report trouble and add/remove contacts.

5.9.3. Modifying Products

The UAP user modifies an assigned product by clicking "Modify Product" from the assigned product detail page. Since an external provisioning system must be used to make the desired modifications to a provisioned product or service, the UAP implements product modification as an order. Modifying an assigned product takes the UAP user to the quote summary page for a new quote, consisting only of the product to be modified.

From this new quote detail, the UAP user can then configure the active parameters on the offer including a "start" date when the customer wishes the modification to take effect as well as any other product parameters, service address, service identifier, etc. The UAP user can then submit the quote.

5.9.4. Removing Products

The UAP user can request an assigned product to be discontinued by clicking "Remove Product" from the assigned product detail page. Removing a product brings the UAP user to the quote summary page of a new quote, consisting only of the product to be removed.

The only configuration possible for this removal quote is the termination date. Analogous to the service start date the UAP user selected when ordering the product, the UAP user can choose either the earliest possible date, or a specific date, as long as the date the UAP user choose is not earlier than the earliest possible date.

5.9.5. Suspend/Resume Product

From the product detail page, the UAP user can suspend products that are provisioned and active. When the UAP user selects a product to be suspended, the system will check to see if the product is an Offer Composite. If it is, the entire offer collection and any of its constituents' child products are suspended, even if they reside on other accounts associated with the active customer. Otherwise, the selected product and all of its children are suspended.

When the UAP user wish to resume a product, the UAP user first locate it in the product hierarchy and select "RESUME". The system traverses that product's children and resumes them as well. Finally, if the UAP user is resuming a previously suspended composite offer, the entire collection and any of its constituents' children are resumed.

Since an external provisioning system must be used to make the desired suspensions/resumptions to a provisioned product or service, the UAP implements product suspend/resume as an order. Suspending or resuming an assigned product takes the UAP user to the quote summary page for a new quote, consisting only of the products to be suspended or resumed.

5.9.6. Upgrading Products

Product upgrades are initiated from the detail page for the provisioned product to be upgraded. Which product offers are on a given product's upgrade path is configurable through the Administrator Console. Once an upgrade product is chosen, that new product is quoted and ordered like a normal product offer. Once the upgrade order is complete, the new offer instance replaces the original.

5.9.7. Contacts

The UAP user may also view or remove existing contacts for this product, and add new contacts.

5.9.8. Reporting Trouble

The UAP user may also raise trouble tickets against specific products.

5.10. Support Personnel

Support Personnel are individuals within the UAP user's organization with assigned areas of responsibility and whom the UAP user can then associate with customers. By default, the UAP has three categories for support: (a) business; (b) primary; and (c) technical. These categories reside in a constant class and can be modified.

5.10.1. Assigning Support

The UAP user can assign support personnel to the active customer by clicking "support" on the customer navigation bar. The assign support page presents the UAP user with a list of all available support personnel. Clicking on "ASSIGN" associates the selected support person to the account, and adds them to the list of assigned supports displayed at the bottom of the page. The UAP user can also un-assign support personnel from this page.

Note that the UAP user can assign multiple support resources from a single category; there is no limit to the number of business, technical or primary supports for a customer.

5.10.2. Managing Support Personnel

Administrative users can create new support personnel and can modify or remove existing ones. If the UAP user is an administrative user, the "manage support" link appears on the user navigation bar and brings up the manage support page. Here, the UAP user is presented with a list of existing support personnel and can view or modify a support person by clicking the corresponding link.

Creating a new support person requires the UAP user to select a category of support from the drop-down menu (these categories can be customized via a constant class). Then, the UAP user must enter name and contact information for this support person, and can enter any comments.

From the manage support page, the UAP user can remove an existing support person outright by selecting them from the list and clicking "REMOVE."

5.12. Contacts

Contacts are individuals in the customer's or partners organization who are assigned responsibility for various aspects of the relationship with the provider. The UAP user may assign contacts to (a) the customer/partner; (b) an account; and (c) a product instance. The UAP user also must provide at least one contact for the customer/partner during registration.

When adding a contact, the UAP user must provide a name, address and telephone number. Contacts are of a particular type such as "primary" or "technical." The UAP user can assign as many contacts as needed. There can also be multiple contacts of a given type. What contact types are defined is determined by a constant class which may be changed.

5.11.1. Managing Contacts

Customer contacts are displayed on the customer/partner, account, and product detail pages. From there, the UAP user can add new contacts, modify an existing contact, or remove an existing contact.

5.12. Reporting Trouble

5.12.1. Issuing Trouble Tickets

By clicking the "Report Trouble" link on the detail pages, the UAP user can issue trouble tickets against customer, account, and provisioned product The trouble ticket is date-stamped and marked with the ID of the UAP agent submitting it. The UAP user must supply contact information for the customer or partner claimant making the trouble report and specify a category or reason for the trouble report. The UAP user should also provide a detailed text description of the problem, and any recommended action. If the UAP user specifies an e-mail address and indicate that this is the preferred contact method, a notification is automatically sent to that e-mail address as the ticket changes state.

Once the UAP user has provided all the information required for the ticket and submitted it, a summary page is displayed.

5.12.2. Tracking Trouble Tickets

Past trouble tickets against a customer are viewed either by executing a search from the user home page or via the history list from the customer/partner navigation bar.

Clicking the trouble ticket number in the history list opens the detail page for that ticket showing a summary of the ticket. The status link brings the UAP user to the interaction status for the ticket, which displays the state of the ticket as reported from the external ticketing system through an end-user view of an interaction model.

As issues are worked, the UAP user can open trouble tickets and click the modify link to add updated information. The systems always records and displays the last-modified date and the user ID of the UAP agent who last modified the trouble ticket.

5.12.3. Resolving a Trouble Ticket

When an issue has been resolved, the UAP user can open the associated trouble ticket to modify it and mark it resolved. The UAP user must put in a description of how the issue was resolved when resolving a ticket. If an external system is in use for tracking trouble tickets, the system sends a CMI to notify the external system of the ticket's resolution.

5.13. Adjustments and Disputes

5.13.1. Adjustments

The UAP user can view the adjustment history for a customer by selecting the "adjustments" link from the customer navigation bar. A drop-down list with all accounts associated with that customer allows the agent to view adjustment histories for each account.

From the adjustment history, the UAP user can issue a new adjustment to the customer. The UAP user selects an account, an invoice against which to issue the adjustment (optional), whether the adjustment is a credit (reduces the amount a customer owes) or debit, (increases the amount the customer owes), an adjustment reason (allowable adjustment reasons are defined in a constant class and are configurable), and a detailed description of the problem or issue that led to the adjustment.

The UAP user may also issue an adjustment when resolving a dispute.

5.13.2. Disputes

When viewing the invoice summary page, or a detail page for a specific invoice, the UAP user can open a dispute on behalf of a customer or partner. The UAP user must specify the partner or customer ID, a name, contact information for the claimant, select a category for the dispute (these categories reside in a constant class and are configurable), and write a detailed text description of the problem. Once submitted, the UAP user can view the dispute, along with any other for that customer at any time by clicking the 'disputes' link in the customer navigation bar. The dispute history gives the dispute ID, the date created, a category and brief description, and the state of the dispute. The UAP user can only create disputes from an invoice summary page, not from the dispute history page.

If the UAP user needs to add or change information in a dispute record, the UAP user can do so from the dispute history by opening that dispute and modifying the description. When the issue which occasioned the dispute has been resolved, the UAP user can open and modify the dispute record, add a resolution description, and then either save the record, or save and issue an adjustment to the account. If the UAP user chooses to save and issue adjustment the UAP user is then brought to the adjustment page and can issue the adjustment.

5.14. Notes

The UAP users can create notes to record activity taken on various entities in the system. Notes capture the date and time they were created, the UAP agent who created them, the customer with whom they are associated, and the entity the note is attached to. Notes can be attached to: (a) Customers or partners, from their respective detail pages; (b) Orders, from the Order Detail page; and (c) Quotes, from the Quote Detail page. Also, a note history can be viewed for each of these entities from their detail pages.

5.15. Reporting

The UAP user can view five different reports from the UAP. Two are visible from the user home page: (a) Financial Forecast; and (b) Financial Bookings. These two reports summarize revenue forecast or booked, respectively broken out by product line and charge type (recurring vs. non-recurring) for the current month.

Three reports are specific to partners and are visible from the partner home page for a particular partner in session. They are: (a) Financial Forecast; (b) Financial Bookings; and (c) Orders Past Due. The first two reports are analogous to the two reports on the user home page, except that they cover revenue for the active partner alone. The last, Orders Past Due summarizes any outstanding orders which are not complete and are past their requested due date.

The actual data in these reports comes from the database, but the reports themselves are provided by an external system; the portal merely supplies links to those reports.

5.16. Manual Approval

The Universal Agent Portal provides pages that allow the UAP user to manually set the status of order items, account requests, and customer requests. This is useful in testing or in deployments which do not use external systems for provisioning or trouble ticketing. By default, the UAP allows a licensee to set the "pending," "rejected," and "complete" states, plus the "canceled" state for an order item.

Click the "approval menu" link off of the user navigation bar to bring up the approval menu. The UAP user will then see the approval menu which contains: (a) Approve Customer Requests; (b) Approve Partner Requests; (c) Approve Account Requests; and (d) Approve Order Item Requests.

Each of these menus presents a list of items (appropriate to the menu chosen), their item number, the date the item was created, the current status, and radio buttons allowing the UAP user to alter the state of the item. Once the UAP user has made the desired modifications, clicking "UPDATE" will commit those changes and change the state of the items within system.

Section 6

The Channel Partner Portal

One embodiment of the invention is the Channel Partner Portal (CPP), which allows users at communications service provider sites to manage their accounts with a provider. CPP users can use the portal to shop for products and services (typically on behalf of their own end-customers), manage these services, view reports, and report and track trouble tickets.

6.1. CPP Logging In

The CPP user logs in using a user name and password set up for their organization by a communications service provider (CSP). The CSP can set up multiple users for a partner, with differing levels of security or access to data. By default, two security levels are supported: administrator and user.

The CSP creates the first user (typically an administrator) for a partner via the Universal Agent Portal. Once the CSP has created at least one administrator user for a partner, that user may then in turn create other users for the partner.

A CPP user's security level determines what transition policies they may execute and what JSP's they may view.

The two security levels, administrator and user have the following permissions and restrictions for navigating the CPP:

(1) CP_partner_user. User may not add, remove, or modify accounts; may not access bulk pre-qualification; may not add, remove or modify support resources; may not add, remove or modify CPP users; may not reorder products or existing orders.

(2) Partner_admin. Administrator may access the entire portal except the manual approval screens.

6.2. CPP Home

After a CPP user logs in to the portal, the partner home page comes to screen. This page contains the following areas:

(1) Navigation. The main navigation bar is visible throughout the CPP and allows the user to navigate to the following areas:

Home: brings the user to the partner home page.

Search: brings the user to the search page.

Shop: brings the user to the main catalog menu where they can shop for products and services.

Support: brings the user to the support page where they can view support resources assigned to them.

Help: This link can be customized to point to whatever online help system the CSP may design and deploy with the CPP.

(2) Partner Name and Logo. The partner's name and logo are displayed at the top of the partner home page, as well as the name of the user currently logged in.

(3) News and information. This area displays any news (such as reports of outages, new service offerings, etc.) or other promotional messages targeted at the CPP user. The contents of this area are configurable via the Administrator Console.

(3) Search. The search area of the partner home page, as well as the "SEARCH" link on the navigation bar, brings the CPP user to the search page from where they can execute three different types of searches.

(4) Information Management. The information management area contains links to three types of partner-specific reports. It also provides a link where CPP users can create bulk pre-qualification requests. CPP users can also manage accounts and view their partner detail page.

(5) Activity History. The activity history area allows CPP users to view past activity in three areas: quotes, orders and trouble tickets.

(6) Administering Users. Functions in this area allow CPP users to change their password, and (if they have sufficient authority) to create other partner users.

6.3. Searching

From the search area on the partner home page, the user can execute searches for three types of objects: orders, trouble tickets, and products. Clicking any one of these links brings the user to the search page for that type of object.

6.3.1. Search Types

On the search page, a drop-down menu controls which type of object the user is searching for. Changing the selection in this drop-down reloads the search page with input fields for search criteria appropriate to that object.

The user can execute searches for the following types of items:

Service Order. Search on and sort by: (a) Order Number; (b) Purchase Order Number; (c) Order Status; (d) Partner-Customer ID; (e) Escalation Flag; and (f) Date Ordered.

Trouble Ticket. Search on and sort by: (a) Ticket Number; (b) Ticket Status; (d) Partner-Customer ID; and (e) Date Created.

Product Instance. Search on and sort by: (a) Product Name; and (b) Service Identifier (e.g., telephone number).

Partner Customer ID. Search on only: (a) Service Street Number; (b) Service Street Name; (c) Service City; (d) Service State/Province, and (e) ZIP/Postal Code.

In addition, the user can specify whether any sort should be ascending or descending.

6.3.2. Search Results

Once the user specifies values for the search criteria, executing the search returns a set of matching items (if any). By clicking on a column header, the user can cause the result set to be sorted on that columns parameter. Clicking again toggles the sort from ascending to descending.

Clicking on an item in a result set brings the user to the appropriate detail page for that item (product detail page for a provisioned product, trouble ticket detail for a trouble ticket, etc.)

6.4. Shopping

A partner can use the CPP to shop, select, configure and order products. Ordering products in the CPP consists of the stages of: (a) shopping; (b) creating and configuring items in a quote; and (c) Ordering the items in a quote.

6.4.1. Menus

Menus are navigable lists of products offered for ordering. In the CPP, the user shops product menus, and selects offered products for purchasing. Menus typically break product offerings down into categories such as "Business Services" and "Residential Services."

(1) Default Menu and Price Groups

When the user is browsing the product menu they will see a set of product offerings determined by their assigned price group. The price group determines the root menu and prices for each offer.

(2) Alphabetical Product Index

In addition to the hierarchical menus, the user can also locate products by name. Selecting a letter from the alphabetical index will bring the user to a menu of products beginning with that letter.

(3) Breadcrumbs

While browsing the hierarchical menus (but not while viewing an alphabetical list), the CPP shows a "breadcrumb" displaying the path thus far taken through the menu hierarchy. The user can click back at any link in the chain to return to the menu at that level.

6.4.2. Offers

The offers in menus are listed with a brief description, the total price for recurring charges and for non-recurring charges, a field displaying both the current quantity in the quote and a field for entering a different quantity.

(1) Offer Detail

When the user shops and finds an offer they wish to purchase, they can choose to drill in to the offer detail page. The detail page displays the name of the offer, itemized prices for recurring, non-recurring and usage charges, and any upsell or related offers. The user can then specify a quantity of the product to be ordered, just as in the order's line-item in the menu page.

Whenever the user changes the quantity of an item to be purchased, either from the menu page or the offer detail page, they must click "UPDATE" to save the new quantity before moving to a new page. This commits the items the user has selected to their shopping cart, which can be viewed at any time by selecting "Quote Preview". The user can then continue shopping, perhaps in a different category of product offerings.

(2) Related Offers and Upsell Offers

When viewing an individual offer via the detail page, the user is shown related offers or upsell offers, if any exist. Related offers are offers which have some connection or marketing synergy with the offer being viewed.

Both related and upsell offers are displayed on the detail page in a one-line format similar to the offers on a menu page. These related offers can themselves be drilled into from the first offer's detail page.

For example, when the user clicks on the Business Access Line product offer, they are taken to the offer detail page for Business Access Line. There, in addition to the Business Access Line product, the user sees: Business Voice Mail w/Pager Notification, Essential Bundle, and Business Messaging Bundle.

The user can enter a quantity for purchase for any of these upsell offers and click "UPDATE" to add those offers to their cart.

Which offers are related to one another and which are on an upsell path is configurable through the Administrator Console.

(3) Offer Collections

Since simple, one-product offers may not be sufficient to meet a providers' product offering requirements, the system allows for individual offers to be bundled together into offer collections. Offer collections (and also simple offers) are configured in the Administrator Console.

Instead of selecting a quantity to purchase, as with simple offers, to select an offer collection for purchase the user must click the "add Bundle" link for that offer and then select which options for that collection they wish to purchase. If the offer collection is fixed, then the user will automatically receive all of the offers in the collection; no choices can be made. If the collection is dynamic, the user is guided through the collection's determinants where the user selects the individual offers that will make up the collection. At any point in this process, the user can go back to a previous determinant to select a different offer. The navigation path through the collection, as well as the determinants used, and the offers included are all configured through the Administrator Console.

6.4.4. Quote Preview

At any point in the shopping process, the user can view a quote preview by selecting that link from the top of any menu page. This is a view of all products that have been selected for ordering, their total recurring and total non-recurring charges, the quantity currently selected for quote and a text field to input an updated quantity. The user may also remove items from a quote. The quote preview is the CPP implementation of the shopping cart. As the user selects offers for purchase, they are placed in the quote preview.

6.5. Quotes 6.5.1. Creating Quote

When the user has shopped and selected all the products desired, clicking "CHECKOUT" creates a quote. All of the items that were in their quote preview when they selected checkout now appear as quote items.

6.5.2. Quote Summary

The quote summary page shows all the items in the users current quote. The top of the summary page shows the quote number, creation date, status, the name of the user who created the quote, and the last-modified user. The user can also enter a master purchase order number, a brief description, select an existing partner-customer ID (or enter a new one), and enter an e-mail address. Partner-Customer ID is a convenience field where the user can store an internal ID for their end-customers. Items in a quote display the item number (ordinal number of item in quote) product offer name, the action for this item (i.e., add, remove, change, etc.), the purchase order number (if one was provided), the status (configured, pending configuration, etc.), the price for recurring and non-recurring charges, and a checkbox with which the user can remove items from the quote. If the user removes any items from a quote, they must click "UPDATE" to commit those changes. If there are more items than will fit on one page, a pair of previous/next links allows users to navigate between pages.

(1) Working With a Quote

The user can hold or cancel the quote, add notes, shop more, or continue. Holding a quote allows a quote to be held in its current state and then re-opened at a later time. Held quotes are displayed in the current quote history, available from the activity history area on the partner home page. Canceling a quote causes the quote to become inactive, but it will continue to be available as a "Canceled quote" in the quote history.

If the user chooses to "shop more" from the quote summary, they are returned to the product catalog. Any products they purchase now are added to the current quote.

Adding a note to a quote allows the user to attach an annotation to the quote that will then be visible to anyone else working with that quote in the CPP. Any notes created in the CPP can only be viewed in the CPP. Users of other e-Business portals cannot view or modify them.

6.5.3. Holding a Quote

Holding a non-negotiated quote causes the quote to persist for a period of time. The user can re-open a non-expired held quote at any time and continue working on it by shopping more, configuring items, ordering it or canceling it.

6.5.4. Canceling a Quote

Canceling a quote stops the ordering process and moves the current quote to state "Canceled." Canceled quotes can always be viewed from the quote history available from the main navigation bar.

6.5.5. Configuring Quote Items

Before quote items can be purchased and moved to order items, they must be configured. Configuration is reached by selecting the "Configure" link which is next to every quote item requiring configuration. If the user attempts to click "CONTINUE" without configuring all quote items, the CPP will prompt for configuration information for each item in the quote.

The following attributes are configured in a quote:

(1) Service Start Date. Users can choose to accept the earliest possible start date for a quote item, or select another date (as long as the date they select is not earlier than the earliest possible date. The earliest possible start date is an attribute of the offer's associated vendor product configured via the Administrator Console when product offerings are created. A constraint on service start dates arises when a quote item is attached to an existing quote item. Users cannot select a start date for a dependent product that is earlier than the start date selected for its parent product.

(2) Service Address. Users must input information for the service address. This associates the product to a physical location, typically a customer address.

(3) Selecting Service Identifier. Users must select a service identifier (a telephone number for access line, for example). The system uses a plug-in to interface with an external system to retrieve a set of service identifiers from which to choose.

(4) Product Association. The user must also attach each quote item either to a place in the partner's hierarchy or to another item in the quote. The determination of which hierarchy objects or quote items are valid attachment points is handled by the business rules manager.

(5) Product Parameters. Finally, the user must provide values for product parameters (such as number of rings before voice mail picks up, guaranteed level of service, etc.). What parameters are required is an attribute of the offer's associated vendor product. These parameters are defined in the Administrator Console.

6.5.6. Automating Quote Item Configuration

In addition to manually configuring quote items, users can take advantage of two features of the CPP to streamline the quote configuration process, pre-population and propagation.

(1) Pre-population of Parameters

Certain offered products can be set up to have values for their parameters pre-populated when they are added to a quote. By default, when an offer item moves from a cart item to a quote item, a plug-in can then give pre-populated values to certain product parameters. By default, the following parameters can be pre-populated: (a) attachment point; (b) service identifier; (c) start date; and (d) Other product parameters.

The parameters to be pre-populated are determined by the PreConfigure*.Java plug-ins. By default, the pre-populated values for product parameters are taken from the default values specified when the offer was configured in the Administrator Console.

Other parameters are populated as follows:
attachment point. The plug-in picks the first account found under the partner.
service identifier. The plug-in picks an identifier at random from the pool.
start date. The plug-in uses the default earliest-available start date determined by the vendor product associated with this quote item's associated offer.

Once the user accepts the pre-populated configuration information, they can at any time before ordering the quote go back and modify the configuration of individual quote items which were pre-configured.

(2) Propagation of Parameters

If there is more than one of the same quote item to be ordered, the CPP allows configuration parameters to propagate to subsequent items in the quote.

Once the user has configured a quote item, they can check the box marked "Propagate to all items (same product)". Then, when accepting the configuration for that item, they will see a confirmation page indicating which items in this quote (if any) have been selected by the plug-in to receive the propagated configuration information. They can then accept or cancel the propagation. If they accept, the indicated quote items receive the configuration information from the "primary" quote item from which they elected to propagate.

Certain configuration parameters for a quote item can be propagated. By default, they are: (a) attachment point; (b) service address; (c) service identifier; (d) start date; and (e) other product parameters.

The determination of which quote items are to be configured by propagation is also determined by the plug-in. By default, the plug-in propagates configuration to the following class of quote items: (a) quote items that are of the same product type (determined by vendor product type) as the 'root' quote item; and (b) of those quote items, only quote items in state "pending configuration" are eligible for propagation Once the user propagates configuration information, they can at any time before purchasing the quote go back and modify the configuration of individual quote items which were propagated, until the quote is submitted as an order.

After configuration is complete, the user is returned to the quote detail page. Clicking "Continue" from here, after having configured the quote, will bring up the disclosures page.

6.5.7. Disclosures

Offer items in the quote can have disclosures associated with them which communicate legal or other information the customer must agree to before purchasing. All disclosures for each item in the quote which has them are displayed and the user must accept them before the quote can proceed.

6.5.8. Negotiated Quote

Once all the configuration described has been completed for a quote, and disclosures have been accepted, it reaches the "quoted" stage, and the display updates to reflect this by bringing the user to the Negotiated Quote page. Once a user elects to order a negotiated quote, all quote items become order items.

(1) Prices of Held Quotes

Once a quote reaches the negotiated stage, the price for that quote is fixed. If the user holds the quote, and prices for items in that quote and for that customer's price group should change, the quote will remain at the price at which it was held. A held negotiated quote will expire after a predetermined period of time has elapsed, measured from when the quote was first created. This time limit is specified in the properties file by the parameter quote.defaultquote-validtimeduration. This parameter has a value of 30 days, by default. After a quote expires, it is no longer available for ordering, but will still appear in and be viewable via the quote history as an "expired quote."

(2) Modifying a Quote

Selecting "Modify Quote" brings the user back to the quote summary page. All of the user's previous configuration information is presented, and they can make changes. The new quote will be repriced. They can proceed with ordering the modified quote.

6.5.9. Shipping Address for Delivered Products

Offers which represent equipment (cell phones, pagers) which are physically delivered to a partner are called delivered products in the CPP. When purchasing a quote containing one or more delivered products, users are required to give a single shipping address to which all delivered products in the quote will be shipped. If there are no offers corresponding to delivered products in the quote, then no shipping address is required.

6.6. Managing Support

Support Personnel are individuals within the CSP's organization who are assigned areas of responsibility and whom the CSP can then associate with partners via the Universal Agent Portal. CPP users can then view support information to determine the correct contact for a given situation.

Users of the CPP can view the support resources assigned to them via the "SUPPORT" link on the main navigation bar. This displays the support list, from which users can select a support resource and view their detailed information. By default, the CPP has three categories for support: (a) business; (b) primary; (c) technical.

6.7. Viewing Activity History

Users can view history information from the links in the activity history section of the partner home page. The user can choose from orders, quotes or trouble tickets. Choosing one of these categories brings up the history page for that item. Depending on the type of item whose history the user is viewing, they may take different actions.

6.7.1. Order History

CPP users can search on service orders from the home page. The following information is returned for each item on the order history page: (a) Order number; (b) Date Created; (c) Partner-Customer ID; (d) Description; (e) Status; and (e) Last Modified By.

(1) Order Detail

By clicking on the order number, the user can then bring up a detail of the order. This page lists: (a) Order number; (b) Date Created; (c) Status; (d) Master PO number (if any); (e) Description; (e Partner-Customer ID; and (g) each of the constituent order items.

Each order item in the list displays:
Item number;
Action (Add, Remove, etc.);
Description. The description is a link which allows the CSP to drill down and view all charges for the item;
Status. The status that is visible from the order item line-item in the order detail page is obtained from an interaction model; it is a view into the external provisioning process. Clicking on this status will bring up the interaction history for that order item;

a link to view a detail for that item. The detail page for an order item displays the following data: (a) product name; and (b) purchase order all the configuration information which was determined when that item was configured in a quote. From the order detail page, the user can request cancellation of the order, or re-order the entire order. The user can also view any notes attached to this order;

totals for one-time and recurring/monthly charges.

No actions, apart from returning to the order detail page, are available from the order item detail page.

(2) Canceling an Order

Canceling an order is not guaranteed to completely cancel all products ordered. Since the system relies on external systems to handle provisioning, it is possible that an ordered item can already be provisioned at the time the user is requesting cancellation, but that the new state information has not been communicated to the system. Therefore, canceling an order from the order detail page simply requests a cancellation and sends the appropriate CMI to the external system. If the external system is successful, the order will be canceled and the state reflected in the order history.

(3) Reordering

When the user selects "REORDER" from the order detail page, they are brought to the quote summary page for a new quote, populated with any items which were in the original order with an action of "Add". This excludes from reordering any items which were in the original order as upgrades, or which were removed, changed suspended or resumed. The items in the re-ordered quote are in a pre-configured state, but the user can then change the configuration of the quote items. They then can resubmit them as a new order, leaving the original order unchanged.

(4) Notes

Users may attach notes to an order.

6.7.2. Quote History

Users can view quotes from the quote history available from the partner home page in the activity history. The quote history page displays the following information for each current quote: (a) Quote number; (b) Date Created; (c) Partner-Customer ID; (d) Description; (e) Status; and (e Last Modified By.

A user can also view ordered, expired and canceled quotes. The user can switch between these three categories via links on the main quote history page.

(1) Quote Detail

The user can view a detail page for a quote by clicking the quote in the history list. The detail page summarizes the data displayed in the history entry, and also shows a list of every item in that quote. For each item, the quote detail displays: (a) Item number; (b) Product Name (Clicking this link shows associated charges for the product); (e) The action (add, remove, etc.) for that item which caused it to appear in the quote; (f The PO number (if any); (g) Item Status; (h) One Time Charge; and (i) Recurring Charge.

(2) Quote Item Detail

Each quote item also has a detail link which shows the user a detail page for that quote item, including the configuration parameters which were chosen when the quote item was purchased.

6.7.3. Trouble Ticket History

Past trouble tickets are viewed either by executing a search, or by viewing the trouble ticket history, both from the partner home page.

The following information is returned for each item on the trouble ticket history page: (a) Ticket number (Clicking the trouble ticket number in the history list or search result set opens the detail page for that ticket showing a summary of the ticket); (b) Date Created; (c) Category; (d) Name of trouble ticket (a headline); and (e) Ticket Status.

The user can view a detail for a trouble ticket by clicking on it from the history list. The ticket detail page lists: (a) Trouble Ticket Name; (b) Trouble Ticket Number; (c) Partner-Customer ID; (d) Status (The ticket status displayed is obtained from an interaction model; it is a view into the external provisioning process. Clicking on this status will bring up the interaction history for that trouble ticket); (e) Created By; (f) Created Date; (g) Last Modified By; (h) Last Modified Date; (i) Contact to Notify; (j) Phone Number; (k) Email Address; (l) The entity (partner, account, product) for which the ticket was raised; (m) The category; (n) The ticket description text; and (o) The resolution text (if any).

6.8. Information Management 6.8.1. Reports

The CPP allows users to view three different reports from the partner home page. The default reports are: (a) Financial Forecast; (b) Financial Bookings; and (c) Orders Past Due.

The first two reports summarize revenue forecast or revenue booked, respectively broken out by product line, charge type (recurring vs. non-recurring), and by month. The last report is a summary of all open orders which are past their current due date.

The actual data in these reports comes from the database, but the reports themselves are provided by an external system; the portal merely supplies links to those reports.

6.8.2. Bulk Pre-Qualification

Some services may require pre-qualification before they can be provisioned. The CPP allows partners to create and submit requests for bulk pre-qualification of a group of customers to an external system. From the partner home page, CPP users can select "bulk pre-qualification." The bulk pre-qualification screen allows users to browse for and select a file containing information on customers to be qualified. They must give a name to the request, and an email address that will be notified when the request has been processed. They then submit the request. The file is then sent to a system which can handle the request.

6.8.3. Account Management

Accounts allow the CSP's partners to segment their business into logical units such as geographic location or department. The partner accounts page provides the CPP user with a list of all of their accounts. The list gives the name of the account, its status, and a link to view products for that account. Clicking on the account name brings the user to the account detail page, where they can view all information pertaining to the selected account such as billing address, credit information, and the names of any contact personnel assigned to the account.

A drop-down menu at the top allows the user quickly to switch to other accounts, which will then display their information. From the account detail page, the user can view the account's history, modify any of the account's information, and report trouble for this account, which will raise a trouble ticket, as, well as add, modify or remove contacts.

Users of the CPP can create accounts from the partner accounts page by clicking the "Add Account" link. The user must provide an account name, billing address and credit information for every account they create. Once created, the account will be displayed in the list of accounts on the partner accounts page.

6.8.4. Managing Products

From the account management page the user can view products and services provisioned to a particular account by clicking the "view the products" link next to that account. They are then shown a hierarchical view of all products provisioned to that account. Arrows next to products allow the user to click to expand or collapse that level of the product hierarchy. Clicking on the name of a product brings the user to the detail page for that product.

(1) Product Detail Page

For assigned products, the detail page shows the name of the product, a brief description, the date the product was provisioned, and a summary of the configuration information. Any contacts assigned to this product are also visible, as is a link to add new contact information.

To manage the product hierarchy, the user can modify, upgrade, remove, report trouble, and reorder the assigned products. For delivered products, users may only report trouble and add/remove contacts.

(2) Modifying Products

The user modifies an assigned product by clicking "Modify Product" from the assigned product detail page. Modifying an assigned product takes the user to the quote summary page for a new quote, consisting only of the product to be modified. From this new quote detail, users can then configure any parameters which were available when the product was first ordered, including a "start" date when the modification will take effect as well as any other product parameters, service address, service identifier, etc. The user can then submit the quote.

(3) Removing Products

The user can request an assigned product to be removed from the hierarchy by clicking "Remove Product" from the assigned product detail page. Removing a product brings up the quote summary page of a new quote, consisting only of the product to be removed. The only configuration possible for this removal quote is the termination date. Analogous to the service start date selected when ordering the product, the user can choose either the earliest possible date, or a specific date, as long as the date chosen is not earlier than the earliest possible date.

(4) Upgrading Products

Product upgrades are initiated from the detail page for the provisioned product to be upgraded. Which product offers are on a given product's upgrade path is configurable through the Administrator Console. Once an upgrade product is chosen, that new product is quoted and ordered like a normal product offer.

(4) Reporting Trouble

The user can raise a trouble ticket on a product.

(5) Reordering

When the user selects "REORDER" from the product detail page, they are brought to the quote summary page for a new quote, populated with a quote item corresponding to the order items in the order which had an action of 'Add'. The item in the re-ordered quote is in a configured state, but the user can then change the configuration of the quote items. They then can re-submit them as a new order.

6.8.5. Partner Detail

The partner detail page presents the CPP user with a summary of their partner information. The page displays partner information, resale authority, address, and contacts. The user can also view their partner history, modify their address information, raise a trouble ticket, and add, modify, or remove contacts. Partner history consists of any changes made to partner information such as mailing address.

(1) Modifying Partner Information

The CPP user can click the "Modify Partner Address" link on the partner detail page to provide new or updated address information. Once they click modify, the new information is displayed on the partner detail page.

(2) Reporting Trouble

The user can raise a trouble ticket on an account.

(3) Adding, Modifying and Removing Contacts

The process for adding contacts to a partner is identical to the process for adding contacts to an account.

6.9. User Administration

6.9.1. Changing Passwords

CPP users may change their passwords from the user administration area of the partner home page. They must provide their current password, type their new password twice, and give a password hint which can be shown to a user if they forget their password.

6.9.2. Managing Users (1) Adding New Users. CPP users with sufficient authority can create other users for their partner account from the manage users area of the partner home page. The user must provide a user name, password, and password hint. They must also select the authority level. The two authority levels and their default permissions are: (a) User: read-only user who may not create orders of perform maintenance activities; and (b) Administrator: user who has full access to all of the features.

(2) Removing Existing Users. From the Manage Users page, a CPP user of sufficient authority can remove existing users by selecting them from the drop-down menu and clicking "update." The selected user is then made inactive and will be unable to log in to the CPP.

6.10. Issuing Trouble Tickets

Users of the CPP can issue trouble tickets against the following items by clicking the "Report Trouble" link on the following detail pages: (a) partner, (b) account; (c) provisioned product; (d) composite product; and (e) delivered product The trouble ticket is date-stamped and marked with the ID of the CPP user submitting it. The user must supply contact information for the partner making the trouble report and specify a category or reason for the report. The user must also include a detailed text description of the problem, and any recommended action. If the user specifies an e-mail address and indicates that this is the preferred contact method a notification is automatically sent to that e-mail address as the ticket changes state.

Once the user has provided all the information required for the ticket and submitted it, summary page is displayed.

6.11. Contacts

Contacts are individuals in the partner's organization who are assigned responsibility for various aspects of the partner's relationship with the provider. Users of the CPP may assign contacts to the following entities: (a) the partner; (b) an account; and (c) a product instance.

When adding a contact, the user must provide a name, address and telephone number. Contacts are of a particular type such as "primary" or "technical." Users of the CPP can assign as many contacts as they desire. There can also be multiple contacts of a given type. What contact types are defined is determined by a constant class which may be changed.

Customer contacts are displayed on the customer, account, and product detail pages, where the user can add new contacts, modify an existing contact, or remove an existing contact.

6.12. Notes

CPP users can create notes to record activity taken on various entities in the system. Notes capture the date and time they were created, the CPP agent who created them, the customer with whom they are associated, and the entity the note is attached to.

Notes can be attached to: (a) Customers or partners, from their respective detail pages; (b) Orders, from the order detail page; and (c) Quotes, from the quote detail page Also, a note history can be viewed for each of these entities from their detail pages.

6.13. Manual Approval

The CPP allows administrators to manually set the status of order items, account requests, and customer requests. This is useful in testing or in deployments which do not use external systems for provisioning or trouble ticketing. By default, the CPP allows a licensee to set the "pending," "rejected" and "complete" states, plus the "canceled" state for an order item.

Upon navigating to the Manual Approval page, the CPP user will then see the following options: (a) Approve Customer Requests; (b) Approve Partner Requests; (c) Approve Account Requests; and (d) Approve Order Item Requests.

Each of these menus presents a list of items (appropriate to the menu chosen), their item number, the date the item was created, the current status, and radio buttons allowing the CSP to alter the state of the interim. Once the CSP have made the desired modifications, clicking "UPDATE" will commit those changes and change the state of the items within system.

Section 7

EAI Adapter

The EAI adapter runs within the eBusiness support system's process space specifically as part of the Interconnect Service. It uses source and target strategies that run within an external system's process space to transmit data between the Smart Component Server (SCS) and the external system. Once integrated with the external system, the eBusiness support system can publish events into the external system, and objects within the eBusiness support system can be updated based on events within the external system.

7.1. Creating Events

The eBusiness support system employs communications messaging interfaces (CMIs), objects within the system that contain references to data needed to be sent as events into an external system such as BusinessWare. Each CMI is associated with a routing policy that dispatches it to the correct adapter. When a routing policy dispatches the CMI to the BusinessWare adapter, the appropriate handler for that CMI creates an event. This event retains an association to the data referenced by the CMI.

There are six generic handlers for the Vitria's BusinessWare adapter, which correspond to six generic events that the system publishes:

ObjectAdd, which is used when an object needs to be added, for example to provision a new product.

ObjectAddChange, which is used when it is not known if an object currently exists. If it doesn't, the object is added. If it does, the passed in data is used to update the object.

ObjectChange, which is used when an object changes, for example, to change parameters on a provisioned product.

ObjectDelete, which is used when an object is deleted, for example to remove an order.

ObjectNotify, which is used when a system needs to be notified of an event.

ObjectRequest, which is used when a synchronous request is needed. When this type of event is used, the adapter cannot process any other events until it receives the returned data.

7.4. Using the BusinessWare Adapter

To use the BusinessWare adapter to publish events to an automator model in BusinessWare, the CSP must complete the following steps for each CMI that will use the adapter:

(1) Create a BusinessWare automator model to handle the event associated with the CMI.

(2) Populate the CMI_CMI_POLICY table so that the CMI uses the generic routing policy.

(3) If the CMI data is for an object other than a vendor product, populate the GENERIC_CMI_POLICY table so that the ADAPTER_HOME attribute is the Java Naming Directory (JNDI) deployed name of the BusinessWare adapter EJB and the CNTXT attribute is the fully qualified class name for the appropriate handler.

(5) If the CMI transports data for a vendor product, populate the VENDOR_PROD_CMI_POLICY. This table associates a handler with each specific action on a vendor product. The ADAPTER_HOME and CNTXT attributes are populated as described in step (3).

(5) Create a source connection model, and if the system is to be updated with data returned from the automator model, create a target connection model as well.

(6) Populate the VITRIA_ADAPTER table. This table contains the source and target strategies, as well as the publish channel, for a given CMI.

(7) Stop and restart the service. Because the system reads the VITRIA_ADAPTER table at startup and loads it into JNDI, changes are not recognized until the service is restarted.

7.5. Creating a Source Connection Model

The system provides a source connection template that the BusinessWare console uses to create a new connection model. The process for creating a source connection model using the console includes the steps of:

(1) Create a source strategy specific to the CMI. The RetrieveCygentData flow uses the source strategy to access the data for the associated CMI. Each CMI associated with the BusinessWare adapter should have its own source strategy;

(2) Create a new model. In the BusinessWare console, navigate to the directory where the instance to be saved. From the File menu, select: New>Connection Model>Cygent Source Connection Model. Then, rename the connection model appropriately;

(3) Configure the subscriber channel. This is the channel that the handler uses to publish events. This channel must be the same as the value for the corresponding PUBLISH_CHANNEL in the VITRIA_ADAPTER table;

(4) Configure the RetrieveCygentData flow. This includes setting the Server URL, the user name, and the appropriate password; and (5) Configure the publisher channel. This is the channel that publishes the event to the automater model.

7.6. Creating a Target Connection Model

The system provides a target connection template that the BusinessWare console uses to create a new connection model. The process for creating a target connection model using the console includes the steps of:

(1) Create a target strategy specific to the CMI. The update flow uses the target strategy to update data within the system;

(2) Create a new model. In the BusinessWare console, navigate to the directory where the instance to be saved. From the File menu, select: New>Connection Model>Cygent Target Connection Model. Then, rename the connection model appropriately;

(3) Configure the subscriber channel. This is the channel that the automator model uses to publish the event; and (4) Configure the Update flow. This includes setting the Server URL, the user name, and the appropriate password.

Section 8

Application in DSL Commerce

One embodiment of the invention is the application of the Smart Component Server (SCS) in DSL commerce. The application is based on the integration of the DSLAdvantage, SCS, and the adapters for Vitria BusinessWare via an HTTP connection to provide flow-through provisioning for DSL products.

8.1. Connection Model

Communication Message Interfaces (CMIs) transport references to data collected in the portal to the BusinessWare adapter. A DSLAdvantage source connection model translates the CMI into specific event data based on the request, then sends it to the appropriate automator model. This model translates the message to XML and sends the message via an HTTP connection directly to the DSL provider. When the BusinessWare adapter receives a return XML message, it uses the same automator model to translate the message before sending it to the DSLAdvantage target connection model, which updates the appropriate objects. DSLAdvantage uses the BusinessWare adapter to interact with a DSL service provider at three key points: (a) Service availability; (b) Order entry; and (c) Order status 8.2. Service Availability The service availability function enables the eBusiness support system to present available services to an end user by sending pre-qualification information to the DSL service provider via a synchronous request, so that the provider immediately returns a list of services the customer qualifies for. Then a determinant allows a user to select from a list of offers to create a dynamic bundle. Offer collections for DSL services use two determinants to capture and send pre-qualification information to the DSL provider: the SERVICE_ADDRESS_REQUEST determinant, which collects address and site information, and the SERVICE_AVAILABILITY_CHOOSE_ONE determinant, which sends that site information to the DSL provider and then displays the returned products. The following steps illustrate how these determinants work in a DSL offer collection:

(1) The end user enters, then submits, pre-qualification information. This page uses the address determinant to collect the information. The service availability determinant (the next determinant in the offer collection sequence) sends the address and site information to the BusinessWare adapter via a CMI.

(2) This information is sent to the DSL provider. The BusinessWare adapter uses the service availability source connection model to translate this information into service availability-specific data, and then sends it to the service availability automater model. This model converts the data into an XML form, and sends it to the DSL service provider via an HTTP connection. This event is synchronous—the adapter waits for a response from the provider.

(3) The provider returns a list of DSL services. The DSL service provider immediately returns a list of all products the customer qualifies for.

(4) The provider's products are mapped to the offers. The system uses the DetermineDeterminantItems plug-in and the PRVDR_SVC_OFFER_MAP table to map the returned product IDs with corresponding the offers. The system then updates the service availability agreements (SMs) based on the returned install date for the corresponding vendor product.

(5) The service availability determinant displays the offers.

An offer collection is set up so that once a user selects a DSL product, the following determinant displays the corresponding customer premises equipment (CPE) needed to complete the DSL offer collection.

8.3. Order Entry

Once the end user completes the parameter configuration of all items in a quote and accepts the associated disclosures, an order is created. At this point, all order items associated with DSL services, along with the end user pre-qualification information, are sent to the provider via the BusinessWare adapter. This event is asynchronous—the adapter does not wait for a response from the provider. Once the provider accepts the order, it assigns an order ID to each item and sends that information back to the system via the BusinessWare adapter. The order entry target connection model translates the information and populates the PRVDR_ORDR_ID attribute for each order item.

8.4. Order Status

Once the DSL service provider has returned the order ID, the provisioning status of a DSL item can be requested. When an end user checks the status of a DSL item, the BusinessWare adapter uses the provider order ID saved to the corresponding order item to send a status request to the provider via the BusinessWare adapter. This event is synchronous—the adapter waits for a response from the provider. Once the provider sends status information back, the system posts this information to the DSL service provider status page. The system neither translates nor saves the status information—it is posted to this page exactly as it is sent by the DSL service provider. If the provider does not yet have status on the order, the system displays a message stating that provisioning status is not yet available.

If the provider's site is not active when the order is submitted, the provider might not receive the order. For this reason, it is recommended that the user check the status of new orders daily to ensure the provider receive all orders sent.

8.5. Creating DSL Vendor Products and Offers

Vendor products and offers for DSL services and CPF are created in the same way as any other products and offers in the Cygent system. The user must associate a vendor with a vendor product, associate any disclosures, service level agreements, and parameter groups, and then create corresponding offers and prices. The user can also create new business rules specific to the relationship between the DSL services and CPE.

The user may also want to create a placeholder CPE vendor product and offer with a price of $0, for use when a customer already owns the specified CPE.

This allows a customer to select this placeholder product when they don't need to order a CPE, thereby not breaking any business rules. Additionally, a representation in their account services for the CPE shows the delivered product was not provisioned by the DSL service provider.

BusinessWare is configured to send specific provisioning information to the DSL service provider when the order is submitted. To get this information to BusinessWare, the use needs to create vendor product parameters to associate with the DSL service vendor products.

8.6. Creating a DSL Offer Collection

To create offer collections for DSL services, the user must first design the flow of the collection, create the determinants, create corresponding determinant items for the DSL offers, then populate the determinant sequence table.

When creating a DSL offer collection, adhere to the following:

(1) Use the SERVICE_ADDRESS_REQUEST determinant. This determinant collects address information.

(2) The determinant after SERVICE_ADDRESS_REQUEST must be the SERVICE_AVAILABILITY_CHOOSE_ONE determinant. The corresponding display policy for this determinant sends the pre-qualification information to the interconnect service, and then displays the returned products as determinant items.

(3) Populate the PRVDR_SVC_OFFER_MAP table. This creates the association between the DSL provider's products and the determinant items. The DSL service provider must provide a list of valid product IDs.

What is claimed is:

1. An electronic business support system, comprising a smart component server, wherein said smart component server comprises:
   a plurality of activity smart components, each of which performs a specific business logic;
   a plurality of service smart components which provide common infrastructure capabilities required by said activity smart components;
   a plurality of communications messaging interfaces that transport messages from said support system to external systems;
   a plurality of transport adapters, which facilitate connectivity with external systems;
   an administrator console, which is a Java-based tool that uses XML files to map object attributes to a database which is associated with said electronic business support system;
wherein said smart components are implemented as stateless session enterprise Java beans;
wherein said activity smart components comprise:
   an offer management server, which provides services for creating and presenting a collection of offer instances;
   a quote management server, which provides services for creating a quote upon placing said collection of offer instances into a shopping cart; and
   an order management server, which provides services for creating an order upon quoting all quote items.

2. The electronic business support system of claim 1, further comprising:
   a business rule management server, which provides services for defining and managing business rules that maintain valid relationships between objects.

3. The electronic business support system of claim 2, wherein said business rules are created in said administrator console using templates.

4. The electronic business support system of claim 2, wherein said business rules are invoked during a quote process.

5. The electronic business support system of claim 1, further comprising:
   a shop management server, which provides services for directing users in on-line shopping process.

6. The electronic business support system of claim 1, further comprising:
   a customer management server, which provides services for managing a customer, their accounts, and their communications-specific products in a hierarchical structure.

7. The electronic business support system of claim 1, further comprising:
   a sales management server, which provides services for sales management and promotion on-line.

8. The electronic business support system of claim 1, further comprising:
   an interaction management server, which provides services in support of interactions on-line.

9. The electronic business support system of claim 1, further comprising:
   a profile management server, which provides services for creating and managing profiles on-line.

10. The electronic business support system of claim 1, further comprising:
   a bill presentment management server, which provides services for presenting and managing bill points on-line.

11. The electronic business support system of claim 1, further comprising:
   a payment management server, which provides services for making payments on-line.

12. The electronic business support system of claim 1, further comprising:
   a trouble ticket server, which provides services for collecting and dispatching trouble tickets.

13. The electronic business support system of claim 1, further comprising:
   a notice management server, which provides services for posting notices and targeting notices to specific customers.

14. An electronic business support system, comprising a smart component server, wherein said smart component server comprises:
   a plurality of activity smart components, each of which performs a specific business logic;
   a plurality of service smart components which provide common infrastructure capabilities required by said activity smart components;
   a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said smart components are implemented as stateless session enterprise Java beans;

wherein said service smart components comprise:

a database access service, which includes a plurality of value objects and a data cursor service;

an interconnect service, which uses said communications messaging interfaces and said transport adapters connecting said activity smart components with external systems;

a security service, which uses standard Internet security protocols to ensure browser to server security and server to server security;

a logging service, which creates files that report on specific actions within the electronic business support system; and a sequence service, which establishes default sequences for page flows;

wherein said value objects include domain objects, which represent a specific row in a database table, and display objects, which are containers that deliver attribute values to JSP pages.

15. The electronic business support system of claim 14, wherein said data cursor service is implemented as a stateful enterprise Java bean;

wherein said data cursor service creates a scrollable, read-only cursor; and wherein said read-only cursor is used when a large result set from a query is expected.

16. The electronic business system of claim 14, wherein said logging service comprises:

a file logger, which sends information to a text file; and a console logger, which sends information to a screen.

17. The electronic business system of claim 16, wherein said logging service allows adding loggers to meet individual business needs.

18. The electronic business system of claim 14, wherein said logging service maintains an XML file which specifies a list of values that are used to determine whether to log a message.

19. The electronic business system of claim 18, wherein said list of values includes a severity level of an event, an architectural area wherein said event occurs, and a functional stage wherein said event occurs.

20. An electronic business support system, comprising a smart component server, wherein said smart component server comprises:

a plurality of activity smart components, each of which performs a specific business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said smart components are implemented as stateless session enterprise Java beans;

wherein said transport adapters comprise:

a file adapter, which prints out all information that it receives from a corresponding communications messaging interface;

a business rules adapter, which determines and displays valid attachment points in a quote process;

an electronic mail adapter, which sends electronic mail messages based on a corresponding communications messaging interface;

an enterprise application integration adapter, which facilitates connection between said electronic business support system with an external system; and an open adapter, which is to be configured by the user according to a particular communications messaging interface.

21. The electronic business support system of claim 20, wherein said open adapters handlers are stubs that are used by a plurality of communications messaging interfaces.

22. The electronic business support system of claim 20, wherein said electronic mail adapters handlers determine who receives a particular electronic mail message and what template is used to create said message.

23. The electronic business support system of claim 20, wherein said enterprise application integration adapter is a stateless enterprise bean that runs within the electronic business support system's process space; and wherein said enterprise application integration adapter uses source and target connection models that run within said external system's process space to transmit data between the electronic business support system and said external system.

24. The electronic business support system of claim 23, wherein when a routing policy dispatches a communications messaging interface to said enterprise application integration adapter, a handler for said communications messaging interface creates an event; and wherein said event retains an association to the data referenced by said communications messaging interface.

25. The electronic business support system of claim 24, wherein said communications messaging interface comprises a plurality of objects that contain references to data which is to be sent as events into said external system.

26. The electronic business support system of claim 24, wherein said handler invokes a source connection model that populates an object with actual data and sends said object to said enterprise application integration adapters automator model.

27. The electronic business support system of claim 20, wherein said external system is Vitria BusinessWare.

28. An electronic business portal for an electronic business support system, comprising a smart component server, wherein said smart component server comprises:

a plurality of activity smart components, each of which performs a specific business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said smart components are implemented as stateless session enterprise Java beans;

wherein the portal comprises:
- a plurality of JSP pages for dynamic content in a Web site;
- a plurality of display policy interfaces that access and manipulate data for display;
- a Web session controller which maintains user session state;
- a plurality of page transition policies which determine navigation logic through said Web site; and
- a plurality of resource bundles which display values or messages corresponding to codes in constant classes.

29. The electronic business portal of claim 28, wherein said Web session controller is a servlet that provides load balancing through a session-level algorithm that weighs server load information and routes requests accordingly.

30. The electronic business portal of claim 29, wherein said Web session controller provides fail-over by replacing HTTP session information across nodes in a cluster and maintains session state via a cookie-based session identification.

31. The electronic business portal of claim 28, wherein said Web session controller describes the lifecycle of data, using a page scope which passes data back and forth between a page and a display policy; and
    wherein said page scope begins when a JSP starts rendering and expires when the JSP finishes rendering.

32. The electronic business portal of claim 28, wherein said Web session controller describes the lifecycle of data, using a request scope which passes data from transition policies to JSPs and display policies or passes data between parent and sub JSPs; and
    wherein said request scope begins with a browser request that passes in HTML form data, lives throughout the life of said request from a client, until the destination JSP is rendered and sent back to the browser.

33. The electronic business portal of claim 28, wherein said Web session controller describes the lifecycle of data, using a session scope which stores data between requests; and
    wherein said session scope is created when a user first makes a request to said Web session controller and is destroyed when the session times out.

34. The electronic business portal of claim 28, wherein said Web session controller describes the lifecycle of data, using an application scope which begins with a server startup and ends when the server is shut down.

35. The electronic business portal of claim 28, wherein said transition policies are Java files that contain navigation and validation logic.

36. The electronic business portal of claim 28, wherein said transition policies access the electronic business support system's API to perform business logic.

37. An electronic business support system, comprising a smart component server, wherein said smart component server comprises:
- a plurality of activity smart components which encapsulate communications-specific functionality and business logic;
- a plurality of service smart components which provide common infrastructure capabilities required by said activity smart components;
- a plurality of communications messaging interfaces that transport messages from said support system to external systems;
- a plurality of transport adapters, which facilitate connectivity with external systems;
- an administrator console, which is a Java-based tool that uses XML files to map object attributes to a database which is associated with said electronic business support system;
- wherein said activity smart components include an offer management server which enables a user to present an offer collection;
- wherein said offer collection includes a set of determinants;
- wherein each of said determinants is represented by a page which includes a plurality of determinant items; and wherein each of said determinant items represents an offer on a determinant:

wherein each offer instance is created by a users each selection of a determinant item to a temporary collection object;
- wherein the users determination of all selections constitutes a collection of offer instances to be added in a shopping cart; and
- wherein said offer collection has an associated sequence that establishes a default order in which said determinants are displayed within offer collection.

38. An electronic business support system, comprising a smart component server, wherein said smart component server comprises:
- a plurality of activity smart components which encapsulate communications-specific functionality and business logic;
- a plurality of service smart components which provide common infrastructure capabilities required by said activity smart components;
- a plurality of communications messaging interfaces that transport messages from said support system to external systems;
- a plurality of transport adapters, which facilitate connectivity with external systems;
- an administrator console, which is a Java-based tool that uses XML files to map object attributes to a database which is associated with said electronic business support system;
- wherein said activity smart components include an offer management server which enables a user to present an offer collection;
- wherein said offer collection includes a set of determinants;
- wherein each of said determinants is represented by a page which includes a plurality of determinant items; and wherein each of said determinant items represents an offer on a determinant;

wherein each of said determinants is selected from a group of determinant types comprising:
- fixed type, which is used when a collection is fixed;
- choose one type, which is used when the user must select one item from a list of items;
- choose multiple type, which is used when the user can select more than one item; and
- information request type, which is used to collect specific information form the user.

39. An electronic business support system, comprising a smart component server, wherein said smart component server comprises:
- a plurality of activity smart components which encapsulate communications-specific functionality and business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system; and wherein said smart component server organizes billing point objects and assigned product objects on an object hierarchy, said object hierarchy comprising:

a root object, which is created during registration;

a plurality of billing point objects, each of which is associated with said root object; and a plurality of assigned product objects, each of which is associated with one of said billing point objects;

wherein each of said billing point object stores all information that is needed for billing purposes;

wherein each of said assigned product objects is associated with an offer instance that is created by the user's selection of said product from a determinant; and wherein each of said objects has a specific object state that is maintained by said smart component server through API calls to a particular smart component.

40. The electronic business support system of claim 39, wherein said root object may be either in a pending state, which indicates that a request to add a new root or modifying an existing root is a process, or in an active state, which indicates that a request to add a new root or modifying an existing root has been approved.

41. The electronic business support system of claim 39, wherein said root object holds a set of information comprising:

price group identity, which determines what products are available to a customer or a partner and at what price;

logo URL, which is a link to where a logo for a customer or a partner can be stored and then displayed on a portal page;

document URL, which is a link to where external documents regarding a customer or partner can be kept; and unique authorization identity of a customer or a partner.

42. The electronic business support system of claim 39, wherein each of said assigned product objects has an object state that is selected from a group of state types comprising:

not ordered, which indicates a product is in a shop process but has not yet been ordered;

pending, which indicates that an action on a product is not complete;

rejected, which indicates that a product is not provisioned due to an error or unresolved issue;

provisioned, which indicates that a process for provisioning a product is complete;

unprovisioned, which indicates that a process for unprovisioning a product is complete;

suspended, which indicates that a service on a product is still active and its charges can be invoiced, but no modifications can be made to said product; and canceled, which indicates that any pending action on a product is canceled.

43. The electronic business support system of claim 39, wherein each of said assigned product objects is either a provisioned product object or a composite product object;

wherein said provisioned product object has a subscriber relationship upon which an account that said provisioned product is assigned to is charged on a periodic basis; and wherein said composite product object represents a group of products that are ordered as a bundle.

44. The electronic business support system of claim 39, wherein said object hierarchy can be displayed by category of summary point type.

45. An electronic business support system, comprising a smart component server, wherein said smart component server comprises:

a plurality of activity smart components which encapsulate communications-specific functionality and business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said activity smart components include a quote management server which enables a user to create a quote upon placing a collection of offer instances into a shopping cart;

wherein each offer instance is associated with a quote item;

wherein each quote item is associated with the root object in a current object hierarchy in a session;

wherein said quote management server displays charges for all items in said quote; and wherein said quote has a specific quote state that is maintained by said smart component server via API calls to said quote management server.

46. The electronic business support system of claim 45, wherein said object state for a quote is selected from a group of state types comprising:

new, which indicates that a quote is created;

pending configuration, which indicates that at least one quote item has not yet been completely configured;

configured, which indicates that all quote items are completely configured;

quoted, which indicates that all quote items are completely configured and contain all the information that is needed to order an entire quote;

expired, which indicates that a quote has expired and can no longer be ordered;

pending approval, which indicates that a quote cannot be completed until at least one requirement is met;

canceled, which indicates that the user canceled a quote;

rejected, which indicates that requirements for approval were not met; and completed, which indicates that a quote has been ordered.

47. The electronic business support system of claim 45, wherein each quote item has a specific object state that is maintained by said smart component server via API calls to said quote management server; and wherein said object state for a quote item is selected from a group of state types comprising:

removed, which indicates that a quote item has been removed from said quote;

pending configuration, which indicates that a quote item is not completely configured;

configured, which indicates that a quote item is completely configured;

expired, which indicates that either the offer associated with an quote item has expired or the quote that said quote item is associated with has expired;

canceled, which indicates that the quote that a quote item is associated with has been canceled;

completed, which indicates that a quote item has been ordered;

replaced, which indicates that a quote item has been replaced by another quote item through a supplemental order;

supplemental cancel, which indicates that a quote item was canceled through a supplemental order; and supplemental complete, which indicates that a quote item cannot be changed through a supplemental order.

48. The electronic business support system of claim 45, wherein said quote can be held for a predetermined amount of time before it expires.

49. The electronic business support system of claim 48, wherein if a price for the determinant item that is represented by a quote item changes while a quote is held, the offer instance that is associated with said quote item retains an association with the price at the time that said offer instance was created.

50. The electronic business support system of claim 49, wherein if an offer itself expires while a quote is held, the offer instance that is associated with said offer remains valid for said quote.

51. The electronic business support system of claim 45, wherein a number of values for each offer instance may be automatically populated during the transition from shopping cart to quote by using a plug-in; and wherein said plug-in is a dynamically deployed algorithm that can be implemented to perform a specific task.

52. The electronic business support system of claim 51, wherein an attachment point plug-in is used to attach assigned products; and wherein said plug-in, by default, attaches all assigned products to an account.

53. The electronic business support system of claim 51, wherein a parameter plug-in is used to set values for a parameter; and wherein said plug-in, by default, accepts values set as default for said parameter.

54. The electronic business support system of claim 51, wherein a service identifier plug-in is used; and wherein said plug-in, by default, obtains a next available service identifier.

55. The electronic business support system of claim 51, wherein a service address plug-in is used to set an address at which an item will be provisioned; and wherein said plug-in, by default, adopts the address associated with the root object with which said quote is also associated.

56. The electronic business support system of claim 45, wherein when several of the same determinant item are purchased, a number of values may be automatically populated from one quote item to all quote items that are associated with the same determinant item by using a plug-in.

57. The electronic business support system of claim 56, wherein an attachment point plug-in is used to attach assigned products.

58. The electronic business support system of claim 56, wherein a parameters plug-in is used to set all parameter values to match the parameter values for the original quote item.

59. The electronic business support system of claim 56, wherein a service identifier plug-in is used to obtain a next available service identifier.

60. The electronic business support system of claim 56, wherein a service address plug-in is used to copy the service address that is associated with the original quote item.

61. The electronic business support system of claim 56, wherein a shipping address plug-in is used to copy the shipping address that is associated with the original quote item.

62. The electronic business support system of claim 56, wherein a requested date plug-in is used to copy the requested provisioning date of the original quote item.

63. An electronic business support system, comprising a smart component server, wherein said smart component server comprises:

a plurality of activity smart components which encapsulate communications-specific functionality and business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said activity smart components include an order management server which enables a user to create an order upon quoting all quote items;

wherein each of said quote items is associated with an order item;

wherein said order is associated with the same hierarchy root object in a session as the user is associated with; and wherein said order has a specific object state that is maintained by said smart component server via API calls to said order management server;

wherein said object state for an order is selected front a group of state types consisting of:

new, which indicates that a quote is ordered;

pending dispatch, which indicates that all order items are created;

dispatched, which indicates that an order is dispatched to a provisioning system;

completed, which indicates that an order is provisioned;

rejected, which indicates that an order is rejected;

pending cancellation, which indicates that a request is submitted to cancel an order; and supplemented, which indicates that a user changed an order by creating a supplemental order.

64. An electronic business support system, comprising a smart component server, wherein said smart component server comprises:

a plurality of activity smart components which encapsulate communications-specific functionality and business logic;

a plurality of service smart components which provide common infrastructure capabilities required by said activity smart components;

a plurality of communications messaging interfaces that transport messages from said support system to external systems;

a plurality of transport adapters, which facilitate connectivity with external systems;

an administrator console, which is a Java-based tool that uses XML files to map object attributes to a database which is associated with said electronic business support system;

wherein said activity smart components include an order management server which enables a user to create an order upon quoting all quote items;

wherein each of said quote items is associated with an order item;

wherein said order is associated with the same hierarchy root object in a session as the user is associated with; and wherein said order has a specific object state that is maintained by said smart component server via API calls to said order management server;

wherein each order item has a specific object state that is maintained by said smart component server via API calls to said order management server; and wherein said object state for an order item is selected from a group of state types consisting of:

new, which indicates that a quote item is ordered and is now an order item;

dispatched, which indicates that an order item is dispatched to a provisioning system;

completed, which indicates that an order item is provisioned;

rejected, which indicates that an order item is rejected;

pending cancellation, which indicates that a request is submitted to cancel an order;

canceled, which indicates that an order item is canceled; and supplemented, which indicates that an order has been replaced by an order which is created through a supplemental quote.

* * * * *

UNITED STATES PATENT AND TRADEMARK OFFICE
CERTIFICATE OF CORRECTION

PATENT NO. : 7,657,436 B2
APPLICATION NO. : 10/240614
DATED : February 2, 2010
INVENTOR(S) : Elmore et al.

It is certified that error appears in the above-identified patent and that said Letters Patent is hereby corrected as shown below:

Line 30 of column 3. Therefore, the following changes should be made:

FIG. 6 is a block diagram illustrating a process for receiving a_ [[-]] message from an external system;

Lines 41-48 of column 179. Therefore, the following changes should be made:

Sally also belongs the Regional Managers group, as does Marla. But because neither of them have visibility into that group, [[Maria]] Marla cannot view anything associated with the East Coast group, and Sally cannot view anything associated with the West Coast group.

Christine does have visibility into the Regional Managers group, even though she is not a member. This means she has visibility to everything Sally and [[Maria]] Marla also have visibility to.

Line 64 of columns 218-219. Therefore, the following changes should be made:

Price groups are a mechanism by which the UAP user can segment the UAP [[users]] user's customers, perhaps into "VIP," "Executive" and "Standard" groups, for example. Price groups determine what products and what prices for those products are available to a given customer. The prices displayed throughout the shop process are determined by the active price group, but can later be negotiated or overridden. What price groups exist and their associated prices are both configured in the Administrator Console.

Line 37 of column 219. Therefore, the following changes should be made:

In addition to the hierarchical menus, the UAP user can also locate products by name. Selecting a letter from the alphabetical index will bring the UAP user [[td]] to a menu of products beginning with that letter. The names on which the UAP user search are taken from the menu item label, in the DISPLATTRIBS table entry for that menu item.

Line 34 of column 233. Therefore, the following changes should be made:

The quote summary page shows all the items in the [[users]] user's current quote. The top of the summary page shows the quote number, creation date, status, the name of the user who created the quote, and the last-modified user. The user can also enter a master purchase order number, a brief description, select an existing partner-customer ID (or enter a new one), and enter an e-mail address. Partner-Customer ID is a convenience field where the user can store an internal ID for their end-customers. Items in a quote display the item number (ordinal number of item in quote) product offer name, the action for this item (i.e., add, remove, change, etc.), the purchase order number (if one was provided), the status (configured, pending configuration, etc.), the price for recurring and non-recurring charges, and a checkbox with which the user can remove items from the quote. If the user removes any items from a quote, they must click "UPDATE" to commit those changes. If there are more items than will fit on one page, a pair of previous/next links allows users to navigate between pages.

Line 50 of column 240. Therefore, the following changes should be made:

Users of the CPP can issue trouble tickets against the following items by clicking the "Report Trouble" link on the following detail pages: (a) partner:[[,]] (b) account; (c) provisioned product; (d) composite product; and (e) delivered product.

Line 27 of column 244. Therefore, the following changes should be made:

(4) The provider's products are mapped to the offers. The system uses the DetermineDeterminantItems plug-in and the PRVDR_SVC_OFFER_MAP table to map the returned product IDs with corresponding the offers. The system then updates the service availability agreements (SAAs) [[(SMs)]] based on the returned install date for the corresponding vendor product.

In claim 21, line 20 of column 248. Therefore, the following changes should be made to claim 21:

The electronic business support system of claim 20, wherein said open adapter's adapters handlers are stubs that are used by a plurality of communications messaging interfaces.

In claim 22, line 23 of column 248. Therefore, the following changes should be made to claim 22:

The electronic business support system of claim 20, wherein said electronic mail adapter's adapters handlers determine who receives a particular electronic mail message and what template is used to create said message.

In claim 26, line 50 of column 248. Therefore, the following changes should be made to claim 26:

The electronic business support system of claim 24, wherein said handler invokes a source connection model that populates an object with actual data and sends said object to said enterprise application integration [[adapters]] adapter's automator model.

In claim 37, lines 16-18 of column 250. Therefore, the following changes should be made to claim 37:

An electronic business support system, comprising a smart component server, wherein said smart component server comprises: a plurality of activity smart components which encapsulate communications-specific functionality and business logic; a plurality of service smart components which provide common infrastructure capabilities required by said activity smart components; a plurality of communications messaging interfaces that transport messages from said support system to external systems; a plurality of transport adapters, which facilitate connectivity with external systems; an administrator console, which is a Java-based tool that uses XML files to map object attributes to a database which is associated with said electronic business support system; wherein said activity smart components include an offer management server which enables a user to present an offer collection; wherein said offer collection includes a set of determinants; wherein each of said determinants is represented by a page which includes a plurality of determinant items; and wherein each of said determinant items represents an offer on a determinant; wherein each offer instance is created by a user's [[users]] each selection of a determinant item to a temporary collection object; wherein the user's [[users]] determination of all selections constitutes a collection of offer instances to be added in a shopping cart;

CERTIFICATE OF CORRECTION (continued)
U.S. Pat. No. 7,657,436 B2 and wherein said offer collection has an associated sequence that establishes a default order in which said determinants are displayed within offer collection.

In claim 63, line 41 of column 254. Therefore, the following changes should be made to claim 63:

An electronic business support system, comprising a smart component server, wherein said smart component server comprises: a plurality of activity smart components which encapsulate communications-specific functionality and business logic; a plurality of service smart components which provide common infrastructure capabilities required by said activity smart components; a plurality of communications messaging interfaces that transport messages from said support system to external systems; a plurality of transport adapters, which facilitate connectivity with external systems; an administrator console, which is a Java-based tool that uses XML files to map object attributes to a database which is associated with said electronic business support system; wherein said activity smart components include an order management server which enables a user to create an order upon quoting all quote items; wherein each of said quote items is associated with an order item; wherein said order is associated with the same hierarchy root object in a session as the user is associated with; and wherein said order has a specific object state that is maintained by said smart component server via API calls to said order management server; wherein said object state for an order is selected <u>from</u> [[front]] a group of state types consisting of: new, which indicates that a quote is ordered; pending dispatch, which indicates that all order items are created; dispatched, which indicates that an order is dispatched to a provisioning system; completed, which indicates that an order is provisioned; rejected, which indicates that an order is rejected; pending cancellation, which indicates that a request is submitted to cancel an order; and supplemented, which indicates that a user changed an order by creating a supplemental order.

Signed and Sealed this

Sixth Day of April, 2010

David J. Kappos
*Director of the United States Patent and Trademark Office*